United States Patent [19]
Hirairi

[11] Patent Number: 6,028,987
[45] Date of Patent: Feb. 22, 2000

[54] METHOD OF OPERATION OF ARITHMETIC AND LOGIC UNIT, STORAGE MEDIUM, AND ARITHMETIC AND LOGIC UNIT

[75] Inventor: Koji Hirairi, Kanagawa, Japan

[73] Assignee: Sony Corporation, Japan

[21] Appl. No.: 08/992,847

[22] Filed: Dec. 18, 1997

[30] Foreign Application Priority Data

| Dec. 20, 1996 | [JP] | Japan | 8-342251 |
| Dec. 20, 1996 | [JP] | Japan | 8-342252 |
| Dec. 20, 1996 | [JP] | Japan | 8-342253 |
| Mar. 28, 1997 | [JP] | Japan | 9-078362 |

[51] Int. Cl.$^7$ .................................................. G06F 17/50
[52] U.S. Cl. .............................. 395/500.04; 395/500.02; 395/500.23; 395/706; 395/708; 708/490; 708/509; 706/56
[58] Field of Search ......................... 395/500.23, 500.38, 395/500.47, 500.03, 800, 562, 564, 573, 581, 583, 702, 500.04, 706, 708; 364/716.05, 717.04, 787.04; 706/56, 22; 708/490, 507, 509, 671

[56] References Cited

U.S. PATENT DOCUMENTS

| 5,077,677 | 12/1991 | Murphy et al. | 395/10 |
| 5,247,627 | 9/1993 | Murakami et al. | 395/375 |
| 5,263,124 | 11/1993 | Weaver et al. | |
| 5,434,972 | 7/1995 | Hamlin | 395/200 |

*Primary Examiner*—Kevin J. Teska
*Assistant Examiner*—Thai Phan
*Attorney, Agent, or Firm*—Rader, Fishman, & Grauer; Ronald P. Kananen

[57] ABSTRACT

A method of operation of an arithmetic and logic unit, a storage medium, and an arithmetic and logic unit introducing a technique and concept of converting a serial structure of decisions having an order dependency to an indeterminate code binary tree which can be processed in parallel so as to simplify the configuration and enable higher speed operation processing.

Where a serial structure of decisions having an order dependency is converted to a binary tree structure using decision nodes not having dependency input/outputs as leaves and higher priority determination nodes as the nodes other than the leaves, the decision nodes having dependency input/outputs are replaced by decision nodes not having dependency input/outputs provided with connotation decision nodes and indeterminate code generation nodes.

85 Claims, 74 Drawing Sheets

INDETERMINATE CODE BINARY TREE
REALIZING PRIORITY ENCODER

FIG. 2A  DECISION NODE HAVING DEPENDENCY INPUT/OUTPUT
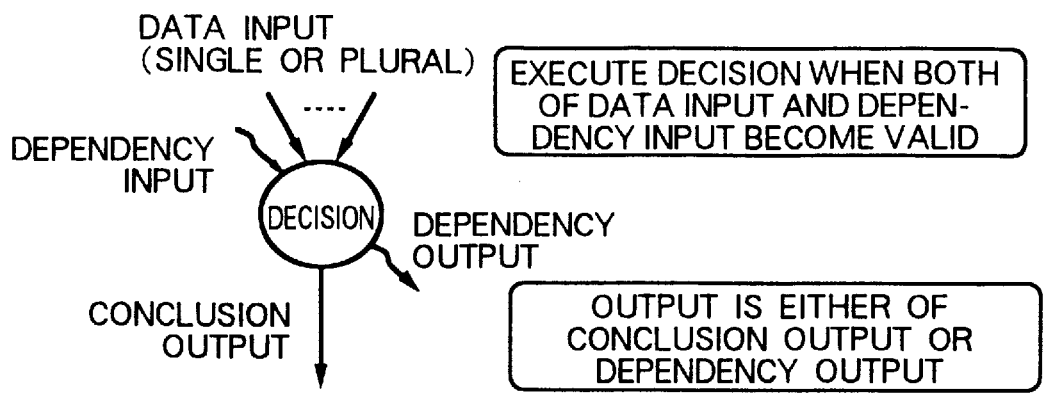
FIG. 2B  SERIAL STRUCTURE OF DECISIONS HAVING AN ORDER DEPENDENCY DATA INPUT
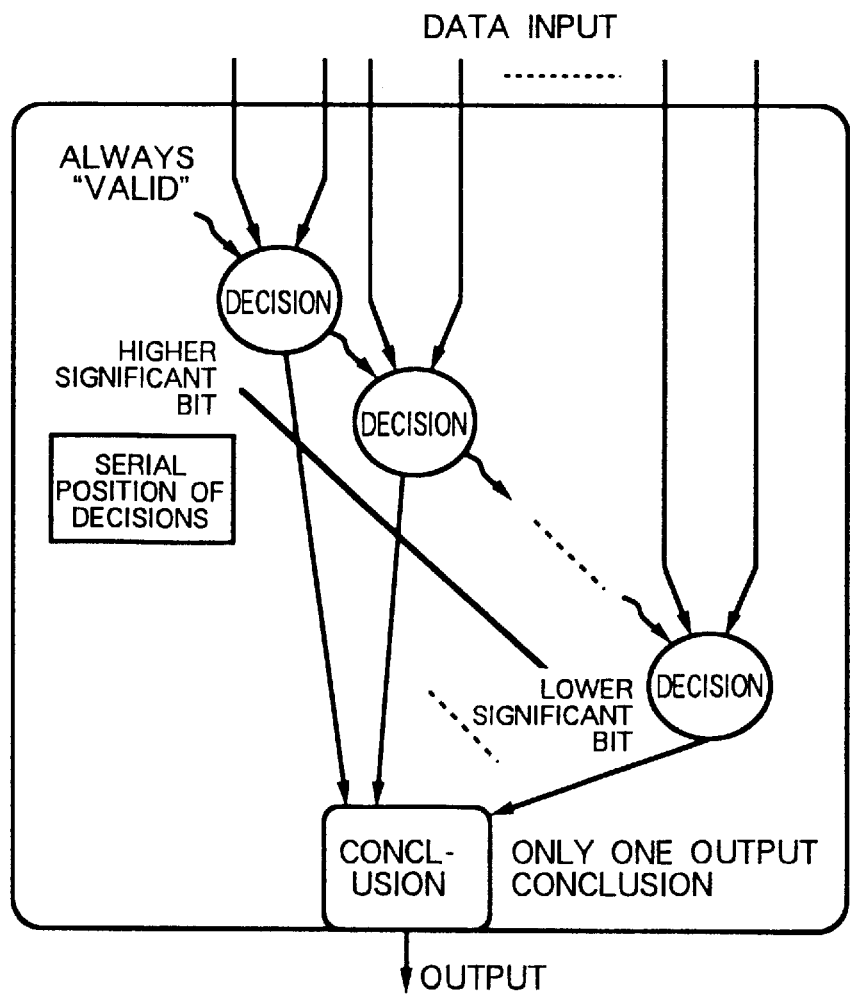

FIG. 5A APPEARANCE OF "DECISION NODE NOT HAVING DEPENDENCY INPUT/OUTPUT"
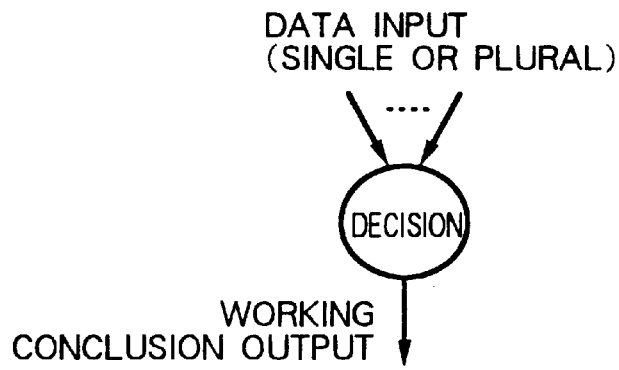
FIG. 5B CONTENTS OF "DECISION NODE NOT HAVING DEPENDENCY INPUT/OUTPUT"
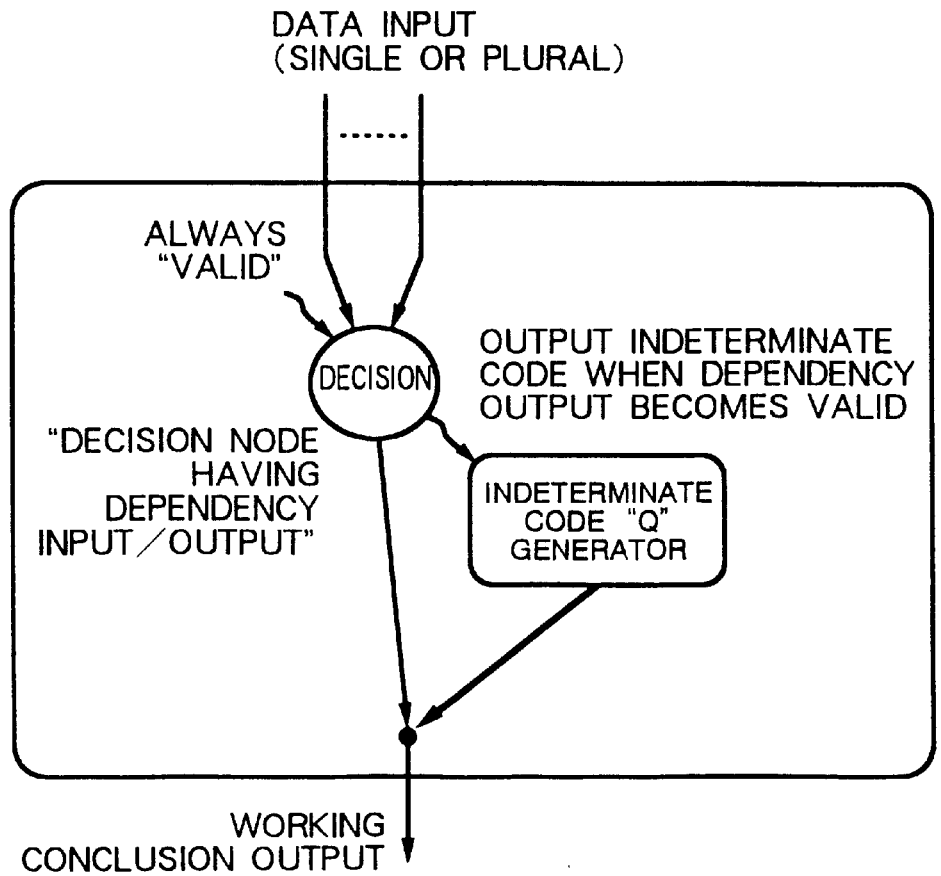

FIG. 6A  APPEARENCE OF "HIGHER PRIORITY DETERMINATION NODE"
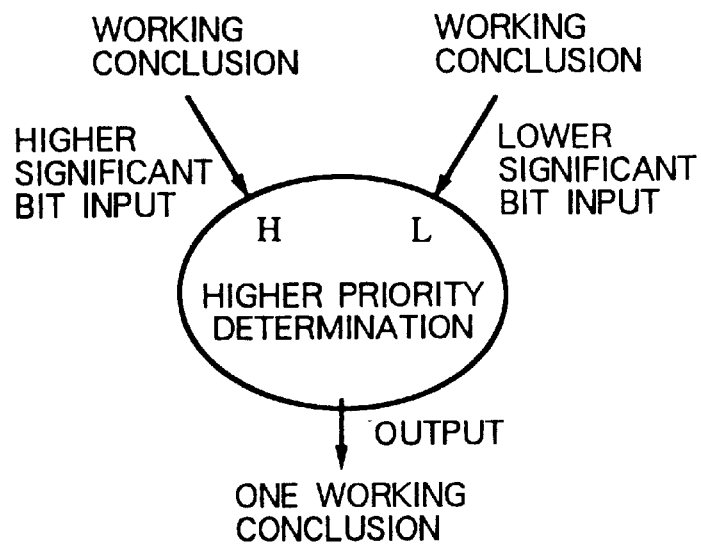
FIG. 6B  OPERATION OF "HIGHER PRIORITY DETERMINATION NODE"
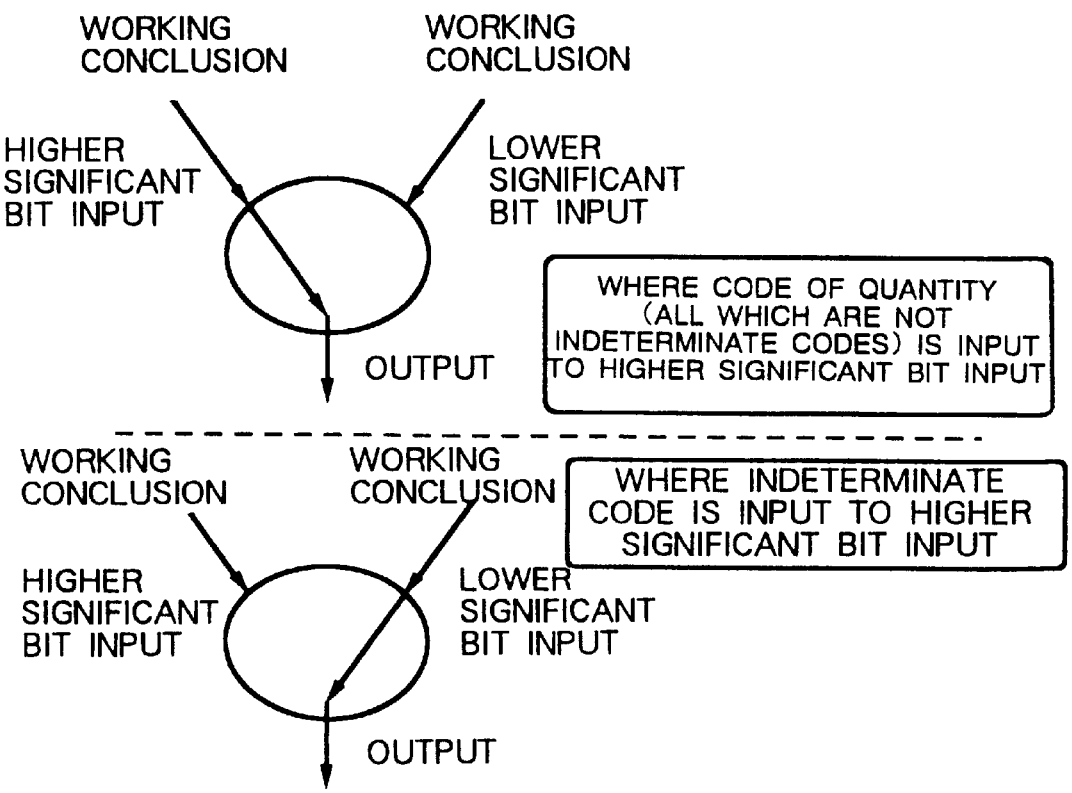

"DECISION NODE NOT HAVING DEPENDENCY INPUT/OUTPUT" CONTAINING "DECISION NODE HAVING DEPENDENCY INPUT/OUTPUT" IN PRIORITY ENCODER

FIG. 10A  CODE SYSTEM OF INDETERMINATE CODE BINARY TREE

| CODE | BINARY CODE |
|---|---|
| VALID NUMERAL 7 | 1 1 1 1 |
| VALID NUMERAL 6 | 1 1 1 0 |
| VALID NUMERAL 5 | 1 1 0 1 |
| VALID NUMERAL 4 | 1 1 0 0 |
| VALID NUMERAL 3 | 1 0 1 1 |
| VALID NUMERAL 2 | 1 0 1 0 |
| VALID NUMERAL 1 | 1 0 0 1 |
| VALID NUMERAL 0 | 1 0 0 0 |
| INDETERMINATE CODE (INVALID) | 0 * * * |

FIG. 10B  TRUTH TABLE OF DECISION NODES

| DECISION NODE | INPUT = 1 | INPUT = 0 |
|---|---|---|
| DECISION 7 | 1 1 1 1 | 0 1 1 1 |
| DECISION 7 | 1 1 1 0 | 0 1 1 0 |
| DECISION 7 | 1 1 0 1 | 0 1 0 1 |
| DECISION 7 | 1 1 0 0 | 0 1 0 0 |
| DECISION 7 | 1 0 1 1 | 0 0 1 1 |
| DECISION 7 | 1 0 1 0 | 0 0 1 0 |
| DECISION 7 | 1 0 0 1 | 0 0 0 1 |
| DECISION 7 | 1 0 0 0 | 0 0 0 0 |

FIG. 10C  TRUTH TABLE OF HIGHER PRIORITY DETERMINATION NODE

| | HIGHER SIGNIFICANT BIT INPUT $A_{3210}$ | LOWER SIGNIFICANT BIT INPUT $B_{3210}$ | OUTPUT |
|---|---|---|---|
| WHEN $A_3 = 1$ | $1A_{210}$ | * | $1A_{210}$ |
| WHEN $A_3 = 0$ | $0A_{210}$ | $B_{3210}$ | $B_{3210}$ |

LOGICAL CIRCUIT OF DECISION NODE AND
HIGHER PRIORITY DETERMINATION NODE

PERFORM LOGIC COMPRESSION WITH RESPECT
TO LOGICAL CIRCUIT OF FIG. 12 AND REMOVED
FIRST SELECTOR. THIS ACTS ALSO AS PRIORITY
ENCODER OF 2-BIT INPUT BY ITSELF.

4-BIT INPUT PRIORITY ENCODER USING CIRCUIT UP TO FIG. 13

PERFORM LOGIC COMPRESSION WITH RESPECT TO CIRCUIT OF FIG. 14 AND REMOVE SECOND AND THIRD SELECTORS

PRIORITY ENCODER OF 8-BIT INPUT AND 4-BIT OUTPUT USING CIRCUIT UP TO FIG.15

OPTIMUM LOGICAL CIRCUIT OF PRIORITY ENCODER OF 8-BIT INPUT AND 4-BIT OUTPUT REMOVED THIRD SELECTOR BY PERFORMING LOGIC COMPRESSION WITH RESPECT TO CIRCUIT OF FIG.16

8 BIT INPUT

4 BIT OUTPUT

| INPUT | | | | | | | | OUTPUT | |
|---|---|---|---|---|---|---|---|---|---|
| 7 | 6 | 5 | 4 | 3 | 2 | 1 | 0 | VALID | NUME-RICAL |
| 1 | * | * | * | * | * | * | * | 1 | 0 0 0 |
| 0 | 1 | * | * | * | * | * | * | 1 | 0 0 1 |
| 0 | 0 | 1 | * | * | * | * | * | 1 | 0 1 0 |
| 0 | 0 | 0 | 1 | * | * | * | * | 1 | 0 1 1 |
| 0 | 0 | 0 | 0 | 1 | * | * | * | 1 | 1 0 0 |
| 0 | 0 | 0 | 0 | 0 | 1 | * | * | 1 | 1 0 1 |
| 0 | 0 | 0 | 0 | 0 | 0 | 1 | * | 1 | 1 1 0 |
| 0 | 0 | 0 | 0 | 0 | 0 | 0 | 1 | 1 | 1 1 1 |
| 0 | 0 | 0 | 0 | 0 | 0 | 0 | 0 | 0 | * * * |

"*" IS "DON' T CARE"

FIG. 25A DECISION NODE

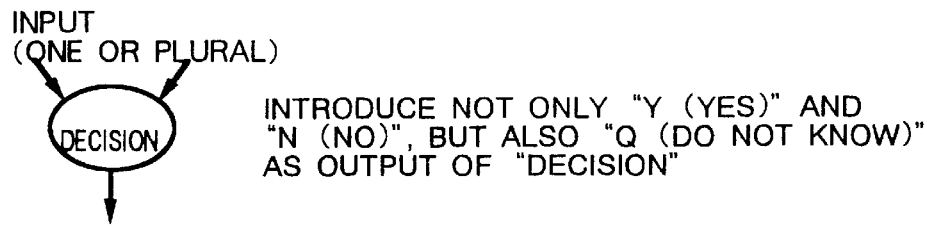

INTRODUCE NOT ONLY "Y (YES)" AND "N (NO)", BUT ALSO "Q (DO NOT KNOW)" AS OUTPUT OF "DECISION"

FIG. 25B HIGHER PRIORITY DETERMINATION NODE

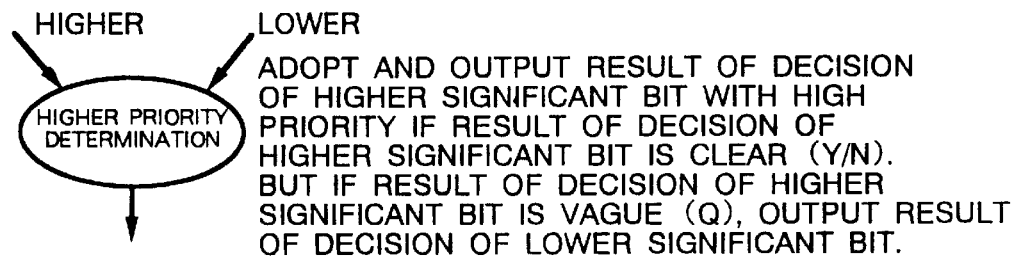

ADOPT AND OUTPUT RESULT OF DECISION OF HIGHER SIGNIFICANT BIT WITH HIGH PRIORITY IF RESULT OF DECISION OF HIGHER SIGNIFICANT BIT IS CLEAR (Y/N). BUT IF RESULT OF DECISION OF HIGHER SIGNIFICANT BIT IS VAGUE (Q), OUTPUT RESULT OF DECISION OF LOWER SIGNIFICANT BIT.

FIG. 25C TERNARY CODE BINARY TREE

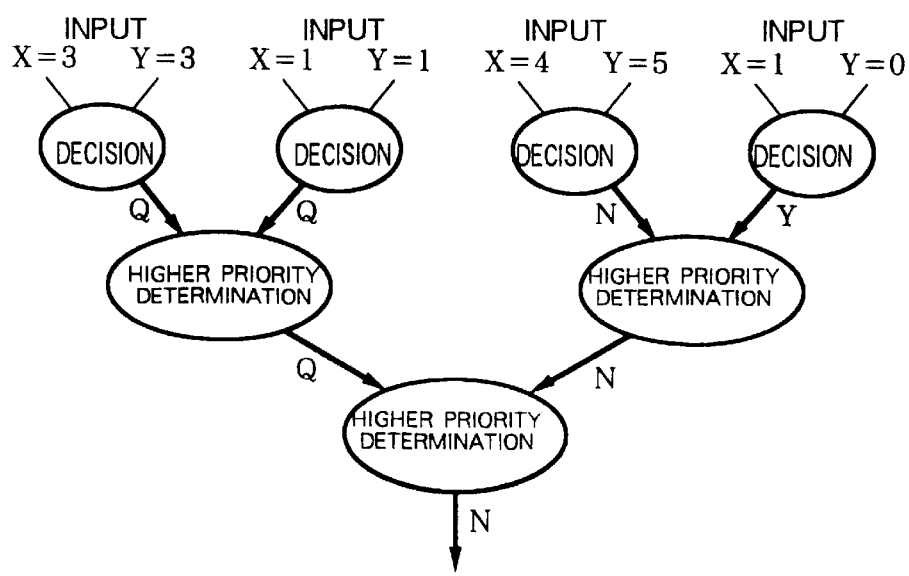

FIG. 26A DEFINITION OF K OPERATOR
|  | L SIDE | | |
|---|---|---|---|
|  | Q | Y | N |
| H SIDE Q | Q | Y | N |
| Y | Y | Y | Y |
| N | N | N | N |
FIG. 26B K LOGIC FUNCTION
$T_i, T_j = \{Q, Y, N\}$
$$T_i \; K \; T_j = T_{ij}$$
$$(T_{i,1}, T_{i,0}) \; K \; (T_{j,1}, T_{j,0}) = (T_{i,1} + T_{j,1}, \; T_{i,1} * T_{i,0} + \overline{T_{i,1}} * T_{j,0})$$
$$= (T_{ij,1}, T_{ij,0})$$
FIG. 26C K LOGIC CIRCUIT
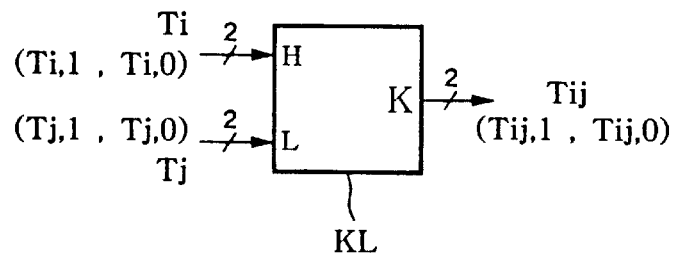
FIG. 26D STRUCTURE OF K LOGIC CIRCUIT
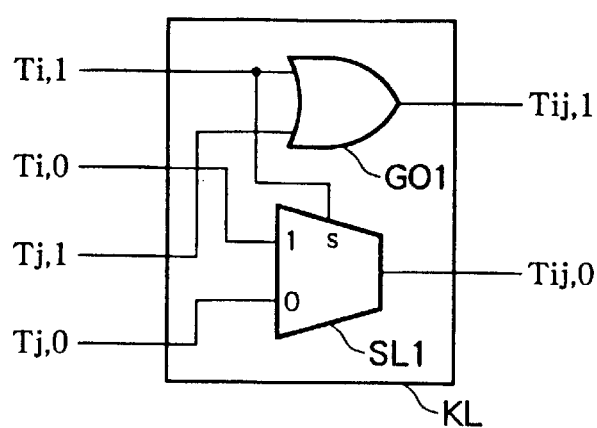

| Xi | Yi | Ti = | (Ti,1 , Ti,0) | |
|----|----|------|-----|---|
| 0  | 0  | Q    | 0   | * |
| 0  | 1  | N    | 1   | 0 |
| 1  | 0  | Y    | 1   | 1 |
| 1  | 1  | Q    | 0   | * |

METHOD OF REALIZATION
MINIMIZING HARDWARE IS $Ti,1 = Xi \, (+) \, Yi$
$Ti,0 = Xi$

FIG. 31

| X (MSB) | Y (MSB) | TERNARY CODE |
|---|---|---|
| 0 | 0 | Q |
| 0 | 1 | Y |
| 1 | 0 | N |
| 1 | 1 | Q |

FIG. 34A
| Xi | Yi | Ti = | (Ti,1 , Ti,0) | |
|----|----|----|----|----|
| 0 | 0 | N | 1 | 0 |
| 0 | 1 | Q | 0 | * |
| 1 | 0 | | | |
| 1 | 1 | Y | 1 | 1 |
METHOD OF REALIZATION MINIMIZING HARDWARE IS
$Ti,1 = \overline{Xi \;(+)\; Yi}$
$Ti,0 = Xi$   OR   $Ti,0 = Yi$
FIG. 34B
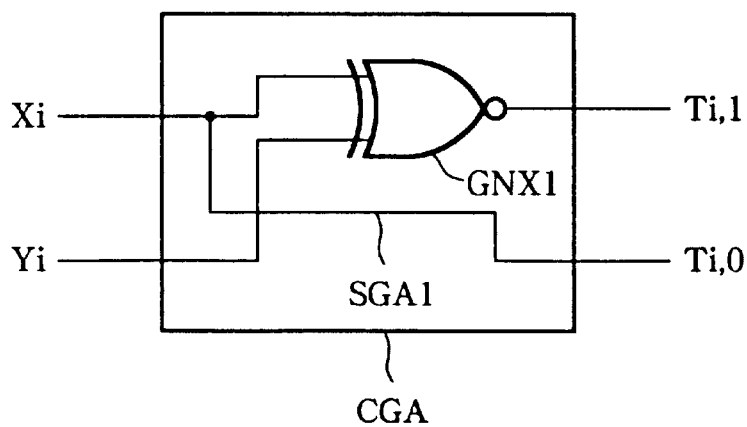
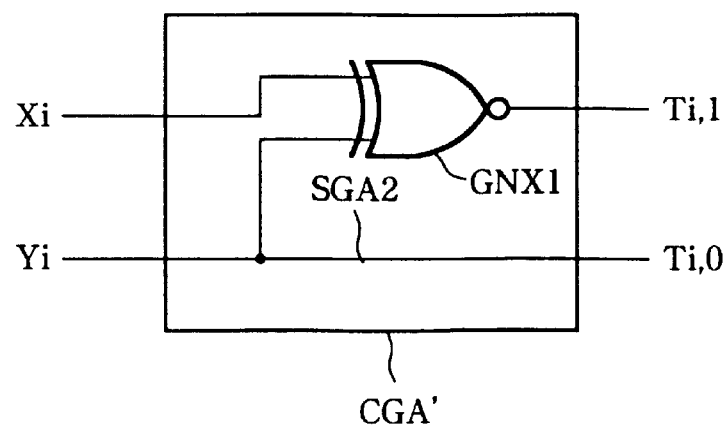

FIG. 35A THERE IS NO DEPENDENCY WITH RESPECT TO DIGIT LOCATED AT LOWER SIGNIFICANT BIT THAN SELF AT LEAST SIGNIFICANT DIGIT. ACCORDINGLY, IT CAN ANSWER GENERATED QUESTION BY ONLY Y AND N WITHOUT Q
CASE OF $C_{IN} = 0$
| X0 | Y0 | T0 = | (T0,1 , T0,0) |
|----|----|------|---------------|
| 0  | 0  |      |               |
| 0  | 1  | N    | 1    |    0   |
| 1  | 0  |      |               |
| 1  | 1  | Y    | 1    |    1   |
CASE OF $C_{IN} = 1$
| X0 | Y0 | T0 = | (T0,1 , T0,0) |
|----|----|------|---------------|
| 0  | 0  | N    | 1    |    0   |
| 0  | 1  |      |               |
| 1  | 0  | Y    | 1    |    1   |
| 1  | 1  |      |               |
FIG. 35B METHOD OF REALIZATION MINIMIZING HARDWARE IS
T0,1 ...NOTHING
T0,0 = $C_{in}$ * (X0 + Y0) + $\overline{C_{in}}$ * (X0 * Y0)
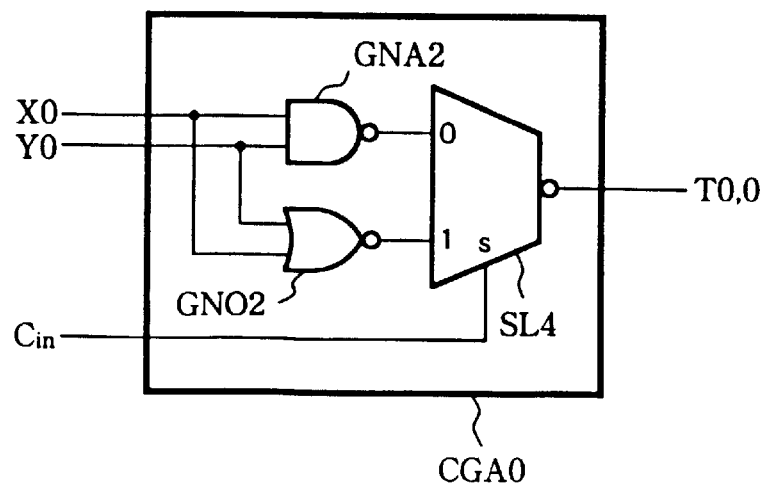

FIG. 44
{00,01,11,10} = {Y,F,Q,N} ASSIGNMENT
K LOGIC FUNCTION : $T1 = H1 \cdot (\char"02C6 H0 + L1)$
$T0 = H0 \cdot L0$
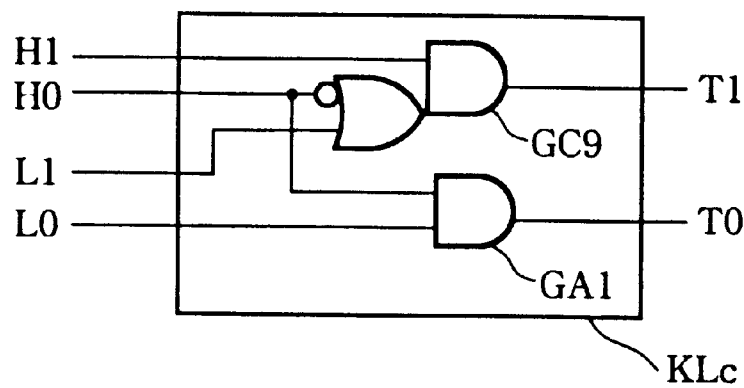
{00,01,11,10} = {F,Y,Q,N} ASSIGNMENT
K LOGIC FUNCTION : $T1 = \char"02C6 H0 + H1 \cdot L1$
$T0 = \char"02C6 H1 + H0 \cdot L0$
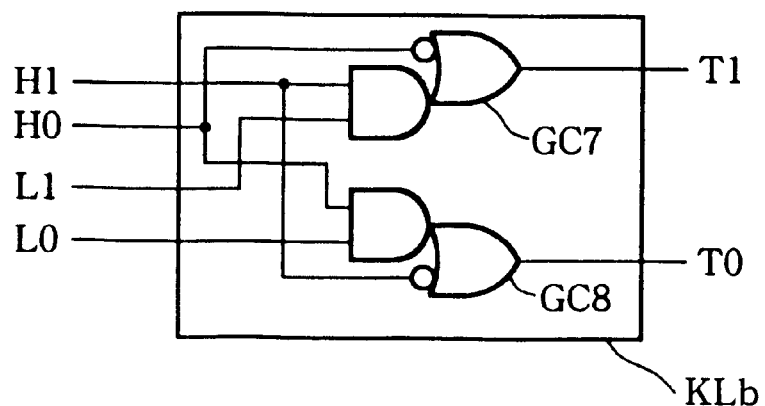

FIG. 45
{00,01,11,10} = {Y,F,N,Q} ASSIGNMENT
K LOGIC FUNCTION : T1 = H0 + H1 · L1
T0 = H0 + H1 · L0
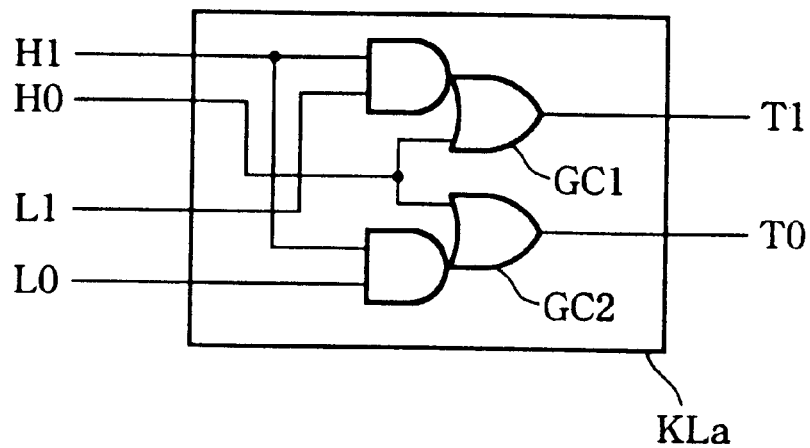
{00,01,11,10} = {Q,Q,Y,N} ASSIGNMENT
K LOGIC FUNCTION : T1 = H1 + L1
T0 = H1 · H0 + ˆH1 · L0
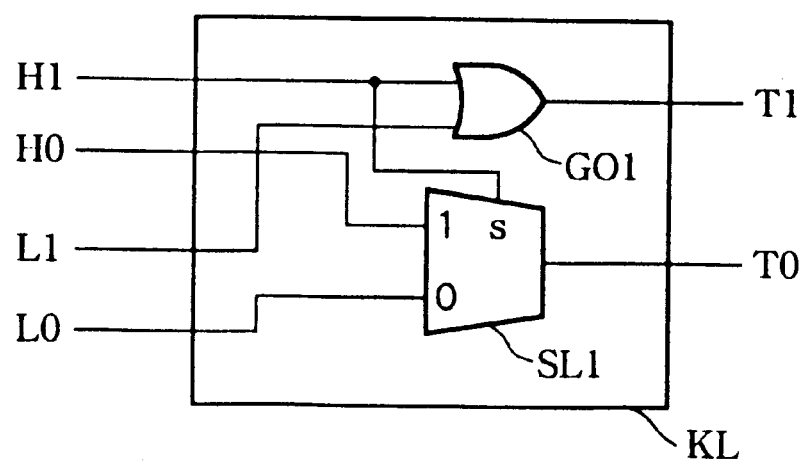

FIG. 46A INPUT STAGE OF COMPARATOR
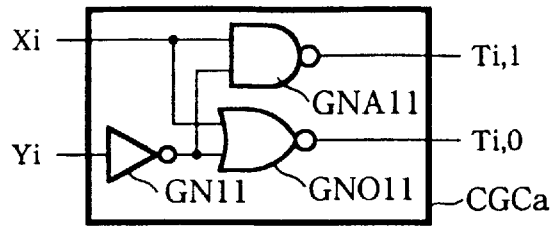
FIG. 46B INPUT STAGE OF ADDER
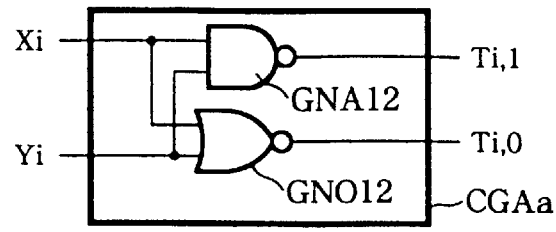
FIG. 46C CONSTITUENT ELEMENT OF BINARY TREE (PN STAGE)
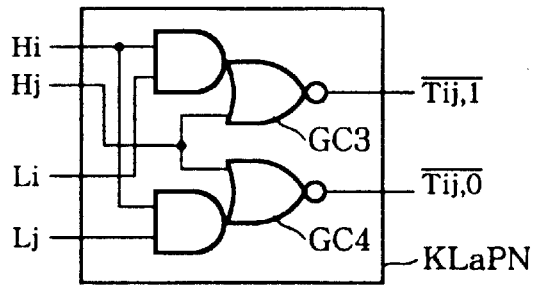
FIG. 46D CONSTITUENT ELEMENT OF BINARY TREE (NP STAGE)
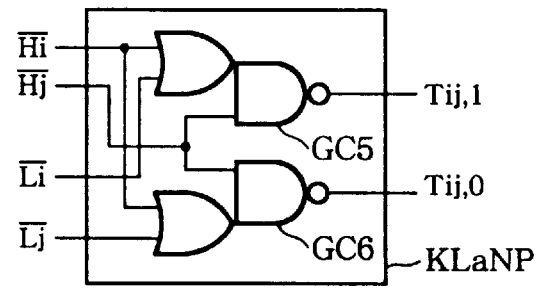
FIG. 46E GENERATION CIRCUIT OF SUM OF ADDER
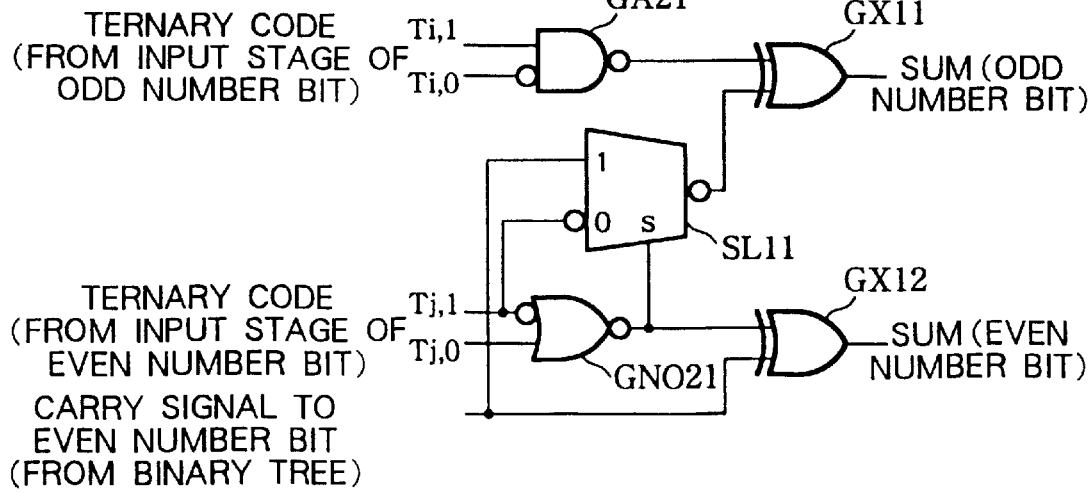

FIG. 47A TERNARY CODE GENERATION LOGIC FUNCTION OF DIFFERENCE AND TRUTH TABLE
| Xi | Yi | Ti = | (Ti,1 , Ti0) | |
|----|----|----|----|----|
| 0 | 0 | Q | 0 | * |
| 0 | 1 | Y | 1 | 1 |
| 1 | 0 | N | 1 | 0 |
| 1 | 1 | Q | 0 | * |
METHOD OF REALIZATION MINIMIZING HARDWARE IS $\cdots$
$T_{i,1} = X_i \;(+)\; Y_i$
$T_{i,0} = Y_i$
※ {00, 01, 11, 10} = {Q, Q, Y, N} ASSIGNMENT
FIG. 47B TERNARY CODE GENERATION LOGIC CIRCUIT OF DIFFERENCE : INPUUT STAGE OF SUBTRACTOR
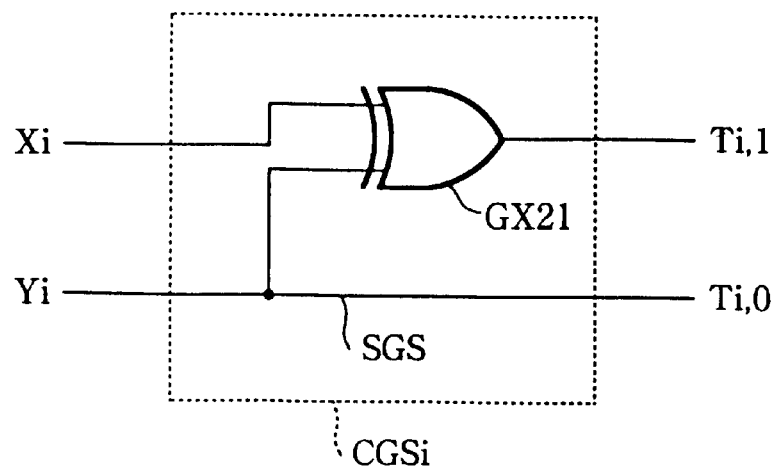

FIG. 48A TRUTH TABLE BASED ON DEFINITIVE NATURE OF BIT 0

THERE IS NO DEPENDENCY WITH RESPECT TO DIGIT LOCATED AT LOWER SIGNIFICANT BIT THAN SELF AT LEAST SIGNIFICANT DIGIT. ACCORDINGLY, IT CAN ANSWER GENERATED QUESTION BY ONLY Y AND N WITHOUT Q

CASE OF $B_{in} = 0$

| X0 | Y0 | T0 = | (T0,1 , T0,0) | |
|----|----|----|----|----|
| 0 | 0 | N | 1 | 0 |
| 0 | 1 | Y | 1 | 1 |
| 1 | 0 | N | 1 | 1 |
| 1 | 1 | | | |

CASE OF $B_{in} = 1$

| X0 | Y0 | T0 = | (T0,1 , T0,0) | |
|----|----|----|----|----|
| 0 | 0 | Y | 1 | 1 |
| 0 | 1 | | | |
| 1 | 0 | N | 1 | 0 |
| 1 | 1 | Y | 1 | 1 |

※ {00, 01, 11, 10} = {Q, Q, Y, N} ASSIGNMENT

FIG. 48B TERNARY CODE GENERATION CIRCUIT OF DEFFERENCE OF BIT 0

METHOD OF REALIZATION MINIMIZING HARDWARE IS …
T0,1 … NOTHING
$T0,0 = B_{in} \cdot (X0 + Y0) + \overline{B_{in}} \cdot (\overline{X0} \cdot Y0)$

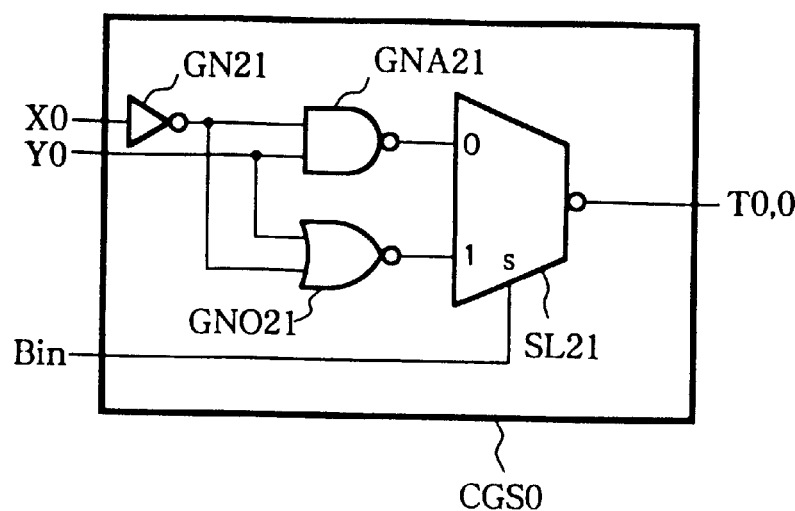

FIG. 57A INTERNAL CIRCUIT OF LOGICAL GATE EXOR
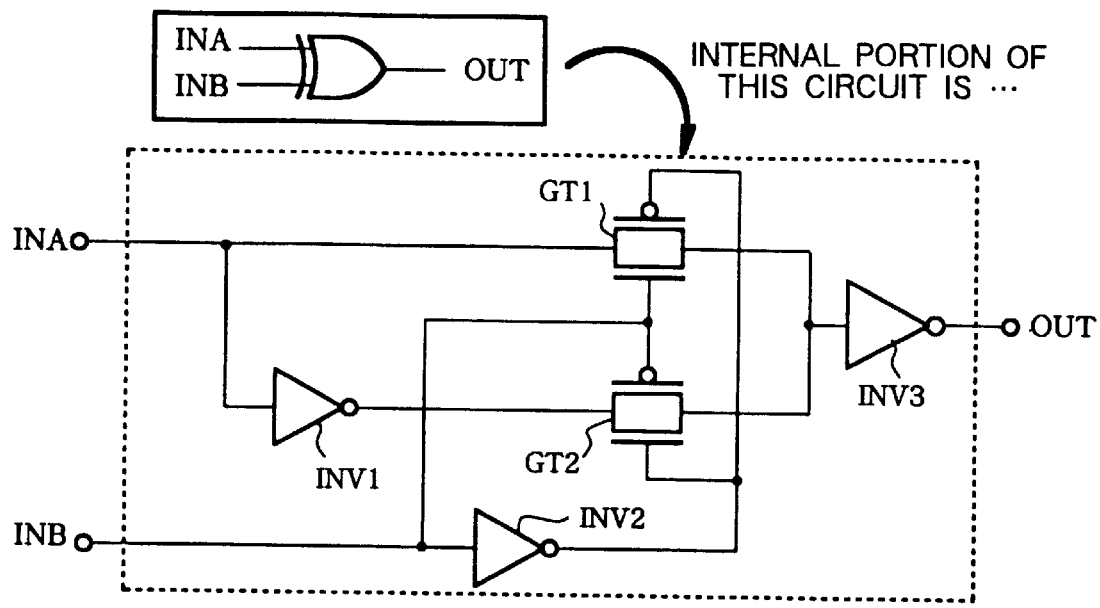
FIG. 57B INTERNAL CIRCUIT OF LOGICAL GATE EXNOR
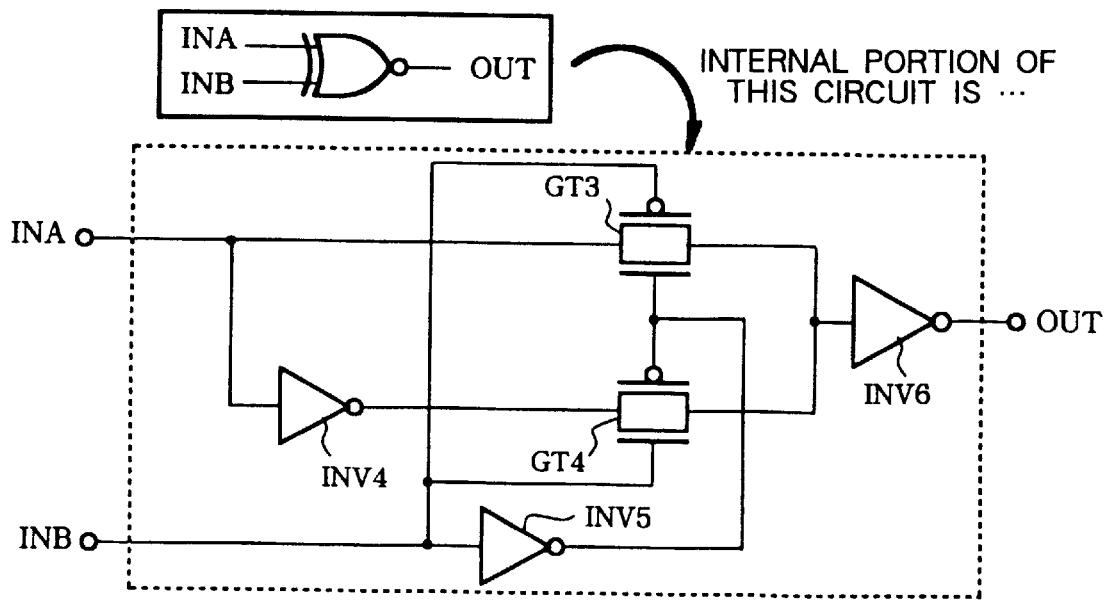

FIG. 58

```
      X =  0  1  1  1  1  1  0  1
    -) Y =  0  0  0  0  0  0  1  0
   ─────────────────────────────────
GENERATED      Q  N  N  N  N  N  Y  N
TERNARY CODE
               ┌─────────────────────────┐
               │ TERNARY CODE BINARY     │
               │   TREE BLC ARRAY        │
               └─────────────────────────┘
BORROW
GENERATION     N  N  N  N  N  N  Y  N
RESULT

Y =  0  0  0  0  0  0  1  0
    -) X =  0  1  1  1  1  1  0  1
   ─────────────────────────────────
GENERATED      Q  Y  Y  Y  Y  Y  N  Y
TERNARY CODE
               ┌─────────────────────────┐
               │ TERNARY CODE BINARY     │
               │   TREE BLC ARRAY        │
               └─────────────────────────┘
BORROW
GENERATION     Y  Y  Y  Y  Y  Y  N  Y
RESULT
```

EXAMPLE IN WHICH SYMMETRY
APPEARS TO STAND AT A GLANCE

GENERATED
TERNARY CODE    Q  N  N  N  N  N  Y  N

TERNARY CODE BINARY TREE BLC ARRAY

BORROW
GENERATION   N  N  N  N  N  N  Y  N
RESULT

```
        Y =  0  0  0  0  0  0  1  0
     −) X =  0  1  1  1  1  1  0  0
            ─────────────────────────
```

GENERATED
TERNARY CODE    Q  Y  Y  Y  Y  Y  N  N

TERNARY CODE BINARY TREE BLC ARRAY

BORROW
GENERATION   Y  Y  Y  Y  Y  Y  N  N
RESULT

EXAMPLE IN WHICH SYMMETRY
DOES NOT STAND AT BIT 0

FIG. 61B WHEN SGN = 1 : TIME WHEN PERFORMING OPERATION CONVERSION FROM (X−Y) TO (Y−X).

| INPUT TERNARY CODE (T1,T0) | SYMMETRICAL CODE REPLACEMENT | FINAL BORROW GENERATION |
|---|---|---|
| Q ( 0, 0/1) | Q ( 0, 1/0) | N ( 0 ) |
| Y ( 1, 1 ) | N ( 1, 0 ) | N ( 0 ) |
| N ( 1, 0 ) | Y ( 1, 1 ) | Y ( 1 ) |

FIG. 61C WHEN SGN = 0 : TIME WHEN (X−Y) CAN BE KEPT AS IT IS.

| INPUT TERNARY CODE (T1,T0) | SYMMETRICAL CODE REPLACEMENT | FINAL BORROW GENERATION |
|---|---|---|
| Q ( 0, 0/1) | Q ( 0, 0/1) | N ( 0 ) |
| Y ( 1, 1 ) | Y ( 1, 1 ) | Y ( 1 ) |
| N ( 1, 0 ) | Y ( 1, 0 ) | N ( 0 ) |

FIG. 64

| | NUMBER OF GATES | DELAY |
|---|---|---|
| TWO SUBTRACTORS (PRIOR ART : SECOND METHOD) | $k_S N + k_A 2N \log_2 N$ | $C_S + C_A \log_2 N$ |
| ONE SUBTRACTOR AND ONE INCREMENTER (PRIOR ART : THIRD METHOD) | $k_S N + 1.4 k_A N \log_2 N$ | $C_S + C_A 2 \log_2 N$ |
| PRESENT INVENTION | $k_T N + k_A \log_2 N$ | $C_T + C_A \log_2 N$ |

※ $K_S$, $K_A$ AND $K_T$ ART CONSTANTS CONCERNING NUMBER OF GATES OF SELECTOR, ADDER AND CODE REPLACEMENT CIRCUIT.

※ $C_S$, $C_A$ AND $C_T$ ARE PROPORTIONAL TO CONSTANTS CONCERNING DELAYS OF SELECTOR, ADDER AND CODE REPLACEMENT CIRCUIT, RESPECTIVELY.

※ BLC ADDER TYPE IS ASSUMED AS SUBTRACTOR. IT IS ASSUMED THAT NUMBER OF GATES IS PROPORTIONAL TO (N × $\log_2 N$) AND DELAY IS PROPORTIONAL TO ($\log_2 N$)

※ IT IS ASSUMED THAT ALSO INCREMENTER IS BLC TYPE. IT IS ASSUMED THAT NUMBER OF GATES IS PROPORTIONAL TO (0.4 × N × $\log_2 N$) AND DELAY IS PROPORTIONAL TO ($\log_2 N$)

| INPUT | | | | | | | | OUTPUT | |
|---|---|---|---|---|---|---|---|---|---|
| 7 | 6 | 5 | 4 | 3 | 2 | 1 | 0 | VALI-DITY | NUME-LAL |
| 1 | * | * | * | * | * | * | * | 1 | 1 1 1 |
| 0 | 1 | * | * | * | * | * | * | 1 | 1 1 0 |
| 0 | 0 | 1 | * | * | * | * | * | 1 | 1 0 1 |
| 0 | 0 | 0 | 1 | * | * | * | * | 1 | 1 0 0 |
| 0 | 0 | 0 | 0 | 1 | * | * | * | 1 | 0 1 1 |
| 0 | 0 | 0 | 0 | 0 | 1 | * | * | 1 | 0 1 0 |
| 0 | 0 | 0 | 0 | 0 | 0 | 1 | * | 1 | 0 0 1 |
| 0 | 0 | 0 | 0 | 0 | 0 | 0 | 1 | 1 | 0 0 0 |
| 0 | 0 | 0 | 0 | 0 | 0 | 0 | 0 | 0 | * * * |

"*" IS "DON' T CARE"

$Gi = Xi * Yi$ , $Pi = Xi + Yi$ $Gij = Gi + (Pi * Gj)$ , $Pij = Pi * Pj$

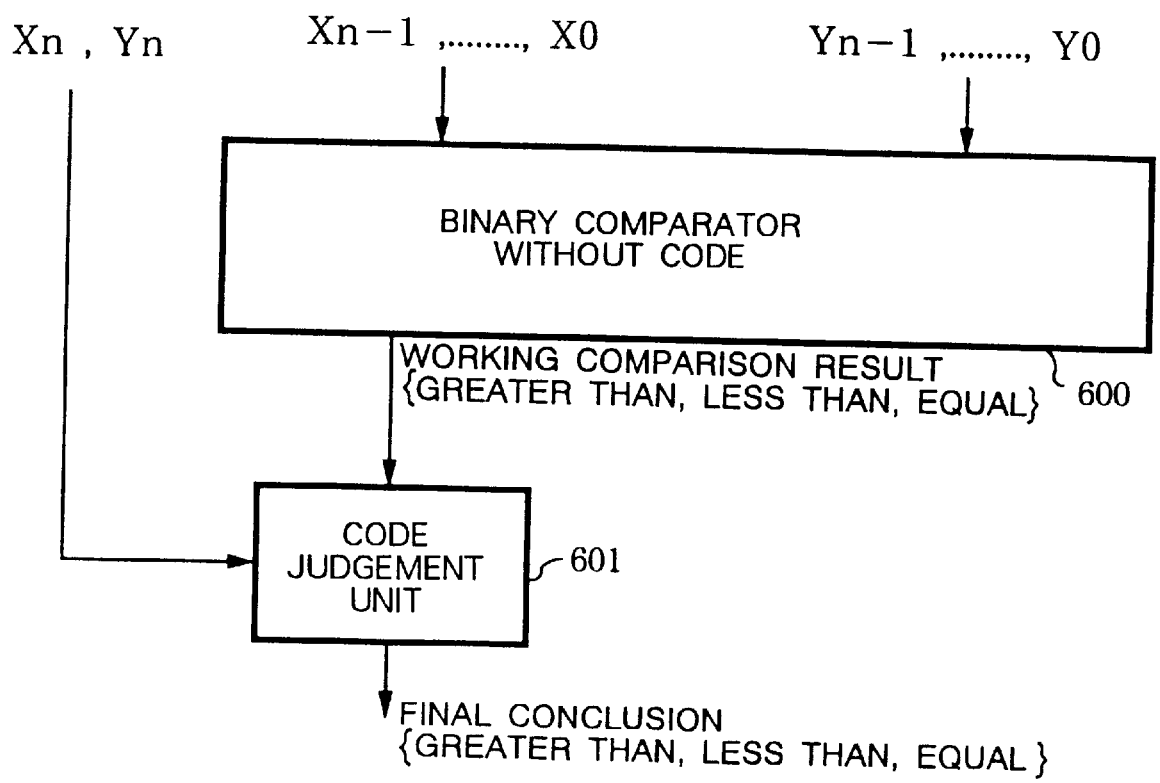

FIG. 71A

| X | Y | Bin | Bout | D |
|---|---|---|---|---|
| 0 | 0 | 0 | 0 | 0 |
| 0 | 1 | 0 | 1 | 1 |
| 1 | 0 | 0 | 0 | 1 |
| 1 | 1 | 0 | 0 | 0 |
| 0 | 0 | 1 | 1 | 1 |
| 0 | 1 | 1 | 1 | 0 |
| 1 | 0 | 1 | 0 | 0 |
| 1 | 1 | 1 | 1 | 1 |

FIG. 71B

| X | Y | Cin | $\overline{B_{out}}$ | D |
|---|---|---|---|---|
| 0 | 0 | 0 | 1 | 0 |
| 0 | 1 | 0 | 0 | 1 |
| 1 | 0 | 0 | 1 | 1 |
| 1 | 1 | 0 | 1 | 0 |
| 0 | 0 | 1 | 0 | 1 |
| 0 | 1 | 1 | 0 | 0 |
| 1 | 0 | 1 | 1 | 0 |
| 1 | 1 | 1 | 0 | 1 |

METHOD OF OPERATION OF ARITHMETIC AND LOGIC UNIT, STORAGE MEDIUM, AND ARITHMETIC AND LOGIC UNIT

BACKGROUND OF THE INVENTION

1. Field of the Invention

The present invention relates to a method of operation of an arithmetic and logic unit capable of performing parallel processing, a storage medium storing this method as a computer program, and an arithmetic and logic unit, more particularly relates to a method of operation of an arithmetic and logic unit, storage medium, and arithmetic and logic unit which introduce the method and concept of converting a problem including a series of decisions having an order dependency which cannot be processed in parallel as it is to an indeterminate code binary tree which can be processed in parallel so as to simplify the circuit configuration and enable higher speed operational processing.

Further, the present invention relates to a method of operation of an arithmetic and logic unit for processing an operation such as comparison, addition, subtraction, and an operation for obtaining the absolute value of a difference of any R-nary number or binary number, a storage medium storing the method as a computer program, and an arithmetic and logic unit, more particularly relates to a method of operation of an arithmetic and logic unit, storage medium, and arithmetic and logic unit which introduce the method and concept of converting a problem including a series of decisions having an order dependency which cannot be processed in parallel as it is to an indeterminate code binary tree which can be processed in parallel so as to simplify the circuit configuration and enable higher speed operational processing.

2. Description of the Related Art

In the first half of the present specification, disclosure will be made of the method and concept of converting a problem including a series of decisions having an order dependency which cannot be processed in parallel as it is to an indeterminate code binary tree which can be processed in parallel. As the arithmetic and logic unit to which the method and concept is applied, here, a priority encoder is mentioned. As an example of a conventional priority encoder, a truth table of a priority encoder (first prior art) in which the input is comprised of a 8-bit input from a bit 0 to a bit 7 and the output is comprised of a 4-bit output of 1 bit of a validity output and 3 bits of numerical output is shown in FIG. 65.

Here, the "priority encoder" is a circuit of function for returning the position (digit place) of the bit which first becomes "1" as a binary numeral when viewing the input data from the MSB (left end) to the LSB (right end) bit by bit. In the case of an 8-bit input, the returned numerals are "7" to "0". Three bits are satisfactory as the output. However, in order to differentiate between a case where all of the input bits are "0" (invalid case) and a case where even one "1" is contained in the input bits (valid case), a validity bit is further added, so a 4-bit output in total is obtained.

For example, when the inputs are:

"00110101", "00111111", and "00100000", since the fifth bit is the first "1" in all of the cases, the outputs become "1101" ("valid", and then "5"). Note that, here, it is assumed that the nearer the position to the MSB (left end), the higher the priority order. However, there is essentially no difference even in the opposite case. For simplification of the discussion, in the present specification, it is assumed that the nearer the position to the MSB, the higher the priority order.

Such a function of a priority encoder becomes necessary when selecting one option from among a plurality of options, i.e., when performing so-called arbitration. For example, when a plurality of bus-connected functional units try to simultaneously output to the bus, the priority encoder performs arbitration.

FIG. 66 is a view of the configuration of a digital device for explaining the arbitration of a single bus SB by the priority encoder MPE. In the digital device of the figure, eight functional units MU0 to MU7 are connected via switching means SW0 to SW7 to a single bus SB. Operational control of the switching means SW0 to SW7 is carried out based on the output of the priority encoder MPE to control the bus connection of the eight functional units MU0 to MU7. Namely, the priority encoder MPE receives as its input bus use requests RQ0 to RQ7 of the functional units and outputs the number of the functional unit allowed to use the bus. The functional unit numbers output by the priority encoder MPE are interpreted by a decoder MDC and become the bus connection control signals CBC0 to CBC7 for controlling the switching means SW0 to SW7.

Further, FIG. 67 shows a view of the configuration of an 8-bit input priority encoder used as a partial circuit of the "Priority Detection Use Counter Device" disclosed in Japanese Unexamined Patent Publication (Kokai) No. 8-147142. Note that in the publication of the this prior art, the encoder is disclosed as one for counting the number of "0's" arranged from the head of the input bit train at a high speed. While the priority encoder and the function under discussion here are not precisely equivalent, they are equal if inversion of the numerical output is made possible.

The 8-bit priority encoder of this prior art is configured by creating a model by a binary tree having a height m of 3. The nodes ND01, ND23, ND45, and ND67 at a depth 3 of the binary tree respectively receive as their inputs 2 bits out of the input data and detect when the bit trains become "01" and "00". They are each provided with an AND logic gate circuit and an OR logic gate circuit. Further, the nodes ND03 and ND47 at a depth 2 of the binary tree are respectively provided with a selector, an AND logic gate circuit, and an OR logic gate circuit. The selector selectively identifies "00" and "01" of the bit train in accordance with the output of the AND logic gate circuit, the AND logic gate circuit detects when all bits of one of the inputs are "0" and all bits of the other of the inputs are not "0", and the OR logic gate circuit detects when all bits become "0", respectively. Further, the node ND07 at a depth 1 of the binary tree is provided with two selectors, an AND logic circuit, and an OR logic gate circuit and functions in the same way as the node at the depth 2.

Below, explanation will be made of terms to be used. In the latter half of the present specification, disclosure is made of the method and concept of converting a problem including a series of decisions having an order dependency which cannot be processed in parallel as it is to a binary tree which can be processed in parallel. As the arithmetic and logic unit to which this method and concept are applied, here, a comparator, adder, subtractor, operation unit for obtaining an absolute value of a difference, etc. realized by forming the logical circuit in the form of a binary tree are mentioned. Therefore, first, the terms such as "binary tree" frequently used in the present specification will be precisely defined.

According to the "Iwanami Joho Kagaku Jiten (Iwanami Information Science Dictionary)", an order tree having no more than two branches at each node is referred to as a "binary tree" ("Iwanami Joho Kagaku Jiten", Iwanami Shoten, 1990, p. 550). Further, particularly, a binary tree having a small biasing with a height of the tree substantially equal to the logarithm (log2 N) of the number N of nodes is referred to as a "balanced binary tree" (p. 683 of the same reference). Further, as a special case of a balanced binary tree, a binary tree having a height of h where there are $2^i$ number of nodes at a depth i ($0 \leq i < h$) and where the nodes of the depth h are arranged so as to be filled from the left is referred to as a "complete binary tree" (p. 550 of the same reference).

A balanced binary tree has the property that the height of the tree is substantially equal to the logarithm of the number of leaves and all leaves exist at substantially the same depth. Further, in a complete binary tree, the difference of height between any two leaves is 1 or less. This property is important for realizing a high speed arithmetic and logic unit. In an arithmetic and logic unit in which the logical circuit is formed as a binary tree, the leaves of the tree are defined as the input, and the root of the tree is defined as the output, the height of the tree indicates the number of steps of a critical path.

In a logical circuit of a complete binary tree form, the output (root) is reached from all inputs (leaves) by substantially the same number of steps. Accordingly, there is no critical path which is conspicuously longer in comparison with the number of steps of other routes reaching the output from the input. A method is known of using this property to configure a logical circuit of a complete binary tree form realize a high speed arithmetic and logic unit.

Note that the term of "binary tree" which is frequently used in the present specification means a "complete binary tree" in so far as no special mention is made to the contrary. A binary tree that is not a balanced binary tree and has heights of leaves different from each other will be referred to as a "binary tree having biasing".

Logical circuit of binary tree form of the related art will be explained below.

First, as a second prior art of the arithmetic and logic unit using a conventional logical circuit of a binary tree form, a "Binary Look-Ahead Carry Method and Device of Same" disclosed in Japanese Unexamined Patent Publication (Kokai) No. 6-28158 may be mentioned. In this publication, disclosure is made of a general binary look-ahead carry (BLC) adder using an improved BLC system and a block carry look ahead (BCLA) adder using an improved BCLA system.

FIG. 68 is a view of a configuration concretely showing a carry generation part (BLC array) of individual bits in the 8-bit BLC adder according to the improved system of the BLC addition disclosed in Japanese Unexamined Patent Publication (Kokai) No. 6-28158.

Here, an addend X and another addend Y to be input to the 8-bit BLC adder is defined as:

X=X7 X6 . . . X1 X0, and Y=Y7 Y6 . . . Y1 Y0,
and X7 and Y7 are defined as codes. Further, Ci−1 (i=0 to 7) is defined as the carry input to the bit i, a carry input to the least significant bit (bit 0) is defined as C−1, and the carry output of the 8-bit BLC adder is defined as C7. Further, a carry generation function indicating that a carry operation is generated at the i digit is defined as Gi, and a carry propagation function indicating the propagation of a carry Ci−1 coming from a digit where the i digit is at a lower significant bit is defined as Pi.

In the 8-bit BLC adder of FIG. 68, the addend X and the other addend Y are input to a carry generation and propagation function generation unit 502, and eight pairs of carry generation functions Gi and carry propagation functions Pi are generated. Further, the carry input Cin regarded as the carry generation function of the −1 bit is added, and nine pairs of carry generation functions and carry propagation functions G0, P0 to G7, P7 and Cin in total are input to the carry generation unit 501. Note that, at this time, the carry propagation function of the −1 bit is "0". Carries C−1 to C7 output from the carry generation unit 501 are input to a sum generation unit 500 together with the carry propagation functions P0 to P7 of the bits, and sums S0 to S7 are generated.

The carry generation and propagation function generation unit 502 is provided with eight input cells IC0 to IC7 which receive as their inputs the addends Xi and the other addends Yi and generate the carry generation functions Gi and the carry propagation functions Pi and one dummy cell ICD in parallel. FIG. 69A is a circuit diagram of an input cell of the present prior art. In the figure, the input cell IC is structured provided with an AND gate circuit GA51 for taking the AND logic of the addend Xi and the other addend Yi and outputting the carry generation function Gi and an OR gate circuit GO51 for taking the OR logic of the addend Xi and the other addend Yi and outputting the carry propagation function Pi. Note that the dummy cell ICD is a buffer cell with an improved driving ability.

Further, the carry generation unit 501 is configured as a 9×4 cell matrix. A first column is configured with the −1-th bit defined as a dummy cell CCD1-1 and a zero-th bit to seventh bit defined as carry generation cells CC10 to CC17; a second column is configured with the −1-th bit and the zero-th bit defined as dummy cells CCD2-1 and CCD20 and the first bit to the seventh bit defined as carry generation cells CC21 to CC27; a third column is configured with the −1-th bit to the second bit defined as dummy cells CCD3-1 to CCD32 and the third bit to the seventh bit defined as carry generation cells CC33 to CC37; and, further, a fourth column is configured with the −1-th bit to the sixth bit defined as dummy cells CCD4-1 to CCD46 and the seventh bit defined as a carry generation cell CC47. FIG. 69B is a circuit diagram of a carry generation cell of the present prior art. In the figure, the carry generation cell CC is configured provided with a composite logical gate circuit GC51 for further taking the OR logic between the value obtained by taking the AND logic of the carry propagation function Pi and the carry generation function Gj and the carry generation circuit Gi and with an AND gate circuit GA52 taking the AND logic of the carry propagation functions Pi and Pj.

Further, the sum generation unit 500 is configured provided with eight EXOR gate circuits GX5i for taking the exclusive OR logic of the carry Ci−1 output from the carry generation unit 501 and the carry propagation function Pi and outputting the sum Si in parallel as shown in FIG. 69C.

The 8-bit BLC adder of the present prior art is intended to further simplify the configuration of the carry generation unit 501 and reduce the delay time and power consumption by regarding the carry input Cin as the carry generation function lower than the least significant bit by one bit in this way.

Next, an explanation will be made of an N-bit code-bearing binary comparator as a third prior art of an arithmetic and logic unit using a conventional binary tree-like logical circuit. FIG. 70 is a view of the configuration of an N-bit code-bearing binary comparator receiving as its input the code-bearing binary numbers X and Y:

X=Xn Xn−1 . . . X1 X0, Y=Yn Yn−1 . . . Y1 Y0
and outputting a final conclusion (Greater Than, Less Than, Equal).

An N-bit code-bearing binary comparator is configured mainly provided with two constituent elements as shown in the figure. One is an (N−1) bit code-less binary comparator 600 receiving as its input the code-less binary numbers X' and Y':

X'=Xn−1 . . . X1 X0, Y'=Yn−1 . . . Y1 Y0 and outputting a working conclusion (Greater Than, Less Than, Equal), and the other one is a code judgement circuit 601 for outputting a final conclusion from the working conclusion of the (N−1) bit code-less binary comparator and the code bits Xn, Yn of the code-bearing binary numbers X and Y. Note that, in the code-bearing binary numbers X and Y, the MSB (Most significant Bit) Xn and Yn thereof indicate the code. When MSB=0, it means a positive number, while when MSB=1, it means a negative number.

In this way, in a code-bearing binary comparator of the present prior art, the input bits other than the MSB are input to the (N−1) bit code-less binary comparator 600, where a working comparison result is first obtained. This working comparison result and the MSB of the code-bearing binary numbers X and Y are input to the code judgement circuit 601, where a final comparison result is obtained.

Further, the contents of the judgement performed in the code judgement circuit 601 are as follows:

(a) Case where the MSB's of the code-bearing binary numbers X and Y are different:

One of the code-bearing binary numbers X and Y is positive and one is negative.

Accordingly, the circuit outputs a conclusion of magnitude regardless of the working comparison result.

(b) Case where the MSB's of the code-bearing binary numbers X and Y are the same:

Both of the code-bearing binary numbers X and Y are positive or negative.

The conclusion depends upon the working comparison result found by the inputs from the (N−1)-th bit to the zero-th bit.

Accordingly, the circuit outputs the working comparison result as the final conclusion.

Next, an explanation will be made of a subtractor according to a fourth prior art of an arithmetic and logic unit using a conventional logical circuit of a binary tree form. The methods used in the conventional subtractor are roughly divided into two by the basic logical equation. The first method is based on the definition of subtraction of a 1-bit binary number. The second method is to add the complement of 2 of Y to X in the subtraction of X−Y.

First, in the first method of the subtractor, the subtraction by two 1-bit binary numbers (X,Y) and an external borrow input Bin is defined as follows: Note that, in the present specification, the OR logic is denoted by an "+" operator, the AND logic is denoted by a "·" operator, negative logic is denoted by an "^" operator, and the exclusive OR logic is denoted by a "(+)", respectively:

Difference $D = X - Y - Bin = X(+)Y(+)Bin$ (mod 2)

External borrow output $Bout = \hat{X} \cdot Y + Y \cdot Bin + Bin \cdot \hat{X}$ (1)

Further, the truth table of Equation (1) becomes as shown in FIG. 71A.

On the other hand, the second method of the subtractor takes note of the fact that an operation of "X−Y" is equivalent to an operation such as "X+(Complement of 2 of Y)" and uses an adder to obtain a subtractor. The complement of 2 of Y is obtained by adding "1" to all bits of Y inverted. In order to add "1", it is sufficient to make the external carry input Cin of the adder "1". Namely, ^Cin=Bin. Accordingly, in the case of a 1-bit binary number, the definition of subtraction by the logical equation becomes as follows:

Difference $D = X(+)\hat{Y}(+)\hat{C}in = X(+)Y(+)Cin$

External borrow output $\hat{B}out = X \cdot \hat{Y} + \hat{Y} \cdot \hat{C}in + \hat{C}in \cdot X$ (2)

Further, the truth table of Equation (2) becomes as shown in FIG. 71B. Further, the example of the configuration realized by the adder 500 becomes as shown in FIG. 72.

Comparing Equation (1) and Equation (2), the logical equations of the difference D are exactly the same, while the logical equations of the external borrow output Bout are obtained by respectively representing the same logical function by the positive logic output in Equation (1) and by the negative logic output in Equation (2), respectively. Accordingly, where realization by a logical circuit is being considered, there is no difference between Equation (1) and Equation (2) in terms of the number of gates and delay. For this reason, in conventional subtractors, subtractors using the definition of Equation (1) in which no particular advantages are found are not used that much. The already well known method of using an adder to realize a subtractor such as with the subtractor of the definition of Equation (2) is easy and has been generally widely used.

Next, an explanation will be made of an arithmetic and logic unit for performing an operation for obtaining an absolute value of a difference according to a fifth prior art of an arithmetic and logic unit using a conventional logic circuit of a binary tree form. As the method of finding the absolute value |X−Y| of the difference (X−Y) of any N-nary non-negative numbers X and Y, not limited to only binary numbers, the following methods are known:

The first method of an operation for obtaining an absolute value of a difference is to compare X and Y and subtract the smaller one from the larger one. Further, the second method is to simultaneously perform the subtraction of (X−Y) and the subtraction of (Y−X) and define the one giving a positive result as the absolute value. Further, the third method is to perform the subtraction of (X−Y) and define this as the absolute value when the result of subtraction is positive and to invert the code and define this as the absolute value when the result of subtraction is negative.

The methods which are usually adopted for an operation for obtaining an absolute value of a difference of binary numbers are the second and third methods. FIG. 73 is a view of the configuration of a unit for performing an operation for obtaining an absolute value of a difference according to the second method. The subtraction of (X−Y) and the subtraction of (Y−X) are simultaneously calculated by two subtractors 511 and 512, and the positive result is selected as the absolute value by the selector 513 based on the code of the result of subtraction of (X−Y).

Further, FIG. 74 is a view of the configuration of a unit for performing an operation for obtaining an absolute value of a difference according to the third method. It is configured by a complementer 522 including one subtractor 521 and one incrementer (+1 operation unit) and by one selector 523 having a required bit width. The subtraction of (X−Y) is carried out by the subtractor 521, while the complement of 2 of the result of the subtraction is produced by the 2-complementer 522. The selector 523 defines the output of the difference of the subtractor 521 as the absolute value when the result of subtraction is positive based on the code of the result of the operation by the subtractor 521 and defines the output of the complement of 2 of the 2-complementer 522 as the absolute value when the result of subtraction is negative. Note that, when the result of subtraction is negative, the complement of 2 of the result of subtraction is produced so as to invert the code. The complement of 2 is obtained by adding 1 by incrementer after inverting all bits of the data.

To solve the above mentioned disadvantages, first, consideration will be made of the first prior art (priority encoder). The integration density of semiconductor integrated circuits has been improved year by year. At present, it has become possible to include many functional units. In order to realize a high level of parallel processing in the future as well, it is certain that the number of the functional units will increase along with improvements made in the integration density. From such a background, it can be said that a priority encoder having an arbitration function is a key device. In the realization thereof, there is the problem that a high speed is particularly important.

Next, consideration will be given to the second prior art (8-bit BLC adder). In an arithmetic and logic unit using a logic circuit in the form of a binary tree such as a BLC adder, roughly, an operator "@" having a similar meaning as:

$$(Gi, Pi) @ (Gj, Pj)$$
$$= (Gi + (Pi * Gj), Pi * Pj)$$

is defined. Namely, in the 8-bit BLC adder of the second prior art, the operator "@" is realized by a logical circuit. A binary tree using this as an element is used. A concrete logical circuit realizing the operator "@" becomes as shown in FIG. 69B.

However, this operator "@", as apparent also from FIG. 69B, includes the logical function (Gi+(Pi*Gj)), that is, the logical function of the composite logical gate circuit GA 51 (AND-OR gate circuit). Recently, as a method of increasing the speed in an arithmetic and logic unit, the method of constructing a logic by a transmission gate has been attracting attention. For example, in the reference (Makino, Suzuki, Morinaka, et al, "286 MHz and 64 Bit Floating Decimal Multiplier Having Function Suitable to CG" in Japan Association for Information and Communication Technical Research Report ICD95-146, pp. 13–20, 1995), it is mentioned that the speed of a logical device constructed by a transmission gate is higher than a composite logical gate circuit. Further, a composite logical gate circuit has a small load driving ability and is weak against increases in the wiring capacity. Accordingly, there was a problem that an arithmetic and logic unit using a conventional logical circuit of a binary tree form was not suitable for an arithmetic and logic unit constructed by standard cells etc.

Further, particularly, the 8-bit BLC adder of the second prior art is a so-called BLC array which arranges logical circuits of the operator "@" in an array and generates carry signals to the individual bits. It regards the external carry input Cin as the input of a−1 bit and provides the −1-th row also in the BLC array, therefore there was a problem that the number of gates was large and also the surface area became large.

Further, in an arithmetic and logic unit using a logical circuit of a binary tree form of the above third prior art (N-bit code-bearing binary comparator), the input bits other than the MSB are input to an (N−1) bit code-less binary comparator 600 where a working comparison result is obtained, then the working comparison result and the MSB of the code-bearing binary numbers X and Y are input to the code judgement circuit 601 where the final comparison result is obtained, but the logical circuit of the input stage in the (N−1) bit code-less binary comparator 600 has a large number of gates, is complex, and further is realized by cascade connection of the code judgement circuit to the latter stage of the code-less binary comparator, therefore there was a problem that the delay was increased by exactly the amount of the code judgement circuit 601.

Next, when considering the fourth prior art (subtractor), when discussing the problems of a conventional subtractor using a complement of 2, the points under the discussion may be roughly divided into two. One is the matter concerning the adder forming the core of the subtractor. The other is the matter occurring when converting the adder to a subtractor. The former matter is the matter concerning the adder per se, therefore is omitted here. Consideration will be given to the latter, i.e., the matter occurring when converting the adder to a subtractor.

There are a variety of methods configuring the adder such as CLA, BCLA, CSelectAdder, CSkipAdder, etc. However, the method of giving the complement of 2 does not depend upon such a method of configuration. When converting an adder to a subtractor, as shown in FIG. 72, it is sufficient to add all of the bits of Y inverted to the Y input of the adder 500 and the borrow input Bin inverted to the carry input Cin of the adder 500, respectively. Namely, the difference between an adder and subtractor resides in only the point of whether or not an inverter (negative logic gate circuit) is attached to the input Y and the input Cin. Accordingly, in a conventional subtractor, there was a problem that both of the number of gates and the signal propagation delay were increased due to the addition of the inverter to the adder.

Next, when considering the fifth prior art (arithmetic and logic unit performing operation for obtaining absolute value of difference), among the above three methods, first, the operation unit for obtaining an absolute value using the second method is configured by two subtractors 511 and 512 and one selector having a required bit width as shown in FIG. 73. The superior point of the operation unit for obtaining an absolute value according to this second method is that the operation speed is high. Since the subtractions are carried out in parallel, when CLA and BCLA type subtractors are used, the operation time is proportional to the logarithm ($\log_2 N$) of the data bit width N. However, there is the defect that there also exists a problem that two subtractors are necessary, so the number of gates is large.

Further, the operation unit for obtaining an absolute value according to the third method is configured by one subtractor 521 and one 2-complementer 522 and one selector 523 having a required bit width as shown in FIG. 74. The superior point of the operation unit for obtaining an absolute value of a difference according to this third method is that the amount of hardware is small. The incrementer can be realized by less than half the number of transistors in comparison with the CLA and BCLA type subtractors. The amount of hardware is clearly smaller in comparison with the second method needing two subtractors. However, there is the defect that the operation unit for obtaining an absolute value of a difference according to the third method has a large operation delay and is slow. That is, the delay of the CLA and BCLA type subtractors is proportional to the logarithm ($\log_2 N$) of the data bit width N and the delay of the high speed CLA and BCLA type incrementers is proportional to the logarithm ($\log_2 N$) of the data bit width N, therefore when considering the fact that the result of subtraction is input to the incrementer, the total delay becomes proportional to ($2 \times \log_2 N$). Accordingly, clearly, the signal propagation delay of the operation unit for obtaining an absolute value of a difference using the third method becomes larger than that of the operation unit for obtaining an absolute value of a difference using the second method.

SUMMARY OF THE INVENTION

An object of the present invention is to provide a method of operation of an arithmetic and logic unit, a storage medium, and an arithmetic and logic unit such as priority encoding which introduce the method and concept of converting a problem including a series of decisions having an order dependency which cannot be processed in parallel as it is to a binary tree which can be processed in parallel so as to simplify the simpler circuit configuration and achieve higher speed processing.

Another object of the present invention is to provide a method of operation of an arithmetic and logic unit, a storage medium, and an arithmetic and logic unit which introduce the method and concept of converting a problem including a series of decisions having an order dependency which cannot be processed in parallel as it is to a binary tree which can be processed in parallel so as to simplify the simpler circuit configuration and achieve higher speed processing of operations such as comparison, addition, subtraction, or an operation for obtaining an absolute value of a difference.

The method of operation of an arithmetic and logic unit of the present invention provides a method of operation of an arithmetic and logic unit for solving a problem including a series of decisions having an order dependency by creating a model by a binary tree using processings for decisions not having dependency input/outputs as leaves and using processings for determination of a higher priority as nodes other than the leaves, wherein processings for decisions not having dependency input/outputs, corresponding to the decisions, each executing a predetermined decision based on a single or a plurality of data inputs comprising an R-nary number or quantity of logical value information at a point of time when said data input becomes valid and outputting a code of a format combining into one an indeterminate code "Q" of the meaning "cannot be defined" and the quantity as a working conclusion; said processings for determination of higher priorities, corresponding to the series of decisions, each receiving as its input the working conclusions of two processings for decisions not having dependency input/outputs or the working conclusions of two processings for determination of higher priorities before the same, outputting the working conclusion of the processing for a decision of a higher significant bit not having a dependency input/output or the working conclusion of the processing for determination of a higher priority of a higher significant bit as a working conclusion when the working conclusion of the processing for a decision not having a dependency input/output of a higher significant bit or the working conclusion of the processing for determination of a higher priority of a higher significant bit is not the indeterminate code "Q", and outputting the working conclusion of the processing for a decision not having a dependency input/output of a lower significant bit or the working conclusion of the processing for determination of a higher priority of a lower significant bit as the working conclusion when the working conclusion of the processing for a decision not having a dependency input/output of a higher significant bit or the working conclusion of the processing for determination of a higher priority of a higher significant bit is the indeterminate code "Q"; and all processings for decisions serving as leaves of the binary tree and all processings for determination of higher priorities located at the same depth in the binary tree being respectively processed in parallel and the working conclusion of the processing for determination of a higher priority serving as a root of the binary tree being defined as the conclusion of the problem.

Further, the method of operation of an arithmetic and logic unit of the present invention is a method of operation of an arithmetic and logic unit for transforming all problems for which a model can be created by a serial structure of decisions having an order dependency configured by having N (N is any positive integer) number of decision nodes having dependency input/outputs each executing a predetermined decision based on a single or a plurality of data inputs comprising an R-nary number or quantity of logical value information and a dependency input comprising binary information indicating "valid" or "invalid" at a point of time when both of the data input and the dependency input become valid and each outputting a conclusion output comprising an R-nary number or quantity of logical value information and a dependency output comprising binary information indicating "valid" or "invalid" and having a relationship of relative order between the decision nodes having dependency input/outputs, having the dependency input of the decision node having a dependency input/output of the most significant bit always being "valid", and having the dependency output of a decision node having a dependency input/output located at a higher significant bit connected as the dependency input of a decision node having a dependency input/output located at one lower significant bit from that decision node having a dependency input/output to a binary tree structure having N number of decision nodes not having dependency input/outputs for each executing a predetermined decision based on a single or a plurality of data inputs comprising an R-nary number or a quantity of logical value information at a point of time when the data input becomes valid and outputting a code of a format combining into one an indeterminate code "Q" of the meaning "cannot be defined" and a quantity as a working conclusion and defining the N number of decision nodes not having dependency input/outputs as leaves, replacing a decision node having a dependency input/output by a decision node not having a dependency input/output having a connotation decision node for executing a predetermined decision based on a single or a plurality of data inputs comprising an R-nary number or quantity of logical value information and a dependency input always comprising "valid" at a point of time when the data input becomes valid and outputting a conclusion output comprising an R-nary number or quantity of logical value information and a dependency output comprising binary information indicating "valid" or "invalid" and an indeterminate code generation node for outputting an indeterminate code "Q" when the dependency output of the connotation decision node becomes "valid" and outputting a code of a format combining in one the indeterminate code "Q" and the quantity as the working conclusion of the decision node not having a dependency input/output.

Further, the method of operation of an arithmetic and logic unit of the present invention is a method of operation of an arithmetic and logic unit for transforming all problems for which a model can be created by a serial structure of decisions having an order dependency configured by having N (N is any positive integer) number of decision nodes having dependency input/outputs for each executing a predetermined decision based on a single or a plurality of data inputs comprising an R-nary number or quantity of logical value information and a dependency input comprising binary information indicating "valid" or "invalid" at a point of time when both of the data input and the dependency input become valid and each outputting a conclusion output comprising an R-nary number or quantity of logical value information and a dependency output comprising binary information indicating "valid" or "invalid" and having a relationship of relative order between the decision nodes having dependency input/outputs, having the dependency input of the decision node having a dependency input/output of the most significant bit always being "valid", and having the dependency output of a decision node having a dependency input/output located at a higher significant bit connected as the dependency input of a decision node having a dependency input/output located at one lower significant bit from that decision node having a dependency input/output to a binary tree structure having N number of decision nodes not having dependency input/outputs for each executing a predetermined decision based on a single or a plurality of data inputs comprising an R-nary number or quantity of logical value information at a point of time when the data input becomes valid and outputting a code of a format combining into one an indeterminate code "Q" of the meaning "cannot be defined" and the quantity as a working conclusion and higher priority determination nodes, corresponding to the series of decisions, which each receives as its input the working conclusions of two decision nodes not having dependency input/outputs or the working conclusions of two higher priority determination nodes in front of this higher priority determination node and outputs the working conclusion of the decision node not having a dependency input/output of a higher significant bit or the working conclusion of the higher priority determination node of a higher significant bit as the working conclusion of that higher priority determination node when the working conclusion of the decision node not having a dependency input/output of a higher significant bit or the working conclusion of the higher priority determination node of a higher significant bit is not the indeterminate code "Q", while outputs the working conclusion of the decision node not having a dependency input/output of a lower significant bit or the working conclusion of the higher priority determination node of a lower significant bit as the working conclusion of that higher priority determination node when the working conclusion of the decision node not having a dependency input/output of a higher significant bit or the working conclusion of the higher priority determination node of a higher significant bit is the indeterminate code "Q" and defining the decision nodes not having dependency input/outputs as leaves and defining the higher priority determination nodes as other nodes other than leaves, said method of operation of an arithmetic and logic unit replacing a decision node having a dependency input/output by a decision node not having a dependency input/output having a connotation decision node for executing a predetermined decision based on a single or a plurality of data inputs comprising an R-nary number or quantity of logical value information and a dependency input always comprising "valid" at a point of time when the data input becomes valid and outputting a conclusion output comprising an R-nary number or quantity of logical value information and a dependency output comprising binary information indicating "valid" or "invalid" and an indeterminate code generation node for outputting an indeterminate code "Q" when the dependency output of the connotation decision node becomes "valid" and outputting a code of a format combining in one the indeterminate code "Q" and the quantity as the working conclusion of the decision node not having a dependency input/output.

Provision is also made of a method of operation of an arithmetic and logic unit for realizing a priority encoding function for outputting as a binary number, with respect to data input of n-bit binary numbers, a bit position which is first "1" or "0" in a direction from the most significant bit to the least significant bit or the number of continuous "1"s or "0"s in the direction from the most significant bit to the least significant bit by creating a model by a binary tree defining a processing for a decision not having a dependency input/output as a leaf and defining processing for determination of a higher priority as another node other than a leaf, in said method of operation of an arithmetic and logic unit, the processings for decisions not having dependency input/outputs, corresponding to each bit of the data input, each executing a predetermined decision based on one bit of the data input at the point of time when the data input becomes valid and outputting a code of a format combining into one an indeterminate code "Q" indicating "cannot be defined" and a quantity as a working conclusion; the processings for determination of higher priorities, corresponding to each bit of the data input, each receiving as its input the working conclusions of two processings for decisions not having dependency input/outputs or the working conclusions of two processings for determination of higher priorities in front of the same, outputting the working conclusion of the processing for a decision not having a dependency input/output of a higher significant bit or the working conclusion of the processing for determination of a higher priority of a higher significant bit as the working conclusion when the working conclusion of the processing for a decision not having significant dependency input/output of a higher significant bit or the working conclusion of the processing for determination of a higher priority of a higher significant bit is not the indeterminate code "Q", and outputting the working conclusion of the processing for a decision not having a dependency input/output of a lower significant bit or the working conclusion of the processing for determination of a higher priority of a lower significant bit as the working conclusion when the working conclusion of the processing for a decision not having a dependency input/output of a higher significant bit or the working conclusion of the processing for determination of a higher priority of a higher significant bit is the indeterminate code "Q"; and all processings for decisions serving as leaves of the binary tree and all processings for determination of higher priorities located at the same depth in the binary tree being respectively processed in parallel and the working conclusion of the higher priority determination node serving as a root of the binary tree being defined as the conclusion of the priority encoding.

The method of operation of an arithmetic and logic unit of the present invention is a method of operation of an arithmetic and logic unit for solving a problem including a series of decisions having an order dependency by creating a model by a binary tree defining processings for decisions corresponding to the decisions as leaves, where a processing for a decision outputting any of "true", "false", and "neither true nor false or do not know" as the result of the decision based on one or a plurality of input information and the processings for decisions being processed in parallel.

Alternatively, provision is made of a method of operation of an arithmetic and logic unit of the present invention wherein when the arithmetic and logic unit is one for performing a comparison of two numbers of any R-nary number and the decisions of the comparisons of the individual digits of the two numbers form the series of decisions having an order dependency, a processing for a decision respectively outputs "true or false" when the result of the difference of two numbers of the same digit place is positive, "false or true" when the result is negative, and "neither true nor false or do not know" when the result is zero.

Alternatively, provision is made of a method of operation of an arithmetic and logic unit of the present invention, wherein when the arithmetic and logic unit is one for performing addition of two numbers of any R-nary number and the decisions of existence of carry operations at the individual digits form the series of decisions having an order dependency, a processing for a decision respectively outputs "true or false" when the resultant sum of two numbers of the same digit place becomes R or more, "false or true" when the result becomes (R−2), and "neither true nor false or do not know" when the result becomes (R−1).

Alternatively, provision is made of a method of operation of an arithmetic and logic unit of the present invention, wherein when the arithmetic and logic unit is one for performing subtraction of two numbers of any R-nary number and the decisions of existence of borrow operations at individual digits form the series of decisions having an order dependency, a processing for a decision respectively outputs "true or false" when the resultant difference of two numbers of the same digit place becomes negative, "false or true" when the result becomes positive, and "neither true nor false or do not know" when the result becomes zero.

Alternatively, provision is made of a method of operation of an arithmetic and logic unit of the present invention, wherein the arithmetic and logic unit is one for finding an absolute value of a difference of two numbers (X, Y) of any R-nary number; and a processing for a decision respectively outputs a value code "Y" meaning "true" when the resultant difference (X−Y) of two numbers of the same digit place becomes negative, outputs a value code "N" meaning "false" when the result becomes positive, and outputs the value code "Q" meaning "neither true nor false or do not know" when the result becomes zero as the result of the decision of the node.

Alternatively, the method of operation of an arithmetic and logic unit of the present invention is a method of operation of an arithmetic and logic unit for solving a problem including a series of decisions having an order dependency by creating a model by a binary tree defining processings for decisions, corresponding to the decisions, as leaves and defining processings for determination of higher priorities as other nodes other than leaves, wherein the processings for decisions outputting any one of "true", "false", and "neither true nor false or do not know" as a result of decision based on one or a plurality of input information; the processings for determination of higher priorities, corresponding to the series of decisions, each receiving as its input the results of decisions of two processings for decisions or the results of decisions of two processings for determination of higher priorities in front of the same, outputting the result of decision of the processing for a decision of the higher significant bit or the processing for determination of a higher priority of the higher significant bit when the result of decision of the processing for a decision of the higher significant bit or the processing for determination of a higher priority of the higher significant bit is "true" or "false", and outputting the result of decision of the processing for a decision of the lower significant bit or the processing for determination of a higher priority of the lower significant bit when the result of decision of the processing for a decision of the higher significant bit or the processing for determination of a higher priority of the higher significant bit is "neither true nor false or do not know"; and all processings for decisions serving as leaves of the binary tree and all processings for determination of higher priorities located at the same depth in the binary tree being respectively processed in parallel.

Alternatively, provision is made of a method of operation of an arithmetic and logic unit of the present invention, wherein when the result of decision "true" is defined as the value code "Y", "false" is defined as the value code "N", and "neither true nor false or do not know" is defined as the value code "Q", respectively, the processing for determination of a higher priority is given as a K operator for deriving one code $Tij \in \{Y, N, Q\}$ from two codes, that is, a code $Ti \in \{Y, N, Q\}$ derived from the result of decision of the processing for a decision of a higher significant bit and a code $Tj \in \{Y, N, Q\}$ derived from the result of decision of a processing for a decision of a lower significant bit; and when the code Ti is in a relationship superior to the code Tj, the K operator defines the value code "Y" or the value code "N" as the value code taken by the code Tij when the code Ti is the value code "Y" or the value code "N" and defines the value code taken by the code Tj as the value code taken by the code Tij when the code Ti is the value code "Q".

Alternatively, provision is made of a method of operation of an arithmetic and logic unit of the present invention, wherein when the result of decision "true" is defined as the value code "Y", "false" is defined as the value code "N", and "neither true nor false or do not know" is defined as the value code "Q", respectively, the processing for determination of a higher priority is given as a K operator for deriving one code $Tij \in \{Y, N, Q\}$ from two codes, that is, a code $Ti \in \{Y, N, Q\}$ derived from the result of decision of the processing for a decision of a higher significant bit and a code $Tj \in \{Y, N, Q\}$ derived from the result of decision of a processing for a decision of a lower significant bit; and when the code Ti is in a relationship superior to the code Tj, when any code X is given by a 2-bit binary number (X, 1, X, 0) defining the value code "Y" as $\{11\}$, the value code "N" as $\{10\}$, and the value code "Q" as $\{0*\}$ (where, "*" is "don't care"), an OR logic is denoted by a "+" operator, an AND logic is denoted by a "·" operator, and a negative logic is denoted by a "^" operator, respectively, the K operator is given as:

$$TiKTj = Tij$$
$$(Ti, 1, Ti, 0)K(Tj, 1, Tj, 0) = (Tij, 1, Tij, 0)$$
$$= (Ti, 1 + Tj, 1, Ti, 1 \cdot Ti, 0 + {}^{\wedge}Ti, 1 \cdot Tj, 0).$$

Alternatively, the method of operation of an arithmetic and logic unit of the present invention is a method of operation of an arithmetic and logic unit for finding the absolute value of the difference of two numbers (X, Y) of n number of digits of any R-nary number by creating a model by one column of n number of processings for decisions, all filled by n number of binary trees defining the processings for decisions from the first digit to a g-th digit (g=1 to n) as the leaves and defining other nodes other than the leaves as the processings for determination of higher priorities, and a matrix comprising n number of rows and m number of columns (m is the smallest integer exceeding $\log_2 n$) of processings for determination of higher priorities, wherein the processings for decisions each outputting as the result of decision a value code "Y" meaning "true" when the result of the difference (X−Y) of two numbers of the same digit place becomes negative, outputting a value code "N" meaning "false" when the result becomes positive, and outputting a value code "Q" meaning "neither true nor false or do not know" when the result becomes zero; the processings for determination of higher priorities, corresponding to the series of decisions, each receiving as its input the results of decisions of two processings for decisions or the results of decisions of two processings for determination of higher priorities in front of the same, outputting the result of decision of the processing for a decision of the higher significant bit or the processing for determination of a higher priority of the higher significant bit when the result of decision of the processing for a decision of the higher significant bit or the processing for determination of a higher priority of the higher significant bit is "true" or "false", and outputting the result of decision of the processing for a decision of a lower significant bit or the processing for determination of a higher priority of the lower significant bit when the result of decision of the processing for a decision of the higher significant bit or processing for determination of a higher priority of the higher significant bit is "neither true nor false or do not know"; and the one column of n number of processings for decisions and the constituent elements of the columns comprising the matrix comprising the n number of rows and m number of columns of processings for determination of higher priorities being respectively simultaneously processed and a borrow operation of each digit being generated from each processing for determination of a higher priority of the m-th column.

Alternatively, provision is made of a method of operation of an arithmetic and logic unit of the present invention, comprising a code judgement step for judging the code for the result of the difference (Xa–Yb) of two numbers based on the result of the generation of the borrow operation of the most significant digit generated from the processing for determination of a higher priority of the n-th row and m-th column; a code replacement step of respectively replacing the value code "Q" with the value code "Q", the value code "Y" with the value code "N", and the value code "N" with the value code "Y" for the output codes of the processings for determination of higher priorities not including the processing for determination of a higher priority of the n-th row among the group of processings for determination of higher priorities of the m-th column when the result of the code judgement of the code judgement step is negative or when it is negative or zero and leaving them as they are without performing the replacement where the result is positive or zero or when it is positive; and a second code replacement step for replacing the value code "Q" with the value code "N" to obtain a borrow operation of each digit for the result of replacement or the output code of the processing for determination of a higher priority after the code replacement step.

Alternatively, provision is made of a storage medium which can be read by a computer of the present invention, wherein the method of operation of the arithmetic and logic unit as set forth in claim 1 is stored as a program for execution by the computer.

Alternatively, provision is made of a storage medium which can be read by a computer of the present invention, wherein the method of operation of the arithmetic and logic unit as set forth in claim 2 is stored as a program for execution by the computer.

Alternatively, provision is made of storage medium which can be read by a computer of the present invention, wherein the method of operation of the arithmetic and logic unit disclosed in claim 3 is stored as a program for execution by the computer.

Alternatively, provision is made of a storage medium which can be read by a computer of the present invention, wherein the method of operation of the arithmetic and logic unit disclosed in claim 5 is stored as a program for execution by the computer.

Alternatively, provision is made of storage medium which can be read by a computer of the present invention, wherein the method of operation of the arithmetic and logic unit disclosed in claim 6 is stored as a program for execution by the computer.

Alternatively, provision is made of a storage medium which can be read by a computer of the present invention, wherein the method of operation of the arithmetic and logic unit disclosed in claim 7 is stored as a program for execution by the computer.

Alternatively, provision is made of a storage medium which can be read by a computer of the present invention, wherein the method of operation of the arithmetic and logic unit disclosed in claim 8 is stored as a program for execution by the computer.

Alternatively, provision is made of a storage medium which can be read by a computer of the present invention, wherein the method of operation of the arithmetic and logic unit disclosed in claim 9 is stored as a program for execution by the computer.

Alternatively, provision is made of a storage medium which can be read by a computer of the present invention, wherein the method of operation of the arithmetic and logic unit disclosed in claim 10 is stored as a program for execution by the computer.

Alternatively, provision is made of a storage medium which can be read by a computer of the present invention, wherein the method of operation of the arithmetic and logic unit disclosed in claim 13 is stored as a program for execution by the computer.

Alternatively, provision is made of a storage medium which can be read by a computer of the present invention, wherein the method of operation of the arithmetic and logic unit disclosed in claim 14 is stored as a program for execution by the computer.

Alternatively, the arithmetic and logic unit of the present invention is an arithmetic and logic unit for solving a problem including a series of decisions having an order dependency, having decision nodes not having dependency input/outputs, corresponding to the decisions, for each executing a predetermined decision based on a single or a plurality of data inputs comprising an R-nary number or quantity of logical value information at a point of time when the data input becomes valid and outputting a code of a format combining in one an indeterminate code "Q" indicating "cannot be defined" and the quantity as a working conclusion and higher priority determination nodes, corresponding to the series of decisions, for each receiving as its input the working conclusions of two decision nodes not having dependency input/outputs or the working conclusions of two higher priority determination nodes in front of the same, outputting the working conclusion of the decision node not having a dependency input/output of the higher significant bit or the working conclusion of the higher priority determination node of the higher significant bit as the working conclusion when the working conclusion of the decision node not having the dependency input/output of the higher significant bit or the working conclusion of the higher priority determination node of the higher significant bit is not the indeterminate code "Q", and outputting the working conclusion of the decision node not having a dependency input/output of the lower significant bit or the working conclusion of the higher priority determination node of the lower significant bit as the working conclusion when the working conclusion of the decision node not having a dependency input/output of the higher significant bit or the working conclusion of the higher priority determination node of the higher significant bit is the indeterminate code "Q" and creating a model for the problem by a binary tree defining a decision node not having a dependency input/output as a leaf and defining a higher priority determination node as another node other than a leaf, simultaneously processing all decision nodes serving as the leaves and all higher priority determination nodes located at the same depth in the binary tree, and defining the working conclusion of the higher priority determination node serving as a root of the binary tree as the conclusion of the problem.

Alternatively, the arithmetic and logic unit of the present invention is an arithmetic and logic unit configured to transform a serial structure of decisions having an order dependency configured by having N (N is any positive integer) number of decision nodes having dependency input/outputs for each executing a predetermined decision based on a single or a plurality of data inputs comprising an R-nary number or quantity of logical value information and a dependency input comprising binary information indicating "valid" or "invalid" at a point of time when both of the data input and the dependency input become valid and outputting a conclusion output comprising an R-nary number or quantity of logical value information and a dependency output comprising the binary information indicating "valid" or "invalid", and having a relationship of relative order between the decision nodes having dependency input/outputs, having the dependency input of the decision node having a dependency input/output of the most significant bit always being "valid", and having the dependency output of a decision node having a dependency input/output located at a higher significant bit connected as the dependency input of a decision node having a dependency input/output located at one lower significant bit from that decision node having a dependency input/output to a binary tree structure having N number of decision nodes not having dependency input/outputs for each executing a predetermined decision based on a single or a plurality of data inputs comprising an R-nary number or quantity of logical value information at a point of time when the data input becomes valid and outputting a code of a format combining in one an indeterminate code "Q" indicating "cannot be defined" and the quantity as the working conclusion and defining the N number of decision nodes not having dependency input/outputs as leaves, replacing a decision node having a dependency input/output by a decision node not having a dependency input/output having a connotation decision node for executing a predetermined decision based on a single or a plurality of data inputs comprising an R-nary number or quantity of logical value information and a dependency input always comprising "valid" at a point of time when the data input becomes valid and outputting a conclusion output comprising an R-nary number or quantity of logical value information and a dependency output comprising binary information indicating "valid" or "invalid" and an indeterminate code generation node for outputting an indeterminate code "Q" when the dependency output of the connotation decision node becomes "valid" and outputting a code of a format combining in one the indeterminate code "Q" and the quantity as the working conclusion.

Alternatively, the arithmetic and logic unit of the present invention is an arithmetic and logic unit configured to transform a serial structure of decisions having an order dependency configured by having N (N is any positive integer) number of decision nodes having dependency input/outputs for each executing a predetermined decision based on a single or a plurality of data inputs comprising an R-nary number or quantity of logical value information and a dependency input comprising binary information indicating "valid" or "invalid" at a point of time when both of the data input and the dependency input become valid and outputting a conclusion output comprising an R-nary number or quantity of logical value information and a dependency output comprising the binary information indicating "valid" or "invalid", and having a relationship of relative order between the decision nodes having dependency input/outputs, having the dependency input of the decision node having a dependency input/output of the most significant bit always being "valid", and having the dependency output of a decision node having a dependency input/output located at a higher significant bit connected as the dependency input of a decision node having a dependency input/output located at one lower significant bit from that decision node having a dependency input/output to a binary tree structure having N number of decision nodes not having dependency input/outputs for each executing a predetermined decision based on a single or a plurality of data inputs comprising an R-nary number or quantity of logical value information at a point of time when the data input becomes valid and outputting a code of a format combining into one an indeterminate code "Q" of the meaning "cannot be defined" and the quantity as a working conclusion and higher priority determination nodes, corresponding to the series of decisions, which each receives as its input the working conclusions of two decision nodes not having dependency input/outputs or the working conclusions of two higher priority determination nodes in front of this higher priority determination node and outputs the working conclusion of the decision node not having a dependency input/output of a higher significant bit or the working conclusion of the higher priority determination node of a higher significant bit as the working conclusion of that higher priority determination node when the working conclusion of the decision node not having a dependency input/output of a higher significant bit or the working conclusion of the higher priority determination node of a higher significant bit is not the indeterminate code "Q", while outputs the working conclusion of the decision node not having a dependency input/output of a lower significant bit or the working conclusion of the higher priority determination node of a lower significant bit as the working conclusion of that higher priority determination node when the working conclusion of the decision node not having a dependency input/output of a higher significant bit or the working conclusion of the higher priority determination node of a higher significant bit is the indeterminate code "Q" and defining the decision nodes not having dependency input/outputs as leaves and defining the higher priority determination nodes as other nodes other than leaves, replacing a decision node having a dependency input/output by a decision node not having a dependency input/output having a connotation decision node for executing a predetermined decision based on a single or a plurality of data inputs comprising an R-nary number or quantity of logical value information and a dependency input always comprising "valid" at a point of time when the data input becomes valid and outputting a conclusion output comprising an R-nary number or quantity of logical value information and a dependency output comprising binary information indicating "valid" or "invalid" and an indeterminate code generation node for outputting an indeterminate code "Q" when the dependency output of the connotation decision node becomes "valid" and outputting a code of a format combining in one the indeterminate code "Q" and the quantity as the working conclusion.

Alternatively, the arithmetic and logic unit of the present invention is an arithmetic and logic unit provided with a priority encoding function for outputting as a binary number, with respect to data input of n-bit binary numbers, a bit position which is first "1" or "0"in a direction from the most significant bit to the least significant bit, having decision nodes not having dependency input/outputs, corresponding to each bit of the data input, each executing a predetermined decision based on one bit of the data input at the point of time when the data input becomes valid and outputting a code of a format combining into one an indeterminate code "Q" indicating "cannot be defined" and a quantity as a working conclusion and higher priority determination nodes, corresponding to each bit of the data input, each receiving as its input the working conclusions of two decision nodes not having dependency input/outputs or the working conclusions of two higher priority determination nodes in front of the same, outputting the working conclusion of the decision node not having a dependency input/output of a higher significant bit or the working conclusion of the higher priority determination node of a higher significant bit as the working conclusion when the working conclusion of the decision node not having significant dependency input/output of a higher significant bit or the working conclusion of the higher priority determination node of a higher significant bit is not the indeterminate code "Q", and outputting the working conclusion of the decision node not having a dependency input/output of a lower significant bit or the working conclusion of the higher priority determination node of a lower significant bit as the working conclusion when the working conclusion of the decision node not having a dependency input/output of a higher significant bit or the working conclusion of the higher priority determination node of a higher significant bit is the indeterminate code "Q" and creating a model of the priority encoding function by a binary tree defining a decision node not having a dependency input/output as a leaf and defining a higher priority determination node as another node other than a leaf, simultaneously processing all decision nodes serving as leaves and all higher priority determination nodes located at the same depth in the binary tree, and defining the working conclusion of the higher priority determination node serving as a root of the binary tree as the conclusion of the priority encoding function.

Alternatively, in the arithmetic and logic unit of the present invention, the binary tree has n number of decision nodes serving as the leaves; a sub binary tree of a height m (m is the smallest integer exceeding $\log_2 n$) not including the leaves of the binary tree has Nm (Nm is the smallest integer exceeding n/2) number of higher priority determination nodes serving as the nodes of a depth m, and Ns (Ns is the smallest integer exceeding Ns+½) number of higher priority determination nodes serving as the nodes of a depth s (s is an integer represented as s=1 to m−1); a decision node is a bit signal line of the corresponding data input; the pm-th (pm=1 to Nm) higher priority determination nodes from the least significant bit serving as the nodes of the depth m of the sub binary tree each defines a (2×pm−2)-th bit signal line and a (2×pm−1)-th bit signal line of the data input as the zero-th bit input and the first bit input and has an OR logic means for taking an OR logic of the zero-th bit input and the first bit input and outputting the result as a first bit output and a connection line for outputting the first bit input as the zero-th bit output; the ps-th (ps=1 to Ns) higher priority determination nodes from the least significant bit serving as the nodes of the depth s of the sub binary tree each defines a zero-th bit output to an (m−s)-th bit output of a (2×1ps−1)-th higher priority determination node serving as a node of the depth (s+1) of the sub binary tree as the zero-th bit input to the (m−s)-th bit input of a lower significant bit and defines the zero-th bit output to the (m−s)-th bit output of a (2×ps)-th higher priority determination node serving as a node of the depth (s+1) of the sub binary tree as the zero-th bit input to the (m−s)-th bit input of a higher significant bit and has an OR logic means for taking the OR logic of the (m−s)-th bit input of the lower significant bit and the (m−s)-th bit input of the higher significant bit and outputting the result as an (m−s+1)-th bit output, a connection line for outputting the (m−s)-th bit input of the higher significant bit as the (m−s)-th bit output, and (m−s+1) number of selecting means; and a q-th (q=1 to m−s+1)-th selecting means from the least significant bit receives as its input the (m−s)-th bit of the higher significant bit as the selection input, selects the (q−1)-th bit input of the higher significant bit when the selection input is "true", selects the(q−1)-th bit input of the lower significant bit when the selection input is "false", and outputs the same as the (q−1)-th bit output.

Alternatively, the arithmetic and logic unit of the present invention is an arithmetic and logic unit provided with a priority encoding function for outputting as a binary number, with respect to a data input of n-bit binary numbers, a bit position which is first "1" or "0" in a direction from the most significant bit to the least significant bit, wherein a model is created for said arithmetic and logic unit by a binary tree of a height m (m is the smallest integer exceeding $\log_2 n$), the binary tree has Nm (Nm is the smallest integer exceeding n/2) number of nodes of a depth m and Ns (Ns is the smallest integer exceeding Ns+½) number of nodes of a depth s (s is an integer represented as s=1 to m−1); the pm-th (pm=1 to Nm) nodes from the least significant bit of the depth m of the binary tree each uses a (2×pm−2)-th bit signal line and a (2×pm−1)-th bit signal line of the data input as the zero-th bit input and the first bit input and has an OR logic means for taking the OR logic of the zero-th bit input and the first bit input and outputting the result as the first bit output and a connection line for outputting the first bit input as the zero-th bit output; the ps-th (ps=1 to Ns) nodes from the least significant bit of the depth s of the binary tree each uses the zero-th bit output to the (m−s)-th bit output of a (2×ps−1)-th node of the depth (s+1) of the binary tree as the zero-th bit input to the (m−s)-th bit input of a lower significant bit and uses the zero-th bit output to the (m−s)-th bit output of a (2×ps)-th node of the depth (s+1) of the binary tree as the zero-th bit input to the (m−s)-th bit input of a higher significant bit and has an OR logic means for taking the OR logic of the (m−s)-th bit input of the lower significant bit and the (m−s)-th bit input of the higher significant bit and outputting the result as an (m−s+1)-th bit output, a connection line for outputting the (m−s)-th bit input of the higher significant bit as the (m−s)-th bit output, and (m−s+1) number of selecting means; and a q-th (q=1 to m−s+1)-th selecting means from the least significant bit receives as its input the (m−s)-th bit of the higher significant bit as the selection input, selects the (q−1)-th bit input of the higher significant bit when the selection input is "true", selects the(q−1)-th bit input of the lower significant bit when the selection input is "false", and outputs the result as the (q−1)-th bit output.

Alternatively, the arithmetic and logic unit of the present invention is an arithmetic and logic unit provided with a priority encoding function for outputting as a binary number, with respect to data input of n-bit binary numbers, the number of continuous "1's" or "0's" in the direction from the most significant bit to the least significant bit, having decision nodes not having dependency input/outputs, corresponding to the individual bits of the data input, for each executing a predetermined decision based on one bit of the data input at a point of time when the data input becomes valid and outputting a code of a format combining in one an indeterminate code "Q" of the meaning "cannot be defined" and a quantity as a working conclusion and higher priority determination nodes, corresponding to the individual bits of the data input, which each receives as its input the working conclusions of two decision nodes not having dependency input/outputs or working conclusions of two higher priority determination nodes in front of the same, outputs the working conclusion of the decision node not having a dependency input/output of the higher significant bit or the working conclusion of the higher priority determination node of the higher significant bit as the working conclusion when the working conclusion of the decision node not having a dependency input/output of the higher significant bit or the working conclusion of the higher priority determination node of the higher significant bit is not the indeterminate code "Q", and outputs the working conclusion of the decision node not having a dependency input/output of the lower significant bit or the working conclusion of the higher priority determination node of the lower significant bit as the working conclusion when the working conclusion of the decision node not having a dependency input/output of the higher significant bit or the working conclusion of the higher priority determination node of the higher significant bit is the indeterminate code "Q"; and the priority encoding function is realized by creating a model by a binary tree using decision nodes not having dependency input/outputs as leaves and using higher priority determination nodes as nodes other than the leaves, simultaneously processing all decision nodes serving as leaves and all higher priority determination nodes located at the same depth in the binary tree, and using the working conclusion of the higher priority determination node serving as the root of the binary tree as the conclusion of the priority encoding function.

Alternatively, the arithmetic and logic unit of the present invention is an arithmetic and logic unit as set forth in claim 32, wherein the binary tree has n number of decision nodes serving as the leaves; a sub binary tree of a part of a height m (m is the smallest integer exceeding $\log_2 n$) not including the leaves of the binary tree has Nm (Nm is the smallest integer exceeding n/2) number of higher priority determination nodes which serve as the nodes of a depth m and Ns (Ns is the smallest integer exceeding Ns+½) number of higher priority determination nodes which serve as the nodes of a depth s (s is an integer represented as s=1 to m−1); a decision node is a bit signal line of the corresponding data input; the pm-th (pm=1 to Nm) higher priority determination nodes from the least significant bit serving as the nodes of the depth m of the sub binary tree each defines a (2×pm−2)-th bit signal line and a (2×pm−1)-th bit signal line of the data input as the zero-th bit input and the first bit input and has an OR logic means for taking an OR logic of the zero-th bit input and the first bit input and outputting the result as a first bit output and a negative logic means for taking the negative logic of the first bit input and outputting the result as the zero-th bit output; the ps-th (ps=1 to Ns) higher priority determination nodes from the least significant bit which serve as the nodes of the depth s of the sub binary tree each uses the zero-th bit output to the (m−s)-th bit output of the (2×ps−1)-th higher priority determination node which serves as a node of the depth (s+1) of the sub binary tree as the zero-th bit input to the (m−s)-th bit input of the lower significant bit and uses the zero-th bit output to the (m−s)-th bit output of the (2×ps)-th higher priority determination node which serves as a node of the depth (s+1) of the sub binary tree as the zero-th bit input to the (m−s)-th bit input of the higher significant bit, and has an OR logic means for taking the OR logic of the (m−s)-th bit input of the lower significant bit and the (m−s)-th bit input of the higher significant bit and outputting the result as an (m−s+1)-th bit output, a negative logic means for taking the negative logic of the (m−s)-th bit input of the higher significant bit and outputting the result as the (m−s)-th bit output, and (m−s+1) number of selecting means; and a q-th (q=1 to m−s+1)-th selecting means from the least significant bit receives as its input the (m−s)-th bit of the higher significant bit as the selection input, selects the (q−1)-th bit input of the higher significant bit when the selection input is "true", selects the (q−1)-th bit input of the lower significant bit when the selection input is "false", and outputs the same as the (q−1)-th bit output.

Alternatively, the arithmetic and logic unit of the present invention is an arithmetic and logic unit provided with a priority encoding function for outputting as a binary number, with respect to data input of n-bit binary numbers, the number of continuous "1's" or "0's" in the direction from the most significant bit to the least significant bit, wherein the arithmetic and logic unit is realized by creating of model by a binary tree of the height m (m is the smallest integer exceeding $\log_2 n$); the binary tree has Nm (Nm is the smallest integer exceeding n/2) number of nodes of the depth m and Ns (Ns is the smallest integer exceeding Ns+½) number of nodes of the depth s (s is an integer represented as s=1 to m−1); the pm-th (pm=1 to Nm) nodes from the least significant bit of the depth m of the binary tree each uses a (2×pm−2)-th bit signal line and a (2×pm−1)-th bit signal line of the data input a s the zero-th bit input and the first bit input and has an OR logic means for taking the OR logic of the zero-th bit input and the first bit input and outputting the result as the first bit output and a negative logic means for taking the negative logic of the first bit input and outputting this as the zero-th bit output; the ps-th (ps=1 to Ns) nodes from the least significant bit of the depth s of the binary tree each uses the zero-th bit output to the (m−s)-th bit output of the (2×ps−1)-th node of the depth (s+1) of the binary tree as the zero-th bit input to the (m−s)-th bit input of the lower significant bit and uses the zero-th bit output to the (m−s)-th bit output of the (2×ps)-th node of the depth (s+1) of the binary tree as the zero-th bit input to the (m−s)-th bit input of the higher significant bit and has an OR logic means for taking the OR logic of the (m−s)-th bit input of the lower significant bit and the (m−s)-th bit input of the higher significant bit and outputting the result as an (m−s+1)-th bit output, a negative logic means for taking the negative logic of the (m−s)-th bit input of the higher significant bit and outputting this as the (m−s)-th bit output, and (m−s+1) number of selecting means; and a q-th (q=1 to m−s+1)-th selecting means from the least significant bit receives as its input the (m−s)-th bit of the higher significant bit as the selection input, selects the (q−1)-th bit input of the higher significant bit when the selection input is "true", selects the (q−1)-th bit input of the lower significant bit when the selection input is "false", and outputs the same as the (q−1)-th bit output.

Alternatively, the arithmetic and logic unit of the present invention is an arithmetic and logic unit for solving a problem including a series of decisions having an order dependency, which has decision nodes, corresponding to the decisions, for outputting either of "true", "false" and "neither true nor false or do not know" as the result of decision based on one or a plurality of input information and which creates a model of the problem by a binary tree using the decision nodes as leaves and simultaneously processes all decision nodes which serve as the leaves.

Alternatively, in the arithmetic and logic unit of the present invention, when the arithmetic and logic unit is for performing a comparison of two numbers of any R-nary system and the comparison decisions for the digits of the two numbers forms a series of decisions having an order dependency, the decision nodes each outputs "true or false" when the result of difference of two numbers of the same digit places becomes positive, "false or true" when the result becomes negative, and "neither true nor false or do not know" when the result becomes zero.

Alternatively, in the arithmetic and logic unit of the present invention, when the arithmetic and logic unit performs addition of two numbers of any R-nary system and the decisions of existence of a carry at each digit forms a series of decisions having an order dependency, the decision nodes each outputs "true or false" when the result of the sum of the two numbers of the same digit places becomes R or more, "false or true" when the result becomes (R−2), and outputs "neither true nor false or do not know" when the result becomes (R−1).

Alternatively, in the arithmetic and logic unit of the present invention, when the arithmetic and logic unit performs the subtraction of two numbers of any R-nary system and the decisions of existence of a borrow at each digit forms a series of decisions having an order dependency, the decision node respectively outputs "true or false" when the result of the difference of two numbers of the same digit places becomes negative, "false or true" when the result becomes positive, and "neither true nor false or do not know" when the result becomes zero.

Alternatively, the arithmetic and logic unit of the present invention is an arithmetic and logic unit for solving a problem including a series of decisions having an order dependency, having decision nodes, corresponding to the decisions, for each outputting either of "true", "false", and "neither true nor false or do not know" as the result of the decision based on one or a plurality of input information and higher priority determination nodes, corresponding to series of the decisions, for each receiving as its input the results of the decisions of two decision nodes or the results of the decisions of two higher priority determination nodes, outputs the result of the decision of the decision node of the higher significant bit or the higher priority determination node of the higher significant bit when the result of the decision of the decision node of the higher significant bit or the higher priority determination node of the higher significant bit is "true" or "false", and outputs the result of the decision of the decision node of the lower significant bit or the higher priority determination node of the lower significant bit when the result of the decision of the decision node of the higher significant bit or the higher priority determination node of the higher significant bit is "neither true nor false or do not know"; and creating a model of the problem by a binary tree using decision nodes as leaves and higher priority determination nodes as nodes other than the leaves and simultaneously processing all decision nodes which serve as leaves and all higher priority determination nodes located at the same depth in the binary tree.

Alternatively, in the arithmetic and logic unit of the present invention, when the arithmetic and logic unit is for performing a comparison of two numbers of any R-nary system and the comparison decisions for the digits of the two numbers form a series of decisions having an order dependency, the decision nodes each outputs "true or false" when the result of difference of the two numbers of the same digit places becomes positive, "false or true" when the result becomes negative, and "neither true nor false or do not know" when the result becomes zero.

Alternatively, in the arithmetic and logic unit of the present invention, when the arithmetic and logic unit performs an addition of two numbers of any R-nary system and the decisions of existence of a carry at each digit form a series of decisions having an order dependency, the decision nodes each outputs "true or false" when the result of the sum of the two numbers of the same digit places becomes R or more, "false or true" when the result becomes (R−2), and "neither true nor false or do not know" when the result becomes (R−1).

Alternatively, in the arithmetic and logic unit of the present invention, when the arithmetic and logic unit performs the subtraction of two numbers of any R-nary system and the decisions of existence of a borrow at each digit forms a series of decisions having an order dependency, the decision nodes each outputs "true or false" when the result of difference of two numbers of the same digit places becomes negative, "false or true" when the result becomes positive, and "neither true nor false or do not know" when the result becomes zero.

Alternatively, in the arithmetic and logic unit of the present invention, when the number of decisions in the series of decisions having an order dependency is n, the binary tree has n number of decision nodes serving as the leaves and a sub binary tree of a part of a height m (m is the smallest integer exceeding $\log_2 n$) not including the leaves of the binary tree has Nm (Nm is the smallest integer exceeding n/2) number of higher priority determination nodes which serve as nodes of a depth m and Ns (Ns is the smallest integer exceeding Ns+½) number of higher priority determination nodes which serve as nodes of a depth s (s is an integer represented as s=1 to m−1).

Alternatively, in an arithmetic and logic unit of the present invention, when the result of decision "true" is defined as the value code "Y", "false" is defined as the value code "N", and "neither true nor false or do not know" is defined as the value code "Q", respectively, a higher priority determination node is given as a K operator for deriving one code Tij∈{Y, N, Q} from two codes, that is, a code Ti∈{Y, N, Q} derived from the result of decision of the decision node of the higher significant bit and a code Tj∈{Y, N, Q} derived from the result of decision of the decision node of the lower significant bit; and where the code Ti is superior to the code Tj, the K operator uses the value code "Y" or the value code "N" as the value code taken by the code Tij when the code Ti is the value code "Y" or the value code "N" and uses the value code taken by the code Tj as the value code taken by the code Tij where the code Ti is the value code "Q".

Alternatively, in the arithmetic and logic unit of the present invention, when the result of decision "true" is defined as the value code "Y", "false" is defined as the value code "N", and "neither true nor false or do not know" is defined as the value code "Q", respectively, a higher priority determination node is given as a K operator for deriving one code Tij∈{Y, N, Q} from two codes, that is, a code Ti∈{Y, N, Q} derived from the result of decision of the decision node of the higher significant bit and a code Tj∈{Y, N, Q} derived from the result of decision of the decision node of the lower significant bit; and where the code Ti is superior to the code Tj, when any code X is assigned by a 2-bit binary number (X, 1, X, 0) defining the value code "Y" as {11{, the value code "N" as {10}, and the value code "Q" as {0*} (where, "*" is "don't care"), an OR logic is denoted by a "+" operator, an AND logic is denoted by a "·" operator, and a negative logic is denoted by a "‾" operator, respectively, the K operator is given as:

$TiKTj = Tij$ $(Ti, 1, Ti, 0)K(Tj, 1, Tj, 0) = (Tij, 1, Tij, 0)$ $= (Ti, 1 + Tj, 1, Ti, 1 \cdot Ti, 0 + {}^{\wedge}Ti, 1 \cdot Tj, 0).$ Alternatively, in the arithmetic and logic unit of the present invention, each higher priority determination node has an OR logic means for taking the OR logic of the code Ti,1 and the code Tj,1 and outputting the result as the code Tij,1 and a selecting means for selecting and outputting the code Ti,0 when the code Ti,1 is "1" and the code Tj,0 when the code Ti,1 is "0" as the code Tij,0, respectively.

Alternatively, in the arithmetic and logic unit of the present invention, when the number of decisions in the series of decision having an order dependency is n and a sub binary tree of the height m (m is the smallest integer exceeding $\log_2 n$) not including the leaves of the binary tree has Nm (Nm is the smallest integer exceeding n/2) number of higher priority determination nodes which serve as the nodes of a depth m and Ns (Ns is the smallest integer exceeding Ns+½) number of higher priority determination nodes which serve as the nodes of a depth s (s is an integer represented as s=1 to m−1), a higher priority determination node which serves as a node at the depth m−p (p is an even number indicated as p=0 to m−1) of the sub binary tree has a NOR logic means for taking the NOR logic of the code Ti,1 and the code Tj,1 and outputting the result as a code ~Tij,1 and a second selecting means for taking the negative logic of the results obtained by respectively selecting the code Ti,0 when the code Ti,1 is "1" and the code Tj,0 when the code Ti,1 is "0" and outputting the result as the ^ code Tij,0; and a higher priority determination node which serves as a node at the depth m−q (q is an odd number indicated as q=0 to m−1) of the sub binary tree has a NAND logic means for taking the NAND logic of the code ~Ti,1 and the code ~Tj,1 and outputting the result as a code Tij,1 and a third selecting means for taking the negative logic of the results obtained by respectively selecting the code ~Ti,0 when the code ~Ti,1 is "0" and the code ~Tj,0 when the code ~Ti,1 is "1" and outputting the result as the code Tij,0.

Alternatively, in the arithmetic and logic unit of the present invention, when the result of decision "true" is defined as the value code "Y", "false" is defined as the value code "N", and "neither true nor false or do not know" is defined as the value code "Q", respectively, a higher priority determination node is given as a K operator for deriving one code Tij∈{Y, N, Q} from two codes, that is, a code Ti∈{Y, N, Q} derived from the result of decision of the decision node of the higher significant bit and a code Tj∈{Y, N, Q} derived from the result of decision of the decision node of the lower significant bit; and where the code Ti is superior to the code Tj, when any code X is assigned by a 2-bit binary number (X, 1, X, 0) defining the value code "Y" as {00}, value code "N" as {11}, and value code "Q" as {10} and defining {01} as "usage forbidden" (value code "F"), an OR logic is denoted by a "+" operator, an AND logic is denoted by a "·" operator, and a negative logic is denoted by a "^" operator, respectively, the K operator is given as:

$TiKTj = Tij$ $(Ti, 1, Ti, 0)K(Tj, 1, Tj, 0) = (Tij, 1, Tij, 0)$ $= (Ti, 0 + Ti, 1, Tj, 1 \cdot Ti, 0 + Ti, 1 \cdot Tj, 0).$ Alternatively, in the arithmetic and logic unit of the present invention, each higher priority determination node has a first composite logical gate means for taking the OR logic between the AND logic of the code Ti,1 and the code Tj,1 and the code Ti,0 and outputting the result as the code Tij,1; and a second composite logical gate means for taking the OR logic between the AND logic of the code Ti,1 and the code Tj,0 and the code Ti,0 and outputting the result as the code Tij,0.

Alternatively, in the arithmetic and logic unit of the present invention, when the number of decisions in the series of decision having an order dependency is n and a sub binary tree of the height m (m is the smallest integer exceeding $\log_2 n$) not including the leaves of the binary tree has Nm (Nm is the smallest integer exceeding n/2) number of higher priority determination nodes which serve as the nodes of a depth m and Ns (Ns is the smallest integer exceeding Ns+½) number of higher priority determination nodes which serve as the nodes of a depth s (s is an integer represented as s=1 to m−1), a higher priority determination node which serves as a node at the depth m−p (p is an even number indicated as p=0 to m−1) of the sub binary tree has a third composite logical gate means for taking the NOR logic between the AND logic of the code Ti,1 and the code Tj,1 and the code Ti,0 and outputting the result as the code ~Tij,1, and a fourth composite logical gate means for taking the NOR logic between the AND logic of the code Ti,1 and the code Tj,0 and the code Ti,0 and outputting the result as the code ~Tij,0; and a higher priority determination node which serves as a node at the depth m−q (q is an odd number indicated as q=0 to m−1) of the sub binary tree has a fifth composite logical gate means for taking the NAND logic between the OR logic of the code ~Ti,1 and the code ~Tj,1 and the code ~Ti,0 and outputting the result as the code Tij,1, and a sixth composite logical gate means for taking the NAND logic between the OR logic of the code ~Ti,1 and the code ~Tj,0 and the code ~Ti,0 and outputting the result as the code Tij,0.

Alternatively, in the arithmetic and logic unit of the present invention, when the result of decision "true" is defined as the value code "Y", "false" is defined as the value code "N", and "neither true nor false or do not know" is defined as the value code "Q", respectively, a higher priority determination node is given as a K operator for deriving one code Tij∈{Y, N, Q} from two codes, that is, a code Ti∈{Y, N, Q} derived from the result of decision of the decision node of the higher significant bit and a code Tj∈{Y, N, Q} derived from the result of decision of the decision node of the lower significant bit; and where the code Ti is superior to the code Tj, when any code X is assigned by a 2-bit binary number (X, 1, X, 0) defining the value code "Y" as {01}, the value code "N" as {10}, and the value code "Q" as {11} and defining {00} as "usage forbidden" (value code "F"), an OR logic is denoted by a "+" operator, an AND logic is denoted by a "·" operator, and a negative logic is denoted by a "^" operator, respectively, a K operator is given as:

$TiKTj = Tij$ $(Ti, 1, Ti, 0)K(Tj, 1, Tj, 0) = (Tij, 1, Tij, 0)$ $= (^\wedge Ti, 0 + Ti, 1, Tj, 1 \cdot ^\wedge Ti, 1 + Ti, 0 \cdot Tj, 0);$ and a higher priority determination node has a seventh composite logical gate means for taking the OR logic between the AND logic of the code Ti,1 and the code Tj,1 and the code ^Ti,0 and outputting the result as the code Tij,1 and an eighth composite logical gate means for taking the OR logic between the AND logic of the code Ti,0 and the code Tj,0 and the code ^Ti,1 and outputting the result as the code Tij,0.

Alternatively, in the arithmetic and logic unit of the present invention, when the result of decision "true" is defined as the value code "Y", "false" is defined as the value code "N", and "neither true nor false or do not know" is defined as the value code "Q", respectively, a higher priority determination node is given as a K operator for deriving one code Tij∈{Y, N, Q} from two codes, that is, a code Ti∈{Y, N, Q} derived from the result of decision of the decision node of the higher significant bit and a code Tj∈{Y, N, Q} derived from the result of decision of the decision node of the lower significant bit; and where the code Ti is superior to the code Tj, when any code X is assigned by a 2-bit binary number (X, 1, X, 0) defining the value code "Y" as {00}, the value code "N" as {10}, and the value code "Q" as {11} and defining {01} as "usage forbidden" (value code "F"), an OR logic is denoted by a "+" operator, an AND logic is denoted by a "·" operator, and a negative logic is denoted by a "^" operator, respectively, the K operator is given as:

$TiKTj = Tij$ $(Ti, 1, Ti, 0)K(Tj, 1, Tj, 0) = (Tij, 1, Tij, 0)$ $= (Ti, 1 \cdot (^\wedge Ti, 0 + Tj, 1), Ti, 0 \cdot Tj, 0);$ and a higher priority determination node has a ninth composite logical gate means for taking the AND logic between the OR logic of the code ^Ti,0 and the code Tj,1 and the code Ti,1 and outputting the result as the code Tij,1 and an AND logic means for taking the AND logic of the code Ti,0 and the code Tj,0 and outputting the result as the code Tij,0.

Alternatively, in the arithmetic and logic unit of the present invention, when the arithmetic and logic unit performs a comparison of two n-bit binary numbers (Xa, Yb) and the comparison decisions for the digits of the two numbers (Xai, Ybi; i=0 to n−1) form a series of decisions having an order dependency, a decision node has an exclusive OR logic means for taking the exclusive OR logic of the digit value Xai and the digit value Ybi and outputting the result as the code Ti,1 and a connecting means for outputting the digit value Xai as the code Ti,0.

Alternatively, in the arithmetic and logic unit of the present invention, each higher priority determination node has an OR logic means for taking the OR logic of the code Ti,1 and the code Tj,1 and outputting the result as the code Tij,1 and a selecting means for respectively selecting the code Ti,0 when the code Ti,1 is "1" and the code Tj,0 when the code Ti,1 is non and outputting the result as the code Tij,0; and it is respectively interpreted that "the two numbers (Xa, Yb) are equal" when the output of the higher priority determination node serving as the root of the binary tree is indicated as Q=(0* ), that "the two numbers (Xa, Yb) have a relationship of magnitude Xa>Yb" when the output is indicated as Y={11}, and that "the two numbers (Xa, Yb) have a relationship of magnitude Xa<Yb" when the output is indicated as N={10}.

Alternatively, in the arithmetic and logic unit of the present invention, when the sub binary tree of the height m (m is the smallest integer exceeding $\log_2 n$) not including the leaves of the binary tree has Nm (Nm is the smallest integer exceeding n/2) number of higher priority determination nodes which serve as the nodes of a depth m and Ns (Ns is the smallest integer exceeding Ns+½) number of higher priority determination nodes which serve as the nodes of a depth s (s is an integer represented as s=1 to m−1), a higher priority determination node which serves as a node at the depth m−p (p is an even number indicated as p=0 to m−1) of the sub binary tree has a NOR logic means for taking the NOR logic of the code Ti,1 and the code Tj,1 and outputting the result as a code ^Tij,1 and a second selecting means for taking the negative logic of the results obtained by respectively selecting the code Ti,0 when the code Ti,1 is "1" and the code Tj,0 when the code Ti,1 is "0" and outputting the result as the code ^Tij,0; a higher priority determination node which serves as a node at the depth m−q (q is an odd number indicated as q=0 to m−1) of the sub binary tree has a NAND logic means for taking the NAND logic of the code ^Ti,1 and the code ^Tj,1 and outputting the result as a code Tij,1, and a third selecting means for taking the negative logic of the results obtained by respectively selecting the code ^Ti,0 when the code ^Ti,1 is "0" and the code ^Tj,0 when the code ^Ti,1 is "1" and outputting the result as the code Tij,0; when m is an even number, it is respectively interpreted that "the two numbers (Xa, Yb) are equal" when the output of the higher priority determination node serving as the root of the binary tree is indicated as Q=(0*), that "the two numbers (Xa, Yb) have a relationship of magnitude Xa>Yb" when the output is indicated as Y={11}, and that "the two numbers (Xa, Yb) have a relationship of magnitude Xa<Yb" when the output is indicated as N={10}; and when m is an odd number, it is respectively interpreted that "the two numbers (Xa, Yb) are equal" when the output of the higher priority determination node serving as the root of the binary tree is indicated as Q=(1*), that "the two numbers (Xa, Yb) have a relationship of magnitude Xa>Yb" when the output is indicated as Y={00}, and that "the two numbers (Xa, Yb) have a relationship of magnitude Xa<Yb" when the output is indicated as N={01}.

Alternatively, in the arithmetic and logic unit of the present invention, when the arithmetic and logic unit performs a comparison of two code-bearing n-bit binary numbers (Xa, Yb), the decision node performing the comparison decision for the MSBs (most significant bits) of the two numbers treats the digit value Xan−1 as the digit value Ybn−1 and treats the digit value Ybn−1 as the digit value Xan−1, respectively.

Alternatively, in the arithmetic and logic unit of the present invention, when the arithmetic and logic unit performs a comparison of two n-bit binary numbers (Xa, Yb) and the comparison decisions for digits of the two numbers (Xai, Ybi; i=0 to n−1) form a series of decisions having an order dependency, each decision node has a NAND logic means for taking the NAND logic of negative logic of the digit value Xai and the digit value Ybi and outputting the result as the code Ti,1 and a NOR logic means for taking the NOR logic of the negative logic of the digit value Xai and the digit value Ybi and outputting the result as the code Ti,0.

Alternatively, in the arithmetic and logic unit of the present invention, when the decisions of existence of a carry for the digits (Xai, Ybi; i=0 to n−1) of two digits in the addition of two n-bit binary numbers (Xa, Yb) form a series of decisions having an order dependency, each decision node has an exclusive NOR logic means for taking the exclusive NOR logic of the digit value Xai and the digit value Ybi and outputting the result as the code Ti,1 and a connecting means for outputting the digit value Xai as the code Ti,0 or a connecting means for outputting the digit value Ybi as the code Ti,0.

Alternatively, in the arithmetic and logic unit of the present invention, the decision node performing a decision of existence of the carry for the LSBs (least significant bits) of the two numbers has a NOR logic means for taking the NOR logic of the digit value Xa0 and the digit value Yb0, a NAND logic means for taking the NAND logic of the digit value Xa0 and the digit value Yb0, and a selecting means for taking the negative logic of the results obtained by respectively selecting the output of the NOR logic means when the carry input to the arithmetic and logic unit is "1" and selecting the output of the NAND logic means when the carry input is "0" and outputting the result as the code T0,0; and does not output the code T0,1.

Alternatively, in the arithmetic and logic unit of the present invention, each higher priority determination node not due to the code T0,1 which originally should be output by the decision node performing the decision of existence of a carry for the LSBs of the two numbers among the higher priority determination nodes has an OR logic means for taking the OR logic of the code Ti,1 and the code Tj,1 and outputting the result as the code Tij,1 and a selecting means for selecting the code Ti,0 when the code Ti,1 is "1", selecting the code Tj,0 when the code Ti,1 is "0", respectively, and outputting the result as the code Tij,0; the higher priority determination node due to the code T0,1 which originally should be output by the decision node performing the decision of existence of a carry for the LSBs of the two numbers among the higher priority determination nodes has a selecting means for selecting the code Ti,0 when the code Ti,1 is "1", selecting the code Tj,0 when the code Ti,1 is "0", respectively, and outputting the result as the code Tij,0 and does not output the code Tij,1; and it is respectively interpreted that "there is a carry output" when the output code Tij,0 of the higher priority determination node which serves as the root of the binary tree is "1" and that "there is no carry output" when the output code Tij,0 is "0".

Alternatively, in the arithmetic and logic unit of the present invention, when the sub binary tree of the height m (m is the smallest integer exceeding $\log_2 n$) not including the leaves of the binary tree has Nm (Nm is the smallest integer exceeding n/2) number of higher priority determination nodes which serve as the nodes of a depth m and Ns (Ns is the smallest integer exceeding Ns+½) number of higher priority determination nodes which serve as the nodes of a depth s (s is an integer represented as s=1 to m−1), each higher priority determination node not derived from the code T0,1 which originally should be output by the decision node performing the decision of existence of a carry for the LSBs of the two numbers among the higher priority determination nodes which serve as the nodes at the depth m−p (p is an even number indicated as p=0 to m−1) of the sub binary tree has a NOR logic means for taking the NOR logic of the code Ti,1 and the code Tj,1 and outputting the result as a code ^Tij,1 and a second selecting means for taking the negative logic of the results obtained by respectively selecting the code Ti,0 when the code Ti,1 is "1" and the code Tj,0 when the code Ti,1 is "0" and outputting the result as the code ^Tij,0; each higher priority determination node not derived from the code T0,1 which originally should be output by the decision node performing the decision of existence of a carry for the LSBs of the two numbers among the higher priority determination nodes which serve as the nodes at the depth m−q (q is an odd number indicated as q=0 to m−1) of the sub binary tree has a NAND logic means for taking the NAND logic of the code ^Ti,1 and the code ^Tj,1 and outputting the result as a code Tij,1 and a third selecting means for taking the negative logic of the results obtained by respectively selecting the code ^Ti,0 when the code ^Ti,1 is "0" and the code ^Tj,0 when the code ^Ti,1 is "1" and outputting the result as the code Tij,0; the higher priority determination node derived from the code T0,1 which originally should be output by the decision node performing the decision of existence of a carry for the LSBs of the two numbers among the higher priority determination nodes which serve as the nodes at the depth m−p (p is an even number indicated as p=0 to m−1) of the sub binary tree has a second selecting means for taking the negative logic of the results obtained by respectively selecting the code Ti,0 when the code Ti,1 is "1" and the code Tj,0 when the code Ti,1 is "0" and outputting the result as the code ^Tij,0 and does not output the code Tij,1; the higher priority determination node derived from the code T0,1 which originally should be output by the decision node performing the decision of existence of a carry for the LSBs of the two numbers among the higher priority determination nodes which serve as the nodes at the depth m−q (q is an odd number indicated as q=0 to m−1) of the sub binary tree has a third selecting means for taking the negative logic of the results obtained by respectively selecting the code ^Ti,0 when the code ^Ti,1 is "0" and the code ^Tj,0 when the code ^Ti,1 is "1" and outputting the result as the code Tij,0 and does not output the code Tij,1; when m is an even number, it is respectively interpreted that "there is a carry output" when the output code Tij,0 of the higher priority determination node which serves as the root of the binary tree is "1" and that "there is no carry output" when the output code Tij,0 is "0"; and when m is an odd number, it is respectively interpreted that "there is a carry output" when the output code ^Tij,0 of the higher priority determination node which serves as the root of the binary tree is "0" and that "there is no carry output" when the output code ^Tij,0 is "1".

Alternatively, in the arithmetic and logic unit of the present invention, when the decisions of existence of a carry for the digits (Xai, Ybi; i=0 to n−1) of two numbers in the addition of two n-bit binary numbers (Xa, Yb) forms a series of decisions having an order dependency, each decision node has a NAND logic means for taking the NAND logic of the digit value Xai and the digit value Ybi and outputting the result as the code Ti,1 and a NOR logic means for taking the NOR logic of the digit value Xai and the digit value Ybi and outputting the result as the code Ti,0.

Alternatively, in the arithmetic and logic unit of the present invention, when the decisions of existence of a carry for the digits (Xai, Ybi; i=0 to n−1) of two numbers in the addition of two n-bit binary numbers (Xa, Yb) forms a series of decisions having an order dependency and when the binary tree is comprised using the decision nodes for performing the decision of existence of a carry for the binary digits Xaj, Ybj (j=0 to n−2) as leaves and the sub binary tree of the height m (m is the smallest integer exceeding $\log_2 n$) not including the leaves of the binary tree has Nm (Nm is the smallest integer exceeding n/2) number of higher priority determination nodes which serve as the nodes of a depth m and Ns (Ns is the smallest integer exceeding Ns+½) number of higher priority determination nodes which serve as the nodes of a depth s (s is an integer represented as s=1 to m−1), the decision node for performing the decision of existence of a carry for the LSBs of the two numbers has a NOR logic means for taking the NOR logic of the digit value Xa0 and the digit value Yb0, a NAND logic means for taking the NAND logic of the digit value Xa0 and the digit value Yb0, and a selecting means for taking the negative logic of the results obtained by respectively selecting the output of the NOR logic means when the carry input to the arithmetic and logic unit is "1" and selecting the output of the NAND logic means when the carry input is "0" and outputting the result as the code T0,0 and does not output the code T0,1; a decision node performing a decision of existence of a carry for the digits Xak, Ybk (k=1 to n−1) of the two numbers has an exclusive NOR logic means for taking the exclusive NOR logic of the digit value Xaj and the digit value Ybj and outputting the result as the code Tj,1 and a connecting means for outputting the digit value Xaj as the code Tj,0 or a connecting means for outputting the digit value Ybj as the code Tj,0; the higher priority determination node derived from the code T0,1 which originally should be output by the decision node performing the decision of existence of a carry for the LSBs of the two numbers among the higher priority determination nodes has a selecting means for respectively selecting the code Ti,0 when the code Ti,1 is "1", selecting the code Tj,0 when the code Ti,1 is "0", and outputting the result as the code Tij,0 and does not output the code Tij,1; each higher priority determination node not derived from the code T0,1 which originally should be output by the decision node performing the decision of existence of a carry for the LSBs of the two numbers among the higher priority determination nodes has an OR logic means for taking the OR logic of the code Ti,1 and the code Tj,1 and outputting the result as the code Tij,1 and a selecting means for respectively selecting the code Ti,0 when the code Ti,1 is "1", selecting the code Tj,0 when the code Ti,1 is "0", and outputting the result as the code Tij,0; when the number of leaves of the binary tree is not a power of 2, uses the higher priority determination node corresponding to the decision node performing the decision of existence of a carry for the LSBs of the two numbers as the dummy node for propagating the code T0,0 output by the decision node as it is; and has an exclusive OR logic means for taking the exclusive OR logic between the negative logic of the output code Tn−1,1 of the decision node performing the decision of existence of a carry for the MSBs of the two numbers and the code output Tij,0 of the higher priority determination node which serves as the root of the binary tree and defining this as the result of the sum for the MSBs of the two numbers.

Alternatively, in the arithmetic and logic unit of the present invention, when the decisions of existence of a carry for the digits (Xai, Ybi; i=0 to n−1) of two numbers in the addition of two n-bit binary numbers (Xa, Yb) form a series of decisions having an order dependency and when the binary tree is comprised using decision nodes for performing the decisions of existence of a carry for the digits Xaj, Ybj (j=0 to n−2) of the two numbers as leaves and the sub binary tree of the height m (m is the smallest integer exceeding $\log_2 n$) not including the leaves of the binary tree has Nm (Nm is the smallest integer exceeding n/2) number of higher priority determination nodes which serve as the nodes of a depth m and Ns (Ns is the smallest integer exceeding Ns+½) number of higher priority determination nodes which serve as the nodes of a depth s (s is an integer represented as s=1 to m−1), the decision node for performing the decision of existence of a carry for the LSBs of the two numbers has a NOR logic means for taking the NOR logic of the digit value Xa0 and the digit value Yb0, a NAND logic means for taking the NAND logic of the digit value Xa0 and the digit value Yb0, and a selecting means for taking the negative logic of the results obtained by respectively selecting the output of the NOR logic means when the carry input to the arithmetic and logic unit is "1", selecting the output of the NAND logic means when the carry input is "0", and outputting the result as the code T0,0 and does not output the code T0,1; each decision node performing the decision of existence of a carry for the digits Xak, Ybk (k=1 to n−1) of the two numbers has an exclusive NOR logic means for taking the exclusive NOR logic of the digit value Xaj and the digit value Ybj and outputting the result as the code Tj,1 and a connecting means for outputting the digit value Xaj as the code Tj,0 or a connecting means for outputting the digit value Ybj as the code Tj,0; each higher priority determination node not derived from the code T0,1 which originally should be output by the decision node performing the decision of existence of a carry for the LSBs of the two numbers among the higher priority determination nodes which serve as the nodes at the depth m−p (p is an even number indicated as p=0 to m−1) of the sub binary tree has a NOR logic means for taking the NOR logic of the code Ti,1 and the code Tj,1 and outputting the result as a code ~Tij,1 and a second selecting means for taking the negative logic of the results obtained by respectively selecting the code Ti,0 when the code Ti,1 is "1" and the code Tj,0 when the code Ti,1 is "0" and outputting the result as the code ~Tij,0; each higher priority determination node not derived from the code T0,1 which originally should be output by the decision node performing the decision of existence of a carry for the LSBs of the two numbers among the higher priority determination nodes which serve as the nodes at the depth m−q (q is an odd number indicated as q=0 to m−1) of the sub binary tree has a NAND logic means for taking the NAND logic of the code ~Ti,1 and the code ~Tj,1 and outputting the result as a code Tij,1, and a third selecting means for taking the negative logic of the results obtained by respectively selecting the code ~Ti,0 when the code ~Ti,1 is "0" and the code ~Tj,0 when the code ~Ti,1 is "1" and outputting the result as the code Tij,0; the higher priority determination node derived from the code T0,1 which originally should be output by the decision node performing the decision of existence of a carry for the LSBs of the two numbers among the higher priority determination nodes which serve as the nodes at the depth m−p (p is an even number indicated as p=0 to m−1) of the sub binary tree has a second selecting means for taking the negative logic of the results obtained by respectively selecting the code Ti,0 when the code Ti,1 is "1" and the code Tj,0 when the code Ti,1 is "0" and outputting the result as the code ~Tij,0 and does not output the code Tij,1; the higher priority determination node derived from the code T0,1 which should be output by the decision node performing the decision of existence of a carry for the LSBs of the two numbers among the higher priority determination nodes which serve as the nodes at the depth m−q (q is an odd number indicated as q=0 to m−1) of the sub binary tree has a third selecting means for taking the negative logic of the results obtained by respectively selecting the code ~Ti,0 when the code ~Ti,1 is "0" and the code ~Tj,0 when the code ~Ti,1 is "1" and outputting the result as the code Tij,0 and does not output the code Tij,1; when the number of leaves of the binary tree is not a power of 2, defines the higher priority determination node corresponding to the decision node performing the decision of existence of a carry for the LSBs of the two numbers as a dummy node for propagating the code T0,0 output by the decision node as it is; has an exclusive OR logic means for taking the exclusive OR logic between the negative logic of the output code Tn−1,1 of the decision node performing the decision of existence of a carry for the MSBs of the two numbers and the code output Tij,0 of the higher priority determination node which serves as the root of the binary tree and defining this as the result of the sum for the MSBs of the two numbers when m is an even number; and has an exclusive OR logic means for taking the exclusive OR logic between the negative logic of the output code Tn−1,1 of the decision node performing the decision of existence of a carry for the MSBs of the two numbers and the negative logic of the code output ^Tij,0 of the higher priority determination node which serves as the root of the binary tree and defining this as the result of the sum for the MSBs of the two numbers when m is an odd number.

Alternatively, in the arithmetic and logic unit of the present invention, when decisions of existence of a carry for the digits (Xai, Ybi; i=0 to n−1) of two numbers in the addition of two n-bit binary numbers (Xa, Yb) form a series of decisions having an order dependency, has n number of decision nodes which respectively output "true or false" when the result of the sum of the same digit places becomes 2 or more, "false or true" when the result becomes zero, and "neither true nor false or do not know" when the result becomes 1 as the results of the decisions based on the digit values Xai, Ybi of the two numbers and a higher priority determination node matrix comprising n number of rows and m number of columns (m is the smallest integer exceeding $\log_2 n$) with rows corresponding to the digits of the two numbers; the group of the higher priority determination nodes of the first column has a higher priority determination node of the zero-th row as a dummy node for propagating the result of decision of the decision node of the zero-th digit as it is and a higher priority determination node of an h1-th row which receives as its input the result of decision of an h1−1-th digit and the decision node of the h1-th digit (h1=1 to n−1), outputs the result of decision of the decision node of the h1-th digit when the result of decision of the decision node of the h1-th digit is "true" or "false", and outputs the result of decision of the decision node of the h1−1-th digit when the result of decision of the decision node of h1-th digit is "neither true nor false or do not know"; the group of higher priority determination nodes of a k-th column (k=2 to m) has higher priority determination nodes from the zero-th row to a $2^{k-1}$-th row as the dummy nodes for respectively propagating the result of decisions of the higher priority determination nodes from the zero-th row to the $2^{k-1}-1$-th row as they are and a higher priority determination node of an hk-th row which receives as its input the results of decisions of the higher priority determination node of an hk−$2^{k-1}$-th row and the higher priority determination node of the hk-th row (hk=$2^{k-1}$ to n−1), outputs the result of decision of the higher priority determination node of the hk-th row when the result of decision of the higher priority determination node of the hk-th row is "true" or "false", and outputs the result of decision of the higher priority determination node of the hk−$_2^{k-1}$-th row when the result of decision of the higher priority determination node of the hk-th row is "neither true nor false or do not know"; and the n number of decision nodes and the groups of higher priority determination nodes of the columns are respectively simultaneously processed.

Alternatively, in the arithmetic and logic unit of the present invention, when the result of decision "true" is defined as the value code "Y", "false" is defined as the value code "N", and "neither true nor false or do not know" is defined as the value code "Q", respectively, each higher priority determination node is given as a K operator for deriving one code Tij∈{Y, N, Q} from two codes, that is, the code Ti∈{Y, N, Q} derived from the result of decision of the decision node of the higher significant bit and the code Tj∈{Y, N, Q} derived from the result of decision of the decision node of the lower significant bit; and where the code Ti is superior to the code Tj, a K operator defines the value code "Y" or the value code "N" as the value code taken by the code Tij when the code Ti is the value code "Y" or the value code "N" and defines the value code taken by the code Tj as the value code taken by the code Tij when the code Ti is the value code "Q".

Alternatively, in the arithmetic and logic unit of the present invention, when the result of decision "true" is defined as the value code "Y", "false" is defined as the value code "N", and "neither true nor false or do not know" is defined as the value code "Q", respectively, each higher priority determination node is given as a K operator for deriving one code Tij∈{Y, N, Q} from two codes, that is, the code Ti∈{Y, N, Q} derived from the result of decision of the decision node of the higher significant bit and the code Tj∈{Y, N, Q} derived from the result of decision of the decision node of the lower significant bit; and where the code Ti is superior to the code Tj, when any code X is assigned by a 2-bit binary number (X, 1, X, 0) defining the value code "Y" as {11}, the value code "N" as {10}, and the value code as {0*} (here, "*" is "don't care"), an OR logic is denoted by a "+" operator, an AND logic is denoted by a "·" operator, and a negative logic is denoted by a "^" operator, respectively, the K operator is given as:

$$TiKTj = Tij$$
$$(Ti, 1, Ti, 0)K(Tj, 1, Tj, 0) = (Tij, 1, Tij, 0)$$
$$= (Ti, 1 + Tj, 1, Ti, 1 \cdot Ti, 0 + \wedge Ti, 1 \cdot Tj, 0).$$

Alternatively, in the arithmetic and logic unit of the present invention, the decision nodes from the first digit to the n−1-th digit each has an exclusive NOR logic means for taking the exclusive NOR logic of the digit value Xai and the digit value Ybi and outputting the result as the code Ti,1 and a connecting means for outputting the digit value Xai as the code Ti,0 or a connecting means for outputting the digit value Ybi as the code Ti,0; the decision node of the zero-th digit has a NOR logic means for taking the NOR logic of the digit value Xa0 and the digit value Yb0, a NAND logic means for taking the NAND logic of the digit value Xa0 and the digit value Yb0, and a selecting means for taking the negative logic of the results obtained by respectively selecting the output of the NOR logic means when the carry input to the arithmetic and logic unit is "1" and selecting the output of the NAND logic means when the carry input is "0" and outputting the result as the code T0,0 and does not output the code T0,1; among the higher priority determination nodes not including the dummy nodes, each higher priority determination node not derived from the code T0,1 which originally should be output by the decision node of the zero-th digit has an OR logic means for taking the OR logic of the code Ti,1 and the code Tj,1 and outputting the result as the code Tij,1 and a selecting means for respectively selecting the code Ti,0 when the code Ti,1 is "1", selecting the code Tj,0 when the code Ti,1 is "0", and outputting the result as the code Tij,0; among the higher priority determination nodes not including the dummy nodes, the higher priority determination node derived from the code T0,1 which originally should be output by the decision node of the zero-th digit has a selecting means for respectively selecting the code Ti,0 when the code Ti,1 is "1", selecting the code Tj,0 when the code Ti,1 is "0", and outputting the result as the code Tij,0 and does not output the code Tij,1; and the output code Tij,0 of the higher priority determination nodes from the zero-th row to the n−1-th row of the m-th column is used as the first digit to the n−1-th digit and the carry output of the arithmetic and logic unit and it is interpreted that "there is a carry output" when the output code Tij,0 is "1" and that "there is no carry output" when the output code Tij,0 is "0", respectively.

Alternatively, the arithmetic and logic unit of the present invention has exclusive OR logic means of the zero-th digit for taking the exclusive OR logic of the digit value Xa0 and the digit value Yb0 and a sum generating means provided with an exclusive OR logic means of the zero-th row for taking the exclusive OR logic of the output of the exclusive OR logic means of the zero-th digit and the carry input to the arithmetic and logic unit and defining this as the result of the sum of the zero-th digits and exclusive OR logic means from the first row to the n−1-th row for taking the exclusive OR logic between each of the negative logics of the output codes Ti,1 of the decision nodes from the first digit to the n−1-th digit and each of the output codes Tij,0 of the higher priority determination nodes from the zero-th row to the n−2-th row of the m-th column and defining this as the result of the sum of the first digit to the n−1-th digit Alternatively, in the arithmetic and logic unit of the present invention, the decision nodes from the first digit to the n−1-th digit each has an exclusive NOR logic means for taking the exclusive NOR logic of the digit value Xai and the digit value Ybi and outputting the result as the code Ti,1 and a connecting means for outputting the digit value Xai as the code Ti,0 or a connecting means for outputting the digit value Ybi as the code Ti,0; the decision node of the zero-th digit has a NOR logic means for taking the NOR logic of the digit value Xa0 and the digit value Yb0, a NAND logic means for taking the NAND logic of the digit value Xa0 and the digit value Yb0, and a selecting means for taking the negative logic of the results obtained by respectively selecting the output of the NOR logic means when the carry input to the arithmetic and logic unit is "1" and selecting the output of the NAND logic means when the carry input is "0" and outputting the result as the code T0,0 and does not output the code T0,1; the higher priority determination node of the zero-th row of the first column and the higher priority determination nodes from the zero-th row to the $2^{k-1}$-1-th row (k=2 to m) of the k-th column are defined as dummy nodes which invert the result of decision of the decision node of the zero-th digit and the results of decisions of the higher priority determination nodes from the zero-th row to the $2^{k-1}$-1-th row and propagate the same; among the higher priority determination nodes of the m−p-th column (p is an even number indicated by p=0 to m−1) not including the dummy nodes, each higher priority determination node not derived from the code T0,1 which originally should be output by the decision node of the zero-th digit has a NOR logic means for taking the NOR logic of the code Ti,1 and the code Tj,1 and outputting the result as the code ~Tij,1 and a second selecting means for taking the negative logic of the results obtained by respectively selecting the code Ti,0 when the code Ti,1 is "1" and the code Tj,0 when the code Ti,1 is "0" and outputting the result as the code ~Tij,0; among the higher priority determination nodes of the m−q-th column (q is an odd number indicated by q=1 to m−1) not including the dummy nodes, each higher priority determination node not derived from the code T0,1 which originally should be output by the decision node of the zero-th digit has a NAND logic means for taking the NAND logic of the code ~Ti,1 and the code ~Tj,1 and outputting the result as the code Tij,1 and a third selecting means for taking the negative logic of the results obtained by respectively selecting the code ~Ti,0 when the code ~Ti1 is "0" and the code ~Tj,0 when the code ~Ti,1 is "1" and outputting the result as the code Tij,0; among the higher priority determination nodes of the m−p-th column (p is an even number indicated by p=0 to m−1) not including the dummy nodes, the higher priority determination node derived from the code T0,1 which originally should be output by the decision node of the zero-th digit has a second selecting means for taking the negative logic of the results obtained by respectively selecting the code Ti,0 when the code Ti,1 is "1" and the code Tj,0 when the code Ti,1 is "0" and outputting the result as the code ~Tij,0 and does not output the code Tij,1; among the higher priority determination nodes of the m−q-th column (q is an odd number indicated by q=1 to m−1) not including the dummy nodes, the higher priority determination node derived from the code T0,1 which originally should be output by the decision node of the zero-th digit has a third selecting means for taking the negative logic of the results obtained by respectively selecting the code ~Ti,0 when the code ~Ti,1 is "0" and the code ~Tj,0 when the code ~Ti,1 is "1" and outputting the result as the code Tij,0 and does not output the code Tij,1; when m is an even number, the output codes Tij,0 of the higher priority determination nodes from the zero-th row to the n−1-th row of the m-th column are used as the first digit to the n−1-th digit and the carry output of the arithmetic and logic unit and it is respectively interpreted that "there is a carry output" when the output code Tij,0 is "1" and that "there is no carry output" when the output code Tij,0 is "0"; and when m is an odd number, the output codes ~Tij,0 of the higher priority determination nodes from the zero-th row to the n−1-th row of the m-th column are used as the first digit to the n−1-th digit and the carry output of the arithmetic and logic unit and it is respectively interpreted that "there is a carry output" when the output code ~Tij,0 is "0" and that "there is no carry output" when the output code ~Tij,0 is "1".

Alternatively, the arithmetic and logic unit of the present invention has an exclusive OR logic means of the zero-th digit for taking the exclusive OR logic of the digit value Xa0 and the digit value Yb0 and, when m is an even number, a sum generating means provided with an exclusive OR logic means of the zero-th row for taking the exclusive OR logic of the output of the exclusive OR logic means of the zero-th digit and the carry input to the arithmetic and logic unit and defining this as the result of the sum of the zero-th digits and exclusive OR logic means from the first row to the n−1-th row for taking the exclusive OR logic between each of the negative logics of the output codes Ti,1 of the decision nodes from the first digit to the n−1-th digit and each of the output codes Tij,0 of the higher priority determination nodes from the zero-th row to the n−2-th row of the m-th column and defining this as the result of the sum of the first digit to the n−1-th digit, and, when m is an odd number, a sum generating means provided with an exclusive OR logic means of the zero-th row for taking the exclusive OR logic of the output of the exclusive OR logic means of zero-th digit and the carry input to the arithmetic and logic unit and defining this as the result of sum of the zero-th digits and exclusive OR logic means from the first row to the n−1-th row for taking the exclusive OR logic between each of the negative logics of the output codes Ti,1 of the decision nodes from the first digit to the n−1-th digit and each of negative logics of the output codes ~Tij,0 of the higher priority determination nodes from the zero-th row to the n−2-th row of the m-th column and defining this as the result of the sum of the first digit to the n−1-th digit.

Alternatively, in the arithmetic and logic unit of the present invention, when the decisions of existence of a carry for the digits (Xai, Ybi; i=0 to n−1) of two numbers in the addition of two n-bit binary numbers (Xa, Yb)form a series of decisions having an order dependency, it has n number of decision nodes which respectively output "true or false" when the result of the sum of the same digit places becomes 2 or more, "false or true" when the result becomes zero, and "neither true nor false or do not know" when the result becomes 1 as the result of a decision based on the digit values Xai, Ybi of the two numbers and a higher priority determination node matrix consisting of n/2 number of rows and m number of columns (m is the smallest integer exceeding $\log_2 n$) with rows corresponding to the odd number digits of the two numbers; the group of higher priority determination nodes of the first column has a higher priority determination node of the h1-th row which receives as its input the results of the decisions of the h1−1-th digit and the decision node of h1-th digit (h1=odd number from 1 to n−1), outputs the result of decision of the decision node h1-th digit when the result of the decision of the decision node of the h1-th digit is "true" or "false", and outputs the result of the decision of the decision node of h1−1-th digit when the result of decision of the decision node of the h1-th digit is "neither true nor false or do not know"; the group of higher priority determination nodes of the k-th column (k=2 to m) has higher priority determination nodes from the first to $2^{k-1}$-th odd number rows as the dummy nodes for respectively propagating the results of decisions of the higher priority determination nodes from the first to $2^{k-1}-1$-th odd number rows as they are and a higher priority determination node of the hk-th row which receives as its input the result of decision of the higher priority determination node of the hk-$2^{k-1}$-th row and the higher priority determination node of the hk-th row (hk=odd number from $2^{k-1}$ to n−1), outputs the result of decision of the higher priority determination node of the hk-th row when the result of decision of the higher priority determination node of the hk-th row is "true" or "false", and outputs the result of decision of the higher priority determination node of the hk-$2^{k-1}$-th row when the result of decision of the higher priority determination node of the hk-th row is "neither true nor false or do not know"; and the n number of decision nodes and the groups of the higher priority determination nodes of the columns are respectively simultaneously processed.

Alternatively, in the arithmetic and logic unit of the present invention, when the result of decision "true" is defined as the value code "Y", "false" is defined as the value code "N", and "neither true nor false or do not know" is defined as the value code "Q", respectively, each higher priority determination node is given as a K operator for deriving one code Tij∈{Y, N, Q} from two codes, that is, the code Ti∈{Y, N, Q} derived from the result of decision of the decision node of the higher significant bit and the code Tj∈{Y, N, Q} derived from the result of decision of the decision node of the lower significant bit; and where the code Ti is superior to the code Tj, the K operator defines the value code "Y" or the value code "N" as the value code taken by the code Tij when the code Ti is the value code "Y" or the value code "N" and defines the value code taken by the code Tj as the value code taken by the code Tij when the code Ti is the value code "Q".

Alternatively, in the arithmetic and logic unit of the present invention, when the result of decision "true" is defined as the value code "Y", "false" is defined as the value code "N", and "neither true nor false or do not know" is defined as the value code "Q", respectively, each higher priority determination node is given as a K operator for deriving one code Tij∈{Y, N, Q} from two codes, that is, the code Ti∈{Y, N, Q} derived from the result of decision of the decision node of the higher significant bit and the code Tj∈{Y, N, Q} derived from the result of decision of the decision node of the lower significant bit; and where the code Ti is superior to the code Tj, when any code X is assigned by a 2-bit binary number (X, 1, X, 0) defining the value code "Y" as {11}, the value code "N" as {10}, and the value code "Q" as {0*} (here, "*" is "don't care"), an OR logic is denoted by a "+" operator, an AND logic is denoted by a "·" operator, and a negative logic is denoted by "·" operator, respectively, the K operator is given as:

$$TiKTj = Tij$$
$$(Ti, 1, Ti, 0)K(Tj, 1, Tj, 0) = (Tij, 1, Tij, 0)$$
$$= (Ti, 1 + Tj, 1, Ti, 1 \cdot Ti, 0 + {}^{\wedge}Ti, 1 \cdot Tj, 0).$$

Alternatively, in the arithmetic and logic unit of the present invention, where the decision nodes from the first digit to the n−1-th digit each has an exclusive NOR logic means for taking the exclusive NOR logic of the digit value Xai and the digit value Ybi and outputting the result as the code Ti,1 and a connecting means for outputting the digit value Xai as the code Ti,0 or a connecting means for outputting the digit value Ybi as the code Ti,0; the decision node of the zero-th digit has a NOR logic means for taking the NOR logic of the digit value Xa0 and the digit value Yb0, a NAND logic means for taking the NAND logic of the digit value Xa0 and the digit value Yb0, and a selecting means for taking the negative logic of the results obtained by respectively selecting the output of the NOR logic means when the carry input to the arithmetic and logic unit is "1" and selecting the output of the NAND logic means when the carry input is "0" and outputting the result as the code T0,0 and does not output the code T0,1; among the higher priority determination nodes not including the dummy nodes, each higher priority determination node not derived from the code T0,1 which originally should be output by the decision node of the zero-th digit has an OR logic means for taking the OR logic of the code Ti,1 and the code Tj,1 and outputting the result as the code Tij,1 and a selecting means for respectively selecting the code Ti,0 when the code Ti,1 is "1", selecting the code Tj,0 when the code Ti,1 is "0", and outputting the result as the code Tij,0; among the higher priority determination nodes not including the dummy node, the higher priority determination node derived from the code T0,1 which originally should be output by the decision node of the zero-th digit has a selecting means for respectively selecting the code Ti,0 when the code Ti,1 is "1", selecting the code Tj,0 when the code Ti,1 is "0", and outputting the result as the code Tij,0 and does not output the code Tij,1; the output code Tij,0 of the higher priority determination node of the n−1-th row of the m-th column is used as the carry output of the arithmetic and logic unit and it is interpreted that "there is a carry output" when the output code Tij,0 is "1" and that "there is no carry output" when the output code Tij,0 is "0", respectively; the arithmetic and logic unit has an exclusive OR logic means of the zero-th digit for taking the exclusive OR logic of the digit value Xa0 and the digit value Yb0 and the sum generating means; and the sum generating means has an exclusive OR logic means of the zero-th row for taking the exclusive OR logic of the output of the exclusive OR logic means of zero-th digit and the carry input to the arithmetic and logic unit and defining this as the result of the sum of the zero-th digits, an exclusive OR logic means of the first row for taking the exclusive OR logic between the output code T0,0 of the decision node of the zero-th digit and the negative logic of the output code T1,1 of the decision node of the first digit and defining this as the result of the sum of the first digits, a carry generating means of the f-th row for respectively selecting the input digit value Xaf or Ybf to the row when the output code Tf,1 of the decision node of the f-th digit (f=even number from 2 to n−1) is "1", selecting the output code of the higher priority determination node of the f−1-th row when the output code Tf, 1 is "0", and outputting the result as the carry to the f+1-th digit, an exclusive OR logic means of the f-th row for taking the exclusive OR logic between the negative logic of the output code Tf,1 of the decision node of the f-th digit and the output code of the higher priority determination node of the f−1-th row and defining this as the result of the sum of the f-th digits, and an exclusive OR logic means of the f+1-th row for taking the exclusive OR logic between the negative logic of the output code Tf+1,1 of the decision node of the f+1-th digit and the output of the carry generating means of the f-th row and defining this as the result of the sum of the f+1-th digits.

Alternatively, in the arithmetic and logic unit of the present invention, where the decision nodes from the first digit to the n−1-th digit each has an exclusive NOR logic means for taking the exclusive NOR logic of the digit value Xai and the digit value Ybi and outputting the result as the code Ti,1, and a connecting means for outputting the digit value Xai as the code Ti,0 or a connecting means for outputting the digit value Ybi as the code Ti,0; the decision node of the zero-th digit has a NOR logic means for taking the NOR logic of the digit value Xa0 and the digit value Yb0, a NAND logic means for taking the NAND logic of the digit value Xa0 and the digit value Yb0, and a selecting means for taking the negative logic of the results obtained by respectively selecting the output of the NOR logic means when the carry input to the arithmetic and logic unit is "1" and selecting the output of the NAND logic means when the carry input is "1" and outputting the result as the code T0,0 and does not output the code T0,1; the higher priority determination nodes of the first to $2^{k-1}$-th (k=2 to m) odd number rows of the k-th column are defined as dummy nodes which respectively invert the results of decisions of the higher priority determination nodes of the first to $2^{k-1}$-th odd number rows and propagate the same; among the higher priority determination nodes of the m−p-th column (p is an even number indicated by p=0 to m−1) not including the dummy nodes, each higher priority determination node not derived from the code T0,1 which originally should be output by the decision node of the zero-th digit has a NOR logic means for taking the NOR logic of the code Ti,1 and the code Tj,1 and outputting the result as the code ~Tij,1 and a selecting means for taking the negative logic of the result obtained by respectively selecting the code Ti,0 when the code Ti,1 is "1" and the code Tj,0 when the code Ti,1 is "0" and outputting the result as the code ~Tij,0; among the higher priority determination nodes of the m−q-th column (q is an odd number indicated by q=1 to m−1) not including the dummy nodes, each higher priority determination node not derived from the code T0,1 which originally should be output by the decision node of the zero-th digit has a NAND logic means for taking the NAND logic of the code ~Ti1 and the code ~Tj,1 and outputting the result as the code Tij,1 and a third selecting means for taking the negative logic of the results obtained by respectively selecting the code ~Ti,0 when the code ~Ti,1 is "0" and the code ~Tj,0 when the code ~Ti,1 is "1" and outputting the result as the code Tij,0; among the higher priority determination nodes of the m−p-th column (p is an even number indicated by p=0 to m−1) not including the dummy nodes, the higher priority determination node derived from the code T0,1 which originally should be output by the decision node of the zero-th digit has a second selecting means for taking the negative logic of the results obtained by respectively selecting the code Ti,0 when the code Ti,1 is "1" and the code Tj,0 when the code Ti,1 is "0" and outputting the result as the code ~Tij,0 and does not output the code Tij,1; among the higher priority determination nodes of the m−q-th column (q is an odd number indicated by q=1 to m−1) not including the dummy nodes, the higher priority determination node derived from the code T0,1 which originally should be output by the decision node of the zero-th digit has a third selecting means for taking the negative logic of the results obtained by respectively selecting the code ~Ti,0 when the code Ti,1 is "0" and the code ~Tj,0 when the code ~Ti,1 is "1" and outputting the result as the code Tij,0 and does not output the code Tij,1; when m is an even number, the output code Tij,0 of the higher priority determination node of the n−1-th row of the m-th column is used as the carry output of the arithmetic and logic unit and it is respectively interpreted that "there is a carry output" when the output code Tij,0 is "1" and that "there is no carry output" when the output code Tij,0 is "0"; and when m is an odd number, the output code Tij,0 obtained by taking the negative logic of the output code ~Tij,0 of the higher priority determination node of the n−1-th row of the m-th column is used as the carry output of the arithmetic and logic unit and it is respectively interpreted that "there is a carry output" when the output code Tij,0 is "1" and that "there is no carry output" when the output code Tij,0 is "0"; the arithmetic and logic unit has an exclusive OR logic means of the zero-th digit for taking the exclusive OR logic of the digit value Xa0 and the digit value Yb0 and the sum generating means; the sum generating means has, when m is an even number, the exclusive OR logic means of the zero-th row for taking the exclusive OR logic of the output of the exclusive OR logic means of the zero-th digit and the carry input to the arithmetic and logic unit and defining this as the result of the sum of the zero-th digits, the exclusive OR logic means of the first row for taking the exclusive OR logic between the output code T0,0 of the decision node of the zero-th digit and the negative logic of the output code T1,1 of the decision node of the first digit and defining this as the result of the sum of the first digits, the carry generating means of the f-th row for respectively selecting the input digit value Xaf or Ybf to the row when the output code Tf,1 of the decision node of the f-th digit (f=even number from 2 to n−1) is "1", selecting the output code of the higher priority determination node of the f−1-th row when the output code Tf,1 is "0", and outputting the result as a carry to the f+1-th digit, the exclusive OR logic means of the f-th row for taking the exclusive OR logic between the negative logic of the output code Tf,1 of the decision node of the f-th digit and the output code of the higher priority determination node of the f−1-th row and defining this as the result of the sum of the f-th digits, and the exclusive OR logic means of the f+1-th row for taking the exclusive OR logic between the negative logic of the output code Tf+1,1 of the decision node of the f+1-th digit and the output of the carry generating means of the f-th row and defining this as the result of the sum of the f+1-th digits, while, when m is an odd number, an exclusive OR logic means of the zero-th row for taking the exclusive OR logic of the output of the exclusive OR logic means of zero-th digit and the carry input to the arithmetic and logic unit and defining this as the result of the sum of the zero-th digits, an exclusive OR logic means of the first row for taking the exclusive OR logic between the output code T0,0 of the decision node of the zero-th digit and the negative logic of the output code T1,1 of the decision node of the first digit and defining this as the result of the sum of the first digits, a carry generating means of the f-th row for respectively selecting the input digit value Xaf or Ybf to the row when the output code Tf,1 of the decision node of the f-th digit (f=even number from 2 to n−1) is "1" selecting the negative logic of the output code of the higher priority determination node of the f−1-th row when the output code Tf,1 is "0", and outputting the result as the carry to the f+1-th digit, an exclusive OR logic means of the f-th row for taking the exclusive OR logic between the negative logic of the output code Tf,1 of the decision node of the f-th digit and the negative logic of the output code of the higher priority determination node of the f−1-th row and defining this as the result of the sum of the f-th digits, and an exclusive OR logic means of the f+1-th row for taking the exclusive OR logic between the negative logic of the output code Tf+1,1 of the decision node of the f+1-th digit and the output of the carry generating means of the f-th row and defining this as the result of the sum of the f+1-th digits.

Alternatively, in the arithmetic and logic unit of the present invention, where the decision nodes from the first digit to the n−1-th digit each has an exclusive NOR logic means for taking the exclusive NOR logic of the digit value Xai and the digit value Ybi and outputting the result as the code Ti,1 and a connecting means for outputting the digit value Xai as the code Ti,0 or a connecting means for outputting the digit value Ybi as the code Ti,0; the decision node of the zero-th digit has a NOR logic means for taking the NOR logic of the digit value Xa0 and the digit value Yb0, a NAND logic means for taking the NAND logic of the digit value Xa0 and the digit value Yb0, and a selecting means for taking the negative logic of the results obtained by respectively selecting the output of the NOR logic means when the carry input to the arithmetic and logic unit is "1" and selecting the output of the NAND logic means when the carry input is "0" and outputting the result as the code T0,0 and does not output the code T0,1; among the higher priority determination nodes not including the dummy node, each higher priority determination node not derived from the code T0,1 which originally should be output by the decision node of the zero-th digit has an OR logic means for taking the OR logic of the code Ti,1 and the code Tj,1 and outputting the result as the code Tij,1 and a selecting means for respectively selecting the code Ti,0 when the code Ti,1 is "1" and the code Tj,0 when the code Ti,1 is "0" and outputting the result as the code Tij,0; among the higher priority determination nodes not including the dummy node, the higher priority determination node derived from the code T0,1 which originally should be output by the decision node of the zero-th digit has a selecting means for respectively selecting the code Ti,0 when the code Ti,1 is "1" and the code Tj,0 when the code Ti,1 is "0" and outputting the result as the code Tij,0 and does not output the code Tij,1; an output code Tij,0 of the higher priority determination node of the n−1-th row of the m-th column is used as the carry output of the arithmetic and logic unit and it is respectively interpreted that "there is a carry output" when the output code Tij,0 is "1" and that "there is no carry output" when the output code Tij,0 is "0"; the arithmetic and logic unit has an exclusive OR logic means of the zero-th digit for taking the exclusive OR logic of the digit value Xa0 and the digit value Yb0 and a sum generating means; and the sum generating means has an exclusive OR logic means of the zero-th row for taking the exclusive OR logic of the output of the exclusive OR logic means of zero-th digit and the carry input to the arithmetic and logic unit and defining this as the result of sum of the zero-th digits, an exclusive OR logic means of the first row for taking the exclusive OR logic between the output code T0,0 of the decision node of the zero-th digit and the negative logic of the output code T1,1 of the decision node of the first digit and defining this as the result of the sum of the first digits, a carry generating means of the f-th row for taking the negative logic of the results obtained by respectively selecting the input digit value Xaf or Ybf to the row when the output code Tf,1 of the decision node of the f-th digit (f=even number from 2 to n−1) is "1", selecting the output code of the higher priority determination node of the f−1-th row when the output code Tf,1 is "0", and outputting the result as a carry to the f+1-th digit, an exclusive NOR logic means of the f-th row for taking the exclusive NOR logic between the output code Tf,1 of the decision node of the f-th digit and the output code of the higher priority determination node of the f−1-th row and defining this as the result of sum of f-th digits, and an exclusive OR logic means of the f+1-th row for taking the exclusive OR logic between the output code Tf+1,1 of the decision node of the f+1-th digit and the output of the carry generating means of the f-th row and defining this as the result of the sum of the f+1-th digits.

Alternatively, in the arithmetic and logic unit of the present invention, where the decision nodes from the first digit to the n−1-th digit each has an exclusive NOR logic means for taking the exclusive NOR logic of the digit value Xai and the digit value Ybi and outputting the result as the code Ti,1 and a connecting means for outputting the digit value Xai as the code Ti,0 or a connecting means for outputting the digit value Ybi as the code Ti,0; the decision node of the zero-th digit has a NOR logic means for taking the NOR logic of the digit value Xa0 and the digit value Yb0, a NAND logic means for taking the NAND logic of the digit value Xa0 and the digit value Yb0, and a selecting means for taking the negative logic of the results obtained by respectively selecting the output of the NOR logic means when the carry input to the arithmetic and logic unit is "1" and selecting the output of the NAND logic means when the carry input is "0" and outputting the result as the code T0,0 and does not output the code T0,1; among the higher priority determination nodes not including the dummy node, each higher priority determination node not derived from the code T0,1 which originally should be output by the decision node of the zero-th digit has an OR logic means for taking the OR logic of the code Ti,1 and the code Tj,1 and outputting the result as the code Ti,1 and a selecting means for respectively selecting the code Ti,0 when the code Ti,1 is "1" and the code Tj,0 when the code Ti,1 is non and outputting the result as the code Tij,0; among the higher priority determination nodes not including the dummy node, the higher priority determination node derived from the code T0,1 which originally should be output by the decision node of the zero-th digit has a selecting means for respectively selecting the code Ti,0 when the code Ti,1 is "1" and the code Tj,0 when the code Ti,1 is "0" and outputting the result as the code Tij,0 and does not output the code Tij,1; the output code Tij,0 of the higher priority determination node of the n−1-th row of the m-th column is used as the carry output of the arithmetic and logic unit and it is respectively interpreted that "there is a carry output" when the output code Tij,0 is "1" and that "there is no carry output" when the output code Tij,0 is "0"; the arithmetic and logic unit has an exclusive OR logic means of the zero-th digit for taking the exclusive OR logic of the digit value Xa0 and the digit value Yb0 and a sum generating means; and the sum generating means has an exclusive OR logic means of the zero-th row for taking the exclusive OR logic of the output of the exclusive OR logic means of zero-th digit and the carry input to the arithmetic and logic unit and defining this as the result of sum of the zero-th digits, an exclusive OR logic means of the first row for taking the exclusive OR logic between the output code T0,0 of the decision node of the zero-th digit and the negative logic of the output code T1,1 of the decision node of the first digit and defining this as the result of the sum of the first digits, a NAND logic means for taking the NAND logic between the output code Tf,1 of the decision node of the f-th digit (f=even number from 2 to n−1) and the input digit value Xaf or Ybf to the row, an exclusive OR logic means for taking the exclusive OR logic of the output code Tf+1,1 of the decision node of the f+1-th digit and the output of the NAND logic means and outputting the zero-th selected signal of the f+1-th row, an exclusive NOR logic means for taking the exclusive NOR logic between the output code Tf,1 of the decision node of the f-th digit and the zero-th selected signal of the f+1-th row and outputting the first selected signal of the f+1-th row, an exclusive NOR logic means for taking the exclusive NOR logic between the output code Tf,1 of the decision node of the f-th digit and the output code of the higher priority determination node of the f−1-th row and defining this as the result of the sum of the f-th digits, and a sum generation selecting means of the f+1-th row for taking the negative logic of the results obtained by respectively selecting the first selected signal of the f+1-th row when the output code of the higher priority determination node of the f−1-th row is "1" and selecting the zero-th selected signal of the f+1-th row when the output code is "0" and defining the result as the result of the sum of the f+1-th digits.

Alternatively, in the arithmetic and logic unit of the present invention, when the decisions of existence of a borrow for digits (Xai, Ybi; i=0 to n−1) of two numbers in the subtraction (Xa−Yb) of two n-bit binary numbers form a series of decisions having an order dependency, each decision node has an exclusive OR logic means for taking the exclusive OR logic of the digit value Xai and the digit value Ybi and outputting the result as the code Ti,1 and a connecting means for outputting the digit value Ybi as the code Ti,0.

Alternatively, in the arithmetic and logic unit of the present invention, where the decision node performing a decision of the existence of a borrow for the LSBs (least significant bits) of the two numbers has a NOR logic means for taking the NOR logic of ^Xa0 of the negative logic of the digit value Xa0 and the digit value Yb0, a NAND logic means for taking the NAND logic of ^-Xa0 of the negative logic of the digit value Xa0 and the digit value Yb0, and a selecting means for taking the negative logic of the results obtained by respectively selecting the output of the NOR logic means when the borrow input to the arithmetic and logic unit is "1" and selecting the output of the NAND logic means when the borrow input is "0" and outputting the result as the code T0,0; and does not output the code T0,1.

Alternatively, in the arithmetic and logic unit of the present invention, wherein each higher priority determination node not derived from the code T0,1 which originally should be output by the decision node performing the decision of existence of a borrow for the LSBs of the two numbers among the higher priority determination nodes has an OR logic means for taking the OR logic of the code Ti,1 and the code Tj,1 and outputting the result as the code Tij,1 and a selecting means for selecting the code Ti,0 when the code Ti,1 is "1", selecting the code Tj,0 when the code Ti,1 is "0", respectively, and outputting the result as the code Tij,0; the higher priority determination node derived from the code T0,1 which originally should be output by the decision node performing the decision of existence of the borrow for the LSBs of the two numbers among the higher priority determination nodes has a selecting means for selecting the code Ti,0 when the code Ti,1 is "1", selecting the code Tj,0 when the code Ti,1 is "0", respectively, and outputting the result as the code Tij,0 and does not output the code Tij,1; and it is respectively interpreted that "there is a borrow output"when the output code Tij,0 of the higher priority determination node which serves as the root of the binary tree is "1" and that "there is no borrow output" when the output code Tij,0 is "0".

Alternatively, in the arithmetic and logic unit of the present invention, when the sub binary tree of the height m (m is the smallest integer exceeding $\log_2 n$) not including the leaves of the binary tree has Nm (Nm is the smallest integer exceeding n/2) number of higher priority determination nodes which serve as the nodes of a depth m and Ns (Ns is the smallest integer exceeding Ns+½) number of higher priority determination nodes which serve as the nodes of a depth s (s is an integer represented as s=1 to m−1), each higher priority determination node not derived from the code T0,1 which originally should be output by the decision node performing the decision of existence of the borrow for the LSBs of the two numbers among the higher priority determination nodes which serve as the nodes at the depth m−p (p is an even number indicated as p=0 to m−1) of the sub binary tree has a NOR logic means for taking the NOR logic of the code Ti,1 and the code Tj,1 and outputting the result as a code ~Tij,1 and a second selecting means for taking the negative logic of the results obtained by respectively selecting the code Ti,0 when the code Ti,1 is "1" and the code Tj,0 when the code Ti,1 is "0" and outputting the result as the code ~Tij,0; each higher priority determination node not derived from the code T0,1 which originally should be output by the decision node performing the decision of existence of a borrow for the LSBs of the two numbers among the higher priority determination nodes which serve as the nodes at the depth m−q (q is an odd number indicated as q=0 to m−1) of the sub binary tree has a NAND logic means for taking the NAND logic of the code ~Ti,1 and the code ~Tj,1 and outputting the result as a code Tij,1 and a third selecting means for taking the negative logic of the results obtained by respectively selecting the code ~Ti,0 when the code ~Ti,1 is "0" and the code ~Tj,0 when the code ~Ti,1 is "1" and outputting the result as the code Tij,0; the higher priority determination node derived from the code T0,1 which originally should be output by the decision node performing the decision of existence of a borrow for the LSBs of the two numbers among the higher priority determination nodes which serve as the nodes at the depth m−p (p is an even number indicated as p=0 to m−1) of the sub binary tree has a second selecting means for taking the negative logic of the results obtained by respectively selecting the code Ti,0 when the code Ti,1 is "1" and the code Tj,0 when the code Ti,1 is "0" and outputting the result as the code ~Tij,0 and does not output the code Tij,1; the higher priority determination node derived from the code T0,1 which originally should be output by the decision node performing the decision of existence of a borrow for the LSBs of the two numbers among the higher priority determination nodes which serve as the nodes at the depth m−q (q is an odd number indicated as q=0 to m−1) of the sub binary tree has a third selecting means for taking the negative logic of the results obtained by respectively selecting the code ^Ti,0 when the code ^Ti,1 is "0" and the code ^Tj,0 when the code ^Ti,1 is "1" and outputting the result as the code Ti,0 and does not output the code Tij,1; when m is an even number, it is respectively interpreted that "there is a borrow output" when the output code Tij,0 of the higher priority determination node which serves as the root of the binary tree is "1" and that "there is no borrow output" when the output code Tij,0 is "0"; and when m is an odd number, it is respectively interpreted that "there is a borrow output" when the output code ^Tij,0 of the higher priority determination node which serves as the root of the binary tree is "0" and that "there is no borrow output" when the output code ^Tij,0 is "1".

Alternatively, in the arithmetic and logic unit of the present invention, when the decisions of existence of a borrow for the digits (Xai, Ybi; i=0 to n−1) in the subtraction (Xa−Yb) of two n-bit binary numbers form a series of decisions having an order dependency, it has n number of decision nodes which respectively output "true or false" when the result of the difference of two numbers of the same digit places becomes negative, "false or true" when the result becomes positive, and "neither true nor false or do not know" when the result becomes zero as a result of the decision based on the digit values Xai, Ybi of the two numbers and a higher priority determination node matrix consisting of n number of rows and m number of columns (m is the smallest integer exceeding $\log_2 n$) with rows corresponding to the digits of the two numbers; the group of higher priority determination nodes of the first column has a higher priority determination node of the zero-th row as a dummy node for propagating the result of decision of the decision node of the zero-th digit as it is and a higher priority determination node of the h1-th row which receives as its input the results of decisions of the h1−1-th digit and the decision node of h1-th digit (h1=1 to n−1), outputs the result of decision of the decision node of the h1-th digit as the result when the result of decision of the decision node of the h1-th digit is "true" or "false", and outputs the result of decision of the decision node of h1−1-th digit as the result when the result of decision of the decision node of h1-th digit is "neither true nor false or do not know"; the group of higher priority determination nodes of the k-th column (k=2 to m) has higher priority determination nodes from the zero-th row to the $2^{k-1}$-th row as the dummy nodes for respectively propagating the result of decisions of the higher priority determination nodes from the zero-th row to the $2^{k-1}$-th row as they are and a higher priority determination node of the hk-th row which receives as its input the results of decisions of the higher priority determination node of the hk-$2^{k-1}$-th row and the higher priority determination node of the hk-th row (hk=$2^{k-1}$ to n−1), outputs the result of the decision of the higher priority determination node of the hk-th row as the result when the result of the decision of the higher priority determination node of the hk-th row is "true" or "false", and outputs the result of decision of the higher priority determination node of the hk-$2^{k-1}$-th row as the result when the result of the decision of the higher priority determination node of the hk-th row is "neither true nor false or do not know"; and the n number of decision nodes and the groups of the higher significant priority determination nodes of the columns are respectively simultaneously processed.

Alternatively, in the arithmetic and logic unit of the present invention, when the result of decision "true" is defined as the value code "Y", "false" is defined as the value code "N", and "neither true nor false or do not know" is defined as the value code "Q", respectively, each higher priority determination node is given as a K operator for deriving one code Tij∈{Y, N, Q} from two codes, that is, the code Ti∈{Y, N, Q} derived from the result of decision of the decision node of the higher significant bit and the code Tj∈{Y, N, Q} derived from the result of decision of the decision node of the lower significant bit; and where the code Ti is superior to the code Tj, a K operator defines the value code "Y" or the value code "N" as the value code taken by the code Tij when the code Ti is the value code "Y" or the value code "N" and defines the value code taken by the code Tj as the value code taken by the code Tij when the code Ti is the value code "Q".

Alternatively, in the arithmetic and logic unit of the present invention, when the result of decision "true" is defined as the value code "Y", "false" is defined as the value code "N", and "neither true nor false or do not know" is defined as the value code "Q", respectively, each higher priority determination node is given as a K operator for deriving one code Tij∈{Y, N, Q} from two codes, that is, the code Ti∈{Y, N, Q} derived from the result of decision of the decision node of the higher significant bit and the code Tj∈{Y, N, Q} derived from the result of decision of the decision node of the lower significant bit; and where the code Ti is superior to the code Tj, when any code X is assigned by a 2-bit binary number (X, 1, X, 0) defining the value code "Y" as {11}, the value code "N" as {10}, and the value code as {0*} (here, "*" is "don't care"), an OR logic is denoted by a "+" operator, an AND logic is denoted by a "." operator, and a negative logic is denoted by a operator "^" operator, respectively, the K operator is given as:

$$TiKTj = Tij$$
$$(Ti, 1, Ti, 0)K(Tj, 1, Tj, 0) = (Tij, 1, Tij, 0)$$
$$= (Ti, 1 + Tj, 1, Ti, 1 \cdot Ti, 0 + \char"5E Ti, 1 \cdot Tj, 0).$$

Alternatively, in the arithmetic and logic unit of the present invention, where the decision nodes from the first digit to the n−1-th digit each has an exclusive OR logic means for taking the exclusive OR logic of the digit value Xai and the digit value Ybi and outputting the result as the code Ti,1 and a connecting means for outputting the digit value Ybi as the code Ti,0; the decision node of the zero-th digit has a NOR logic means for taking the NOR logic of ^Xa0 of the negative logic of the digit value Xa0 and the digit value Yb0, a NAND logic means for taking the NAND logic of ^Xa0 of the negative logic of the digit value Xa0 and the digit value Yb0, and a selecting means for taking the negative logic of the results obtained by respectively selecting the output of the NOR logic means when the borrow input to the arithmetic and logic unit is "1" and selecting the output of the NAND logic means when the borrow input is "0" and outputting the result as the code T0,0 and does not output the code T0,1, among the higher priority determination nodes not including the dummy node, each higher priority determination node not derived from the code T0,1 which originally should be output by the decision node of the zero-th digit has an OR logic means for taking the OR logic of the code Ti,1 and the code Tj,1 and outputting the result as the code Tij,1 and a selecting means for respectively selecting the code Ti,0 when the code Ti,1 is "1", selecting the code Tj,0 when the code Ti,1 is "0", and outputting the result as the code Tij,0; among the higher priority determination nodes not including the dummy nodes, the higher priority determination node derived from the code T0,1 which originally should be output by the decision node of the zero-th digit has a selecting means for respectively selecting the code Ti,0 when the code Ti,1 is "1", selecting the code Tj,0 when the code Ti,1 is "0", and outputting the result as the code Tij,0 and does not output the code Tij,1; and an output code Tij,0 of the higher priority determination nodes from the zero-th row to the n−1-th row of the m-th column is used as the first digit to the n−1-th digit and the borrow output of the arithmetic and logic unit and it is interpreted that "there is a borrow output" when the output code Tij,0 is "1" and that "there is no borrow output" when the output code Tij,0 is "0", respectively.

Alternatively, in the arithmetic and logic unit of the present invention, there is an exclusive OR logic means of the zero-th digit for taking the exclusive OR logic of the digit value Xa0 and the digit value Yb0 and a sum generating means provided with an exclusive OR logic means of the zero-th row for taking the exclusive OR logic of the output of the exclusive OR logic means of zero-th digit and the borrow input to the arithmetic and logic unit and defining this as the result of difference of the zero-th digits and exclusive OR logic means from the first row to the n−1-th row for taking the exclusive OR logic between each of the output codes Ti,1 of the decision nodes from the first digit to the n−1-th digit and each of the output codes Tij,0 of the higher priority determination nodes from the zero-th row to the n−2-th row of the m-th column and defining this as the result of difference of the first digit to the n−1-th digit.

Alternatively, in the arithmetic and logic unit of the present invention, when the decision nodes from the first digit to the n−1-th digit each has an exclusive OR logic means for taking the exclusive OR logic of the digit value Xai and the digit value Ybi and outputting the result as the code Ti,1 and a connecting means for outputting the digit value Ybi as the code Ti,0; the decision node of the zero-th digit has a NOR logic means for taking the NOR logic of ^Xa0 as the negative logic of the digit value Xa0 and the digit value Yb0, a NAND logic means for taking the NAND logic of ^Xa0 as the negative logic of the digit value Xa0 and the digit value Yb0, and a selecting means for taking the negative logic of the results obtained by respectively selecting the output of the NOR logic means when the borrow input to the arithmetic and logic unit is "1" and selecting the output of the NAND logic means when the borrow input is "0" and outputting the result as the code T0,0 and does not output the code T0,1; the higher priority determination node of the zero-th row of the first column and the higher priority determination nodes from the zero-th row to the $2^{k-1}-1$-th row (k=2 to m) of the k-th column are defined as dummy nodes which invert the result of decision of the decision node of the zero-th digit and the results of decisions of the higher priority determination nodes from the zero-th row to the $2^{k-1}-1$-th row and propagate the same; among the higher priority determination nodes of the m−p-th column (p is an even number indicated by p=0 to m−1) not including the dummy nodes, each higher priority determination node not derived from the code T0,1 which originally should be output by the decision node of the zero-th digit has a NOR logic means for taking the NOR logic of the code Ti,1 and the code Tj,1 and outputting the result as the code ~Tij,1, and a second selecting means for taking the negative logic of the results obtained by respectively selecting the code Ti,0 when the code Ti,1 is "1" and the code Tj,0 when the code Ti,1 is "0" and outputting the result as the code ~Tij,0; among the higher priority determination nodes of the m−q-th column (q is an odd number indicated by g=1 to m−1) not including the dummy nodes, each higher priority determination node not derived from the code T0,1 which originally should be output by the decision node of the zero-th digit has a NAND logic means for taking the NAND logic of the code ~Ti,1 and the code ~Tj,1 and outputting the result as the code Tij,1 and a third selecting means for taking the negative logic of the results obtained by respectively selecting the code ~Ti,0 when the code ~Ti,1 is "0" and the code ~Tj,0 when the code ~Ti,1 is "1" and outputting the result as the code Tij,0; among the higher priority determination nodes of the m−p-th column (p is an even number indicated by p=0 to m−1) not including the dummy nodes, the higher priority determination node derived from the code T0,1 which originally should be output by the decision node of the zero-th digit has a second selecting means for taking the negative logic of the results obtained by respectively selecting the code Ti,0 when the code Ti,1 is "1" and the code Tj,0 when the code Ti,1 is "0" and outputting the result as the code ~Tij,0 and does not output the code Tij,1; among the higher priority determination nodes of the m−q-th column (q is an odd number indicated by q=1 to m−1) not including the dummy node, the higher priority determination node derived from the code T0,1 which originally should be output by the decision node of the zero-th digit has a third selecting means for taking the negative logic of the results obtained by respectively selecting the code ~Ti,0 when the code ~Ti,1 is "0" and the code ~Tj,0 when the code ~Ti,1 is "1" and outputting the result as the code Tij,0 and does not output the code Tij,1; when m is an even number, the output codes Tij,0 of the higher priority determination nodes from the zero-th row to the n−1-th row of the m-th column are used as the first digit to the n−1-th digit and the borrow output of the arithmetic and logic unit and it is respectively interpreted that "there is a borrow output" when the output code Tij,0 is "1" and that "there is no borrow output" when the output code Tij,0 is "0"; and when m is an odd number, the output codes ~Tij,0 of the higher priority determination nodes from the zero-th row to the n−1-th row of the m-th column are used as the first digit to the n−1-th digit and the borrow output of the arithmetic and logic unit and it is respectively interpreted that "there is a borrow output" when the output code ~Tij,0 is "0" and that "there is no borrow output" when the output code ~Tij,0 is "1".

Alternatively, in the arithmetic and logic unit of the present invention, when an exclusive OR logic means of the zero-th digit for taking the exclusive OR logic of the digit value Xa0 and the digit value Yb0 and, when m is an even number, a difference generating means provided with an exclusive OR logic means of the zero-th row for taking the exclusive OR logic of the output of the exclusive OR logic means of zero-th digit and the carry input to the arithmetic and logic unit and defining this as the result of difference of the zero-th digits and exclusive OR logic mean as from the first row to the n−1-th row for taking the exclusive OR logic between each the output codes Ti,1 of the decision nodes from the first digit to the n−1-th digit and each of the output codes Tij,0 of the higher priority determination nodes from the zero-th row to the n−2-th row of the m-th column and defining this as the result of difference of the first digit to the n−1-th digit, and, when m is an odd number, a difference generating means provided with an exclusive OR logic means of the zero-th row for taking the exclusive OR logic of the output of the exclusive OR logic means of zero-th digit and the borrow input to the arithmetic and logic unit and defining this as the result of difference of the zero-th digits and exclusive OR logic means from the first row to the n−1-th row for taking the exclusive OR logic between each of the output codes Ti,1 of the decision nodes from the first digit to the n−1-th digit and each of negative logics of the output codes ^Tij,0 of the higher priority determination nodes from the zero-th row to the n−2-th row of the m-th column and defining this as the result of sum of the first digit to the n−1-th digit.

Alternatively, in the arithmetic and logic unit of the present invention, when decisions of existence of a borrow for the digits (Xai, Ybi; i=0 to n−1) in the subtraction of two n-bit binary numbers (Xa−Yb) forms a series of decisions having an order dependency, it has n number of decision nodes which respectively output "true or false" when the result of difference of two numbers of the same digit places becomes negative, "false or true" when the result becomes positive, and "neither true nor false or do not know" when the result becomes zero as the result of the decision based on the digit values Xai, Ybi of the two numbers and a higher priority determination node matrix comprising n/2 number of rows and m number of columns (m is the smallest integer exceeding $\log_2 n$) with rows corresponding to the odd number digits of the two numbers; the group of higher priority determination node of the first column has a higher priority determination node of the h1-th row which receives as its input the result of decision of the h1−1-th digit and the decision node of h1-th digit (h1=odd number from 1 to n−1), outputs the result of the decision of the decision node h1-th digit as the result when the result of decision of the decision node of the h1-th digit is "true" or "false", and outputs the result of the decision of the decision node of h1−1-th digit as the result when the result of decision of the decision node of h1-th digit is "neither true nor false or do not know"; the group of higher priority determination nodes of the k-th column (k=2 to m) has higher priority determination nodes from the first to $2^{k-1}$-th odd number rows as dummy nodes for respectively propagating the results of decisions of the higher priority determination nodes of the first to $2^{k-1}-1$-th odd number rows as they are and a higher priority determination node of the hk-th row which receives as its input the result of decision of the higher priority determination node of the hk-$2^{k-1}$-th row and the higher priority determination node of the hk-th row (hk=odd number from $2^{k-1}$ to n−1), outputs the result of decision of the higher priority determination node of the hk-th row as the result when the result of decision of the higher priority determination node of the hk-th row is "true" or "false", and outputs the result of decision of the higher priority determination node of the hk-$2^{k-1}$-th row as the result when the result of decision of the higher priority determination node of the hk-th row is "neither true nor false or do not know"; and the n number of decision nodes and the groups of the higher priority determination nodes of the columns are respectively simultaneously processed.

Alternatively, in the arithmetic and logic unit of the present invention, when the result of decision "true" is defined as the value code "Y", "false" is defined as the value code "N", and "neither true nor false or do not know" is defined as the value code "Q", respectively, each higher priority determination node is given as a K operator for deriving one code Tij∈{Y, N, Q} from two codes, that is, the code Ti∈{Y, N, Q} derived from the result of decision of the decision node of the higher significant bit and the code Tj∈{Y, N, Q} derived from the result of decision of the decision node of the lower significant bit; and where the code Ti is superior to the code Tj, a K operator defines the value code "Y" or the value code "N" as the value code taken by the code Tij wherein the code Ti is the value code "Y" or the value code "N" and defines the value code taken by the code Tj as the value code taken by the code Tij when the code Ti is the value code "Q".

Alternatively, in the arithmetic and logic unit of the present invention, when the result of decision "true" is defined as the value code "Y", "false" is defined as the value code "N", and "neither true nor false or do not know" is defined as the value code "Q", respectively, each higher priority determination node is given as a K operator for deriving one code Tije{Y, N, Q} from two codes, that is, the code Tie{Y, N, Q} derived from the result of decision of the decision node of the higher significant bit and the code Tje{Y, N, Q} derived from the result of decision of the decision node of the lower significant bit; and where the code Ti is superior to the code Tj, when any code X is assigned by a 2-bit binary number (X, 1, X, 0) defining the value code "Y" as {11}, the value code "N" as {10}, and the value code as {0*} (here, "*" is "don't care"), an OR logic is denoted by a "+" operator, an AND logic is denoted by a "·" operator, and a negative logic is denoted by a "^" operator, respectively, the K operator is given as:

$$TiKTj = Tij$$
$$(Ti, 1, Ti, 0)K(Tj, 1, Tj, 0) = (Tij, 1, Tij, 0)$$
$$= (Ti, 1 + Tj, 1, Ti, 1 \cdot Ti, 0 + {^\wedge}Ti, 1 \cdot Tj, 0).$$

Alternatively, in the arithmetic and logic unit of the present invention, the decision nodes from the first digit to the n−1-th digit each has an exclusive OR logic means for taking the exclusive OR logic of the digit value Xai and the digit value Ybi and outputting the result as the code Ti,1 and a connecting means for outputting the digit value Ybi as the code Ti,0; the decision node of the zero-th digit has a NOR logic means for taking the NOR logic of ^Xa0 as the negative logic of the digit value Xa0 and the digit value Yb0, a NAND logic means for taking the NAND logic of ^Xa0 of the negative logic of the digit value Xa0 and the digit value Yb0, and a selecting means for taking the negative logic of the results obtained by respectively selecting the output of the NOR logic means when the borrow input to the arithmetic and logic unit is "1" and selecting the output of the NAND logic means when the borrow input is "0" and outputting the result as the code T0,0 and does not output the code T0,1; among the higher priority determination nodes not including the dummy nodes, each higher priority determination node not derived from the code T0,1 which originally should be output by the decision node of the zero-th digit has an OR logic means for taking the OR logic of the code Ti,1 and the code Tj,1 and outputting the result as the code Tij,1 and a selecting means for respectively selecting the code Ti,0 when the code Ti,1 is "1", selecting the code Tj,0 when the code Ti,1 is "0", and outputting the result as the code Tij,0; among the higher priority determination nodes not including the dummy nodes, the higher priority determination node derived from the code T0,1 which originally should be output by the decision node of the zero-th digit has a selecting means for respectively selecting the code Ti,0 when the code Ti,1is "1", selecting the code Tj,0 when the code Ti,1is "0", and outputting the result as the code Tij,0 and does not output the code Tij,1; the output code Tij,0 of the higher priority determination node of the n−1-th row of the m-th column is used as the borrow output of the arithmetic and logic unit and it is interpreted that "there is a borrow output" when the output code Tij,0 is "1" and that "there is no borrow output" when the output code Tij,0 is "0", respectively; the arithmetic and logic unit has an exclusive OR logic means of the zero-th digit for taking the exclusive OR logic of the digit value Xa0 and the digit value Yb0 and a difference generating means; and the difference generating means has an exclusive OR logic means of the zero-th row for taking the exclusive OR logic of the output of the exclusive OR logic means of zero-th digit and the borrow input to the arithmetic and logic unit and defining this as the result of difference of the zero-th digits, an exclusive OR logic means of the first row for taking the exclusive OR logic between the output code T0,0 of the decision node of the zero-th digit and the negative logic of the output code T1,1 of the decision node of the first digit and defining this as the result of the difference of the first digits, a borrow generating means of the f-th row for respectively selecting the input digit value Ybf to the row when the output code Tf,1 of the decision node of the f-th digit (f=even number from 2 to n−1) is "1" and selecting the output code of the higher priority determination node of the f−1-th row when the output code Tf,1 is "0" and outputting the result as the borrow to the f+1-th digit, an exclusive OR logic means of the f-th row for taking the exclusive OR logic between the output code Tf,1 of the decision node of the f-th digit and the output code of the higher priority determination node of the f−1-th row and defining this as the result of difference of the f-th digits, and an exclusive OR logic means of the f+1-th row for taking the exclusive OR logic between the output code Tf+1,1 of the decision node of the f+1-th digit and the output of the borrow generating means of the f-th row and defining this as the result of difference of the f+1-th digits.

Alternatively, in the arithmetic and logic unit of the present invention, each decision nodes from the first digit to the n−1-th digit has an exclusive OR logic means for taking the exclusive OR logic of the digit value Xai and the digit value Ybi and outputting the result as the code Ti,1 and a connecting means for outputting the digit value Ybi as the code Ti,0; the decision node of the zero-th digit has a NOR logic means for taking the NOR logic of ^Xa0 as the negative logic of the digit value Xa0 and the digit value Yb0, a NAND logic means for taking the NAND logic of ^Xa0 as the negative logic of the digit value Xa0 and the digit value Yb0, and a selecting means for taking the negative logic of the results obtained by respectively selecting the output of the NOR logic means when the borrow input to the arithmetic and logic unit is "1" and selecting the output of the NAND logic means when the borrow input is "0" and outputting the result as the code T0,0 and does not output the code T0,1; the higher priority determination nodes from the first to $2^{k-1}-1$-th (k=2 to m) odd number rows of the k-th column are defined as dummy nodes which respectively invert the results of decisions of the higher significant priority determination nodes from the first to $2^{k-1}-1$-th odd number rows and propagate the same; among the higher priority determination nodes of the m−p-th column (p is an even number indicated by p=0 to m−1) not including the dummy nodes, each higher priority determination node not derived from the code T0,1 which originally should be output by the decision node of the zero-th digit has a NOR logic means for taking the NOR logic of the code Ti,1and the code Tj,1 and outputting the result as the code ^Tij,1 and a selecting means for taking the negative logic of the results obtained by respectively selecting the code Ti,0 when the code Ti,1 is "1" and the code Tj,0 when the code Ti,1 is "0" and outputting the result as the code ^Tij,0; among the higher priority determination nodes of the m−q-th column (q is an odd number indicated by q=1 to m−1) not including the dummy nodes, each higher priority determination node not derived from the code T0,1 which originally should be output by the decision node of the zero-th digit has a NAND logic means for taking the NAND logic of the code ^Ti,1 and the code ^Tj,1 and outputting the result as the code Tij,1 and a third selecting means for taking the negative logic of the results obtained by respectively selecting the code ^Ti,0 when the code ^Ti,1 is non and the code ^Tj,0 when the code ^Ti,1 is "1" and outputting the result as the code Tij,0; among the higher priority determination nodes of the m−p-th column (p is an even number indicated by p=0 to m−1) not including the dummy nodes, the higher priority determination node derived from the code T0,1 which originally should be output by the decision node of the zero-th digit has a second selecting means for taking the negative logic of the results obtained by respectively selecting the code Ti,0 when the code Ti,1 is "1" in and the code Tj,0 when the code Ti,1 is "0" and outputting the result as the code ^Tij,0 and does not output the code Tij,1; among the higher priority determination nodes of the m−g-th column (q is an odd number indicated by q=1 to m−1) not including the dummy node, the higher priority determination node derived from the code T0,1 which originally should be output by the decision node of the zero-th digit has a third selecting means for taking the negative logic of the results obtained by respectively selecting the code ^Ti,0 when the code ^Ti1 is "0" and the code ^Tj,0 when the code ^Ti,1 is "1" and outputting the result as the code Tij,0 and does not output the code Tij,1; when m is an even number, the output code Tij,0 of the higher priority determination node of the n−1-th row of the m-th column is used as the borrow output of the arithmetic and logic unit and it is respectively interpreted that "there is a borrow output" when the output code Tij,0 is "1" and that "there is no borrow output" when the output code Tij,0 is "0"; and when m is an odd number, the output code ^Tij,0 of the higher priority determination node of the n−1-th row of the m-th column is used as the borrow output of the arithmetic and logic unit and it is respectively interpreted that "there is a borrow output" when the output code ^Tij,0 is "0" and that "there is no borrow output" when the output code ^Tij,0 is "1"; the arithmetic and logic unit has an exclusive OR logic means of the zero-th digit for taking the exclusive OR logic of the digit value Xa0 and the digit value Yb0 and a difference generating means; the difference generating means has, when m is an even number, an exclusive OR logic means of the zero-th row for taking the exclusive OR logic of the output of the exclusive OR logic means of the zero-th digit and the borrow input to the arithmetic and logic unit and defining this as the result of difference of the zero-th digits, an exclusive OR logic means of the first row for taking the exclusive OR logic between the output code T0,0 of the decision node of the zero-th digit and the output code T1,1 of the decision node of the first digit and defining this as the result of the difference of the first digits, a borrow generating means of the f-th row for respectively selecting the input digit value Ybf to the row when the output code Tf,1 of the decision node of the f-th digit (f=even number from 2 to n−1) is "1" and selecting the output code of the higher priority determination node of the f−1-th row when the output code Tf,1 is "0" and outputting the result as a borrow to the f+1-th digit, an exclusive OR logic means of the f-th row for taking the exclusive OR logic between the output code Tf,1 of the decision node of the f-th digit and the output code of the higher priority determination node of the f−1-th row and defining this as the result of difference of the f-th digits, and an exclusive OR logic means of the f+1-th row for taking the exclusive OR logic between the output code Tf+1,1 of the decision node of the f+1-th digit and the output of the borrow generating means of the f-th row and defining this as the result of difference of the f+1-th digits, and, when m is an odd number, an exclusive OR logic means of the zero-th row for taking the exclusive OR logic of the output of the exclusive OR logic means of zero-th digit and the borrow input to the arithmetic and logic unit, and defining this as the result of difference of the zero-th digits, an exclusive OR logic means of the first row for taking the exclusive OR logic between the output code T0,0 of the decision node of the zero-th digit and the output code T1,1 of the decision node of the first digit and defining this as the result of the difference of the first digits, a borrow generating means of the f-th row for respectively selecting the input digit value Ybf to the row when the output code Tf,1 of the decision node of the f-th digit (f=even number from 2 to n−1) is "1", and selecting the negative logic of the output code of the higher priority determination node of the f−1-th row when the output code Tf,1 is "0" and outputting the result as a borrow to the f+1-th digit, an exclusive OR logic means of the f-th row for taking the exclusive OR logic between the output code Tf,1 of the decision node of the f-th digit and the negative logic of the output code of the higher priority determination node of the f−1-th row and defining this as the result of difference of the f-th digits, and an exclusive OR logic means of the f+1-th row for taking the exclusive OR logic between the output code Tf+1,1 of the decision node of the f+1-th digit, and the output of the borrow generating means of the f-th row, and defining this as the result of difference of the f+1-th digits.

Alternatively, the arithmetic and logic unit of the present invention is an arithmetic and logic unit for finding the absolute value of the difference of two n-bit binary numbers (Xa, Yb), having a decision node which outputs the value code "Y" meaning "true" when the result of difference (Xai−Ybi) of two numbers of the same digit places becomes negative, the value code "N" meaning "false" when the result becomes positive, and the value code "Q" meaning "neither true nor false or do not know" when the result becomes zero as the result of the decision based on the digit values Xai and Ybi (i=0 to n−1) of the two numbers and has a matrix of the higher priority determination nodes consisting of n number of rows and m number of columns (m is the smallest integer exceeding $\log_2 n$) with rows corresponding to the digits of the two numbers and a borrow generating unit for generating a borrow of the digits in the absolute value operation of the difference; the group of higher priority determination nodes of the first column has a higher priority determination node of the zero-th row as a dummy node for propagating the result of decision of the decision node of the zero-th digit as it is and a higher priority determination node of the h1-th row which receives as its input the result of decision of the h1−1-th digit and the decision node of h1-th digit (h1=1 to n−1), outputs the result of decision of the decision node of the h1-th digit as the result when the result of decision of the decision node of the h1-th digit is "true" or "false", and outputs the result of decision of the decision node of h1−1-th digit as the result when the result of decision of the decision node of h1-th digit is "neither true nor false or do not know"; the group of higher priority determination nodes of the k-th column (k=2 to m) has higher priority determination nodes from the zero-th row to the $2^{k-1}$-th row as the dummy nodes for respectively propagating the results of decisions of the higher priority determination nodes from the zero-th row to the $2^{k-1}$-th row as they are and a higher priority determination node of the hk-th row which receives as its input the result of decision of the higher priority determination node of the hk−$2^{k-1}$-th row and the higher priority determination node of the hk-th row (hk=$2^{k-1}$ to n−1), outputs the result of decision of the higher priority determination node of the hk-th row as the result when the result of decision of the higher priority determination node of the hk-th row is "true" or "false", and outputs the result of decision of the higher priority determination node of the hk−$2^{k-1}$-th row as the result when the result of decision of the higher priority determination node of the hk-th row is "neither true nor false or do not know"; the borrow generation unit has a code judging means for judging the code for the result of difference (Xa−Yb) of the two numbers based on the result of the borrow generation of the n−1-th digit generated from the higher priority determination node of the n−1-th row and the m-th column, code replacing means from the zero-th row to the n−2-th row for replacing the value code "Q" with the value code "Q", the value code "Y" with the value code "N", and the value code "N" with the value code "Y", respectively for the output codes of the higher priority determination nodes from the zero-th row to the n−2-th row not including the higher priority determination node of the n−1-th row in the higher priority determination node group of the m-th column where the code is negative or negative or zero as the result of code judgement of the code judging means, respectively, and not performing the replacement and leaving them as they are where the result is positive or zero or positive, and a second code replacing means of the zero-th row to the n−2-th row for replacing the value code "Q" with the value code "N" to obtain a borrow of each digit for the output of the code replacing means of the zero-th row to the n−2-th row; and the n number of decision nodes, the groups of higher priority determination nodes of the columns, and the code replacing means of the zero-th row to the n−2-th row and the second code replacing means are respectively simultaneously processed.

Alternatively, in the arithmetic and logic unit of the present invention, each higher priority determination node is given as a K operator for deriving one code Tij∈{Y, N, Q} from two codes, that is, the code Ti∈{Y, N, Q} derived from the result of decision of the decision node of the higher significant bit and the code Tj∈{Y, N, Q} derived from the result of decision of the decision node of the lower significant bit; and a K operator defines the value code "Y" or the value code "N" as the value code taken by the code Tij where the code Ti is the value code "Y" or the value code "N" and defines the value code taken by the code Tj as the value code taken by the code Tij where the code Ti is the value code "Q".

Alternatively, in the arithmetic and logic unit of the present invention, each higher priority determination node is given as a K operator for deriving one code Tij∈{Y, N, Q} from two codes, that is, the code Ti∈{Y, N, Q} derived from the result of decision of the decision node of the higher significant bit and the code Tj∈{Y, N, Q} derived from the result of decision of the decision node of the lower significant bit; and where the code Ti is superior to the code Tj, when any code X is assigned by a 2-bit binary number (X, 1, X, 0) defining the value code "Y" as {11}, the value code "N" as {10}, and the value code as {0*} (here, "*" is "don't care"), an OR logic is denoted by a "+" operator, an AND logic is denoted by a "·" operator, and a negative logic is denoted by "^" operator, respectively, a K operator is given as:

$TiKTj = Tij$ $(Ti, 1, Ti, 0)K(Tj, 1, Tj, 0) = (Tij, 1, Tij, 0)$ $= (Ti, 1 + Tj, 1, Ti, 1 \cdot Ti, 0 + \char'136 Ti, 1 \cdot Tj, 0).$ Alternatively, in the arithmetic and logic unit of the present invention, each decision node has an exclusive OR logic means for taking the exclusive OR logic of the digit value Xai and the digit value Ybi and outputting the result as the code Ti,1 and a connecting means for outputting the digit value Ybi as the code Ti,0; each higher priority determination node not including the dummy nodes has an OR logic means for taking the OR logic of the code Ti,1 and the code Tj,1 and outputting the result as the code Tij,1 and a selecting means for respectively selecting the code Ti,0 when the code Ti,1 is "1" and code Tj,0 when the code Ti,1 is "0" and outputting the result as the code Tij,0; a code judging means outputs a code judgement signal which becomes "true" when the output code Tij from the higher priority determination node of the n−1-th row and the m-th column is the value code "Y", "false" when it is the value code "Q" or "N", or "true" when the output code Tij is the value code "Y" or "Q", and "false" when it is the value code "N"; the code replacing means of the zero-th row to the n−2-th row have exclusive logical means for respectively taking the exclusive OR logic between the code judgement signal from the code judging means and the output code Tij,0 of the higher priority determination nodes from the zero-th row to the n−2-th row; the second code replacing means of the zero-th row to the n−2-th row have AND logic means for respectively taking the AND logic between the outputs of the code replacing means from the zero-th row to the n−2-th row and the output codes Tij,1 of the higher priority determination nodes from the zero-th row to the n−2-th row; and the arithmetic and logic unit has a difference generating means provided with a connecting means for defining the output code Ti,1 of the decision node of the zero-th digit as the result of the absolute value of the difference and the exclusive OR logic means for taking the exclusive OR logic between each of the output codes Ti,1 of the decision nodes from the first digit to the n−1-th digit and each of outputs of the second node replacing means from the zero-th row to the n−2-th row and defining the same as the result of the absolute value of differences from the first digit to the n−1-th digit.

Alternatively, in the arithmetic and logic unit of the present invention, when the arithmetic and logic unit finds the operation for obtaining the absolute value of a difference of the two code-bearing n-bit binary numbers (Xa, Yb), the decision node performing the comparison decision for the MSB (most significant bit) of the two numbers treats the digit value Xan−1 as the digit value Ybn−1 and treats the digit value Ybn−1 as the digit value Xan−1, respectively.

In the arithmetic and logic unit and method of operation of the present invention, when solving a problem including a series of decisions having an order dependency, a model is created by a binary tree defining decision nodes not having dependency input/outputs as leaves and higher priority decision nodes as nodes other than leaves, these are processed in parallel, and the working conclusion of the higher priority decision node serving as the root of the binary tree is defined as the conclusion of the problem.

Further, in the arithmetic and logic unit and method of operation of the present invention, when converting a serial structure of decisions having an order dependency configured by having a relationship of relative order between the decision nodes having dependency input/outputs, having the dependency input of the decision node having a dependency input/output of the most significant bit always being "valid", and having the dependency output of a decision node having a dependency input/output located at a higher significant bit connected as the dependency input of a decision node having a dependency input/output located at one lower significant bit from that decision node having a dependency input/output to a binary tree structure defining decision nodes not having dependency input/outputs as leaves and defining higher priority determination nodes as nodes other than leaves, the decision having dependency input/outputs are replaced by decision nodes not having dependency input/outputs provided with connotation decision nodes and indeterminate code generation nodes.

The serial structure of decisions having an order dependency is frequently seen in logical human thought. In such a serial structure, it is necessary to perform a plurality of decisions in a predetermined order. Parallel processing is not possible. When replacing such a structure as it is with a processing sequence to realize a processing program etc., the processing time becomes extremely long, in the worst case the sum of "n" when the number of times of processings for decisions worth of processing times for the processings for decisions is "n". Further, even when replacing this serial structure as it is with logic circuits to realize an arithmetic and logic circuit, the number of steps of the critical paths of the arithmetic and logic unit becomes extremely large. According to the present invention, by converting a serial structure of decisions having an order dependency to a binary tree structure, the processing time becomes the sum of the smallest integer exceeding log₂n worth of times at the most and high speed processing becomes possible. Further, realization of a high speed arithmetic and logic unit able to perform parallel processing efficiently becomes possible.

Further, in the arithmetic and logic unit and method of operation of the present invention, when solving a problem including a series of decisions having an order dependency, a model is created by a binary tree having as a leaf a decision node or processing for a decision outputting any of "true", "false", and "neither true nor false or do not know" as the result of the decision based on one or a plurality of input information and all of the decision nodes or the processings for decisions serving as the leaves being processed in parallel.

Further, the arithmetic and logic unit and method of operation of the present invention may be applied to the case where the comparison decisions for each digit of two numbers when comparing any two R-nary n-digit numbers form a series of decisions having an order dependency. If configuring the unit and method so that the ternary code generated by the ternary code generation question of the comparison is input to the ternary code binary tree, that is, by configuring them so that the decision nodes serving as leaves of the binary tree each output "true or false" when the result of difference of the two numbers of the same digit places becomes positive, "false or true" when the result becomes negative, and "neither true nor false or do not know" when the result becomes zero, it is possible to obtain a correct result of comparison. That is, the ternary code generation question of the comparison is not limited to binary numbers and can be applied to any R-nary numbers. By applying a ternary code generation question of the comparison, it is possible to derive a comparison program or comparator for any R-nary numbers. Further, what used to be processed in the time of the order O(n) in the past can be processed in the time of the logarithmic order O(log₂n).

Further, the arithmetic and logic unit and method of operation of the present invention can be applied to the case where decisions on existence of carries for each digit when adding any two R-nary n-digit numbers form a series of decisions having an order dependency. If configuring the unit and method so that the ternary code generated by the ternary code generation question of the sum is input to the ternary code binary tree, that is, by configuring them so that the decision nodes serving as leaves of the binary tree each output "true or false" when the result of the sum of the two numbers of the same digit places becomes R or more, "false or true" when the result becomes (R−2), and "neither true nor false or do not know" when the result becomes (R−1), it is possible to look ahead at a carry in addition. That is, the ternary code generation question of the sum is not limited to binary numbers and can be applied to any R-nary numbers. By applying a ternary code generation question of the sum, it is possible to derive an addition program or adder for any R-nary numbers. Further, what used to be processed in the time of the order O(n) in the past can be processed in the time of the logarithmic order $O(\log_2 n)$.

Further, in the arithmetic and logic unit and method of operation of the present invention, in the case where decisions on existence of borrows for each digit when subtracting any two R-nary n-digit numbers form a series of decisions having an order dependency, when solving a problem including such a series of decisions, a model is created of the problem using a binary tree which is provided with decision nodes, corresponding to the decisions, which, when solving a problem including such a series of decisions, each output "true or false" when the result of the difference of the two numbers of the same digit places becomes negative, "false or true" when the result becomes positive, and "neither true nor false or do not know" when the result becomes zero based on one or more pieces of input information, uses the decision nodes as leaves, and performs processing in parallel. That is, the ternary code generation question of the difference is not limited to binary numbers and can be applied to any R-nary numbers. By applying a ternary code generation question of the difference, it is possible to derive a subtraction program or subtractor for any R-nary numbers. The reason is that, for example, in the case of a subtractor, if it were possible to use a circuit system capable of R-nary expression such as a multiple value logical circuit or analog circuit to realize a ternary code generation circuit in line with this ternary code generation question, it would then be possible to generate a borrow to each digit by a BLB array of a ternary code binary tree corresponding to the BLC array in the adder (in this specification, copying the binary look-ahead carry (BLC) in the adder, called a binary look-ahead borrow system or BLB array). For the difference generation, if a circuit (one R-nary digit's worth of subtractor) for realizing (Xi−Yi−Bi) is separately prepared and combined with this, an R-nary subtractor is obtained. Further, what used to be processed in the time of the order O(n) in the past can be processed in the time of the logarithmic order $O(\log_2 n)$.

Further, in the arithmetic and logic unit and method of operation of the present invention, when solving a problem including a series of decisions having an order dependency, a model is created using a ternary code binary tree defining decision nodes or processings for decisions, corresponding to the decisions, which each output either of "true", "false", or "neither true nor false or do not know" as a result of decision based on one or more pieces of input information, and defining higher priority determination nodes or higher priority determination processings each output the result of decision of the higher significant bit when the result of decision of the higher significant bit is a clear one of "true" or "false" and output the result of decision of the lower significant bit when the result of decision of the higher significant bit is a vague one of "neither true nor false or do not know" as nodes other than the leaves and all decision nodes or all processings for decisions serving as leaves and all higher priority determination nodes or all higher priority determination processings at the same depth in the ternary code binary tree are processed in parallel.

For example, when there are n number of decision nodes in the series of decisions having an order dependency, a ternary code binary tree is configured provided with n number of decision nodes and a sub binary tree of a height m (m is the smallest integer exceeding $\log_2 n$) not including the leaves of the binary tree is configured provided with Nm (Nm is the smallest integer exceeding n/2) number of higher priority determination nodes serving as the nodes of a depth m and Ns (Ns is the smallest integer exceeding Ns+½) number of higher priority determination nodes serving as the nodes of a depth s (s is an integer represented as s=1 to m−1). By introducing the concept of this ternary code binary tree, it is possible to convert a serial structure of n number of decisions having an order dependency to a complete binary tree structure of a depth m, possible to make the order of time for comparison, addition, and other processing $O(\log_2 n)$, and possible to perform processing at a faster speed.

Further, in the arithmetic and logic unit and method of operation of the present invention, when assigning the codes defining "true" as "Y", "false" as "N", and "neither true nor false or do not know" as "Q", respectively, the function of the higher priority determination node or the processing for determination of a higher priority is defined as a K operator for deriving one code $Tij \in \{Y, N, Q\}$ from two codes, that is, a code $Ti \in \{Y, N, Q\}$ derived from the result of decision of a higher significant bit and a code $Tj \in \{Y, N, Q\}$ derived from the result of decision of a lower significant bit; and when the code Ti is in a relationship superior to the code Tj, the K operator is defined so that "Y" or "N" is taken by the code Tij as it is when the code Ti is "Y" or "N" and that the value taken by the code Tij is taken by the code Tij when the code Ti is "Q". In this way, by introducing the K operator, it becomes possible to algebraically treat the function of the component elements of the ternary code binary tree, that is, the higher priority determination nodes or processings for determination of the higher priority. Further, by this, it is clarified that the K operator satisfies the associative law and directly proved that the conclusion derived by the ternary code binary tree is correct.

Further, in the arithmetic and logic unit and method of operation of the present invention, when assigning as a binary expression of the ternary code a 2-bit binary number (X, 1, X, 0) defining "Y" as {11}, "N" as {10}, and "Q" as {0*} (where, "*" is "don't care"), the binary logic function for realizing the K operator is defined as:

$$TiKTj = Tij$$

$$(Ti, 1, Ti, 0)K(Tj, 1, Tj, 0) = (Tij, 1, Tij, 0)$$

$$= (Ti, 1 + Tj, 1, Ti, 1 \cdot Ti, 0 + \wedge Ti, 1 \cdot Tj, 0).$$

By assigning suitable binary expressions to the ternary code in this way, it becomes possible to derive the K operator as a Boolean algebraic function, that is, the "K logic function". Further, by forming the K logic circuit for realizing the K logic function as a complete binary tree, it is possible to realize the concept of a ternary code binary tree by binary logic circuits. By giving sufficient consideration to the content of the processing desired to be realized by the ternary code binary tree and using suitable ternary code generation circuits as the leaves of the ternary code binary tree, it is possible to easily derive various arithmetic and logic units.

Further, in a storage medium which can be read by a computer according to the present invention, the above method of operation of an arithmetic and logic unit is stored as a program to be executed by the computer. The program introduces the concept of an indeterminate code binary tree to realize a complete binary tree structure of a depth m from a serial structure of n number of decisions having an order dependency. This gives a processing program which enables the order of time for processing of various operations $O(\log_2 n)$ and perform processing at a faster speed.

Alternatively, in a storage medium which can be read by a computer according to the present invention, the above method of operation of an arithmetic and logic unit is stored as a program to be executed by the computer. The program introduces the concept of an indeterminate code binary tree to realize a complete binary tree structure of a depth m from a serial structure of n number of decisions having an order dependency. This gives a processing program which enables the order of time for processing of various operations such as comparison, addition, and subtraction $O(\log_2 n)$ and perform processing at a faster speed.

Alternatively, in a storage medium which can be read by a computer according to the present invention, the above method of operation of an arithmetic and logic unit is stored as a program to be executed by the computer. The program is equivalent to the above N-digit subtraction program to which a code replacement program is added. By just adding a constant time of the code replacement program to the order of time for processing subtraction $O(\log_2 n)$, a processing program is obtained able to perform processing at a faster speed.

Further, in the arithmetic and logic unit and method of operation of the present invention, when realizing a priority encoder function for outputting, with respect to data input of an n-bit binary number, the first "1" or "0" bit position in the in the direction from the most significant bit to the least significant bit or the number of continuous "1's" or "0's" in the direction from the most significant bit to the least significant bit as binary numbers, the priority encoder function is realized by creating a model by a binary tree defining decision nodes not having dependency input/outputs as leaves and defining higher priority determination nodes as nodes other than leaves, performing processing in parallel, and defining the working conclusion of the higher priority determination node serving as the root of the binary tree as the conclusion of the priority encoder.

The conventional priority encoders had the defect of a lower speed due to the serial structure of decisions having an order dependency, but the priority encoder according to the present invention is higher in speed since it uses parallel processing through an indeterminate code binary tree structure. Further, the indeterminate code binary tree having the priority encoder function is an abstract structure, so can be applied to objects other than logic circuits (machines (configuration of array processor) or computer programs) as well.

Further, in the arithmetic and logic unit of the present invention, since a model is created by a binary tree of a height m (m is the smallest integer exceeding $\log_2 n$), the nodes of the depth m of the binary tree are each realized by an OR logic means and connection line or negative logic means, and the other nodes of the depth s are each realized by an OR logic means, connection line, or negative logic means, and (m−s+1) number of selecting means, it is possible to configure an arithmetic and logic unit by an extremely simple configuration. Further, since the signal propagation delay is proportional to the logarithm of the number of input bits, high speed operation is possible even with multiple input bits.

Further, in the arithmetic and logic unit of the present invention, each higher priority determination node takes the OR logic of the code Ti,1 and the code Tj,1 by the OR logic means and outputs the result as the code Tij,1 and selects the code Ti,0 when the code Ti,1 is "1" and the code Tj,0 when the code Ti,0 is "0" by the selecting means and outputs the result as the code Tij,0. By realizing the K logic function by a logic circuit using the OR logic means and selecting means in this way, it is possible to realize a ternary code binary tree by logic circuits.

Further, in the K logic circuit in the assignment of {00, 01, 11, 10}={Q, Q, Y, N}, use is made not of a composite logical gate circuit, but of a selecting means (selector). Therefore, the binary tree logic circuit according to the present invention does not have the disadvantageous aspects of a composite logical gate circuit as explained in the "Prior Art". Further, as stated in the reference (Makino, Suzuki, Morinaka, et al, "286 MHz and 64 Bit Floating Decimal Multiplier Having Function Suitable to CG" in Japan Association for Information and Communication Technical Research Report ICD 95-146, pp. 13–20, 1995) as well, a selector can be easily constructed by transmission gates. Such a configuration of a selector is simpler and faster than a conventional logic circuit comprised of a binary tree constructed by transmission gates. Further, a selector enables easy control of the load drive capacity, so is advantageous in standard cell designs as well.

Further, in the arithmetic and logic unit of the present invention, for a higher priority determination node comprising the partial binary tree of the height m not including the leaves of the ternary code binary tree, proposal is made of a logic circuit structure performing so-called sign optimization where a structure in which logical circuits of positive logic inputs and positive logic outputs are cascade-connected in multiple stages is converted to a structure in which stages of the positive logic input and negative logic output (PN stages) and stages of the negative logic input and positive logic output (NP stages) are alternately cascade-connected. By using this sign optimized structure, redundant transistors can be eliminated and the arithmetic and logic unit can be improved in terms of the circuit area and operation speed.

Further, in the arithmetic and logic unit and method of operation of the present invention, when assigning as a binary expression of the ternary code a 2-bit binary number (X, 1, X, 0) defining "Y" as {00}, "N" as {11}, and "Q" as {10} and defining {01} as "usage forbidden" "F", the binary logic function for realizing the K operator is defined as:

$$TiKTj = Tij$$
$$(Ti, 1, Ti, 0)K(Tj, 1, Tj, 0) = (Tij, 1, Tij, 0)$$
$$= (Ti, 1 + Tj, 1, Ti, 1 \cdot Ti, 0 + {}^\wedge Ti, 1 \cdot Tj, 0).$$

By assigning suitable binary expressions to the ternary code in this way, it becomes possible to derive the K operator as another Boolean algebraic K logic function.

Further, in the arithmetic and logic unit and method of operation of the present invention, when assigning as a binary expression of the ternary code a 2-bit binary number (X, 1, X, 0) defining "Y" as {01}, "N" as {10}, and "Q" as {11} and defining {00} as "usage forbidden" "F", the binary logic function for realizing the K operator is defined as:

$$TiKTj = Tij$$

$$(Ti, 1, Ti, 0)K(Tj, 1, Tj, 0) = (Tij, 1, Tij, 0)$$

$$= (Ti, 1 + Tj, 1, Ti, 1 \cdot Ti, 0 + {}^{\wedge}Ti, 1 \cdot Tj, 0).$$

By assigning suitable binary expressions to the ternary code in this way, it becomes possible to derive the K operator as another Boolean algebraic K logic function.

Further, in the arithmetic and logic unit and method of operation of the present invention, when assigning as a binary expression of the ternary code a 2-bit binary number (X, 1, X, 0) defining "Y" as {00}, "N" as {10}, and "Q" as {11} and defining {01} as "usage forbidden" "F", the binary logic function for realizing the K operator is defined as:

$$TiKTj = Tij$$

$$(Ti, 1, Ti, 0)K(Tj, 1, Tj, 0) = (Tij, 1, Tij, 0)$$

$$= (Ti, 1 \cdot ({}^{\wedge}Ti, 0 + Tij, 1), Ti, 0 \cdot Tj, 0).$$

By assigning suitable binary expressions to the ternary code in this way, it becomes possible to derive the K operator as another Boolean algebraic K logic function.

Here, in a K logic circuit in the assignment {00, 01, 1, 10}={Y, F, Q, N}, a higher priority determination node uses a first composite logic gate means to take the OR logic of the AND logic of the code Ti,1 and code Tj,1 and the code Ti,0 and outputs the result as the code Tij,1 and uses a second composite logic gate means to take the OR logic of the AND logic of the code Ti,1 and code Tj,0 and the code Ti,0 and outputs the result as the code Tij,0.

Further, in also an assignment {00, 01, 11, 10}={F, Y, N, Q} or an assignment {00, 01, 11, 10}={Y, F, Q, N}, similarly the K logic function can be realized by a logic circuit comprised of one or more composite logic gate means. Therefore, if sufficiently considering the processing desiring to be realized by the designer and defining suitable ternary code generation questions, one may then merely select the most convenient ternary code binary tree system. That is, it is possible to select a system in accordance with the content of processing to realize a suitable ternary code tree operation circuit.

Further, in the arithmetic and logic unit of the present invention, when comparison decisions on the digits of two numbers (Xai, Ybi; i=0 to n−1) in a comparison of n-bit binary numbers (Xa, Yb) form a series of decisions having an order dependency, the decision nodes each take the exclusive OR of the digit value Xai and digit value Ybi by the exclusive OR logic means and outputs the result as the code Ti,1 and outputs the digit value Xai as the code Ti,0 by the connecting means. In this way, by configuring the system so as to generate a ternary code in a comparison by decision nodes serving as leaves of the binary tree, it is possible to realize a binary comparator.

Further, in the arithmetic and logic unit of the present invention, as a K logic circuit in an assignment of {00, 01, 11, 10}={Q, Q, Y, N}, a higher priority determination node is realized by an OR means for outputting a code Tij,1 and a selecting means for outputting a code Tij,0 and interprets that "the two numbers (Xa, Yb) are equal" when the output of the higher priority determination node serving as the root of the binary tree is Q=(0*), that "the two numbers (Xa, Yb) have a relationship of magnitude Xa>Yb" when the output is Y={11}, and that "the two numbers (Xa, Yb) have a relationship of magnitude Xa<Yb" when the output is N={10}. In this way, the arithmetic and logic unit for comparing two code-less numbers according to the present invention is advantageous in simplicity and high speed compared with the conventional binary tree comparator. That is, as explained above, the comparator of the present invention does not have a composite logic gate circuit (or logical function of a composite logic gate circuit) and does not have the disadvantageous aspects of a composite logic gate circuit. Further, the logic circuit of the input stage generating the ternary code is also simple and can be realized by a smaller number of gates (number of transistors).

Further, in the arithmetic and logic unit of the present invention, in the comparison of two code-bearing n-bit binary numbers (Xa, Yb), the decision node performing the decision on comparison for the MSBs of the two numbers treats the digit value Xan−1 as the digit value Ybn−1 and the digit value Ybn−1 as the digit value Xan−1 and therefore reverses the treatment of Xai, Ybi in the decision nodes of the other digits. In this way, in the present invention, by exchanging the X and Y inputs of the MSBs, it is possible to convert a code-less binary comparator to a code-bearing binary comparator and realize a code-bearing binary comparator not requiring a code judgement circuit. Therefore, the code-bearing binary comparator of the present invention has a smaller delay by the amount of the lack of the code judgement circuit compared with a conventional code-bearing binary comparator. Further, the method of conversion is derived by the concept of a ternary code binary tree, but can be applied to a general code-less binary comparator as well.

Further, in the arithmetic and logic unit of the present invention, when decisions of existence of carries for the digits of two numbers (Xai, Ybi; i=0 to n−1) in the addition of two n-bit binary numbers (Xa, Yb) form a series of decisions having an order dependency, the decision nodes each takes the exclusive NOR logic of the digit value Xai and the digit value Ybi by an exclusive NOR logic means and outputs the result as the code Ti,1 and outputs the digit value Xai or the digit value Ybi as the code Ti,0 by the connecting means. By configuring the system so as to generate a ternary code in addition by the decision nodes serving as the leaves of the binary tree in this way, it is possible to realize a carry look-head circuit of a binary adder.

Further, in the arithmetic and logic unit for performing n-bit binary addition of the present invention, the "definitive property of the bit 0" of the result of decision never becoming "Q" and always becoming either of "Y" or "N" in the decision on the existence of a carry for the LSBs (bit 0) is reflected into the configuration of the circuit. That is, the decision node performing the decision on existence of a carry for the LSBs uses the selecting means to take the negative logic of the results obtained by respectively selecting the NOR logic of the digit values Xa0 and the digit value Yb0 when the carry input to the arithmetic and logic unit is "1" and selecting the NAND logic of the digit value Xa0 and the digit value Yb0 when the carry input is "0" and outputs the result as the code T0,0 and does not output the code T0,1.

Further, even in a binary tree of higher priority determination nodes realizing a K logic function, each higher priority determination node not derived from the code T0,1 which originally should be output by the decision node performing the decision of existence of a carry for the LSBs among the higher priority determination nodes is configured by an OR logic means and selecting means, but the higher priority determination node originally derived from the code T0,1 does is configured simply by just a selecting means and does not output the code Tij,1. That is, the selecting means selects the code Ti,0 when the code Ti,1 is "1" and the code Tj,0 when the code Ti,1 is "0" and outputs the result as the code Tij,0. As the final conclusion, the higher priority determination node serving as the root of the binary tree interprets that "there is a carry output" when the output code Tij,0 is "1" and that "there is no carry output" when the output code Tij,0 is "0".

By adopting a configuration using the definitive property for the LSBs (bit 0) and reflecting the carry input to the arithmetic and logic unit in the decision node performing the decision of existence of a carry of the LSBs in this way, it is possible to simplify the binary tree structure of the higher priority determination nodes following it and possible to configure a BLC array not having the first row as in the conventional BLC adder, that is, with one fewer row than the conventional BLC adder. This makes it superior in the points of the number of gates and area. Further, by providing a higher priority determination node of a configuration simplified by using only a selecting means in a binary tree of higher priority determination nodes for realizing a K logic function, it is possible to eliminate the logically redundant circuits and form a binary tree with fewer number of transistors. Further, in the arithmetic and logic unit for performing n-bit binary addition according to the present invention, as explained above, there is no composite logic gate circuit (or logic function of a composite logic circuit) and there is none of the disadvantageous aspects of a composite logic gate circuit, so the unit is advantageous in simplicity and higher speed compared with a conventional adder. Further, the logic circuit of the input stage generating the ternary code is also simpler and can be realized with fewer number of gates (number of transistors).

Further, to generate a sum, the result of the operation for obtaining the exclusive OR (Xai(+)Ybi) for the digits of two numbers (Xai, Ybi; i=0 to n−1) and a carry signal are necessary. In the arithmetic and logic unit for performing the addition of n-bit binary numbers of the present invention, when using a binary tree of K logic circuits in an assignment of {00, 01, 11, 10}={Q, Q, Y, N}, the decision nodes for performing decisions of existence of carries for the digits Xaj, Ybj (j=1 to n−2) include an exclusive NOR logic means which takes the exclusive NOR logic of the digit value Xaj and the digit value Ybj and outputs the result as the code Tj,1, so it is possible to obtain an exclusive NOR logic of the digits (Xaj, Ybj) by just inverting the output code Tj,1 and therefore possible to generate a sum with a simpler configuration. Further, the logical structure of the decision nodes generating the ternary code is simple in itself enabling realization with a smaller number of gates (number of transistors). That is, if use is made of a binary tree of K logic circuits in an assignment of {00, 01, 11, 10}={Q, Q, Y, N}, it is possible to reduce overall the number of transistors of the input stage and sum generation stage of the adder.

Further, in the arithmetic and logic unit of the BLC addition system of the present invention, the "definitive property of the bit 0" of the result of decision never becoming "Q" and always becoming either of "Y" or "N" in the decision on the existence of a carry for the LSBs (bit 0) is reflected into the configuration of the circuit. That is, the decision node performing the decision on existence of a carry for the LSBs uses the selecting means to take the negative logic of the results obtained by respectively selecting the NOR logic of the digit values Xa0 and the digit value Yb0 when the carry input to the arithmetic and logic unit is "1" and selecting the NAND logic of the digit value Xa0 and the digit value Yb0 when the carry input is "0" and outputs the result as the code T0,0 and does not output the code T0,1.

Further, even in higher priority determination nodes realizing a K logic function, each higher priority determination node not derived from the code T0,1 which originally should be output by the decision node performing the decision of existence of a carry for the LSBs is configured by an OR logic means and selecting means, but the higher priority determination node originally derived from the code T0,1 is configured simply by just a selecting means and does not output the code Tij,1. That is, the selecting means selects the code Ti,0 when the code Ti,1 is "1" and the code Tj,0 when the code Ti,1 is "0" and outputs the result as the code Tij,0.

By adopting a configuration using the definitive property for the LSBs (bit 0) and reflecting the carry input to the arithmetic and logic unit in the decision node performing the decision of existence of a carry of the LSBs in this way, it is possible to simplify the higher priority determination node matrix following it and possible to configure a BLC array not having the first row as in the conventional BLC adder, that is, with one fewer row than the conventional BLC adder. This makes it superior in the points of the number of gates and area. Further, by partially providing a higher priority determination node of a configuration simplified by using only a selecting means in a higher priority determination node matrix for realizing a K logic function as well, it is possible to eliminate the logically redundant circuits and form a binary tree with fewer number of transistors. Further, in the arithmetic and logic unit of the BLC addition system according to the present invention, as explained above, there is no composite logic gate circuit (or logic function of a composite logic circuit) and there is none of the disadvantageous aspects of a composite logic gate circuit, so the unit is advantageous in simplicity and higher speed compared with a conventional BLC adder. Further, the logic circuit of the input stage generating the ternary code is also simpler and can be realized with fewer number of gates (number of transistors).

Further, in the arithmetic and logic unit of the BLC addition system of the present invention, by using a reduced BLC array which eliminates the even number rows of the BLC array and reduces the number of gates, it is possible to reduce to a half the number of gates of the BLC array and the many long wiring existing in the BLC array. On the other hand, the number of operation steps is increased by one, but this does not necessarily mean an increase in the delay. The reason is that since the number of gates and wiring of the BLC array are halved, the structure of the BLC array becomes simpler and gives rise to the effect of reducing the delay. The result is the delays of the adders of the BLC array not eliminating the even number rows and the BLC array eliminating the BLC array become equal. Further, an adder of a reduced BLC array is superior in terms of the number of transistors and the simplicity of the wiring.

This was not clearly pointed out in the prior art. The method of generation of a carry in an arithmetic and logic unit of the BLC addition system of the present invention can be said to be a carry generation treating 2 bits as a single unit. In the prior art as well, methods were proposed for treating a plurality of bits as a single unit, but the logic circuits of the stage of generation of the sum in these cases were complicated and the number of operation steps increased. As a result, there was a compromise of an increase in delay in return for the simplicity of the BLC array.

Further, a point which deserves note in the method of generation of a carry in the arithmetic and logic unit of the BLC addition system in the present invention is that it does not treat an unlimited large number of bits as a single unit, but defines a unit as limited to 2 bits. By doing this, it becomes possible to halve the number of transistors and wiring of the BLC array while maintaining the high speed.

Further, in the arithmetic and logic unit of the present invention, when decisions of existence of a borrow for the digits (Xai, Ybi; i=0 to n−1) in the subtraction of two n-bit binary numbers (Xa−Yb) form a series of decisions having an order dependency, the decision nodes each take the exclusive OR of the digit value Xai and the digit value Ybi by the exclusive OR logic means and output the result as the code Ti,1 and output the digit value Ybi as the code Ti,0 by the connecting means. By configuring the system so as to generate a ternary code in the subtraction by the decision nodes serving as leaves of a binary tree in this way, it is possible to realize a borrow look-ahead circuit of a binary subtractor. Further, the logic circuit of the input stage generating a ternary code itself is simple enabling realization by a smaller number of gates (number of transistors).

In this way, in the arithmetic and logic unit for performing binary subtraction of the present invention, the decision node used at the input stage (ternary code generation circuit) is not configured by adding an inverter to the input stage of an adder as in the conventional subtractors, but includes part of a logic operation for finding the difference as an internal logic while being configured having the same number of gates and signal propagation delay as the input stage (ternary code generation circuit) of an adder using a ternary code binary tree. Therefore, it is possible to realize a subtractor by an ideal configuration without inviting an increase in the number of gates and the signal propagation delay. Further, since it includes a logic operation which should be performed by difference generation at the output stage, the logical circuit configuration of the output stage becomes simpler enabling realization by a smaller number of gates.

Further, in the arithmetic and logic unit performing n-bit binary subtraction of the present invention, the "definitive property of the bit 0" of the result of decision never becoming "Q" and always becoming either of "Y" or "N" in the decision on the existence of a borrow for the LSBs (bit 0) is reflected into the configuration of the circuit. That is, the decision node performing the decision on existence of a borrow for the LSBs uses the selecting means to take the negative logic of the results obtained by respectively selecting the NOR logic of the digit values Xa0 and the digit value Yb0 when the borrow input to the arithmetic and logic unit is "1" and selecting the NAND logic of the digit value Xa0 and the digit value Yb0 when the borrow input is "0" and outputs the result as the code T0,0 and does not output the code T0,1.

Further, even in a binary tree of higher priority determination nodes realizing a K logic function, each higher priority determination node not derived from the code T0,1 which originally should be output by the decision node performing the decision of existence of a borrow for the LSBs is configured by an OR logic means and selecting means, but the higher priority determination node originally derived from the code T0,1 is configured simply by just a selecting means and does not output the code Tij,1. That is, the selecting means selects the code Ti,0 when the code Ti,1 is "1" and the code Tj,0 when the code Ti,1 is "0" and outputs the result as the code Tij,0. As the final conclusion, the higher priority determination node serving as the root of the binary tree interprets that "there is a borrow output" when the code Tij,0 is "1" and that "there is no borrow output" when the code Tij,0 is "0".

By adopting a configuration using the definitive property for the LSBs (bit 0) and reflecting the borrow input to the arithmetic and logic unit in the decision node performing the decision of existence of a borrow of the LSBs in this way, it is possible to simplify the binary tree structure of the higher priority determination nodes following it and possible to realize an arithmetic and logic unit superior in the points of number of gates and area. Further, by providing a higher priority determination node of a configuration simplified by using only a selecting means in the binary tree of the higher priority determination nodes for realizing a K logic function as well, it is possible to eliminate the logically redundant circuits and form a binary tree with fewer number of transistors.

Further, in the K logic circuit in the assignment of {00, 01, 11, 10}={Q, Q, Y, N}, use is made not of a composite logical gate circuit, but of a selecting means (selector). Therefore, the binary tree logic circuit according to the present invention does not have the disadvantageous aspects of a composite logical gate circuit of the small drive ability of a load and the susceptibility to an increase in wiring capacity. Further, as explained above, a selector can be easily constructed by transmission gates which enables construction of a faster speed logic device and is simpler and faster than a conventional logic circuit comprised of a binary tree constructed by transmission gates. Further, a selector enables easy control of the load drive capacity, so is advantageous in standard cell designs as well.

Further, to generate a difference, the result of the operation for obtaining the exclusive OR (Xai(+)Ybi) for the digits of two numbers (Xai, Ybi; i=0 to n−1) and a borrow signal are necessary. In the arithmetic and logic unit for performing the subtraction of n-bit binary numbers of the present invention, when using a binary tree of K logic circuits in an assignment of {00, 01, 11, 10}={Q, Q, Y, N}, the decision nodes for performing decisions of existence of carries for the digits Xaj, Ybj (j=1 to n−2) include an exclusive NOR logic means which takes the exclusive NOR logic of the digit value Xaj and the digit value Ybj and outputs the result as the code Tj,1, so it is possible to generate a difference by a simpler configuration. Further, the logical structure of the decision nodes generating the ternary code is simple in itself enabling realization with a smaller number of gates (number of transistors). That is, if use is made of a binary tree of K logic circuits in an assignment of {00, 01, 11, 10}={Q, Q, Y, N}, it is possible to reduce overall the number of transistors of the input stage and sum generation stage of the adder.

Further, in the arithmetic and logic unit for performing binary subtraction using a BLC array of a ternary code binary tree corresponding to the BLC array in the adder of the present invention, the "definitive property of the bit 0" of the result of decision never becoming "Q" and always becoming either of "Y" or "N" in the decision on the existence of a carry for the LSBs (bit 0) is reflected into the configuration of the circuit. That is, the decision node performing the decision on existence of a borrow for the LSBs uses the selecting means to take the negative logic of the results obtained by respectively selecting the NOR logic of the digit values Xa0 and the digit value Yb0 when the borrow input to the arithmetic and logic unit is "1" and selecting the NAND logic of the digit value Xa0 and the digit value Yb0 when the borrow input is "0" and outputs the result as the code T0,0 and does not output the code T0,1. Further, even in higher priority determination nodes realizing a K logic function, each higher priority determination node not derived from the code T0,1 which originally should be output by the decision node performing the decision of existence of a borrow for the LSBs is configured by an OR logic means and selecting means, but the higher priority determination node originally derived from the code T0,1 is configured simply by just a selecting means and does not output the code Tij,1. That is, the selecting means selects the code Ti,0 when the code Ti,1 is "1" and the code Tj,0 when the code Ti,1 is "0" and outputs the result as the code Tij,0.

By adopting a configuration using the definitive property for the LSBs (bit 0) and reflecting the borrow input to the arithmetic and logic unit in the decision node performing the decision of existence of a borrow of the LSBs in this way, it is possible to simplify the higher priority determination node matrix following it and, even when using a BLC adder in the conventional subtractor, possible to configure a BLC array not having the first row as in the conventional BLC adder, that is, with one fewer row than the conventional BLC adder. This makes it superior in the points of the number of gates and area. Further, by partially providing a higher priority determination node of a configuration simplified by using only a selecting means in a higher priority determination node matrix for realizing a K logic function as well, it is possible to eliminate the logically redundant circuits and form a binary tree with fewer number of transistors. Further, in the arithmetic and logic unit for performing binary subtraction using a BLB array according to the present invention, as explained above, there is no composite logic gate circuit (or logic function of a composite logic circuit) and there is none of the disadvantageous aspects of a composite logic gate circuit, so the unit is advantageous in simplicity and higher speed compared with a subtractor using a conventional BLC adder. Further, the logic circuit of the input stage generating the ternary code is also simpler and can be realized with fewer number of gates (number of transistors).

Further, in the arithmetic and logic unit performing binary subtraction using the BLB array of the present invention, by using a reduced BLB array which eliminates the even number rows of the BLB array and reduces the number of gates, it is possible to reduce to a half the number of gates of the BLB array and the many long wiring existing in the BLB array. On the other hand, the number of operation steps is increased by one, but this does not necessarily mean an increase in the delay. The reason is that since the number of gates and wiring of the BLB array are halved, the structure of the BLB array becomes simpler and gives rise to the effect of reducing the delay. The result is the delays of the adders of the BLB array not eliminating the even number rows and the BLC array eliminating the BLB array become equal. Further, an subtractor of a reduced BLB array is superior in terms of the number of transistors and the simplicity of the wiring.

Further, in the arithmetic and logic unit and method of operation of the present invention, when finding an operation for obtaining an absolute value of a difference of any two n-bit binary numbers (X, Y), first, the ternary codes of the differences for all digits including the least significant bit are generated by the decision nodes of a subtractor realized by creation of a model by a group of decision nodes and higher priority determination node matrix which fill a ternary code binary tree defining decision nodes (difference ternary code generation circuits) as leaves and defining higher priority determination nodes as nodes other than the leaves. Due to this, the ternary code generation at the time of (X-Y) and the ternary code generation at the time (Y-X) become symmetric and therefore the result of borrow generation also becomes symmetric between (X-Y) and (Y-X). Therefore, it is possible to obtain the result of borrow generation at the time of (X-Y) by an extremely simple method of performing the borrow generation assuming (X-Y) and then restoring the result of that borrow generation to its original state.

Further, in the arithmetic and logic unit and method of operation of the present invention, when finding the operation for obtaining the absolute value of the difference of any two n-bit binary numbers (X,Y), the subtractor realized by creating a model by a group of decision nodes and higher priority determination node matrix gives the generation of the ternary code of the difference for all digits including the least significant bit generated by the decision nodes to the higher priority determination node matrix to generate borrows for all of the digits. The result of the borrow generation is also output by a ternary code, but the symmetry of the output defined by the generation of the ternary code at the input stage is maintained. Therefore, it is possible to easily obtain the result of the borrow generation at the time of (Y-X) from the result of borrow generation at the time of (X-Y).

Further, in the arithmetic and logic unit and method of operation of the present invention, when finding an operation for obtaining an absolute value of the difference of any two n-bit R-nary numbers (X, Y), a subtractor realized by creating a model by a group of decision nodes and higher priority determination node matrix gives the ternary code generation of the difference for all bits, including the least significant bit, generated by the decision nodes to the higher priority determination node matrix to generate a borrow for each digit, then judges the code for the result of the difference of the two numbers based on the result of the borrow generation of the most significant bit. When the code of the result of borrow generation of the most significant bit is "Y", X<Y and code replacement of the result of borrow generation is performed, when the code of the result is "Q", X=Y and code replacement of the result of borrow generation is performed or the code is left as it is, and when the code of the result is "N", X>Y and the result of borrow generation is left as it is. Further, in symmetric code replacement, the value code "Q" is replaced with the value code "Q", the value code "Y" is replaced with the value code "N", and the value code "N" is replaced with the value code "Y". By this, it is possible to simply obtain the result of borrow generation of (Y-X) from the result of borrow generation of (X-Y) and possible to realize an ideal conversion of operations.

Further, in the arithmetic and logic unit and method of operation of the present invention, when finding an operation for obtaining an absolute value of the difference of two n-bit binary numbers (X, Y), the ternary code binary tree BLB array comprised of the group of decision nodes (ternary code generation circuits) and higher priority determination node matrix (non-simplified K logic circuit matrix) gives the ternary code generation of the difference for all bits, including the bit 0, generated by the ternary code generation circuits to the non-simplified K logic circuit matrix to generate a borrow for each digit, then judges the code for the result of the difference of the two numbers based on the result of the borrow generation of the MSB. When the code of the result of borrow generation of the MSB is "Y", x<Y and code replacement of the result of borrow generation is performed, when the code of the result is "Q", X=Y and code replacement of the result of borrow generation is performed or the code is left as it is, and when the code of the result is "N", X>Y and the result of borrow generation is left as it is. Further, in symmetric code replacement, the value code "Q" is replaced with the value code "Q", the value code "Y" is replaced with the value code "N", and the value code "N" is replaced with the value code "Y". By this, it is possible to simply obtain the result of borrow generation of (Y−X) from the result of borrow generation of (X−Y) and possible to realize an ideal conversion of operations.

Further, after the code replacement, the value code "Q" is replaced by the value code "N" to obtain a borrow for each digit of the result of the replacement or the output code of the higher priority determination node (K logic circuit). That is, note is taken of the fact that the value code "Q" after code replacement means that "there will be no borrow" and the value code "Q" is replaced by the value code "N". The result of the borrow generation after the value code "Q" is replaced with the value code "N" becomes just the value code "Y" and the value code "N", the value code "Y" indicates that "there will be a borrow", that is, the borrow Bi−1, and the value code "N" indicates that "there will not be a borrow", that is, the borrow Bi=0. The same is true for the result of the borrow generation in a subtractor. Therefore, from here, use may be made of a logic circuit similar to that of a subtractor to obtain the absolute value of the difference.

Further, in the arithmetic and logic unit of the present invention, the code judgement means for judging the code of the result of borrow generation of the most significant bit outputs a code judgement signal indicating "true" when the output code is the value code "Y" or "false" when it is the value code "Q" or "N" or outputs a code judgement signal indicating "true" when the output code is the value code "Y" or "Q" and "false" when it is the value code "N". A code replacement means which performs code replacement for the result of borrow generation when the code judgement signal is "true" since X≦Y and leaves the result of borrow generation as it is when the code judgement signal is "false" since X≧Y uses an exclusive OR logic means to take the exclusive or logic of the code judgement signal and the output code of the higher priority determination node (K logic circuit. After the code replacement, further, a second code replacement means which replaces the value code "Q" with the value code "N" for the result of the replacement or the output code of the higher priority determination node (K logic circuit) uses an AND logic means to obtain the AND logic between the output of the code replacement means and the output code of the higher priority determination node (K logic circuit). Due to this, it becomes possible to convert the operation of (X−Y) to the operation of (Y−X) at a high speed by a constant order without regard as to the number of bits n. Further, the number of the gates required is smaller as well.

Further, in the arithmetic and logic unit for calculating the absolute value of a code-less difference of the present invention, note is taken of the symmetry of the ternary code after a borrow generation and the conversion of the operation from (X−Y) to (Y−X) is realized by replacement of the code of the result of the borrow generation. In the conventional method, the conversion from the operation of (X−Y) to the operation of (Y−X) was achieved by finding the result of the operation of (X−Y) and then calculating the complement of 2. In the present invention, the code is replaced to convert to the operation of (Y−X) at the step where the borrow generation ends in the operation of (X−Y). Further, this code replacement can be performed at a high speed by fewer number of gates by a code replacement circuit. Accordingly, according to the arithmetic and logic unit for calculating the absolute value of a code-less difference according to the present invention, it is possible to realize an arithmetic and logic unit enable a higher speed operation for obtaining an absolute value of a difference with fewer gates.

Further, in the arithmetic and logic unit of the present invention, when finding the operation for obtaining the absolute value of the difference of two code-bearing n-bit binary numbers (Xa, Yb), the decision node performing the comparison decision for the MSBs of the two numbers treats the digit value $Xa_{n-1}$ as the digit value $Yb_{n-1}$ and the digit value $Yb_{n-1}$ as the digit value $Xa_{n-1}$ and therefore reverses the treatment of $Xa_i$, $Yb_i$ in the decision nodes of the other digits. In this way, in the present invention, by exchanging the X and Y inputs of the MSBs, it is possible to convert an operation unit for obtaining the absolute value of a code-less difference to an operation unit for obtaining the absolute value of a code-bearing difference and therefore convert an operation unit for obtaining the absolute value of a code-less difference to an operation unit for obtaining the absolute value of a code-bearing difference by an extremely simple method without increasing the number of transistors, the wiring, the area, or the signal propagation delay.

BRIEF DESCRIPTION OF THE DRAWINGS

The above and other objects and features of the present invention will be described more in detail with reference to the accompanying drawings, in which:

FIG. 2A and FIG. 2B are conceptual explanatory views for explaining the definition of a serial structure of decisions having an order dependency and a decision node having a dependency input/output;

FIG. 5A and FIG. 5B are conceptual explanatory views explaining the definition of a decision node not having a dependency input/output;

FIGS. 6A and 6B are conceptual explanatory views explaining the definition of a higher priority determination node;

FIG. 10A is an explanatory view of a code system of the indeterminate code binary tree;

FIG. 10B is a truth table of a decision node;

FIG. 10C is a truth table of a higher priority determination node;

FIG. 25A, FIG. 25B and FIG. 25C are explanatory views of the principle of the present invention and a conceptual explanatory view of a ternary code binary tree and the decision node and higher priority determination node serving as constituent elements of the same;

FIG. 26A to FIG. 26D are explanatory views explaining the definition of K operators and the logical function thereof;

FIG. 31 is an explanatory view illustrating a truth table of a ternary code;

FIG. 34A and FIG. 34B are truth tables explaining the generation of a ternary code in the case of addition and a circuit diagram of a sum ternary code generation circuit;

FIG. 35A and FIG. 35B are truth tables based on the definitive property of the bit 0 and a circuit diagram of the sum ternary code generation circuit of the bit 0;

FIG. 44 is an explanatory view of the code assignment of the ternary code binary tree and a circuit diagram of the K logic circuit as an example of the same (first);

FIG. 45 is an explanatory view of the code assignment of the ternary code binary tree and a circuit diagram of the K logic circuit as an example of the same (second);

FIG. 46A to FIG. 46E are circuit diagrams of the constituent elements of the comparator and adder resulting from replacement of (Y, F, N, Q} as another assignment of the present invention;

FIG. 47A and FIG. 47B are truth tables explaining the generation of ternary codes in the case of subtraction and a circuit diagram of the difference ternary code generation circuit;

FIG. 48A and FIG. 48B are truth tables based on the definitive property of the bit 0 and a circuit diagram of the difference ternary code generation circuit of the bit 0;

FIG. 57A and 57B are internal circuit diagrams of an exclusive OR gate circuit and an exclusive NOR gate circuit.

FIG. 58 is an explanatory view comparing ternary codes generated in subtraction (first: example in which the symmetry appears to stand at a glance);

FIG. 59 is an explanatory view comparing ternary codes generated in subtraction (second: example in which symmetry does not stand at the bit 0);

FIG. 61A, FIG. 61B and FIG. 61C are circuit diagrams of the code replacement circuit in the operation unit for obtaining the absolute value of a difference according to a sixth embodiment of the present invention and an explanatory view of a table explaining the code conversion (final digit borrow generation) based on the code judgement result of a code judgement;

FIG. 64 is an explanatory view explaining a qualitative comparison of the number of gates and delay in operation units for obtaining the absolute value of a difference according to conventional second and third methods and an operation unit for obtaining the absolute value of a difference according to the present invention;

FIG. 70 is a view of the configuration of the conventional code-bearing binary comparator;

FIG. 71A and FIG. 71B are explanatory views showing the definition of subtraction of 1-bit binary numbers and the truth table in the case of adding the complement of 2 of Y to X to perform the subtraction of X–Y;

DESCRIPTION OF THE PREFERRED EMBODIMENTS

Figure 1:
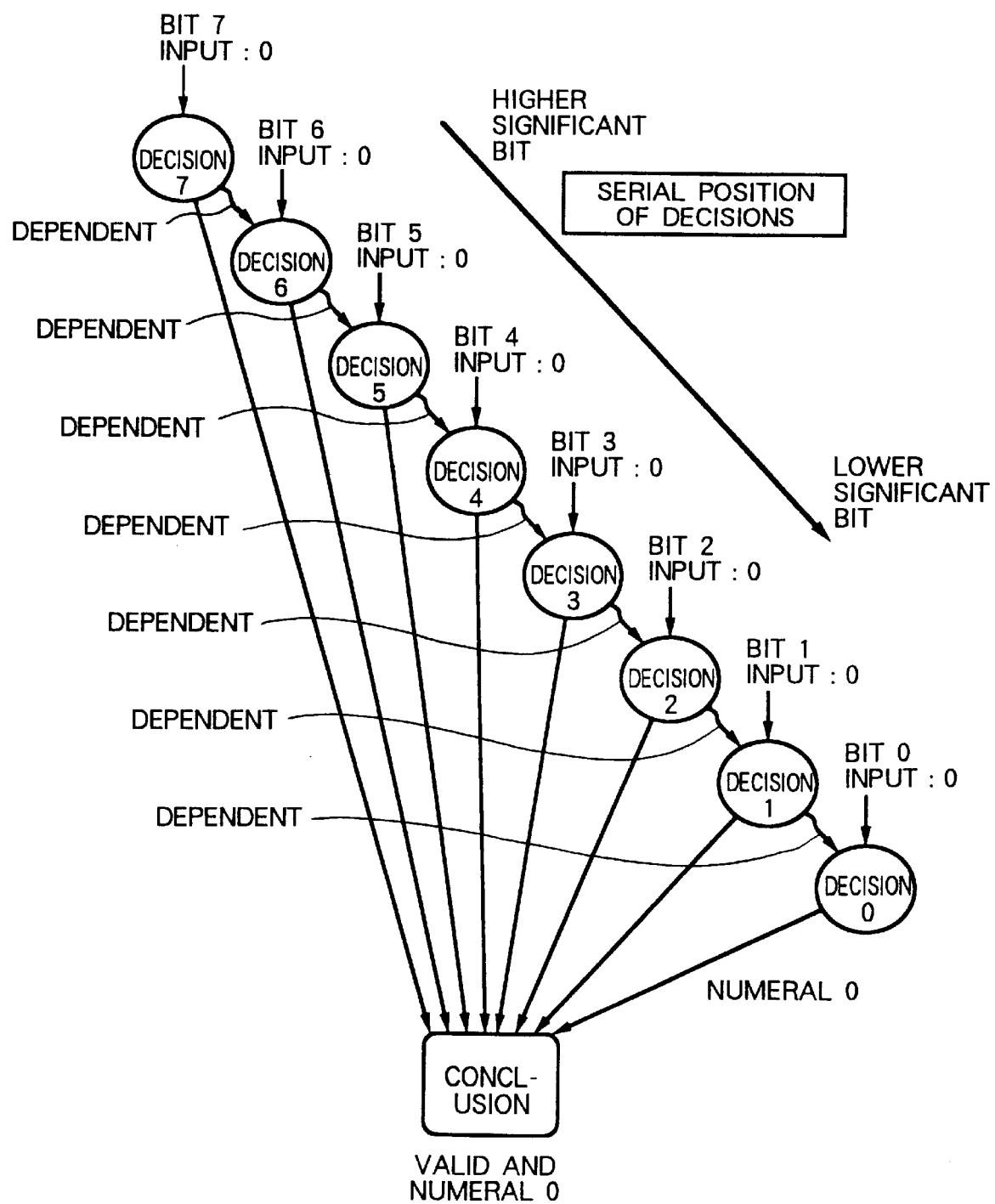
FIG. 1 is a conceptual explanatory view of a serial structure of decisions having an order dependency in a priority encoder.

Below, an explanation will be made, according to the table of contents, of the "series of decision having an order dependency", a "ternary code binary tree", "application of a ternary code binary tree to a binary logic circuit", the "serial structure of decisions having an order dependency", an "indeterminate code binary tree", and "application of an indeterminate code binary tree to a binary logic circuit". Note that, as embodiments of the arithmetic and logic unit of the present invention, a detailed explanation will be given, in order and with reference to the drawings, of a priority encoder as a [first embodiment] and [second embodiment] in the "application of an indeterminate code binary tree to a binary logic circuit" and of a comparator as a [third embodiment], of an adder, BLC array, and reduced BLC array as a [fifth embodiment], and an operation unit for obtaining an absolute value of a difference as a [sixth embodiment] in the "application of a ternary code binary tree to a binary logic circuit".

Table of Contents

[1] Serial Structure of Decisions Having an Order Dependency 1.1 Series of Decisions Having an Order Dependency 1.2 Definition and Theorems of "Serial Structure of Decisions Having an Order Dependency"

1.2.1 Definition of "Decision Node Having Dependency Input/Output"

1.2.2 Definition and Theorems of "Serial Structure of Decisions Having an Order Dependency"

1.2.3 Theorem of Incapability of Parallel Execution of Serial Structure of Decisions Having an Order Dependency 1.2.4 Theorem of Correctness of Serial Structure of Decisions Having an Order Dependency 1.2.5 Propriety of Model 1.2.6 Delay of Serial Structure of Decisions Having an Order Dependency 1.4 Logical Circuit of Conventional Priority Encoder and Problems of Same

[2] Indeterminate Code Binary Tree 2.1 Discovery of Method of Performing Decisions in Parallel While Maintaining Order and Positional Relationship 2.2 Definitions and Theorems 2.2.1 Definition of "Decision Node Not Having Dependency Input/Output"

2.2.2 Definition of "Higher Priority Determination Node"

2.2.3 Definition of "Indeterminate Code Binary Tree"

2.2.4 Theorem of Correctness of Indeterminate Code Binary Tree 2.2.5 Delay of Indeterminate Code Binary Tree 2.2.6 Method of Converting Serial Structure of Decisions Having an Order Dependency to Indeterminate Code Binary Tree (Principle of Conversion of Structure)

2.2.7 Theorem of Identity of Principle of Conversion of Structure 2.2.8 Exception Provision of Least significant Decision Node

[3] Application of Indeterminate Code Binary Tree to Binary Logic Circuit: High Speed Priority Encoder 3.1 Priority Encoder Using Indeterminate Code Binary Tree 3.2 Logical Configuration of Optimum Priority Encoder 3.3 Effect of Application of Indeterminate Code Binary Tree to Binary Logic Circuit

[4] Series of Decisions Having an Order Dependency 4.1 Foreword 4.2 Series of Decisions Having an Order Dependency 4.2.1 Case of Comparison 4.2.2 Case of Carry of Addition 4.2.3 Case of Borrow of Subtraction 4.2.4 Structure of "Series of Decisions Having an Order Dependency"

[5] Ternary Code Binary Tree 5.1 Introduction of New Functions 5.2 Ternary Code Binary Tree 5.3 Definition and Algebraic Properties of K Operators

[6] Application of Ternary Code Binary Tree to Binary Logic Circuit 6.1 One Example of Ternary Code Binary Tree 6.1.1 Binary Expression of Ternary Code 6.1.2 Logical Function of K Operator 6.2 Embodiment of Comparator 6.2.1 Generation of Ternary Code of Comparison 6.2.2. Overall Configuration of Comparator 6.3 Embodiment of Adder 6.3.1 Generation of Ternary Code of Sum 6.3.2 Definitive Nature of Bit 0

6.3.3 Configuration of Carry Generation Binary Tree (Case of Carry Generation Binary Tree)

(Generation of Sum)

(Overall Configuration of Carry Generation Binary Tree: BLC Array)

(Reduced BLC Array)

6.3.4 Other Assignment of Ternary Code 6.3.5 Modification of Embodiment 6.4 Embodiment of Subtractor 6.4.1 Generation of Ternary Code of Difference 6.4.2 Definitive Property of Bit "0"

6.4.3 Configuration of Borrow Generation Binary Tree (Case of Borrow Generation Binary Tree)

(Overall Configuration of Borrow Generation Binary Tree: BLB Array)

(Optimization of Sign)

(Generation of Difference)

(Reduced BLB Array)

6.4.4 Effect of Application of Ternary Code Binary Tree to Subtractor 6.5 Embodiment of Operation Unit for Obtaining Absolute Value of Difference 6.5.1 Configuration of Ideal Operation Unit for Obtaining Absolute Value of Difference 6.5.2 Difference Between X–Y and Y–X 6.5.3 Method of Operation of Obtaining Absolute Value of Difference by Ternary Code 6.5.4 Code Replacement Circuit 6.5.5 Configuration of Operation Unit for Obtaining Absolute Value of Code-Less Difference 6.5.6 Configuration of Operation Unit for Obtaining Absolute Value of Code-Bearing Difference 6.5.7 Effect of Application of Ternary Code Binary Tree to Operation Unit for Obtaining Absolute Value of Difference

[1] Serial Structure of Decisions Having an Order Dependency 1.1 Series of Decisions Having an Order Dependency If the function of the priority encoder were to be carried out by a person, how does he or she think and derive a correct output? This would become as follows from the definition of the function of a priority encoder.

Step SP1. Look at the bit having the highest priority order (MSB) among the input bits. If it is "1", "1111" ("valid" and "7") is output and the operation is ended. Further, if it is "0", the result depends upon the bit of the lower significant digit, therefore the value cannot be output (seen) here and the routine proceeds to the next step.

Step SP2. Look at the bit lower than the MSB by one. If it is "1", "1110" ("valid" and "6") is output and the operation is ended. If it is "0", the result depends upon the bit of the lower significant digit, so the routine proceeds to the next step.

Step SP3. Look at the bit lower than the MSB by two. If it is "1", output "1101" ("valid" and "5") is output and the operation is ended. If it is "0", the result depends upon the bit of the lower significant digit, so the routine proceeds to the next step.

Step SP4. to step SP6. are similarly processed.

Step SP7. Look at the bit lower than the MSB by seven (LSB). If it is "1", "1000" ("valid" and "0") is output and the operation is ended. If it is "0", "0***" ("invalid") (here, * means "don't care") is output and the operation is ended.

The order of decisions is important in this process of thought. It is not allowed to freely perform individual decisions at any timing. For example, it is clear that the action of looking at the bit 3 before looking at the bit 6 and outputting "1011" ("valid" and "3") if it is "1" is erroneous. Accordingly, it can be said that, in a plurality of decisions, there exists a relationship of order of execution. In order to perform the decisions while maintaining the order relationship, a restrictive condition that "execution of the following (lower significant) decision is first allowed after determining that a clear conclusion cannot be made by this decision, an answer cannot be given since it depends upon the next (lower significant) decision, or do not know" is necessary.

If representing this relationship that a plurality of decisions have an order dependency and are executed in order by an abstract figure, the result becomes FIG. 1. The characteristic feature is that individual decisions are linked in series by the relationship of "dependency". The structure which can be represented by the directed graph as in FIG. 1 is referred to as "a serial structure of decisions having an order dependency" in the present specification.

This structure is not restricted to the priority encoder explained later as an embodiment of the present invention and is frequently found in human thinking. For example, when a person thinks about the comparative magnitude of two numbers, the cause of a carry in addition, and the cause of a borrow in subtraction, the same structure exists in his or her thought.

This "serial structure of decisions having an order dependency" is often found outside of thought as well. The same is true of the descriptions of the procedures of a priority encoder and expressions using figures as shown in FIG. 1. The following program written by the C language is particularly familiar:

```
if (~) {..}
    else if (~) {..}
        else if ...
            else {...}
;
```

This shows that the "serial structure of decisions having an order dependency" can be expressed by language and figures and can be correctly transferred to another person. However, while this structure can be taught and transferred to people, people already know this structure before they are taught it by someone. This structure is one aspect of the prototype originally provided in people and can be said to be a manifestation of the ability of the prototype. This ability is very important, but very close to us. We use it with almost no awareness. The discussion concerning this point is out of the gist of the present specification, so the present specification will not refer to this any further.

1.2 Definition and Theorems of "Serial Structure of Decisions Having an Order Dependency"

In order to show the logical correctness of the model of the "serial structure of decisions having an order dependency", here, the model is correctly defined and its general properties are clarified.

1.2.1 Definition of "Decision Node Having Dependency Input/Output"

(1) Apparent Features

Each of circles labeled as a "decision" in FIG. 1 will be referred to here as a "decision node having a dependency input/output". A decision node having a dependency input/output, as shown in FIG. 2A, is the minimum unit of a decision having one or more data inputs and dependency inputs and having a conclusion output and dependency output.

(2) Inputs and Outputs

The data input and conclusion output are not limited to the binary system and can handle quantities of any format (N-nary number of a finite number of digits or a logical value (of "true" or "false") etc.) On the other hand, the dependency input and the dependency output handle binary information indicating "valid" or "invalid".

(3) Functional Model

A decision node having a dependency input/output first starts the execution of a predetermined decision at a point of time when both of the data input and dependency input become valid. When a clear conclusion can be drawn from the given input data, that value is output as the conclusion, and the dependency output is made "invalid". On the other hand, where the decision node cannot draw a clear decision from the given input, it does not output a conclusion (outputs "invalid") and outputs "valid" for the dependency output. There are two outputs, but the two will not simultaneously become valid.

(4) Delay Model

It is assumed that a delay occurs during the period from when this decision node having a dependency input/output starts execution to when it finishes outputting either a conclusion or dependency. The magnitude of this delay may be suitably determined in accordance with the medium on which the structure is realized. It is allowed to make this sufficiently small, but not allowed to make it "0".

1.2.2 Definition of "Serial Structure of Decisions Having an Order Dependency"

(1) Apparent Features

A "serial structure of decisions having an order dependency" is a structure characterized in that "decision nodes having dependency input/outputs" are linked in series via dependency input/outputs as shown in FIG. 2B. Further, conclusion outputs of decision nodes having dependency input/outputs are combined into one. There is a relative positional and order relationship between decision nodes having dependency input/outputs. In FIG. 2B, the higher the position of a node, the higher the order. The position and order follow those of an orderly thought process.

(2) Inputs and Outputs

All of the data required for a decision are input, while the conclusion based on the predetermined orderly thought process is output. A data input is a quantity expressed by any format. A conclusion is a quantity expressed by any format as well. A common example is a logical value such as (True/False/Unknown).

(3) Functional Model

At a point of time when a data input is given, the execution is started from the decision node having a dependency input/output of the most significant bit. The decision node having a dependency input/output of the most significant bit, and only this node, specially has a dependency input which is always "valid". For this reason, as soon as the data arrives, the execution of the decision thereof can be started. After this, according to the definition of a "decision node having a dependency input/output", the execution of the subsequent decision nodes having dependency input/outputs is carried out. When a clear conclusion is output during this process, this is output as the final conclusion. Due to the property of a decision node having a dependency input/output, the execution of the subsequent decision node having a dependency input/output is not carried out. The decision node having a dependency input/output located at the least significant bit does not have a dependency with respect to a lower significant bit. Accordingly, the situation of "do not know since it depends upon a lower significant bit" cannot occur. For this reason, the decision node having a dependency input/output located at the least significant bit does not have a dependency output.

(4) Delay Model

The delay occurring during the period from when the input is given to the serial structure of decisions having an order dependency to when the conclusion is output is equal to the sum of the delays of the decision nodes having an order dependency executed until the conclusion is output.

1.2.3 Theorem of Incapability of Parallel Execution of Serial Structure of Decisions Having an Order Dependency The following theorems can be derived from the above definitions.

[Auxiliary Theorem 1]

When two "decision nodes having dependency input/outputs" are connected via the dependency input/outputs, these two decision nodes cannot be simultaneously executed.

[Proof]

Between two decision nodes having dependency input/outputs, the one located at the higher significant bit is defined as "A", and the one located at the lower significant bit is defined as "B". In order to start the execution of the decision node B, the required condition is that the dependency input of the decision node B becomes valid (from the definition of a decision node having a dependency input/output). Further, in order to make the dependency input of the decision node B valid, it is necessary to make the dependency output of the decision node A valid. The only time when the dependency output of the decision node A becomes valid is the point of time when the execution of the decision node A is terminated and the result is found to be that "do not know due to dependency" (from definition of a decision node having a dependency input/output).

Accordingly, in order to start the execution of the decision node B, it is necessary to wait at least until the end of execution of the decision node A. The waiting time is not 0, but at least a delay time caused in the decision node A. Therefore, when two "decision nodes having dependency input/outputs" are connected via dependency input/outputs, these two decision nodes cannot be simultaneously executed. [Proof end]

[Theorem 1]

In a "serial structure of decisions having an order dependency", it is impossible to execute any plurality of decision nodes having dependency input/outputs in parallel.

[Proof]

By mathematical induction, the auxiliary theorem 1 can be easily expanded to "N number of decision nodes linked in series via dependency input/outputs cannot be simultaneously executed (N is a natural number)".

In a serial structure of decisions having an order dependency, all decision nodes having dependency input/outputs are connected in series by the dependency input/outputs (from the definition of the serial structure of decisions having an order dependency). They correspond to "N number of decision nodes having dependency input/outputs linked in series via dependency input/outputs" and accordingly cannot be simultaneously executed. [Proof end]

1.2.4 Theorem of Correctness of Serial Structure of Decisions Having an Order Dependency

[Theorem 2]

In a serial structure of decisions having an order dependency, there are a plurality of decision nodes having dependency input/outputs and any of the same can output a conclusion. However, there is only one which outputs a valid correct conclusion. It is impossible for a plurality of conclusions of decisions to stand simultaneously. That is, they are not contradictory.

[Proof]

From auxiliary theorem 1, it is impossible for two continuous decision nodes having dependency input/outputs to simultaneously output conclusions. This is because, a conclusion is the result of execution of the decisions. Similarly, a situation where a plurality of conclusions are simultaneously output and contradict each other.

Can a situation where conclusions caused with a delay contradict each other? Here, assume a case where a valid conclusion is output from any one decision node having a dependency input/output among N number of decision nodes having dependency input/outputs connected in series via dependency input/outputs. When the conclusion output is valid, the dependency output of a decision node having a dependency input/output becomes invalid (from the definition of a decision node having a dependency input/output). Accordingly, the execution of all decision nodes having dependency input/outputs located at lower significant bits than this decision node having a dependency input/output cannot be started and a valid conclusion should not be output. Namely, it can be said that "where a certain decision node having a dependency input/output outputs a valid conclusion, all decision nodes having dependency input/outputs located at lower significant bits cannot output a valid conclusion.".

On the other hand, the fact that this decision node having a dependency input/output could output a conclusion shows that the execution of this decision node having a dependency input/output was carried out. One of required conditions for the start of execution of a decision node having a dependency input/output is that a decision node having a dependency input/output higher by one significant bit cannot output a conclusion and the dependency output becomes valid. Similarly, when going back up the required conditions for the start of execution to the top, in the final analysis, the condition for the start of execution of a certain decision node having dependency input/output can be said to be "only when all of the decision nodes having dependency input/outputs located at higher significant bits than this cannot output a conclusion and the dependency outputs are valid (assuming tacitly that the data inputs are aligned". Namely, it can be said that "All of the decision nodes having dependency input/outputs located at higher significant bits than the decision node having a dependency input/output which outputs a conclusion could not output a valid conclusion".

Therefore, in a serial structure of decisions having an order dependency, all of the decision nodes having dependency input/outputs located at higher significant bits and the decision nodes having dependency input/outputs located at lower significant bits than the decision node having a dependency input/output which outputs a conclusion do not output valid conclusions. The only decision node having a dependency input/output which outputs a valid conclusion is that decision node having a dependency input/output. [Proof end]

1.2.5 Propriety of Model of Serial Structure of Decisions Having an Order Dependency Theorem 1 and theorem 2 guarantee the propriety of the previously defined model of the serial structure of decisions having an order dependency. That is, a decision node having a dependency input/output in the model of the serial structure of decisions having an order dependency is executed according to a predetermined order (from theorem 1). Further, there is always one conclusion (from theorem 2). Accordingly, the human orderly thought process explained in the third section of the present chapter can be explained by using this model of the serial structure of decisions having an order dependency.

1.2.6 Delay of Serial Structure of Decision having an Order Dependency

In the explanation, importance is attached to the delay up until the conclusion of the "serial structure of decisions having an order dependency" is obtained. The gist of the present specification resides in that a machine is made to copy the human thought process, more specifically, a logic circuit is made to replace human thought. In this case, the amount of hardware (number of gates or number of transistors) of the logic circuit and the operation time (signal propagation delay time) become important.

When there is a "serial structure of decisions having an order dependency" among the people who design the logical circuit and the logical circuit is configured according to this, this logical circuit has a "serial structure of decisions having an order dependency". The signal propagation delay of this logical circuit follows the general properties of the delay of the "serial structure of decisions having an order dependency". This being the case, what are the general properties of the delay of a "serial structure of decisions having an order dependency"?

The first of the features of the delay of this structure is that the magnitude of the delay is greatly affected by the decision process. For example, in FIG. 1, if the conclusion is obtained by the decision at the most significant bit, the delay is 1 (unit), while when it is necessary to wait for the decision of the least significant bit, it is 8 (units).

Further, the second of the features is that the worst value of the delay (when the decisions are carried out up to the least significant bit) is proportional to the number of decision nodes having dependency input/outputs. For example, in a structure where 32 decision nodes having dependency input/outputs are linked in series, the worst delay becomes 32 (units).

A logical circuit in which the "signal propagation delay time is not constant" is not suitable for the current mainstream clock synchronization pipeline type computers. In such computers, the logical circuit must output a result within a predetermined time (clock cycle). Since the "signal propagation delay time is not constant", in order to guarantee that the logical circuit outputs the result in time in all types of inputs, the clock cycle must be set to more than the worst delay time of the logical circuit. However, the worst delay time is "in proportion to the number of the decision nodes". In general, the number of the decision nodes is proportional to the input bit width of the logical circuit. When the signal propagation delay of such a logical circuit becomes so large that it can no longer be ignored in the pipeline, this logical circuit determines the clock frequency of the computer and greatly affects the performance of the computer. In the later section, as a concrete example of such a logical circuit, a logical circuit of a priority encoder will be mentioned.

In current computers, especially microprocessors, the trend toward an increase of the data bit width and the number of functional units will continue in the future as well. In view of this, a logical circuit having a signal propagation delay smaller than that in proportion to the input bit width is important. Consequently, it is important to establish a general procedure for remaking a "serial structure of decisions having an order dependency" per se having a delay in proportion to the number of decision nodes having dependency input/outputs to another higher speed structure.

1.4 Logical Circuit of Conventional Priority Encoder and Problems Thereof

Figure 3:
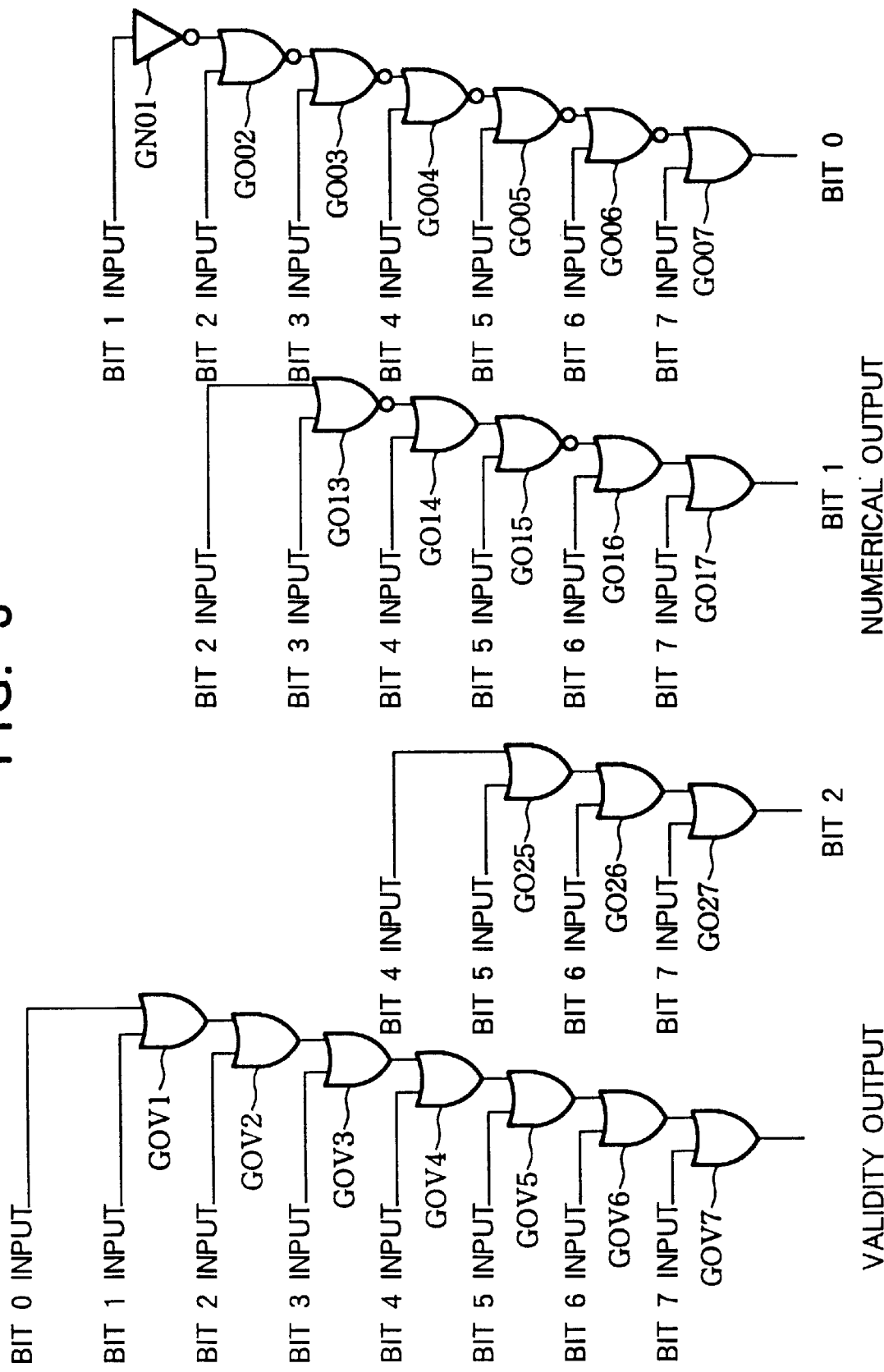
FIG. 3 is a logical circuit diagram of a conventional priority encoder.

FIG. 3 shows the logical circuit of a conventional priority encoder. The logical circuit of FIG. 3 has the serial structure of decisions having an order dependency as shown in FIG. 1, but at first appearance, FIG. 1 and FIG. 3 do no appear to have the same structure. This is because, in FIG. 3, the outputs of the logical gates GOV6, GO26, GO16, and GO06 receiving as their inputs the bit 6 are respectively connected to the inputs of the logical gates GOV7, GO27, GO17, and GO07 receiving as their inputs the bit 7. Contrary to this, in FIG. 1, the dependency output of the decision node 6 receiving as its input the bit 6 is connected as the dependency input of the decision node 5. That is, the order of arrangement of logical gates becomes reverse to the order of arrangement of the decision nodes.

Figure 4:
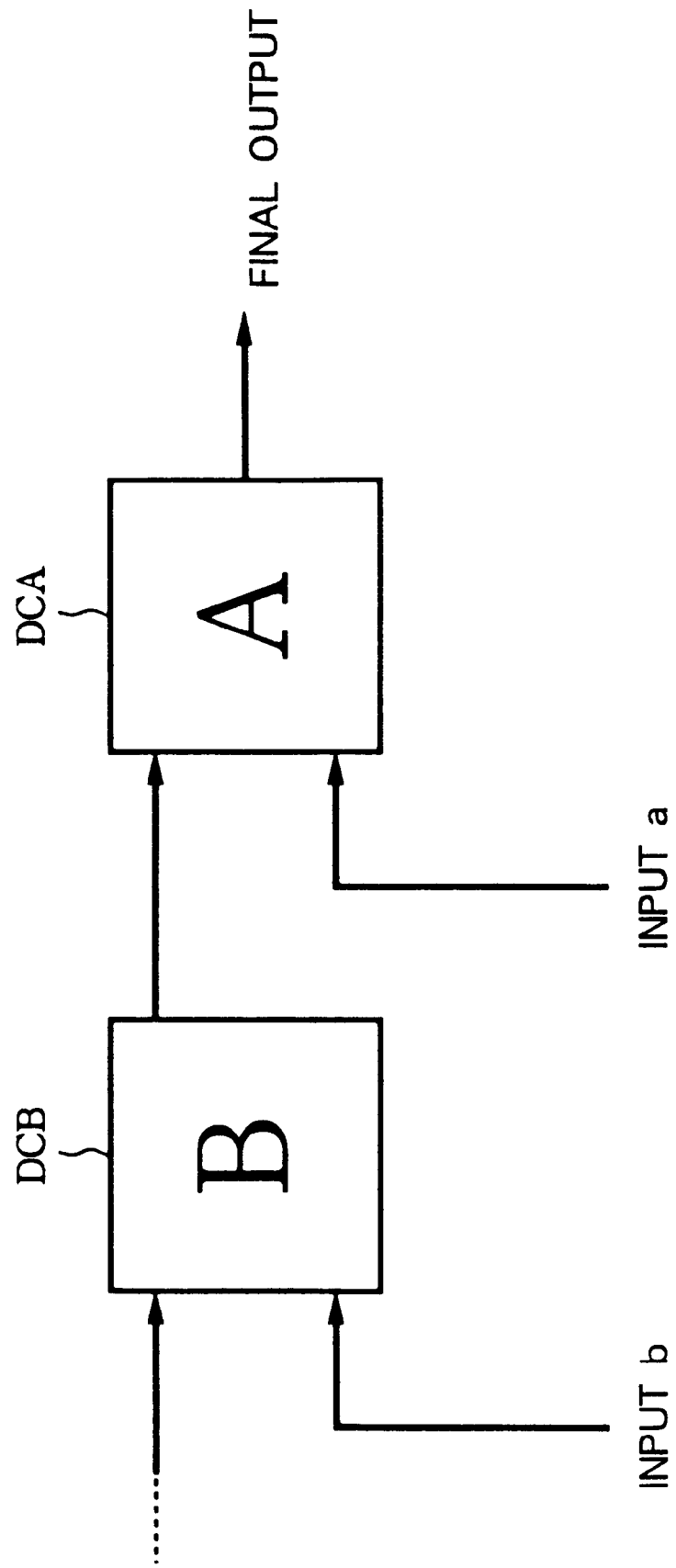
FIG. 4 is an explanatory view explaining a typical structure in a logical circuit of the serial structure of decisions having an order dependency.

However, irrespective of this, it can be said that the logical circuit of the priority encoder shown in FIG. 3 has a serial structure of decisions having an order dependency. FIG. 4 shows the generalized structure of the logical circuit of FIG. 3. Whether or not the result which is output by the logical gate DCB will reach the final output is governed by the logical gate DCA through which it passes. The input a can suppress the output of the result of the logical gate DCB. Further, a result which has no relation to the input b and is based on only the input a can be output. This shows that the input a is superior to the input b, that is, is located at a dominant position.

As shown in FIG. 4, a structure that realizes the function that "there is a positional relationship among individual inputs and an output of a result of a higher significant bit suppresses other results located at lower significant bits and is output as the final conclusion" and where "control structures where higher significant bits suppress lower significant bits are linked in series" is truly a serial structure of decisions having an order dependency.

The reason why FIG. 3 looks different from FIG. 1 is that there is no clear signal line transferring information such as "dependent" in FIG. 3. However, in actuality, the "words" such as "depend/not depend on lower significant bits" of the structure of FIG. 1 are merely replaced by the "words" "adopt/suppress results of lower significant bits". The identity of the meaning is held.

In general, when a serial structure of decisions having an order dependency is realized by a logical circuit, as shown in the logical circuit structure shown in FIG. 3 and FIG. 4, the structure becomes one where the higher significant bit the input received by the logical gate is, the closer the logical gate is to the output side. As a typical example of such a structure of a logical circuit, a carry ripple adder can be mentioned.

As explained at the end of the previous section, a logical circuit having a serial structure of decisions having an order dependency has the defect that the worst delay time is increased in proportion to the number of bits of the input. A conventional priority encoder also has this defect. In the example of FIG. 3, OR gate circuits or AND gate circuits are added in series and the number of operation steps is increased by exactly the amount of increase of the number of bits of the input.

The above may be summarized as follows. A logical circuit having a "serial structure of decisions having an order dependency" (for example, FIG. 3) is not suitable for a computer operating at a high speed. This is for the following reasons: Namely, this is because (a) inside a pipeline computer, the worst delay time of the logical circuit is one of the important elements determining the clock cycle of the computer and (b) the worst delay time of a logical circuit having a "serial structure of decisions having an order dependency" is proportional to the number of bits of the inputs. Accordingly, the logical circuit and operation unit with worst delay times which are smaller than that in proportion to the number of bits of the input become important.

[2] Indeterminate Code Binary Tree 2.1 Discovery of Method of Performing Decisions in Parallel While Maintaining Order and Positional Relationship As explained in theorem 1 of 1.2.3, in a serial structure of decisions having an order dependency, parallel processing of decisions is impossible. The reason why parallel processing is impossible is that there is a dependency input which should be called a "control input" other than the data input in individual decision nodes having dependency input/outputs.

What should one do in order to make all decision nodes be able to immediately start execution at the point of time of the data input, that is, in order to enable parallel processing of decisions? It is sufficient to change things so that "individual decision nodes do not have the dependency inputs, but have only data inputs".

Since each decision node no longer has a dependency input, the dependency output also becomes unnecessary. When a state where the dependency output becomes valid, that is, a state that "do not know since it depends upon lower significant bits, cannot be answered, or cannot be defined" occurs, an indeterminate code "Q" is output as the conclusion. A decision node obtained in this way will be referred to as a "decision node having a dependency input/output". Further, the output of this decision node not having a dependency input/output will be referred to as a "working conclusion".

Of course, there are as many "working conclusions" as the number of decision nodes not having dependency input/outputs. They must be collected together and only the correct conclusion derived. Originally, there had been an order relationship among decision nodes. Accordingly, where there are a plurality of working conclusions, the working conclusion of the decision node not having a dependency input/output of the most significant bit must be defined as the final conclusion.

For example, when there are two decision nodes not having dependency input/outputs and they output different working conclusions, the one correct conclusion must be the working conclusion of the higher significant bit. Then, in what kind of case can the working conclusion of a lower significant bit be the final conclusion?

This is the case where a clear conclusion cannot be derived in the decision of the higher significant bit. Namely, it is the case where the indeterminate code "Q" is output in the decision node not having a dependency input/output of the higher significant bit. Only in such a case can the working conclusion of a lower significant bit be the final conclusion.

The operation and action of deriving one correct conclusion from two different working conclusions in this way are referred to as the "function of higher priority determination" in the present specification. An abstract unit having this function will be referred to as a "higher priority determination node" as opposed to a decision node not having a dependency input/output.

By combining higher priority determination nodes in multiple stages so that the output of a higher priority determination node becomes the input of a next higher priority determination node, it becomes possible to derive a single correct conclusion even when there are three or more working conclusions (proof will be explained later).

The structure of the assembled higher priority determination nodes by nature naturally becomes a binary tree. Here, a binary tree structure enabling parallel processing of decisions by using the an indeterminate code will be called an "indeterminate code binary tree".

2.2 Definition and Theorems

As explained in the previous section, a method of performing decisions of an orderly thought process in parallel was found by introducing the new concepts of a "decision node not having a dependency input/output" and a "function of higher priority determination (higher priority determination node)". Here, these concepts are defined. Then, the general method of converting a "serial structure of decisions having an order dependency" to an "indeterminate code binary tree" will be explained.

2.2.1 Definition of "Decision Node Not Having a Dependency Input/Output"

(1) Apparent Feature

A decision node not having a dependency input/output as shown in FIG. 5A is a unit of decision having one or more data inputs and a working conclusion output. It does not have a dependency input or dependency output. The output value of this decision node not having a dependency input/output will be referred to as a "working conclusion".

(2) Inputs and Outputs

The data input is not limited to the binary system and can handle quantities of any format (N-nary number of a finite number of digits or a logical value (of "true" or "false") etc.)

On the other hand, as the working conclusion output, a code of the format combining into one the indeterminate code "Q" and a quantity is output.

(3) Functional Model

This decision node not having a dependency input/output starts the execution of the decision at the point of time when the data input is given. Namely, the start of execution does not depend upon the result of execution of another decision node not having a dependency input/output. When a clear conclusion can be drawn from the given input data, the result is output. On the other hand, when a decision node not having a dependency input/output cannot render a clear decision from the given input, it outputs the indeterminate code "Q".

Illustrating the relationship between a "decision node not having a dependency input/output" and a "decision node having a dependency input/output", the result becomes as shown in FIG. 5B. As shown in the figure, a "decision node not having a dependency input/output" has the property that it can contain a "decision node having a dependency input/output". By utilizing this property, it is possible to create a "decision node not having a dependency input/output" from a "decision node having a dependency input/output".

(4) Delay Model

It is assumed that a delay occurs during a term from when this decision node not having dependency input/output starts the execution to when it terminates the output of the working conclusion. The magnitude of this delay can be appropriately determined in accordance with the medium on which the structure is realized. Although it is allowed to make this sufficiently small, it is not allowed to bring this to 0.

2.2.2 Definition of "Higher Priority Determination Node"

(1) Apparent Feature

A higher priority determination node, as shown in FIG. 6A, is a unit of a function for realizing a "higher priority determination" having two inputs and one output. These two inputs are not equal. One is a higher significant bit input which becomes "H" in the figure, while the other is the lower significant bit input which becomes L in the figure.

(2) Inputs and Outputs

Two working conclusions are input. One of the two working conclusions is selected based on the "higher priority determination" and output as the working conclusion of the higher priority determination node.

(3) Functional Model

The execution is started at a point of time when the working conclusions are given to two inputs. One of the two working conclusions is selected as shown in FIG. 6B according to the "higher priority determination" and this is output.

(4) Delay Model

It is assumed that a delay occurs during a period from when two working conclusions are given to this higher priority determination node to when one correct working conclusion is derived. The magnitude of this delay can be suitably determined in accordance with the medium on which the structure is realized. Although it is allowed to make this sufficiently small, it is not allowed to make it 0.

(5) What is "Higher Priority Determination"

In a higher priority determination node, as shown in FIG. 6B, when the working conclusion input to the higher significant bit is other than the indeterminate code "Q", the code of the higher significant bit input is output. On the other hand, when the working conclusion input to the higher significant bit is the indeterminate code "Q", the code of the lower significant bit input is output. Such a selection and determination method will be referred to as "higher priority determination".

(6) Regarding Conversion of Code Expression

The expression of the input code and the output code do not necessarily always have to be the same. It is allowed to perform the conversion for compression/expansion of the code expression in accordance with need. Of course, it is not allowed to change the meaning possessed by the code.

For example, the conversion for "compression of the code expression" is carried out as follows. Namely, when there are only four types of input codes {1234, 5678, 9012, Q}, it is allowed to express them by using an expression of a smaller number of digits, for example, converting {1234, 5678, 9012, Q} to {1, 2, 0, Q}. Note that the condition is that no problem occurs in the rest of the process. For example, the original meanings expressed by the expressions must not be lost. (Namely, "1" means "1234", "2" means "5678", and "0" means "9012".)

2.2.3 Definition of "Indeterminate Code Binary Tree"

(1) Apparent Feature

Figure 7:
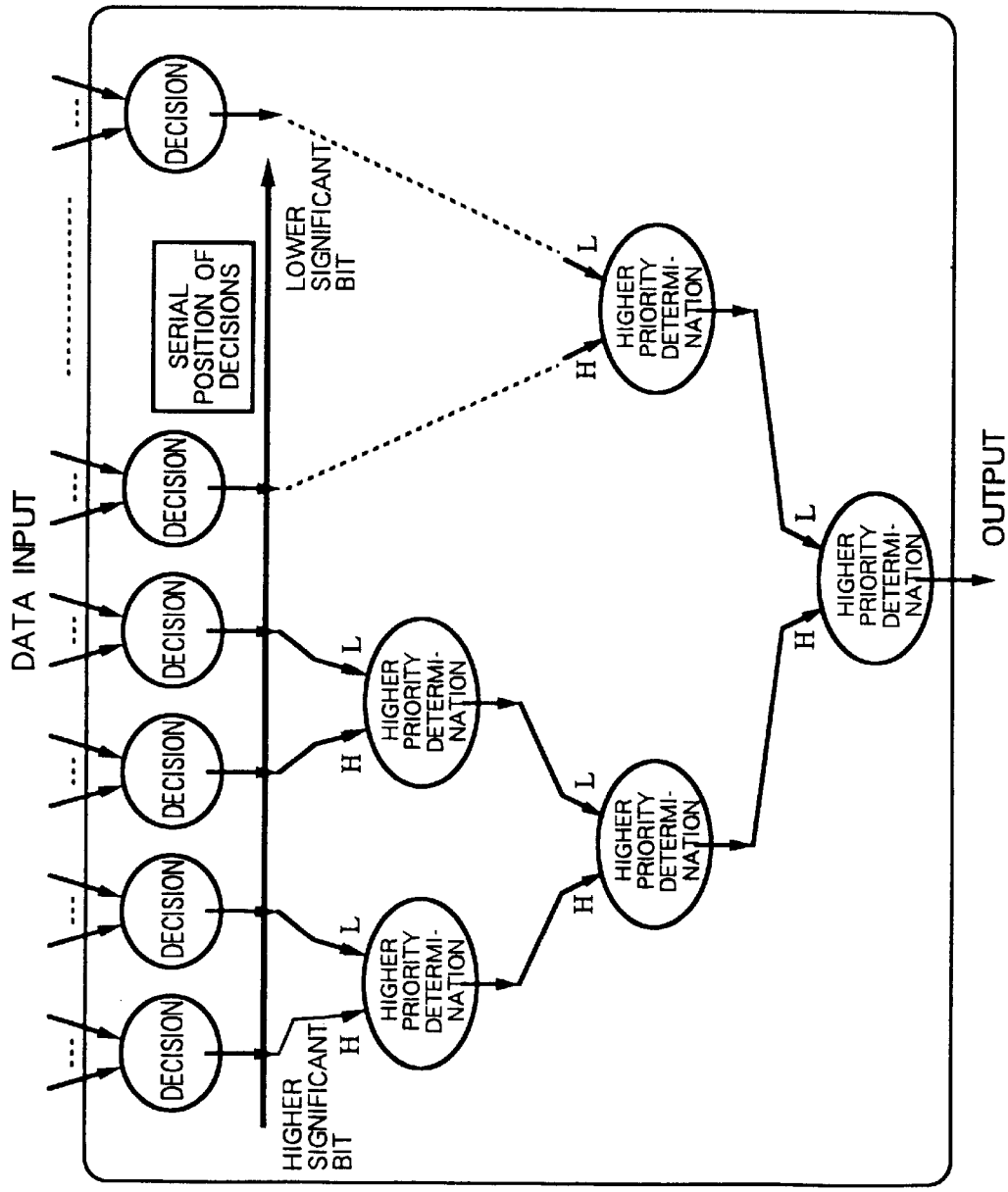
FIG. 7 is a conceptual explanatory view explaining the definition of an indeterminate code binary tree.

An indeterminate code binary tree, as shown in FIG. 7, is a binary tree that defines "decision nodes not having dependency input/outputs" as the leaves and defines the "higher priority determination node" as a constituent element. Particularly, when a high speed property is required, desirably the balanced binary tree model is used. There is a relative position and order relationship among decision nodes not having dependency input/outputs in the internal portion. In FIG. 7, the further to the left the decision node not having a dependency input/output, the higher the position. The position and order follow the orderly thought process.

(2) Inputs and Outputs

All of the data necessary for a decision are input, and one correct conclusion is output. The data input is a quantity expressed by any format. Further, the conclusion is also expressed by any format. A common one is a logical value such as (True/False/Unknown).

(3) Functional Model

At the point of time when the data input is given, all decision nodes not having dependency input/outputs start execution and perform the processing in parallel. After a certain delay, a working conclusion is generated at the output of each decision node not having a dependency input/output. The "higher priority determination node" gradually decreases the number of the working conclusions until finally the single correct conclusion is derived. The processing of the higher priority determination node at this time is carried out in parallel except a case of a slave relationship.

(4) Delay Model

The time required until an input is given to the structure of this indeterminate code binary tree and the final conclusion is obtained is proportional to the height of the tree of this indeterminate code binary tree structure. The "height of the tree" here means the maximum number of steps from an input stage decision node not having a dependency input/output (leaf) to the higher priority determination node of the final output (root).

2.2.4 Theorem of Correctness of Indeterminate Code Binary Tree

[Theorem 3]

The conclusion finally derived by the indeterminate code binary tree is correct.

[Proof]

One final conclusion is derived from the N number of working conclusions by the "higher priority determination node" comprised as a balanced binary tree. First, the correctness of this final conclusion will be proved. The prerequisite is that "all working conclusions existing at the first point of time are correct" and "the order and positional relationship existing among a plurality of working conclusions (derived from orderly thought process) is clear at the first point of time." This prerequisite is guaranteed by arranging correctly functioning decision nodes along the series positions of the inputs (for example, one lateral line).

i) When There is One Working Conclusion

There is no doubt that this single working conclusion is correct. If it is not correct, this means that there is an error in the generation of the working conclusions of the decision nodes not having dependency input/outputs which is contrary to the initial prerequisite.

ii) When There Are Two Working Conclusions

These two working conclusions are input to the higher priority determination node. As a result, one working conclusion is derived. The correctness of this single derived conclusion is proved by the principle of the higher priority determination. The principle of the higher priority determination is the alternative principle that "(a) where the working conclusion of the higher significant bit is clear, the working conclusion of the higher significant bit is adopted and (b) only in the case where a clear conclusion cannot be drawn at a higher significant bit due to the dependency of the higher significant bit upon the lower significant bit, that is, the case where working conclusion of the higher significant bit means 'indeterminate', the working conclusion of the lower significant bit is adopted." Originally, there is an order and positional relationship derived from the orderly thought process between two working conclusions. It is clear that the principle of higher priority determination maintains this order and positional relationship and leads to the correct conclusion.

iii) When the Number of Working Conclusions Is an Even Number of 2 or More (2n Number: N Is a Natural Number)

There is an order and positional relationship derived from the orderly thought process among 2N number of working conclusions. Here, all working conclusions are arranged in one lateral line from a higher significant bit toward a lower significant bit. By taking two working conclusions each from the higher significant bit, N number of pairs are formed. A higher priority determination node is given to each of the pairs and derives one conclusion from each pair. From ii), each derived conclusion is correct. All of them are still working conclusions. At this point of time, there are N number of working conclusions arranged in one lateral line. The order and positional relationship existing among the N number of working conclusions is explicitly stored by this order of arrangement.

iv) When the Number of Working Conclusions Is an Odd Number of 3 or More (2n+1 Number: N Is a Natural Number)

There is an order and positional relationship derived from the orderly thought process among (2N+1) number of working conclusions. Here, all working conclusions are arranged in order from a higher significant bit to a lower significant bit in one lateral line. By taking two working conclusions each from the higher significant bit, N number of pairs are formed. The one working conclusion at the least significant bit remains. A higher priority determination node is given to each of the pairs. One conclusion is drawn from each pair. The remaining working conclusion is led to the same level as those of these conclusions as it is. From ii), each derived conclusion is correct. All of them are still working conclusions. At this point of time, there are (N+1) number of working conclusions arranged in one lateral line. The order and positional relationship existing among the (N+1) number of working conclusions is explicitly stored by this order of arrangement.

v) When the Number of Working Conclusions Is Generally Natural Number (N)

There is an order and positional relationship derived from the orderly thought process among N number of working conclusions. Here, all working conclusions are arranged in order in one lateral line from a higher significant bit toward a lower significant bit. Here, iii) applies when N is an even number, and iv) is applied when N is an odd number. As a result, the number of working conclusions is decreased from N to N'=N/2, or from N to N'=(N+1)/2. Clearly, here, N' is a natural number. iii) is applied again when N' is an even number and iv) is applied again when N' is an odd number. The above operation is repeated until the number of the working conclusions becomes one. From i), the correctness of this single derived working conclusion serving as the final conclusion cannot be doubted. This is made the final conclusion.

Accordingly, by mathematical induction, it can be said that "the one conclusion derived from the N number of working conclusions by the higher priority determination nodes comprised as a balanced binary tree is correct." The model of the indeterminate code binary tree (arrangement of decision nodes not having dependency input/outputs and higher priority determination nodes) satisfies the prerequisite condition of this inductive proof. Therefore, the conclusion finally derived by the indeterminate code binary tree is correct. [Proof end]

2.2.5 Delay of Indeterminate Code Binary Tree

In the present specification, importance is attached to the delay (number of steps) until the indeterminate code binary tree structure issues a conclusion. The number of steps of the serial structure of decisions having an order dependency was in proportion to the number (N) of the decision nodes having dependency input/outputs, but the number of steps of the indeterminate code binary tree must be definitely smaller than this.

As explained in the third section, the number of steps of the indeterminate code binary tree is the height of the tree of this structure. In the case of a balanced binary tree, when the number of leaves (decision nodes not having dependency input/outputs) is N, the height is substantially equal to $\log_2 N$ and the heights of all leaves are substantially equal. Accordingly, from the following relationship:

$$N > \log_2 N \text{ (N is a natural number)}$$

it can be said that an indeterminate code binary tree (balanced binary tree) can reliably derive a conclusion with a smaller number of steps than a serial structure of decisions having an order dependency.

2.2.6 Procedure for Converting Serial Structure of Decisions Having an Order Dependency to Indeterminate Code Binary Tree (Principle of Conversion of Structure)

The procedure of converting a serial structure of decisions having an order dependency to an indeterminate code binary tree, that is, the principle of conversion of structure, is realized by the following method.

Step SPC1. The decision nodes not having dependency input/outputs are formed based on the decision nodes having dependency input/outputs. As shown in FIG. 5B, a "decision node not having a dependency input/output" contains a "decision node having a dependency input/output". Accordingly, by the operations of:

(i) always inputting "valid" to the dependency input and
(ii) attaching an indeterminate code generator to the dependency output, a decision node not having a dependency input/output can be formed.

Step SPC2. A binary tree defining decision nodes not having dependency input/outputs as leaves and defining higher priority determination nodes as elements of the binary tree is configured as shown in FIG. 7. At this time, the decision nodes not having dependency input/outputs are arranged and the higher priority determination nodes are connected while paying attention so that the relationship of the serial position of the inputs and the positions of the working conclusions is correctly maintained.

2.2.7 Theorem of Identity of Principle of Conversion of Structure

[Theorem 4]

The serial structure of decisions having an order dependency and the indeterminate code binary tree using the principle of conversion of structure based on this always output the same final conclusion if the same input is given.

[Proof]

From theorem 2, it is clear that the output of the "serial structure of decisions having an order dependency" is the correct conclusion based on an orderly thought process, and from theorem 3, it is clear also that the output of the "indeterminate code binary tree" is the correct conclusion.

The decision carried out first in the "indeterminate code binary tree" (decision node not having a dependency input/output) contains the decision of a "serial structure of decisions having an order dependency" (decision node having a dependency input/output) as shown in FIG. 5B. When a "decision node not having a dependency input/output" outputs a clear conclusion (other than the indeterminate code "Q"), the conclusion is the conclusion of the "decision node having a dependency input/output" itself in the internal portion.

Accordingly, when the same inputs are given to the two "serial structure of decisions having an order dependency" and "indeterminate code binary tree"), the two respectively output conclusions based on the same decisions. There is only one correct conclusion. Both of the conclusions are correct. Therefore, the conclusions output by the two are identical. [Proof end]

2.2.8 Exception Provision of Least Significant Bit Decision Node

As shown in FIG. 2B, the decision node having a dependency input/output located at the least significant bit of the serial structure of decisions having an order dependency does not have a dependency with respect to the lower significant bits and does not have a dependency output. When the decision node having a dependency input/output of the least significant bit is converted to a decision node not having a dependency input/output according to the principle of conversion of structure, the decision node not having a dependency input/output does not output the indeterminate code "Q". Namely, this is because, as shown in FIG. 5B, the indeterminate code "Q" is output when the dependency output becomes valid in the internal portion. Accordingly, there is also a decision node not having a dependency input/output which does not output such an indeterminate code "Q".

In the definition of a "decision node not having a dependency input/output" of 2.2.1, it was stated that the feature is that a decision node not having a dependency input/output outputs an indeterminate code "Q". Here, the exception provision that "only for the decision node not having a dependency input/output of the least significant bit is a case where the indeterminate code "Q" is not output allowed" is provided.

The higher priority determination nodes to which such the decision node not having a dependency input/output of the least significant bit and the usual decision node not having a dependency input/output are connected do not output the indeterminate code "Q". This is clear from the principle of higher priority determination. Only in the case where the higher significant bit input is the indeterminate code "Q" is the code of the lower significant bit input output. Further, at that time, only in the case where the lower significant bit input is the indeterminate code "Q" is the indeterminate code "Q" is output. In the current case, the decision node not having a dependency input/output of the least significant bit does not output an indeterminate code "Q". Accordingly, also the higher priority determination node does not output the indeterminate code "Q".

If utilizing this property, the number of types of the codes to be output is decreased by one. Accordingly, the optimum logical circuit having a smaller number of transistors can be derived by using the "conversion of code expression" explained in 2.2.2. Incidentally, it is not necessary to consider the case where a decision node not having a dependency input/output which is not the least significant bit does not output the indeterminate code "Q". This is because the existence of all decision nodes not having dependency input/outputs located lower than decision nodes not having dependency input/outputs not outputting the indeterminate code "Q" becomes meaningless.

[3] Application of Indeterminate Code Binary Tree to Binary Logical Circuit 3.1 Priority Encoder Using Indeterminate Code Binary Tree

[First Embodiment]

The serial structure of decisions having an order dependency in the conventional priority encoder explained in 1.2 is converted to an indeterminate code binary tree according to the principle of conversion of structure explained in 2.2.6. Here, the priority encoding function handled in the first embodiment outputs the position of the bit which is first "1" in the direction from the most significant bit to the least significant bit as a binary number for an n-bit binary data input.

The serial structure of decisions having an order dependency in a conventional priority encoder (for example, 8-bit input and 4-bit output) is the serial structure shown in FIG. 1. A decision node having a dependency input/output shown in FIG. 1 has a 1-bit data input and dependency input by itself and starts the execution of a decision when both of the data input and the dependency input become valid. The details of the execution of the decision are as follows:

Case of data input=1
Data output=predetermined number, dependency output= "invalid"
Case of data input=0
Data output=invalid, dependency output="valid"

Figure 8:
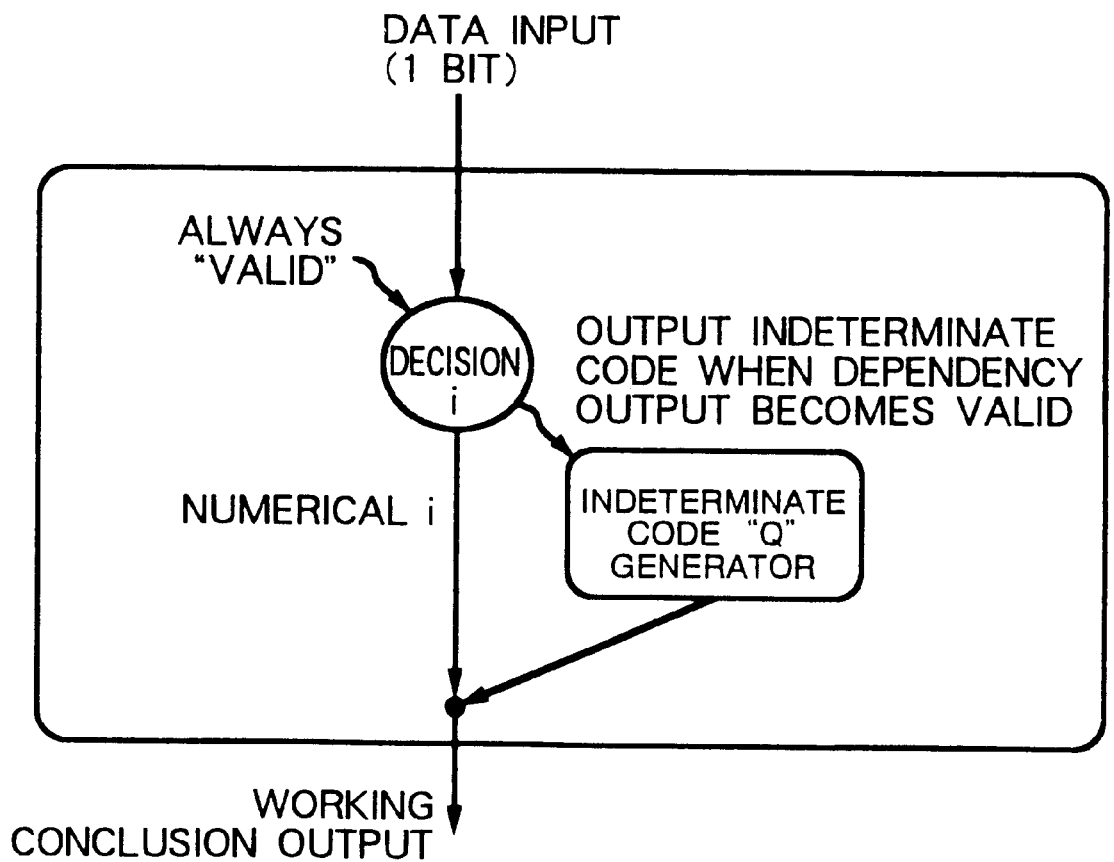
FIG. 8 is a conceptual explanatory view explaining a decision node not having a dependency input/output containing a decision node having a dependency input/output in the priority encoder.

The procedure for converting a "decision node having a dependency input/output" to a "decision node not having a dependency input/output" in the principle of conversion of structure is applied to obtain a decision node not having a dependency input/output as shown in FIG. 8.

Figure 9:
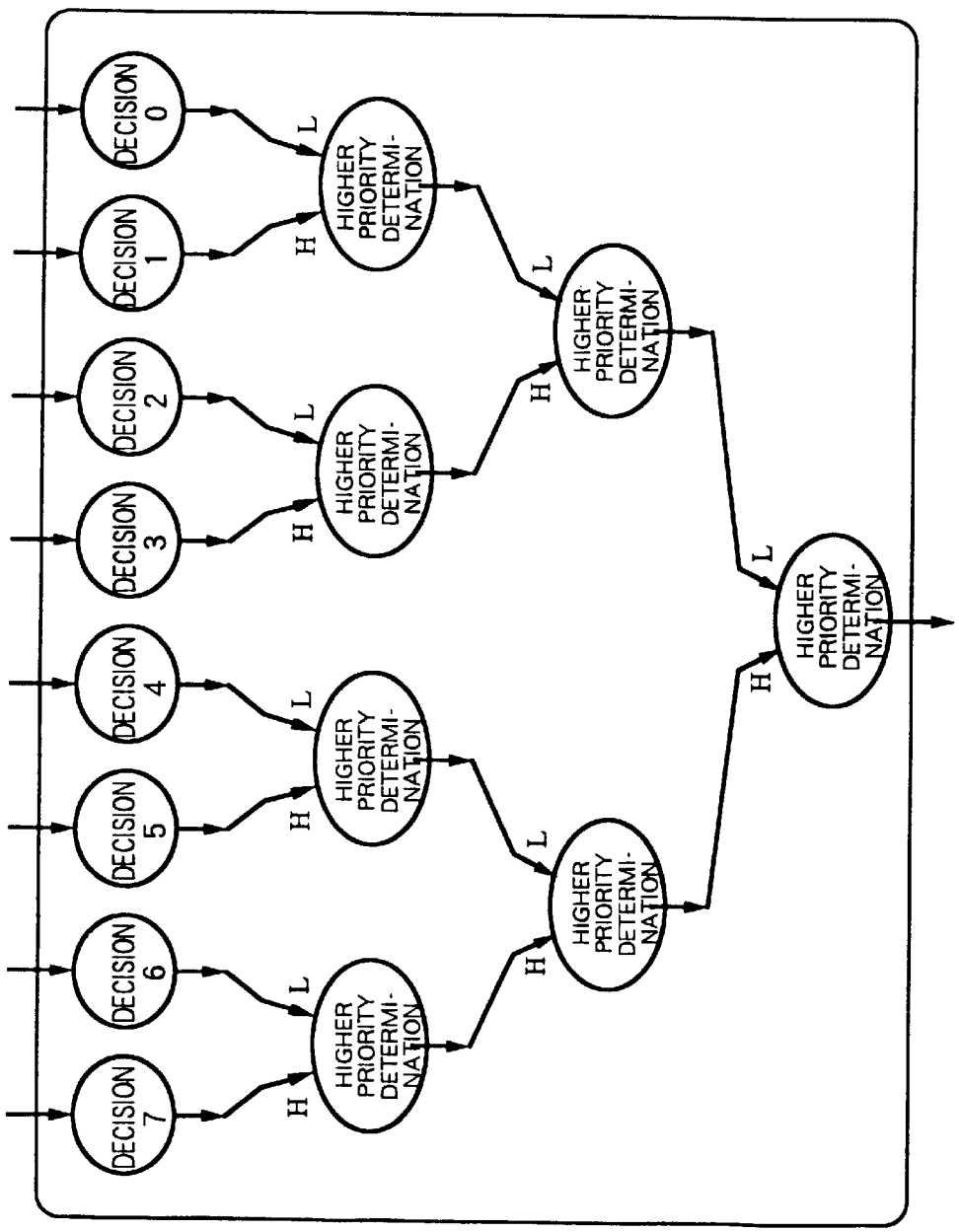
FIG. 9 is a conceptual explanatory view explaining an indeterminate code binary tree for realizing a priority encoder.

A balanced binary tree defining the obtained decision nodes not having dependency input/outputs as leaves and defining higher priority determination nodes as elements is configured as shown in FIG. 9. The structure shown in the figure is an indeterminate code binary tree for realizing a priority encoder.

By replacing each of the nodes of this binary tree by a logical circuit, the logical circuit of a priority encoder can be obtained. In order to derive the logical circuit, it is necessary to convert the code of the quantity and the indeterminate code "Q" to suitable binary codes. Particularly, it is important what kind of binary code is assigned to the indeterminate code "Q". This greatly influences the format of the logical circuit, the number of gates, and the signal propagation delay. The binary code assignment of the 8-bit input and 4-bit output priority encoder handled in the present embodiment is shown in FIG. 10A.

When the assignment of the binary code is determined, truth tables of the decision nodes not having dependency input/outputs and the higher priority determination nodes are found as shown in FIGS. 10B and 10C. Then, finally, the logical circuits of the decision nodes not having dependency input/outputs and the higher priority determination nodes are derived from these truth tables as shown in FIG. 11.

Figure 11:
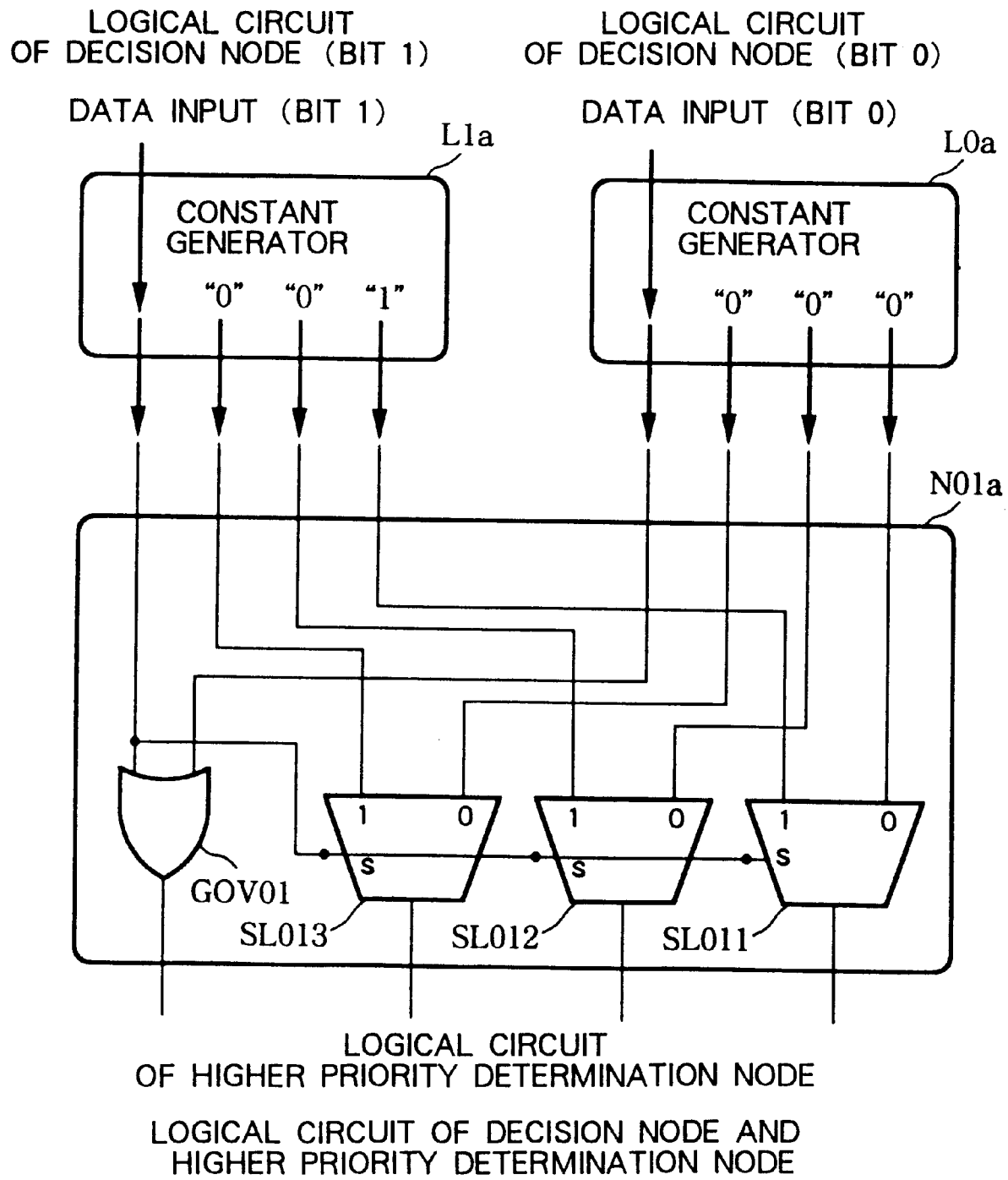
FIG. 11 is a logical circuit diagram of an indeterminate code binary tree using the decision nodes and the higher priority determination nodes of the priority encoder according to a first embodiment of the present invention.

The circuit diagram shown in FIG. 11 is part of the priority encoder and is a circuit diagram including a decision node L0$a$ corresponding to the bit "0", a decision node L1$a$ corresponding to the bit "1", and a higher priority determination node N01$a$ receiving as its inputs the outputs of the decision nodes L0$a$ and L1$a$. Also the logical circuits of the decision nodes corresponding to the other bits can be similarly configured according to the truth table shown in FIG. 10B. The same configuration as that of the higher priority determination node N01$a$ shown in FIG. 11 is used for all of the logical circuits of the higher priority determination nodes which serve as the other nodes of the indeterminate code binary tree. When the logical circuits of the decision nodes and the higher priority determination nodes obtained in this way are combined as in FIG. 9, the logical circuit of an 8-bit input and 4-bit output priority encoder is completed.

3.2 Logical Configuration of Optimum Priority Encoder

The logical circuit of the priority encoder (refer to FIG. 11) shown in 3.1 (priority encoder using indeterminate code binary tree) operates correctly, but there are still many redundant parts and the number of gates is too large. The cause of this resides in the fact that the indeterminate code binary tree of this circuit consistently uses a common code system (binary code assignment of FIG. 10A) from the decision nodes not having dependency input/outputs up to the final higher priority determination node.

It is allowed to change the method of expression of the code in each level from the definition of the higher priority determination node of 2.2.2. Accordingly, it is possible to use the binary code assignment advantageous at each level. Here, the process for deriving the optimum logical circuit for use in an integrated circuit by performing logical compression of a binary code for every level is shown.

First, take note of FIG. 11. There are three binary codes input to the higher priority determination node N01$a$ in the figure: "1001" ("valid" and numeral "1"), "1000" ("valid" and numeral "0"), and "0***" ("invalid"). Both of the second bit and the first bit are "00" no matter which of "1" and "0" is selected, therefore the selectors SL013 and SL012 relating to this part can be removed. It is sufficient to add the common "00" in the higher priority determination node N01$a$; It is not necessary to generate this in the decision nodes L0$a$ and L1$a$. Accordingly, both of the decision nodes L0$a$ and L1$a$ and the higher priority determination node N01$a$ are simplified and the configuration of FIG. 12 in which they are replaced by the decision nodes L0$b$ and L1$b$ and the higher priority determination node N01$b$ is obtained.

Figure 12:
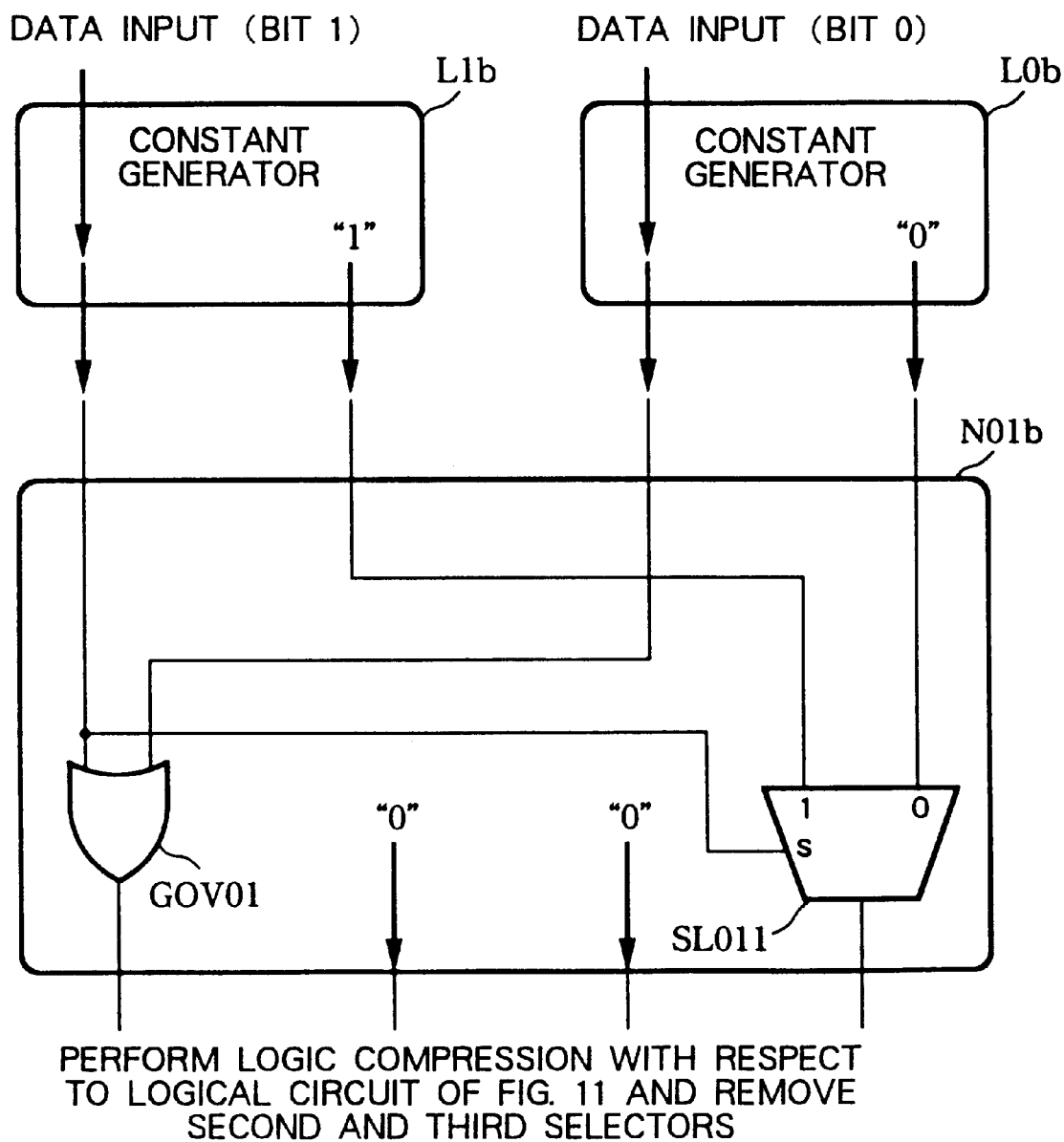
FIG. 12 is an explanatory view of the process of logic-compression and optimization of the indeterminate code binary tree logical circuit diagram of the priority encoder of the first embodiment (first)
Figure 13:
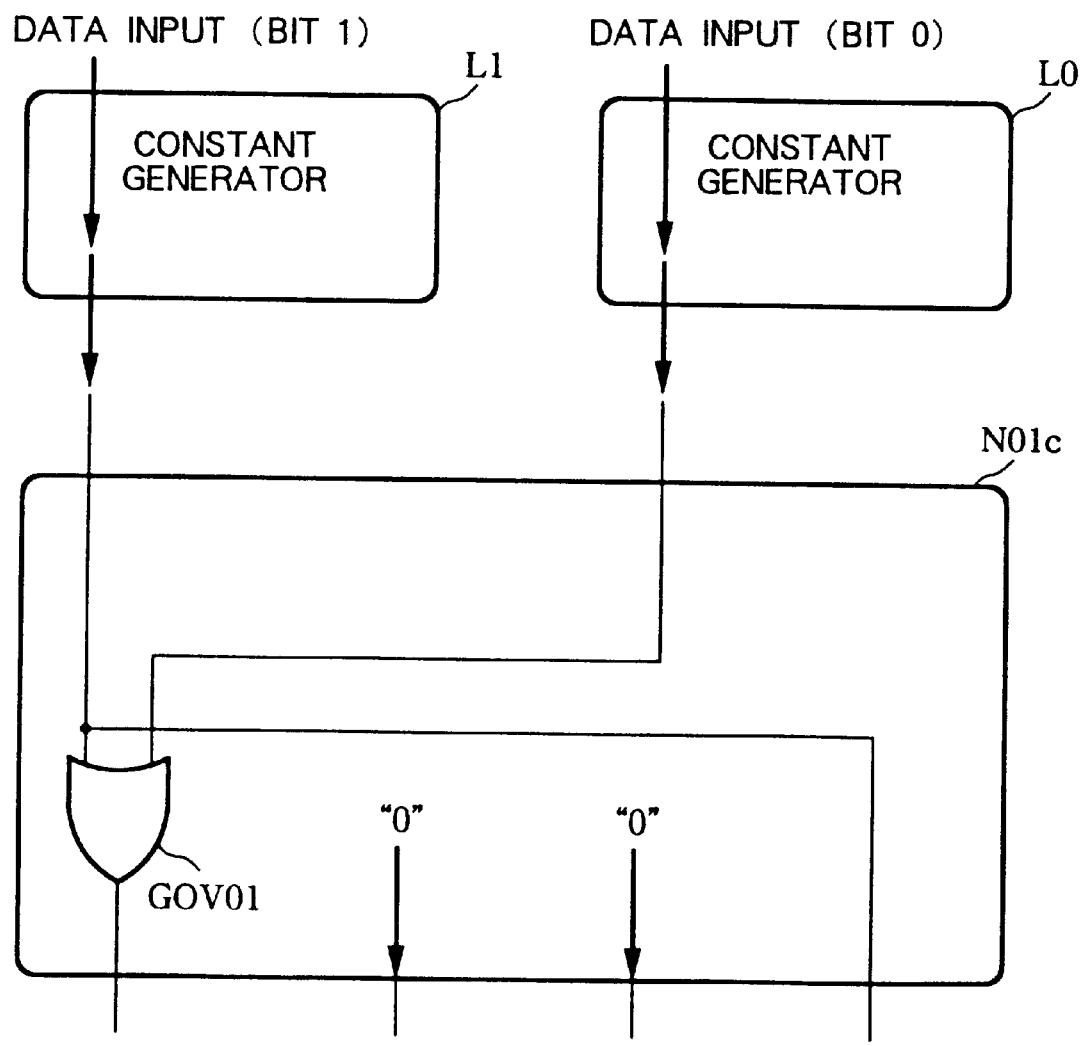
FIG. 13 is an explanatory view of the process of logic-compression and optimization of the indeterminate code binary tree logical circuit diagram of the priority encoder of the first embodiment (second)

Further, in the configuration of FIG. 12, taking note of the point that in the data input of the selector SL011 in the higher priority determination node N0$b$, the left 1-input is fixed to "1" and the right 0-input is fixed to "0", respectively, the selector SL011 is removed to simplify the configuration so that the selection signal of the selector SL011 is allow to pass through as it is. As a result, a very simple circuit configuration as in FIG. 13 in it is replaced by the decision nodes L0 and L1 and the higher priority determination node N01c is obtained.

Figure 14:
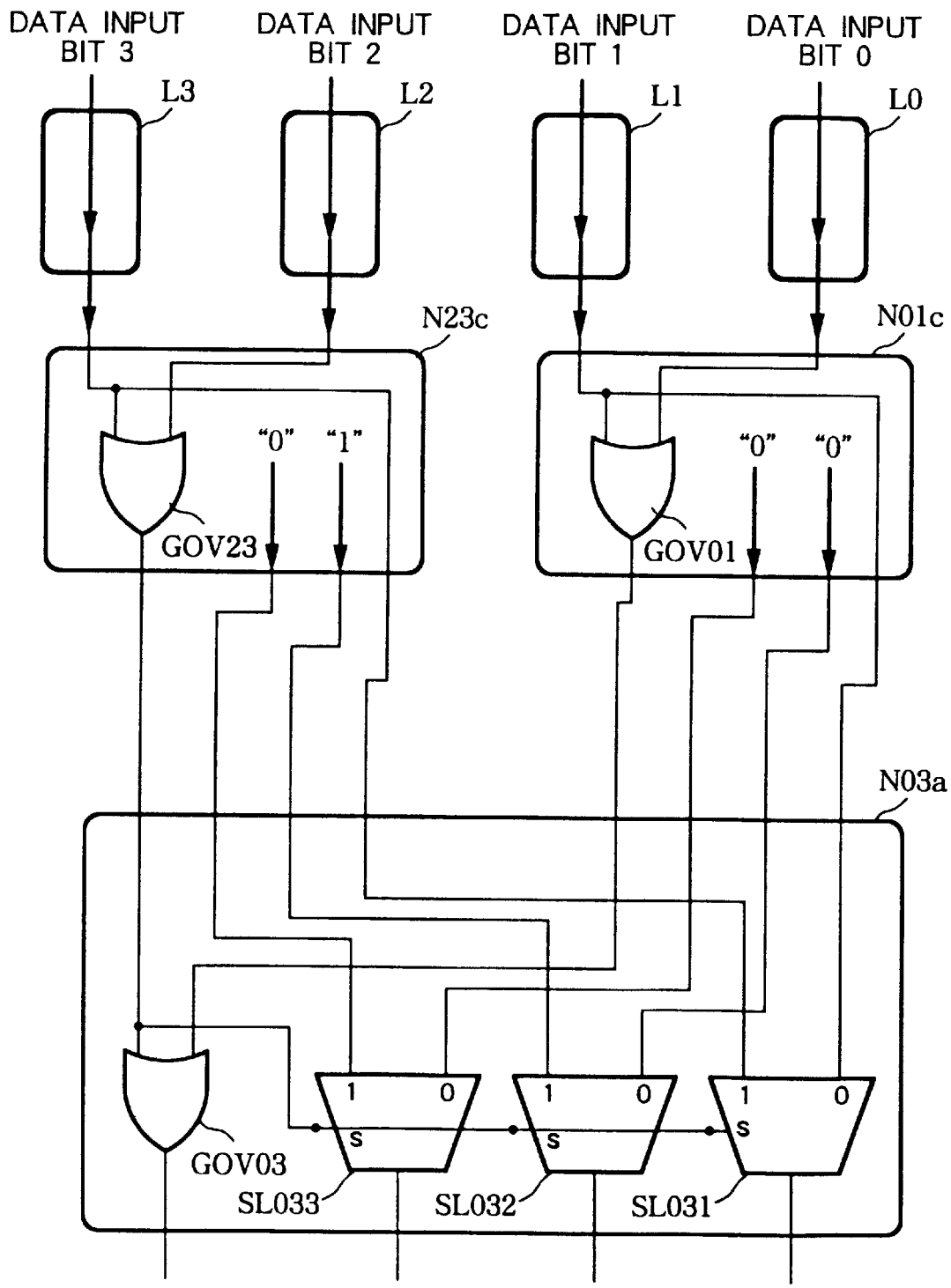
FIG. 14 is an explanatory view of the process of logic-compression and optimization of the indeterminate code binary tree logical circuit diagram of the priority encoder of the first embodiment (third)

The above concept is also applied to the circuits of the latter stages, that is, the configuration using the decision nodes L0 and L1 corresponding to the bit 0 and bit 1 of the data input and the higher priority determination node N0c, the configuration using the decision nodes L2 and L3 corresponding to the bit 2 and bit 3 of the data input and the higher priority determination node N23c equivalent to this configuration, and the circuit configuration containing the higher priority determination node N03a (refer to FIG. 14). Note that the configuration of FIG. 14 is the configuration of a 4-bit input priority encoder.

Figure 15:
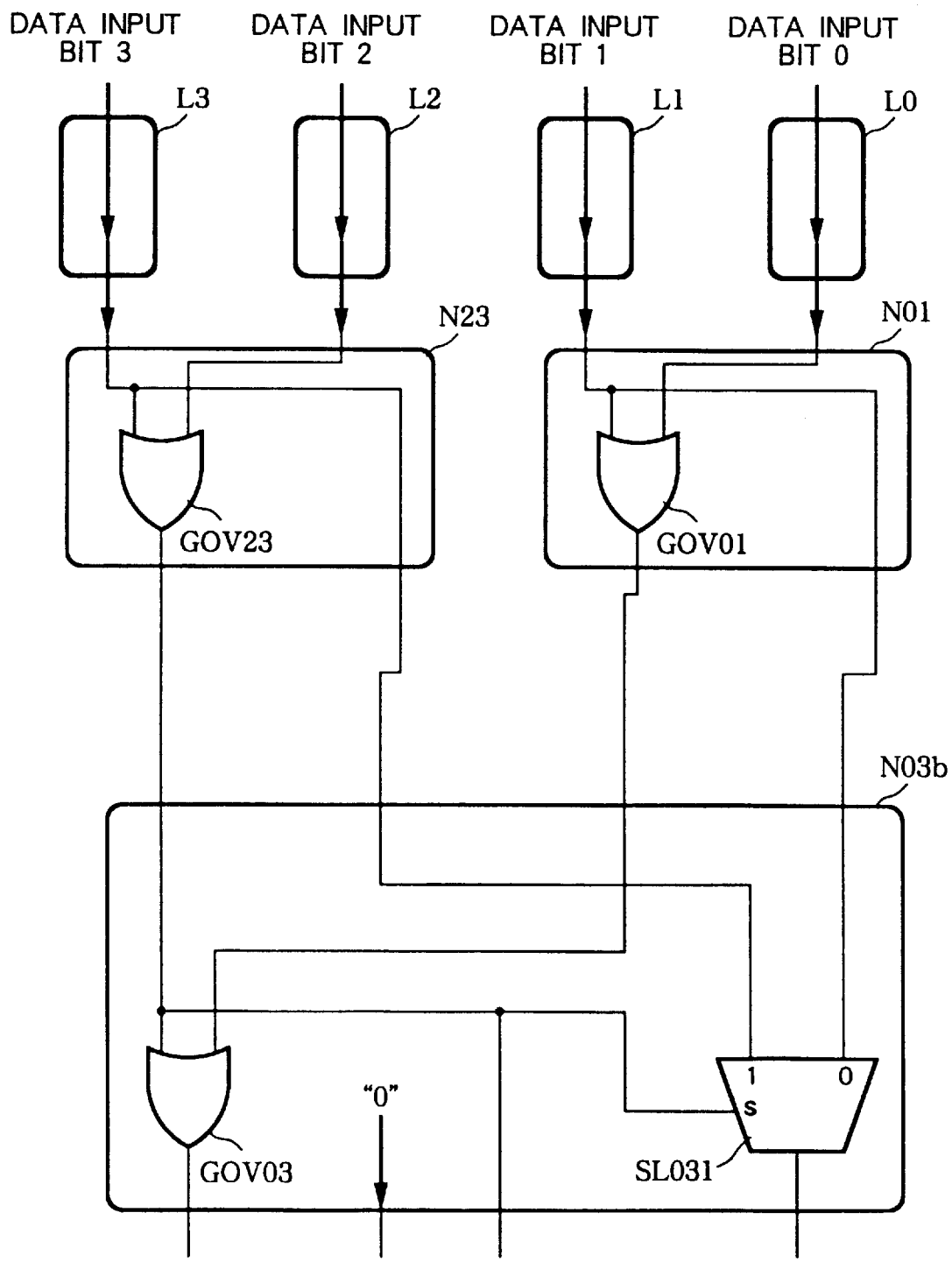
FIG. 15 is an explanatory view of the process of logic-compression and optimization of the indeterminate code binary tree logical circuit diagram of the priority encoder of the first embodiment (fourth)

In the configuration of FIG. 14, the higher priority determination node N03a respectively receives "1011" ("valid" and numeral "3"), "1010" ("valid" and numeral "2"), and "0*" ("invalid") as the inputs on the higher significant bit side and "1001"("valid" and numeral "1"), "1000" ("valid" and numeral "0"), and "0*" ("invalid") as the inputs on the lower significant bit side. Here, no matter which of "3", "2", "1", and "0" is selected, the second bits are commonly "0", therefore the selector SL033 in which the second bit is reflected can be removed. Further, since the selector SL032 at which the first bit is reflected has the left 1-input fixed to "1" and the right 0-input is fixed to "0", it is possible to remove the selector SL032 so as to simplify the structure so as to allow the selection signal of the selector SL032 to pass through as it is. As a result, a simple circuit configuration as in FIG. 15 in which it is replaced by the decision nodes L0, L1, L2, and L3 and the higher priority determination nodes N01, N23, and N03b is obtained.

When configuring the 8-bit input priority encoder by using the circuit shown above, the configuration shown in FIG. 16 is exhibited. Namely, FIG. 16 shows a circuit configuration containing a configuration using the decision nodes L0 to L3 corresponding to the bit 0 to the bit 3 of the data input and higher priority determination nodes N01, N23, and N03b, a configuration using the decision nodes L4 to L7 corresponding to the bit 4 to the bit 7 of the data input and higher priority determination nodes N45, N67, and N47b equivalent to this configuration, and the higher priority determination node N07a.

Figure 16:
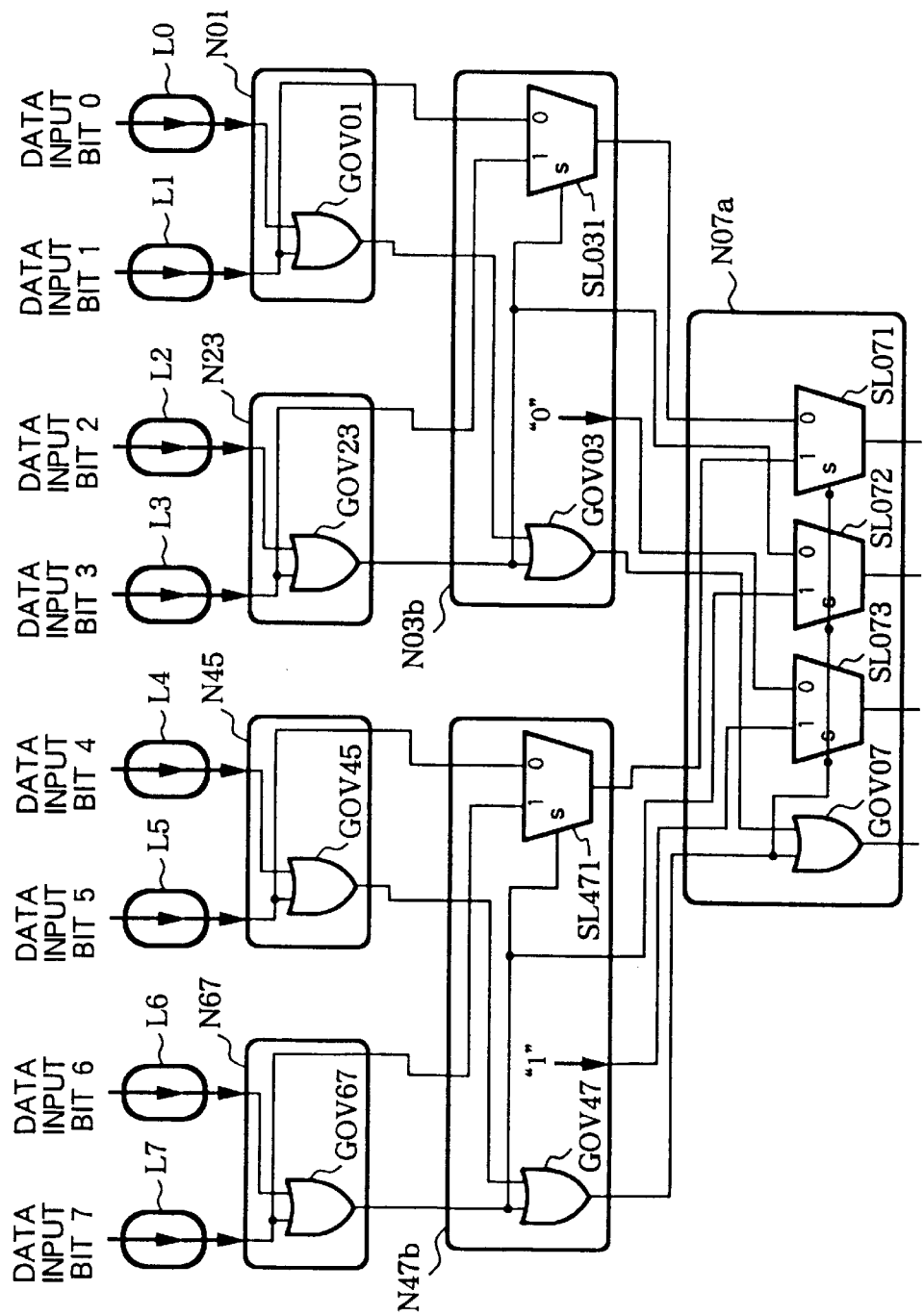
FIG. 16 is an explanatory view of the process of logic-compression and optimization of the indeterminate code binary tree logical circuit diagram of the priority encoder of the first embodiment (fifth)

In the configuration of FIG. 16, the selector SL073 at which the second bit in the higher priority determination node N07a is reflected has a left 1-input which is fixed to "1" and a right 0-input thereof which is fixed to "0", respectively, therefore it is possible to remove the selector SL073 so as to simplify the configuration so that the selection signal of the selector SL073 is made to pass through as it is. As a result, a logical circuit of an optimum 8-bit input priority encoder of a very simple final circuit configuration as shown in FIG. 17 in which it is replaced by the decision nodes L0 to L7 and the higher priority determination nodes N01, N23, N45, N67, N03, N47, and N07 is derived.

Figure 17:
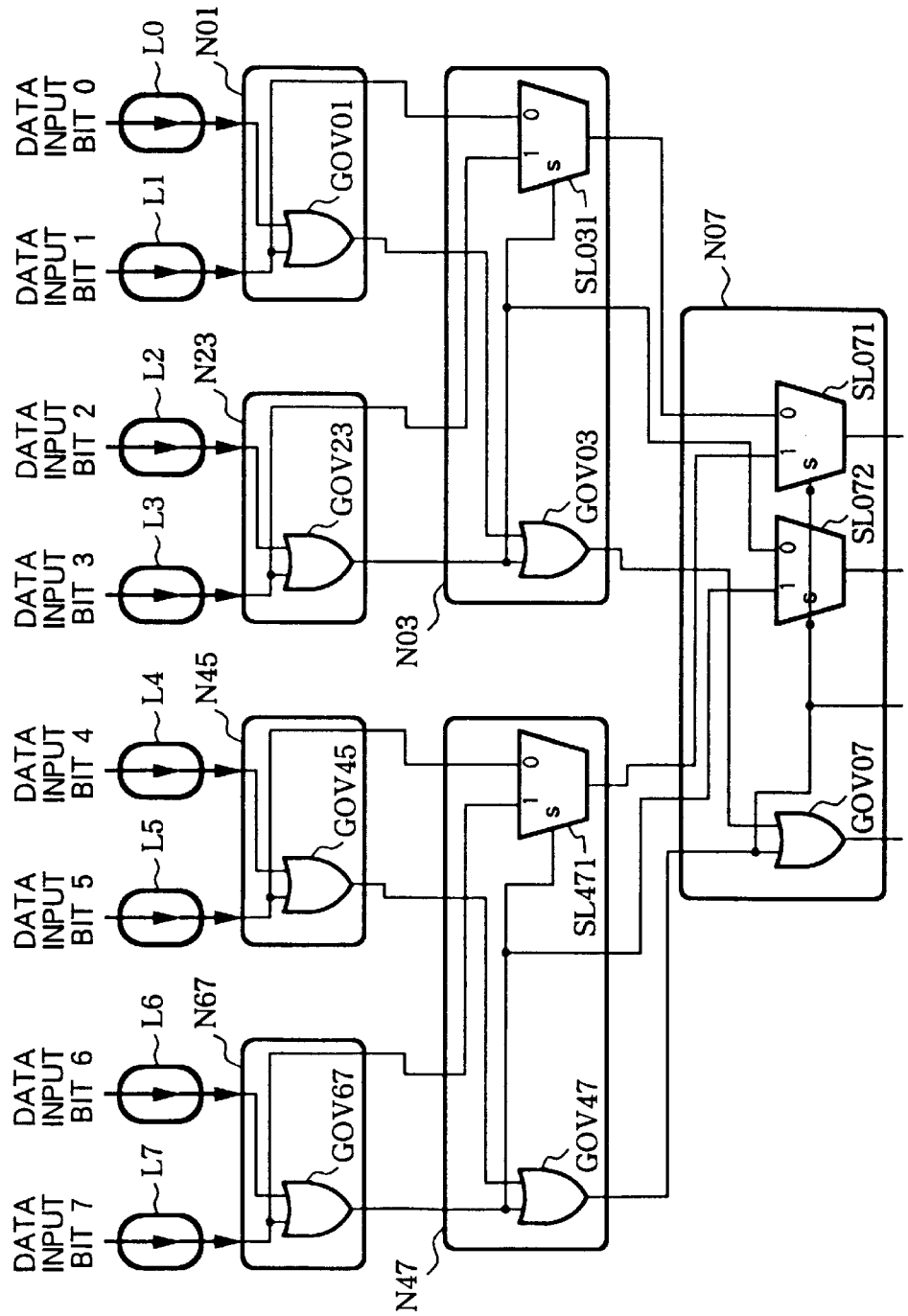
FIG. 17 is a logical circuit diagram finally obtained by the compression and optimization of the indeterminate code binary tree logical circuit of the priority encoder of the first embodiment.

In FIG. 17, the configuration of an n-(n=8) bit input priority encoder is realized by creating a model by a balanced binary tree of the height m (m=3) using higher priority determination nodes as constituent elements. The binary tree is comprised by respectively providing Nm (Nm=4) number of nodes of the depth 3 and Ns (Ns=2, 1) number of nodes of the depth s (s=1, 2). The pm-th (pm=1 to 4) node from the least significant bit of the depth 3 of the binary tree is configured by providing an OR gate circuit receiving as its zero-th bit input and the first bit input the (2×pm−2)-th bit signal line and (2×pm−1)-th bit signal line of the data input, taking the OR logic of the zero-th bit input and the first bit input, and outputting the result as the first bit output and a connection line for outputting the first bit input as the zero-th bit output; the ps-th (ps=1 to Ns; Ns=2,1) node from the least significant bit of the depth s (s=1,2) of the binary tree is configured by providing an OR gate circuit receiving the zero-th bit output to the (m−s)-th bit output of the (2×ps−1)-th node of the depth (s+1) of the binary tree as the zero-th bit input to the (m−s)-th bit input of the lower significant bits, receiving the zero-th bit output to the (m−s)-th bit output of the (2×ps)-th node of the depth (s+1) of the binary tree as the higher significant zero-th bit input to the (m−s)-th bit input, respectively, taking the OR logic of the (m−s)-th bit input of the lower significant bit and the (m−s)-th bit input of the higher significant bit, and outputting the result as the (m−s+1)-th bit output, a connection line for outputting the (m−s)-th bit input of the higher significant bit as the (m−s)-th bit output, and (m−s+1) number of selectors; and the q-th (q=1 to m−s+1) selector from the least significant bit receives as its selection input the higher significant (m−s)-th bit, selects the higher significant (q−1)-th bit input when the selection input is "1", selects the lower significant (q−1)-th bit input when the selection input is "0", respectively, and outputs the same as the (q−1)-th bit output.

Note that, in actuality, when it is realized by a static CMOS logic, there also exists a case where sign optimization is further carried out with respect to the configuration of FIG. 17. Here, the term "sign optimization" is the method of converting a structure in which logical circuits of positive logic inputs and positive logic outputs (here, the higher priority determination nodes) are cascade-connected in multiple stages to a structure in which stages of the positive logic input and negative logic output (PN stages) and stages of the negative logic input and positive logic output (NP stages) are alternately cascade-connected. By using this method of sign optimization, redundant transistors can be reduced and the number of transistors and operation speed can be improved.

[Second Embodiment]

Figure 18:
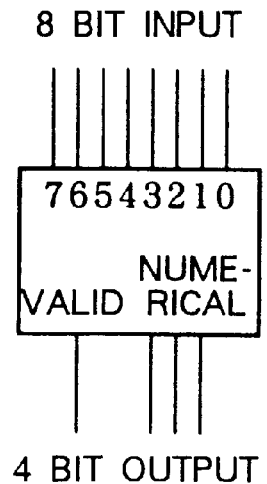
FIG. 18 is a truth table of an 8-bit input and 4-bit output priority encoder for counting the amount of bit shift according to a second embodiment of the present invention.

Next, FIG. 18 shows a truth table of a priority encoder where, as the priority encoding function, the number of continuous "0's" in the direction from the most significant bit to the least significant bit are output as a binary number with respect to an 8-bit binary data input.

One of the applications of this priority encoding function is that of a priority encoder for counting the shift of the bits used for example for the normalization of floating decimal operations. For this, for example, in addition in floating decimal operations, when the codes of two operands are reverse and these values are close, a so-called "digit drop" where "0's" are arranged at the head of the result of addition occurs, therefore the procedure of counting the number of "0's" arranged at the head, shifting the mantissa portion to the left based on this number, and, at the same time, subtracting that number from the index portion becomes necessary. Namely, a bit shift count use priority encoder for counting the number of "0's" arranged from the head of the bit train becomes necessary.

Figure 19:
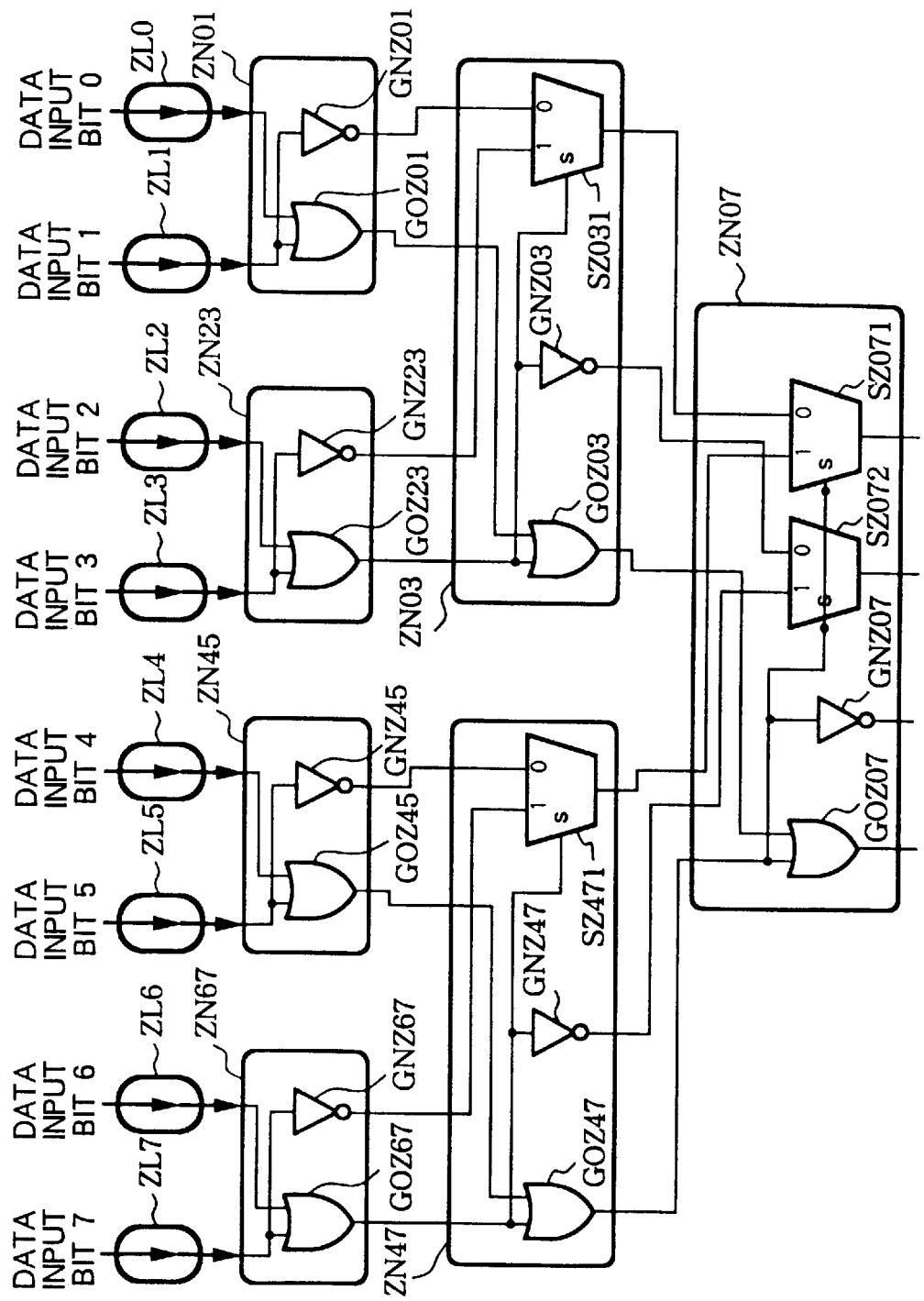
FIG. 19 is a view of the configuration of a priority encoder for counting the amount of bit shift of the second embodiment.

FIG. 19 is a view of the configuration of the bit shift count use priority encoder according to the second embodiment of the present invention. The configuration of the figure is the result, in the same way as the first embodiment, of determining the binary code assignment with respect to the truth table of FIG. 18, finding the truth table of the decision node not having a dependency input/output and the higher priority determination node, deriving the logical circuit of a decision node not having a dependency input/output and the higher priority determination node, then further performing logical compression.

In FIG. 19, the configuration of the priority encoder for an n (n=8)-bit binary input is realized by creating a model by a binary tree of a height m (m=3). The binary tree is respectively provided with Nm (Nm=4) number of nodes of the depth m and Ns (Ns=2, 1) number of nodes of the depth s (s=1, 2). The pm-th (pm=1 to 4) node from the least significant bit of the depth 3 of binary tree is provided with an OR gate circuit receiving as its zero-th bit input and the first bit input the (2×pm−2)-th bit signal line and (2×pm−1)-th bit signal line of the data input, taking the OR logic of the zero-th bit input and the first bit input, and outputting the result as the first bit output and a negative logic gate circuit for taking the negative logic of the first bit input and outputting the result as the zero-th bit output; the ps-th (ps=1 to Ns; Ns=2, 1) node from the least significant bit of the depth s (s=1, 2) of the binary tree is provided with an OR gate circuit receiving the zero-th bit output to the (m−s)-th bit output of the (2×ps−1)-th node of the depth (s+1) of the binary tree as the zero-th bit input to the (m−s)-th bit input of the lower significant bits, receiving the zero-th bit output to the (m−s)-th bit output of the (2×ps)-th node of the depth (s+1) of the binary tree as the higher significant zero-th bit input to the (m−s)-th bit input, respectively, taking the OR logic of the (m−s)-th bit input of the lower significant bit and the (m−s)-th bit input of the higher significant bit, and outputting the result as the (m−s+1)-th bit output, a negative logic gate circuit for taking the negative logic of the (m−s)-th bit input of the higher significant bit, and outputting the result as the (m−s)-th bit output and (m−s+1) number of selectors; and the q-th (q=1 to m−s+1) selector from the least significant bit receives as its selection input the higher significant (m−s)-th bit, selects the higher significant (q−1)-th bit input when the selection input is "1", selects the lower significant (q−1)-th bit input when the selection input is "0", respectively, and outputs the same as the (q−1)-th bit output. Note that, in actuality, when it is realized by a static CMOS logic, there also exists a case where sign optimization is further carried out with respect to the configuration of FIG. 19.

3.3 Effect of Application of Indeterminate Code Binary Tree to Binary Logic Circuit As the effects of application of an indeterminate code binary tree to a binary logic circuit, first of all, there is the effect due to the definition of the "serial structure of decisions having an order dependency". In order to convert sequential logical circuits having the property that the signal propagation delay time is proportional to the bit width of input to binary tree form high speed logical circuits, first, it is necessary to find the "serial structure of decisions having an order dependency" existing in the sequential logical circuits. According to the definition of a "serial structure of decisions having an order dependency", it becomes possible for the designer of a logical circuit to find "decision nodes having dependency input/outputs" in sequential logical circuits.

Second, there is the effect due to the definition of an "indeterminate code binary tree" itself and the definitions of the constituent elements of the binary tree, that is, a "decision node not having a dependency input/output" and a "higher priority determination node". The indeterminate code binary tree has a height which is proportional to the logarithm ($\log_2 N$) of the number N of the decision nodes. By applying the indeterminate code binary tree structure to a logical circuit, an operation unit which reliably operates at a higher speed than sequential logical circuits can be realized. Further, by the definition of a "decision node not having a dependency input/output" and a "higher priority determination node", the designer of a logical circuit can derive the logical circuits of the decision nodes and the higher priority determination nodes and correctly combine them and realize a high speed binary tree for logical circuit.

Third, there is a method of converting a "serial structure of decisions having an order dependency" to an "indeterminate code binary tree", that is, the "principle of conversion of structure". The logical circuit created based on an orderly thought process by the designer of a logical circuit is often a "serial structure of decisions having an order dependency". This logical circuit has the problem that the signal propagation delay is proportional to the number of bits of the input, so the speed is low. Contrary to this, a logical circuit formed by the structure of an "indeterminate code binary tree" has the advantage that the signal propagation delay is proportional to the logarithm of the number of bits of the input and the speed is high. By the "principle of conversion of structure", the designer of a logical circuit becomes able to convert a low speed "serial structure of decisions having an order dependency" to a high speed "indeterminate code binary tree".

Fourth, there is the effect due to the indeterminate code binary tree having the function of a priority encoder derived from the principle of conversion of structure. The conventional priority encoder had a serial structure of decisions having an order dependency and therefore had the defect of a low speed, but the priority encoder according to the present invention operates at a high speed since it is formed by an indeterminate code binary tree. An indeterminate code binary tree having the function of a priority encoder is not a concrete logical circuit, but an abstract structure. Accordingly, it is also possible to apply this to the objects for realization other than a logical circuit (machines (configurations of array processors), computer programs, etc.) For example, where this structure is realized as the program of a parallel computer, this becomes a high speed arbitration program.

Fifth, there is the effect due to the logical circuit of a high speed priority encoder using an indeterminate code binary tree. In the logical circuit of a conventional priority encoder, the signal propagation delay is proportional to the number of bits of the input, therefore high speed operation is impossible in the case of multiple input bits. In the logical circuit of a priority encoder of the present invention, the signal propagation delay is proportional to the logarithm of the number of bits of the input, therefore high speed operation is possible also with multiple input bits.

Further, when comparing the configuration of an 8-bit priority encoder realized by creating a model by a binary tree of the height m=3 in Japanese Unexamined Patent Publication (Kokai) No. 8-147142 explained with reference to the prior art (refer to FIG. 22) and the configuration of the 8-bit priority encoder realized by creating a model by a binary tree of the height m=3 according to the second embodiment (refer to FIG. 19), it is concluded that the configuration of the 8-bit priority encoder according to the second embodiment is superior first in the point that the AND gate circuit and the OR gate circuit contained in each node of the binary tree of the prior art correspond to OR gate circuit and the negative logic gate circuit contained in each node of the binary tree of the second embodiment so the circuit configuration is more simplified and second in the point of the number of gates and the signal propagation delay since, in contrast to the fact that an inverted signal is required for the input stage of the conventional AND gate circuit, it is unnecessary in the second embodiment.

Note that in the future as well, the number of functional units of the microprocessor will without question increased and the operation frequency will be improved. With this in mind, it can be said that the value of utilization of the priority encoder of the present invention is very high.

[4] Series of Decisions Having an Order Dependency 4.1 Foreword

In this chapter, an explanation will be made of the basic concept of a "ternary code binary tree" of the present invention. The essence of the present invention resides in the method of converting a series of decisions having an order dependency which cannot be processed in parallel to a ternary code binary tree which can be processed in parallel. The range of application of the method is broad and is not limited to a binary comparator, adder, subtractor, or operation unit for obtaining an absolute value of a difference. It is possible to derive any N-nary high speed comparator, high speed adder, high speed subtractor, high speed operation unit for obtaining an absolute value of a difference, etc. Further, it is not limited to an operation such as comparison, addition, subtraction, or operation for obtaining an absolute value of a difference. It can be applied to all problems having the structure of a "series of decisions having an order dependency" as will be explained in the next section.

4.2 Series of Decisions Having an Order Dependency 4.2.1 Case of Comparison

When a person considers the magnitude of two numbers, what thinking process does he follow? Here, it is assumed that the numbers of digits are the same. As an example of the two numbers, consider the comparison of two decimal numbers:

X=3141, Y=3150

For convenience, the format is adopted of answering a question of "X>Y?" by:

"Yes" if X>Y, "No" if X<Y, and "Neither Yes nor No" if X=Y.

In general, assuming that a person considers the comparison of two numbers, he unquestionably thinks in the following order. Note that people who perform subtraction by a computer to determine if the result is positive or negative should think as follows: "Dropping of even one digit cannot be allowed when comparing two numbers of 1,000,000,000 digits".

Step SC1: The numbers of the most significant digit (1000 position) are compared. In the concrete example, they are the same number "3", therefore no answer can be given. Namely, it cannot be said which is larger. That is, the answer depends upon the next lower digit. Accordingly, the next lower digit is viewed.

Step SC2: The numbers of the 100 position are compared. In the concrete example, they are the same number "1", therefore no answer can be given (it cannot be said which is larger). That is, the answer depends upon the next lower digit. Accordingly, the next lower digit is viewed.

Step SC3: The numbers of 10 position are compared. In the concrete example, the numbers are X=4 and Y=5, therefore the number of Y is larger. Accordingly, the answer is "No". This result does not depend upon the results of the digits lower than this.

Step SC4: The final conclusion is obtained. In the concrete example, it is "No", therefore the final conclusion "X<Y" is obtained.

An ordinary person will first look at the numbers at the most significant digit (1000 position in the concrete example) and decide on the relative magnitude by just the numbers of that digit. Here, if the relative magnitude is settled, the conclusion can be immediately issued. When they are the same numbers, it is necessary to look at the next lower digit (100 position) and make a decision there. When they are still the same number even at the 100 position, it is necessary to look at the further one lower digit (10 position) and make a decision there. In this example, the conclusion can be first drawn after looking up to the 10 position. Of course, it is not necessary to look at the 1 position.

In this example, even though the correct conclusion can be issued even if first looking at the 10 position, the conclusion cannot be issued by just looking at the 10 position before looking at the 1000 and 100 positions in any combination of numbers. Namely, there is a dependency relationship in the order of the decisions.

Figure 20:
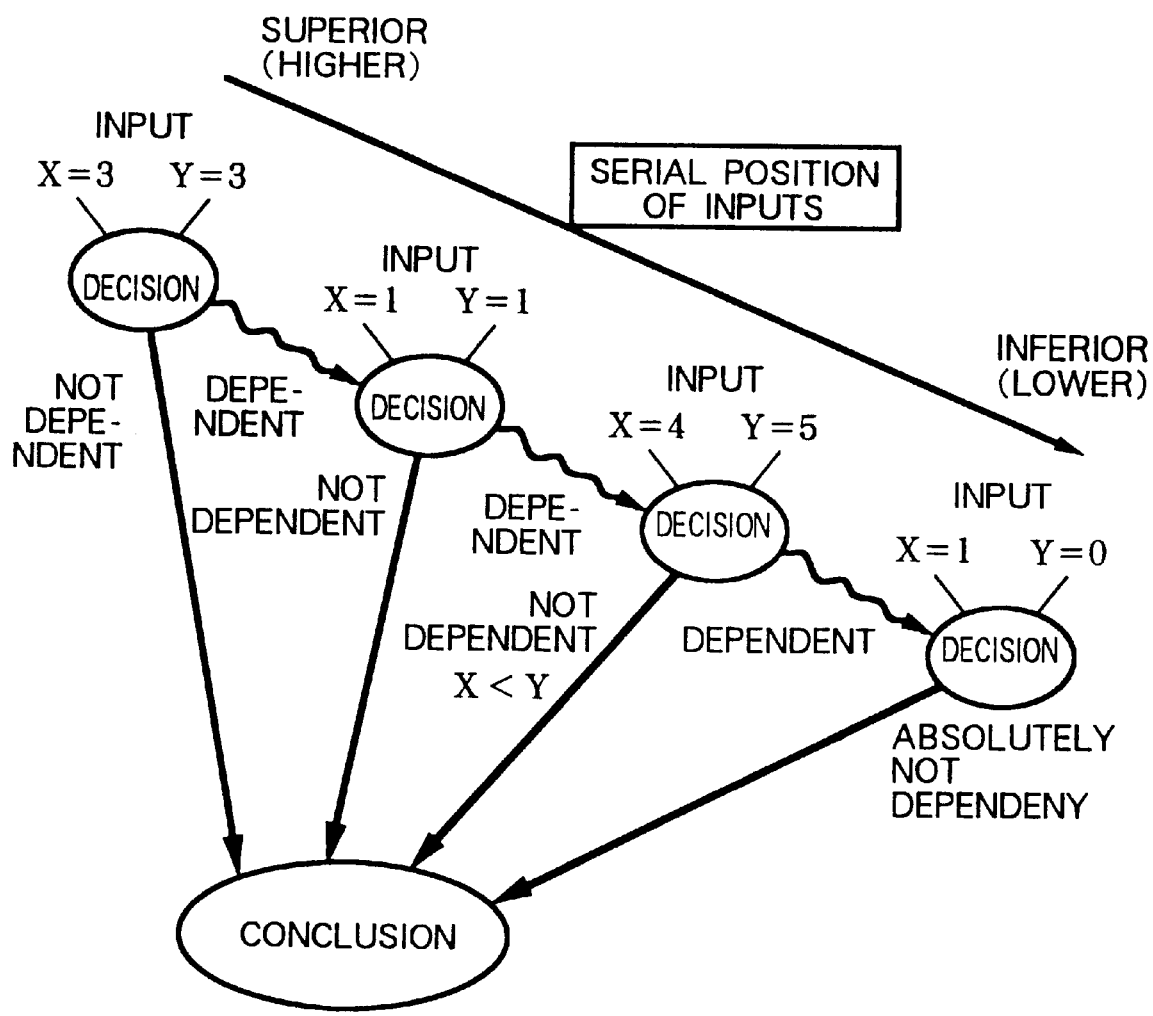
FIG. 20 is a conceptual explanatory view explaining the concepts of the orderly human thought process in a comparison.

This is illustrated in FIG. 20. This is a directed graph, therefore a circle labeled as a "DECISION" or a "CONCLUSION" is regarded as one node. A node labeled as a "DECISION" answers "Yes" or "No" with respect to the node labeled as "~e". However, when it is not possible to give a decision of either "Yes" or "No" by just the given input, it asks the slave decision node. The slave decision node does not render a conclusion arbitrarily on its own until the master decision node asks.

In general, the decision on a comparison made by a logical person is orderly as shown in FIG. 20. When a comparison program using software or a comparator using hardware is configured by copying this orderly method, the trouble (time) of processing or operation is increased in proportion to the digit of the numbers being compared. This is because since individual decisions depend upon the order, they cannot be simultaneously made. For example, when there are 30 digits to be operated on, this means that the conclusion cannot be obtained until a process of 30 steps is gone through in the worst case.

4.2.2 Case of Carry of Addition

As another concrete example, this time, consider a case where a person finds the sum of two numbers. Here, let us assume a case of finding the 1000 position of the sum of two decimal numbers:

X=1236, Y=2756

Figure 21:
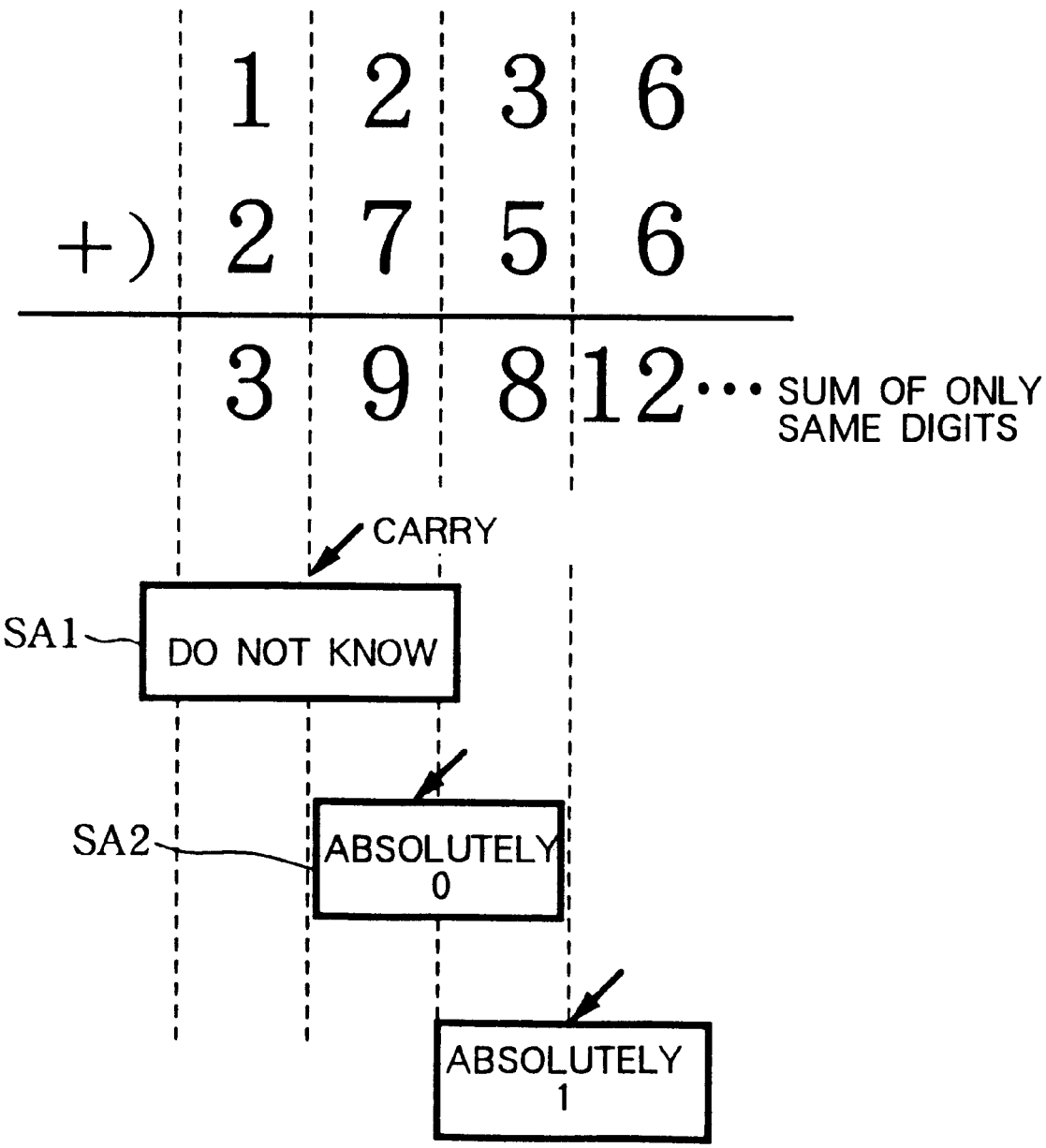
FIG. 21 is a conceptual explanatory view explaining the concepts of human thought in addition.

As shown in the explanatory view of FIG. 21, clearly the 1000 position of the sum is either "3" or "4". Namely, it is clearly "3" if adding the numbers of the 1000 position to each other. Further, if there is a carry from the 100 position here, it becomes "4". That is, the information that is not clear when finding the sum is a carry. It is thinking whether or not a carry occurs that is the essence of consideration of addition. Accordingly, with respect to the question "does a carry occur from the 100 position to the 1000 position as a result of X+Y?", the format of answering "Yes" if it occurs, while as "No" if it does not occur can be set. In this case, the answer "neither" cannot exist. Namely, the thought process can be considered to follow the following order:

Step SA1. Whether or not there is a carry from the 100 position to the 1000 position cannot be immediately answered. This is because the numeral becomes "9" if adding the numbers of the 100 position. If there is a carry from the 10 position, a carry from the 100 position to the 1000 position occurs. However, if there is no carry from the 10 position, there is no carry from the 100 position to the 1000 position. Accordingly, it is not possible to give an answer just by looking at the 100 position.

The answer depends upon the one lower digit (10 position).

Step SA2. A carry from the 10 position to the 100 position is absolutely "0" no matter what the one lower digit (1 position). This is because it is "8" if adding the numbers of the 10 position.

Even if there is a carry occurs at the 1 position, the 10 position absorbs this.

Step SA3. Conclusion . . . there is no carry to the 1000 position. Namely, "No".

Figure 22:
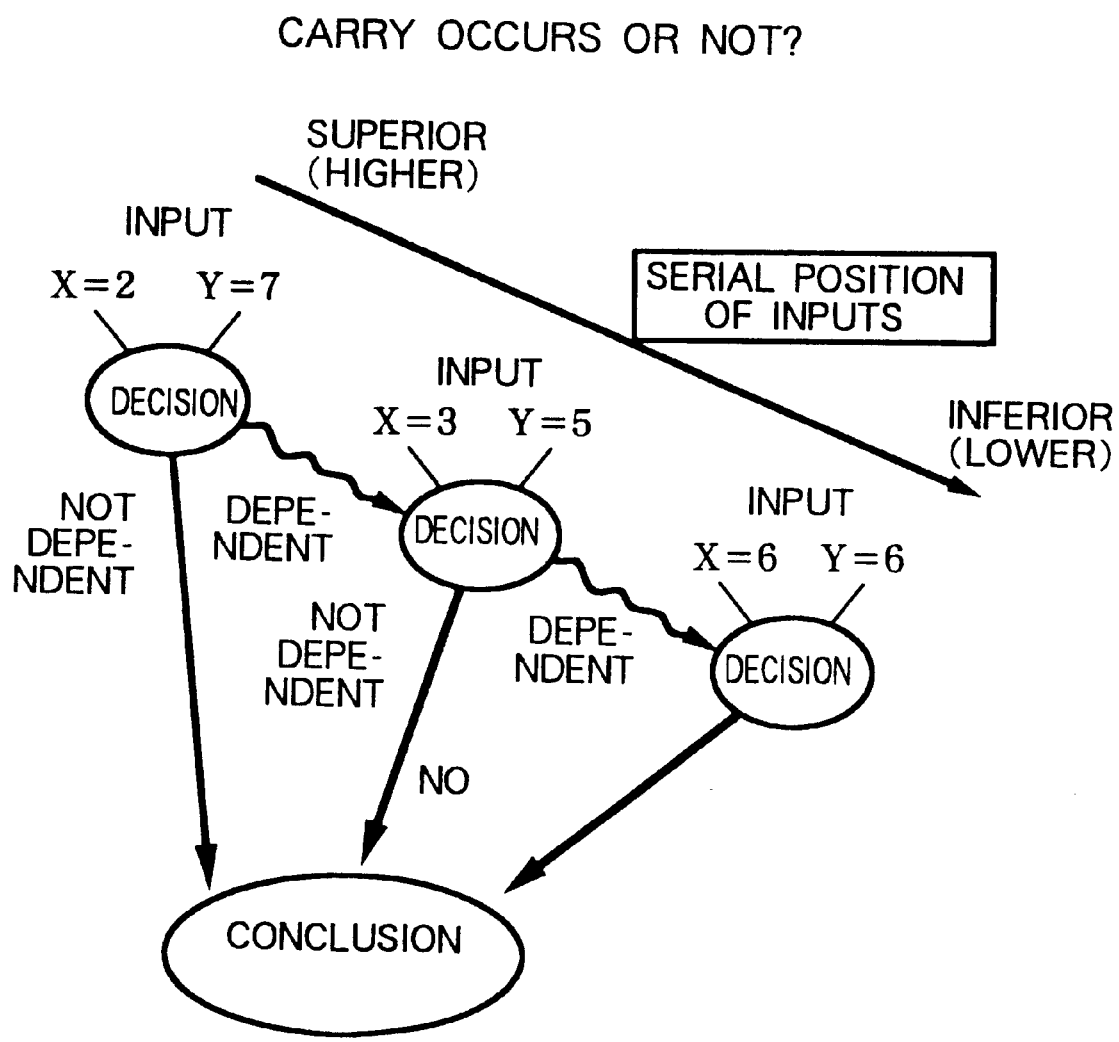
FIG. 22 is a conceptual explanatory view explaining the concepts of the orderly human thought process in addition.

Incidentally, a carry from the 1 position to the 10 position is absolutely "1". When this though process is represented by a directed graph provided with "decision" and "conclusion" nodes, it becomes as shown in FIG. 22 in the same way as the case of comparison. In the same way as the case of a comparison as well, a structure of a series of decisions having an order dependency is seen.

4.2.3 Case of Borrow of Subtraction

Figure 23:
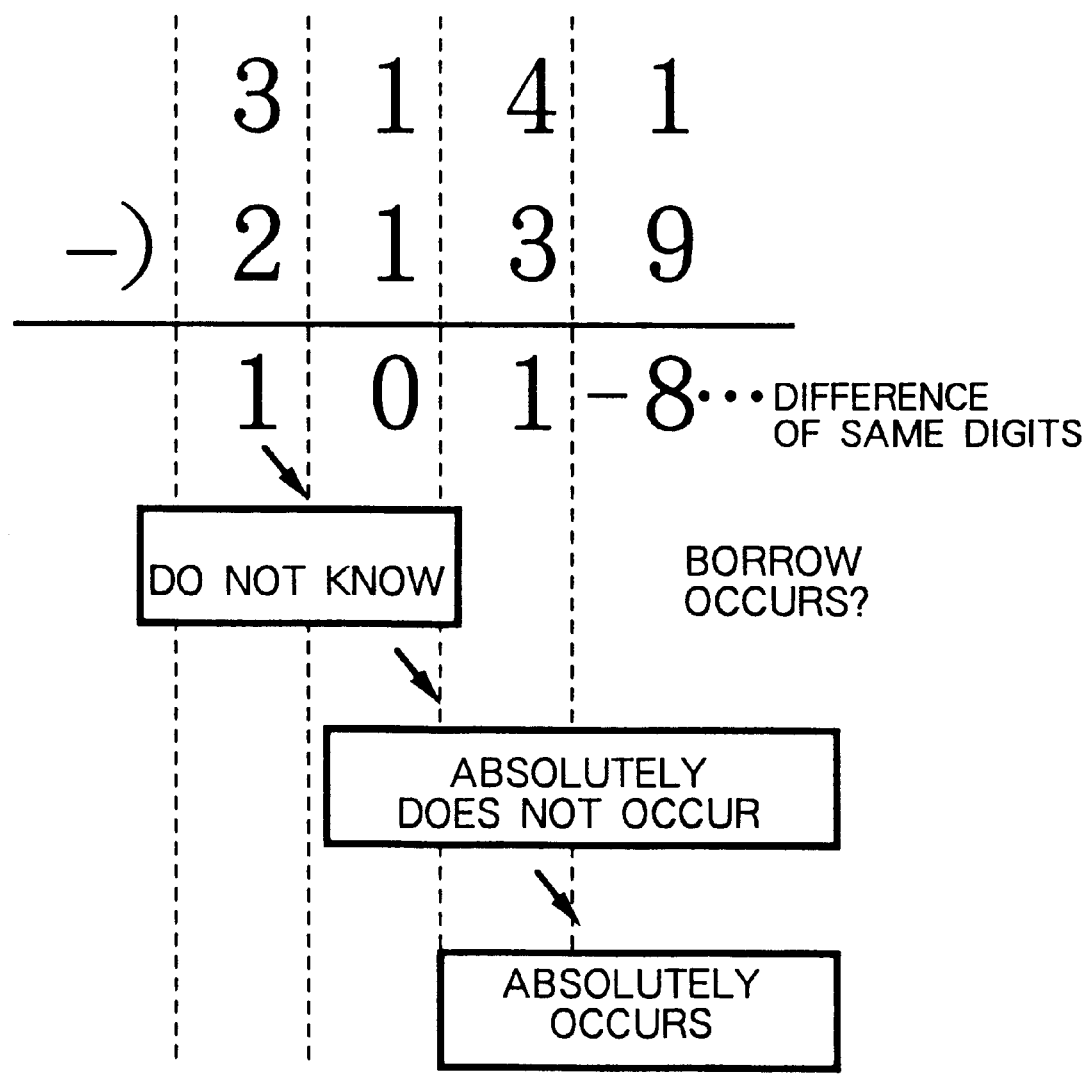
FIG. 23 is a conceptual explanatory view explaining the concepts of human thought in subtraction.

Further, as another concrete example, consider a case where a person finds the difference of two numbers. For example, consider the process of decision when finding the 1000 position of the difference in the case of the subtraction (X-Y) of two decimal numbers (X=3141, Y=2139) as shown in FIG. 23. In this case, clearly the 1000 position is either "1" or "0". If finding the difference by only the numeral of the 1000 position, it is "1". If there is a borrow from the 100 position, it becomes "0". That is, it is not clear whether a borrow occurs from one lower position. In the same way as the fact that the essence of thought in addition is a carry, it can be said that the essence of thought in subtraction is a borrow. The process of deciding whether a borrow occurs in the case of this example becomes as follows:

Step SS1. Whether or not there is a borrow from the 100 position to the 1000 position cannot be immediately answered.

This is because the difference of the numerals at the 100 position becomes "0".

If there is a borrow from the 10 position, a borrow from the 100 position to the 1000 position also occurs.

However, if there is no borrow from the 10 position, there is also no borrow from the 100 position to the 1000 position.

Accordingly, it is not possible to give an answer just by looking at the 100 position.

The answer depends upon one lower digit (10 position).

Step SS2. There is never a borrow from the 10 position to the 100 position irrespective of the one lower digit (1 position).

This is because the difference of the numerals of the 10 position is 1. Even if a borrow occurs at the 1 position, the 10 position does not transfer this.

Step SS3. Conclusion . . . There is no borrow to the 1000 position. Namely, "No".

4.2.4 Structure of Series of Decisions having an Order Dependency

Figure 24:
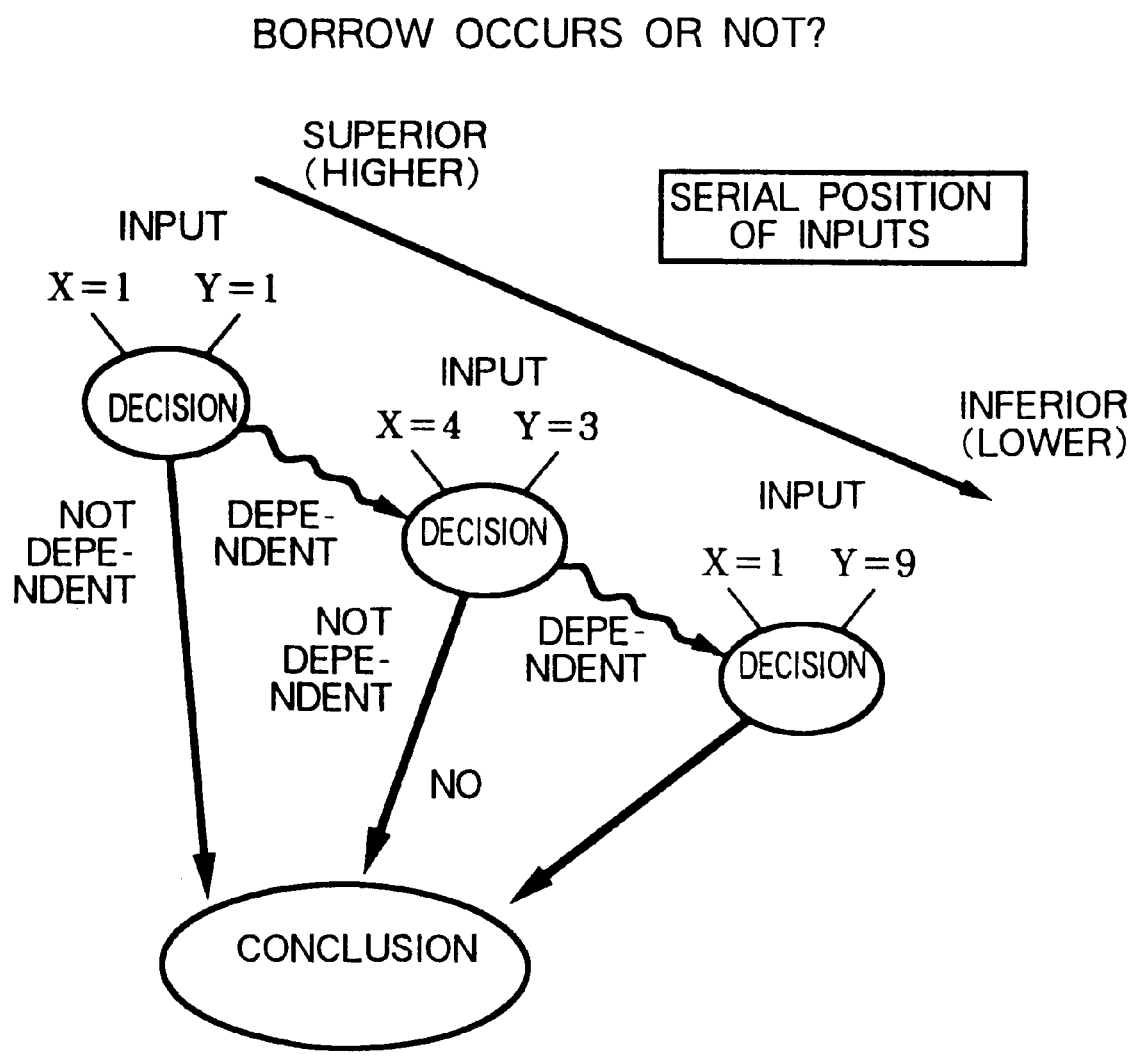
FIG. 24 is an explanatory view explaining a series of human decisions having an order dependency in subtraction.

As described above, both when considering a comparison and considering a carry of addition, there is a common structure of the series of decisions having an order dependency. Further, the process of deciding whether or not a carry occurs may be illustrated as shown in FIG. 24. As shown in the figure, when considering subtraction, it is clear that the process of deciding whether a borrow occurs is a serial structure having order dependency. The property which should be taken special note of in such a structure is that a plurality of decisions cannot be simultaneously carried out due to the order dependency.

That is, a decision node having a "dependency" input does not operate until an instruction is given from the master decision node to the effect that "I depend upon you, so decide." Namely, individual decision nodes cannot issue their own conclusions (Yes/No) from only their own inputs (X, Y). All of these decision nodes are connected into one by the dependency input/outputs. Accordingly, it is not allowed to simultaneously perform a plurality of decisions. Namely, in a structure of a series of decisions having an order dependency, parallel processing of a plurality of decisions is impossible.

[5] Ternary Code Binary Tree 5.1 Introduction of New Function

From the considerations of the previous chapter, the conclusion is drawn that in a structure of a series of decisions having an order dependency, a plurality of decisions cannot be processed in parallel. In order to enable parallel processing, a new function must be introduced.

First, the dependency input/output is deleted from the decision node. Then, a third method of answering of "neither or do not know" is permitted for the decision node, which had previously been allowed only two types of methods of answering of "Yes" and "No". A code expression of "Q" is applied to this vague method of answering. Accordingly, the new decision node will output the ternary code {Y, N, Q} as shown in FIG. 25A.

Further, the function of the higher priority determination of receiving the results of decisions by two decision nodes as its inputs, selecting and determining one, and outputting the result is introduced. FIG. 25B is an explanatory view of a higher priority determination node for realizing this function. As explained in the previous section (series of decisions having an order dependency), there is a series of order in the input data (X, Y) and an order of a higher significant bit/lower significant bit is clearly defined. Accordingly, the order of a higher significant bit/lower significant bit is tacitly contained in also the result of decision of the decision node obtained from such input data (X, Y). Accordingly, in the functions of the higher priority determination nodes receiving as their inputs the results of decisions by two decision nodes, one is determined as a higher significant bit input, and another is determined as a lower significant bit input. When a clear result of decision of Yes/No is given to the higher significant bit input of the higher priority determination node, the result of decision of the higher significant bit is selected and the output of the higher priority determination node becomes the same as the higher significant bit input. Further, only in a case where a vague result of decision of "Q" is given to the higher significant bit input is the result of decision of the lower significant bit selected and the output of the higher priority determination node becomes the same as the lower significant bit input.

By defining a decision node outputting the ternary code {Y, N, Q} as described above as a "leaf" and defining a higher priority determination node as a "node", the binary tree comprised as shown in FIG. 25C is defined as a "ternary code binary tree".

5.2 Ternary Code Binary Tree

The ternary code binary tree defined in the previous section enables a plurality of decisions to be independently carried out. That is, a plurality of decisions can be simultaneously carried out. This is because the decision node no longer has a dependency input/output. For this reason, it is possible to output a result of decision at the point of time when the input data is given without depending upon the result of another decision. Further, a plurality of provisional results of decisions are connected into one by the functions of the higher priority determination nodes. The correctness of the single derived final conclusion can be proved by induction. It can be said that a ternary code binary tree is a method of processing decisions having an order dependency in parallel.

5.3 Definition of K Operator and Algebraic Properties

A higher priority determination node derives one code ($\epsilon\{Y, N, Q\}$) from two codes ($\epsilon\{Y, N, Q\}$). This is algebraically closed and has the property of an operator. Accordingly, the function of the higher priority determination node is defined as an operator so as to be able to be algebraically handled and is named a "K operator".

Just like in the usual definition of an operator, the definition of the K operator is represented by a table as shown in FIG. 26A. In FIG. 26A, "H SIDE" means the higher significant bit input side, and "L SIDE" means the lower significant bit input. Where the H side is a vague "Q", the input of the L side is output as it is. Further, where the H side is a clear Yes/No, the input of the H side is output as it is irrespective of the L side.

Here, consideration is given to the abstract algebraic property of the system formed by a ternary code and K operator. First, since it is a group, it is sufficient to satisfy the following three conditions:

1. Associative law
2. Identity element
3. Inverse element
1. The K operator satisfies the associative law as follows:

$$(YKN)KQ = YK(NKQ) = Y$$
$$(YKQ)KN = YK(QKN) = Y$$
$$(QKY)KN = QK(YKN) = Y$$
$$(YKN)KY = YK(NKY) = Y$$

2. As follows, Q is the identity element.

$$YKQ = QKY = Y$$
$$NKQ = QKN = N$$
$$QKQ = QKQ = Q$$

3. There is no inverse element.

There is no Z ($\epsilon\{Y, N, Q\}$) satisfying YKZ=Q and NKZ=Q. In other words, there is no inverse operation.

Accordingly, they are not a group. Further, separate from whether or not they are a group, a K operator also has the property that it is not transformable.

Summarizing this, it can be said that a system formed by a ternary code and K operator is not transformable and is an irreversible operation process with no inverse operations. Note that since the associative law stands, it can be directly proved that the conclusion derived by the ternary code binary tree is correct.

[6] Application of Ternary Code Binary Tree to Binary Logic Circuit

6.1 One Example of Ternary Code Binary Tree

6.1.1 Binary Expression of Ternary Code

When realizing the ternary code binary tree by a binary logic circuit, a binary comparator or a binary adder using a carry generator can be constituted. For this purpose, it is necessary to express the ternary code by a binary number. Of course, at least 2 bits are necessary.

In contrast to the fact that there are three types of codes, there are four types of expressions by a 2-bit binary number. There are 60 types of combinations when assigning these four types of expressions to the three codes as will be explained later. Here, one of these, the method of assignment:

$$\{00, 01, 11, 10\} = \{Q, Q, Y, N\} \qquad (1)$$

is adopted. Q is assigned the two types of expressions $\{00\}$ and $\{01\}$. This means the expression $Q=\{0*\}$. "*" is "don't care" and means either of "0" and "1" is OK.

6.1.2 Logical Function of K Operator

The relationship of the input/output of the K operator is defined from FIG. 26A, and the binary expression of ternary code was given by equation (1). Accordingly, the (binary) logical function for realizing the K operator is derived as in the following equation (refer to FIG. 26B).

Namely, the K operator deriving one code $Tij \epsilon \{Y, N, Q\}$ from two codes, that is, the code $Ti \epsilon \{Y, N, Q\}$ due to the result of decision of the higher significant bit and the code $Tj \epsilon \{Y, N, Q\}$ due to the result of decision of the lower significant bit, is given as the following when any code X is assigned by the 2-bit binary (X, 1, X, 0) defining "Y" as $\{11\}$, defining "N" as $\{10\}$, and defining "Q" as $\{0*\}$ and when the OR logic is denoted by the "+" operator, the AND logic is denoted by the "·" operator, and negative logic is denoted by the "^" operator $$TiKTj = Tij \qquad (2)$$
$$(Ti, 1, Ti, 0)\ K(Tj, 1, Tj, 0) = (Tij, 1, Tij, 0)$$
$$= (Ti, 1 + Tj, 1,\ Ti, 1 \cdot Ti, 0 +^\wedge Ti, 1 \cdot Tj, 0)$$

Equation (2) is defined as the "K logic function in the assignment of $\{00, 01, 11, 10\} = \{Q, Q, Y, N\}$". As shown in FIGS. 26C and 26D, a logical circuit realizing the K logic function (K logic circuit) can be derived from this equation (2).

Namely, in FIG. 26D, the K logic circuit KL is configured by an OR gate circuit GO1 taking the OR logic of the code Ti,1 and the code Tj,1 and outputting the result as the code Tij,1 and a selector (selecting means) SL1 for selecting the code Ti,0 when the code Ti,1 is "1", selecting the code Tj,0 when the code Ti,1 is "0", respectively, and outputting the result as the code Tij,0. Note that if the method of assignment of binary expressions of the ternary code is different, the K logic function also changes and the K logic circuit also changes.

[Third Embodiment]

6.2 Embodiment of Comparator

6.2.1 Generation of Ternary Code of Comparison

The K logic circuit derived in the previous section corresponds to a node of a higher priority determination function in the conceptual view of the ternary code binary tree (refer to FIG. 25). Accordingly, a logical circuit performing the comparison of binary numbers can be formed if a decision node on the conceptual view is realized by the logical circuit.

The contents of the decision in a comparison are obtained by making a slight revision to the decision of comparison explained in "1.2.1 Case of Comparison".

Question of generation of ternary code of comparison: "When taking the difference (Xi−Yi) of two numbers of the same digit places, does it become positive (that is, Xi>Yi) (Yes)?,
does it become negative (that is, Xi<Yi) (No)?
Is it 0 (Xi=Yi) (Q)?"

Figures 27A, 27B:
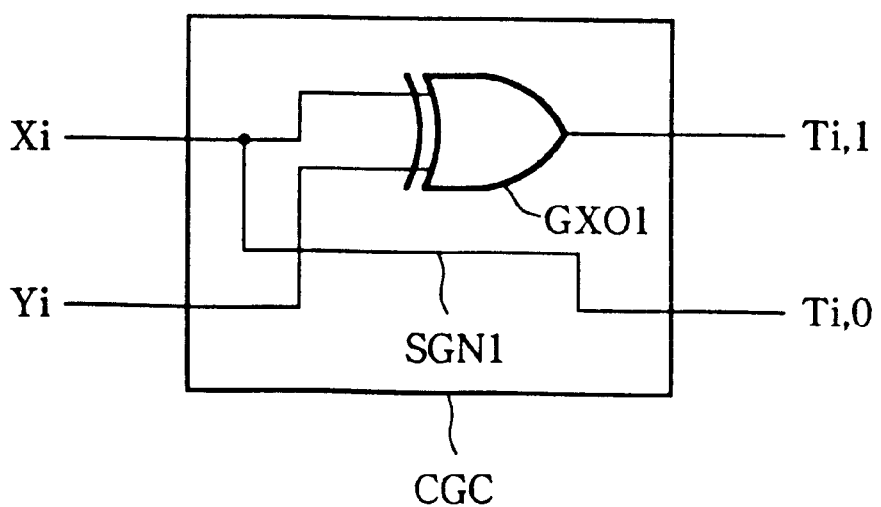
FIG. 27A and FIG. 27B are truth tables explaining the generation of ternary codes in the case of a comparison and a circuit diagram of a comparison ternary code generation circuit.

When applying this ternary code generation question of this comparison to binary numbers, the truth table of the logical function as shown in FIG. 27A is obtained and further the logical functions:

$$Ti, 1 = Xi \; (+) \; Yi \quad (3)$$

$$Ti, 0 = Xi$$

are obtained. Note that, the ternary code generation question of comparison is not limited to binary numbers and can be applied to any N-nary numbers.

Accordingly, from equation (3), the comparison ternary code generation circuit which serves as the input stage of the comparator becomes as shown in FIG. 27B. In FIG. 27B, the comparison ternary code generation circuit CGC is configured by an exclusive OR gate circuit GXO1 taking the exclusive OR logic of the digit value Xi and the digit value Yi and outputting the result as the code Ti,1 and by a connection line SGN1 outputting the digit value Xi as the code Ti,0.

6.2.2 Overall Configuration of Comparator

Figure 28:
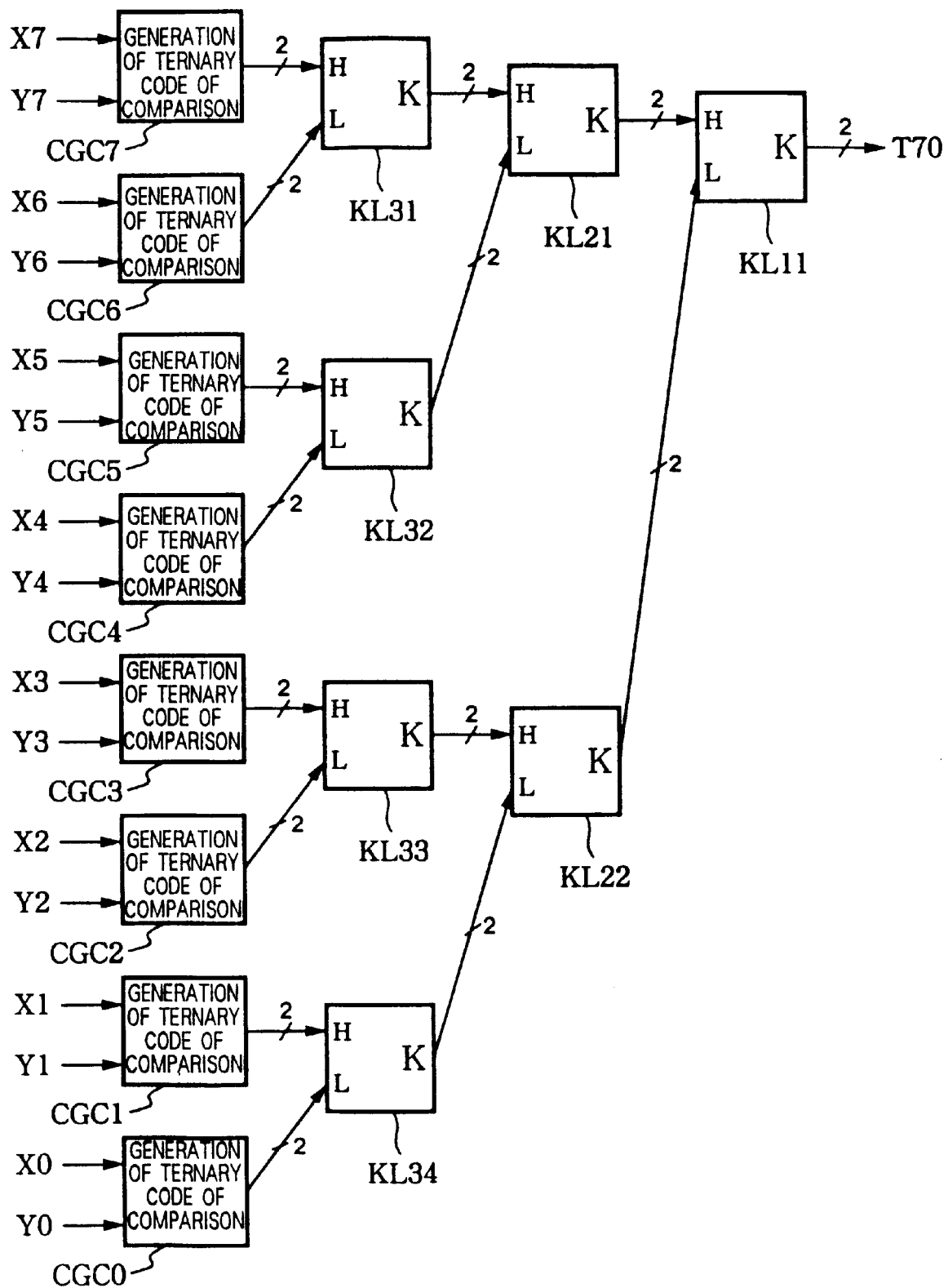
FIG. 28 is a view of the configuration showing the general structure in a case where the ternary code binary tree is realized by a binary logic circuit.

Next, when forming a binary tree by defining a comparison ternary code generation circuit CGC as a leaf (input stage) and defining a K logic circuit KL as a constituent element, the result is the logical circuit having the structure as shown in FIG. 28. This is none other than the conceptual structure of the ternary code binary tree itself shown in FIG. 25C. Namely, FIG. 28 is a general structure where a ternary code binary tree is realized by a binary logic circuit and shows the case of 8 bits.

That is, an arithmetic and logic unit for solving a problem including a series of decisions having an order dependency is configured having the comparison ternary code generation circuits CGC0 to CGC7 as the decision nodes and the K logic circuits KL11, KL21, KL22, and KL31 to KL34 as the higher priority determination nodes and creates models of problems by a ternary code binary tree defining the comparison ternary code generation circuits CGC0 to CGC7 as leaves and the K logic circuits KL11, KL21, KL22, and KL31 to KL34 as the nodes other than the leaves. Note that the comparison ternary code generation circuits CGC0 to CGC7 which serve as leaves and the K logic circuits KL11, the K logic circuits KL21 and KL22, and the K logic circuits KL31 to KL34 located at the same depth in the ternary code binary tree are respectively simultaneously executed.

In general, when there are n number of decisions in a series of decisions having an order dependency, the ternary code binary tree has n number of comparison ternary code generation circuits CGC (detection nodes) serving as the leaves. A sub binary tree of a height m (m is the smallest integer exceeding $\log_2 n$) except the leaves of the ternary code binary tree will have Nm (Nm is the smallest integer exceeding n/2) number of K logic circuits (higher priority determination nodes) serving as the nodes of the depth m and Ns (Ns is the smallest integer exceeding Ns+½) number serving as the nodes of the depth s (s is an integer represented by s=1 to m−1).

When using the comparison ternary code generation circuit CGC as the input stage in the ternary code generation circuit, it becomes a binary comparator. Here, a view of the configuration of a code-less 8-bit comparator is shown in FIG. 29.

Figure 29:
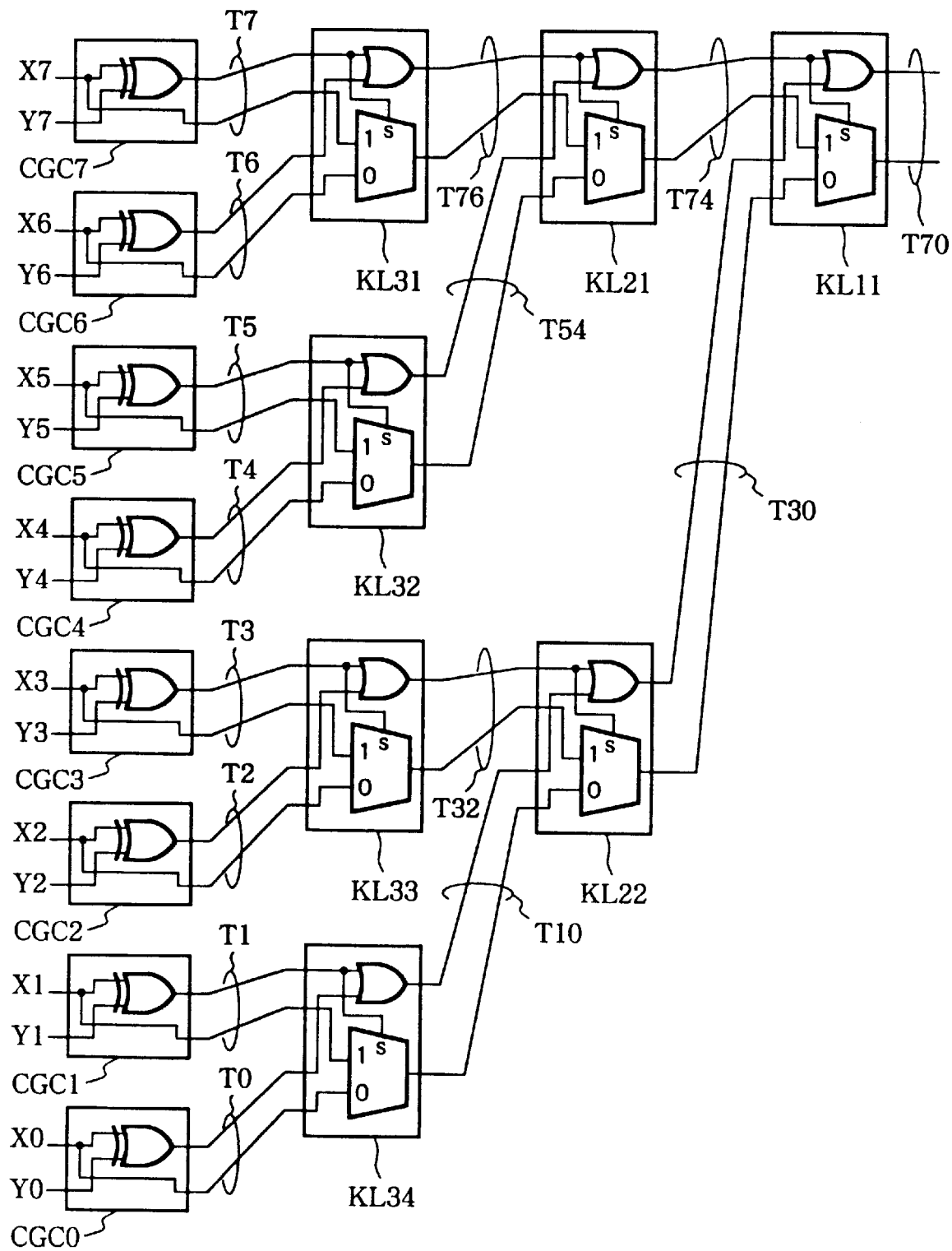
FIG. 29 is a view of the configuration of a code-less 8-bit binary comparator according to a third embodiment of the present invention.

In FIG. 29, the comparison ternary code generation circuits CGC0 to CGC7 are realized by configurations provided with the exclusive OR gate circuit GXO1 and the connection line SGN1 shown in FIG. 27B, while the K logic circuits KL11, KL21, KL22, and KL31 to KL34 are realized by configurations provided with the OR gate circuit GO1 and the selector SL1 shown in FIG. 26D.

The result of comparison is obtained by analyzing the output T70 (2 bits of T70,1, T70,0) of the K logic circuit KL11 serving as the "root" of the binary tree. Namely, when T70={0*}, it expresses the code Q and X=Y;
when T70={10}, it expresses the code N and X<Y;
and
when T70={11}, it expresses the code Y and X>Y.

Figure 30:
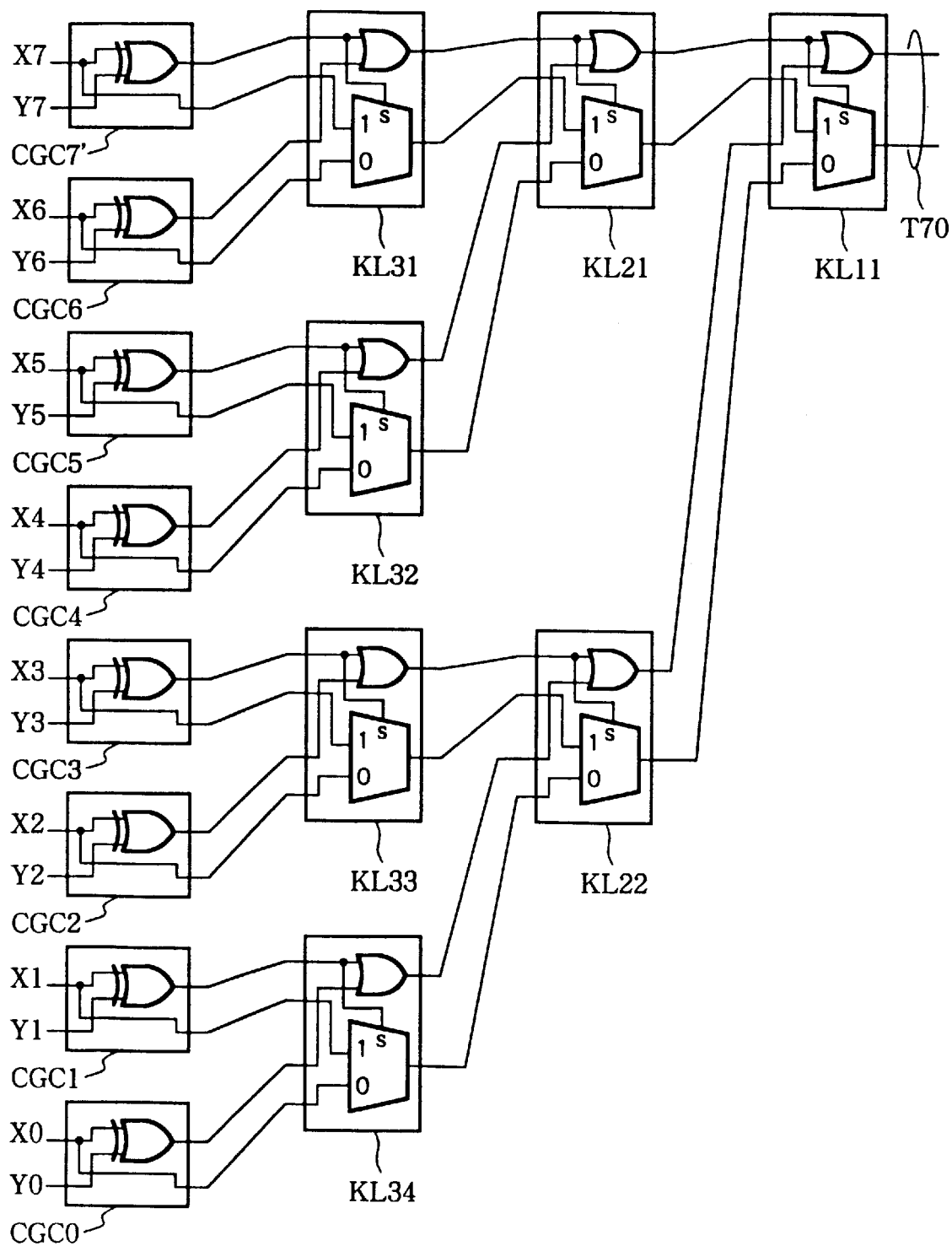
FIG. 30 is a view of the configuration of a code-bearing 8-bit binary comparator according to the third embodiment of the present invention.

Next, the code-bearing binary comparator using the complement of 2 can be realized by a really surprisingly simple method using a code-less comparator. This can be realized just by exchanging the most significant bits of X and Y (MSB) and inputting the same to the comparison ternary code generation circuit. FIG. 30 applies this to the configuration of FIG. 29. FIG. 30 shows a view of the configuration of the code-bearing binary comparator using the complement of 2. Namely, originally, in the comparison ternary code generation circuit CGC defined in FIG. 27B, the upper side of the input terminal is defined as X, and the lower side is defined as Y, but in the code-bearing binary comparator of FIG. 30, the inputs of the comparison ternary code generation circuits CGC0 to CGC6 except the MSB are connected according to the definition of FIG. 27B. As an inverse connection to that of the definition of FIG. 27B, X7 is input to the lower side, and Y7 is input to the upper side only for the comparison ternary code generation circuit CGC7' of the MSB.

Figure 31:
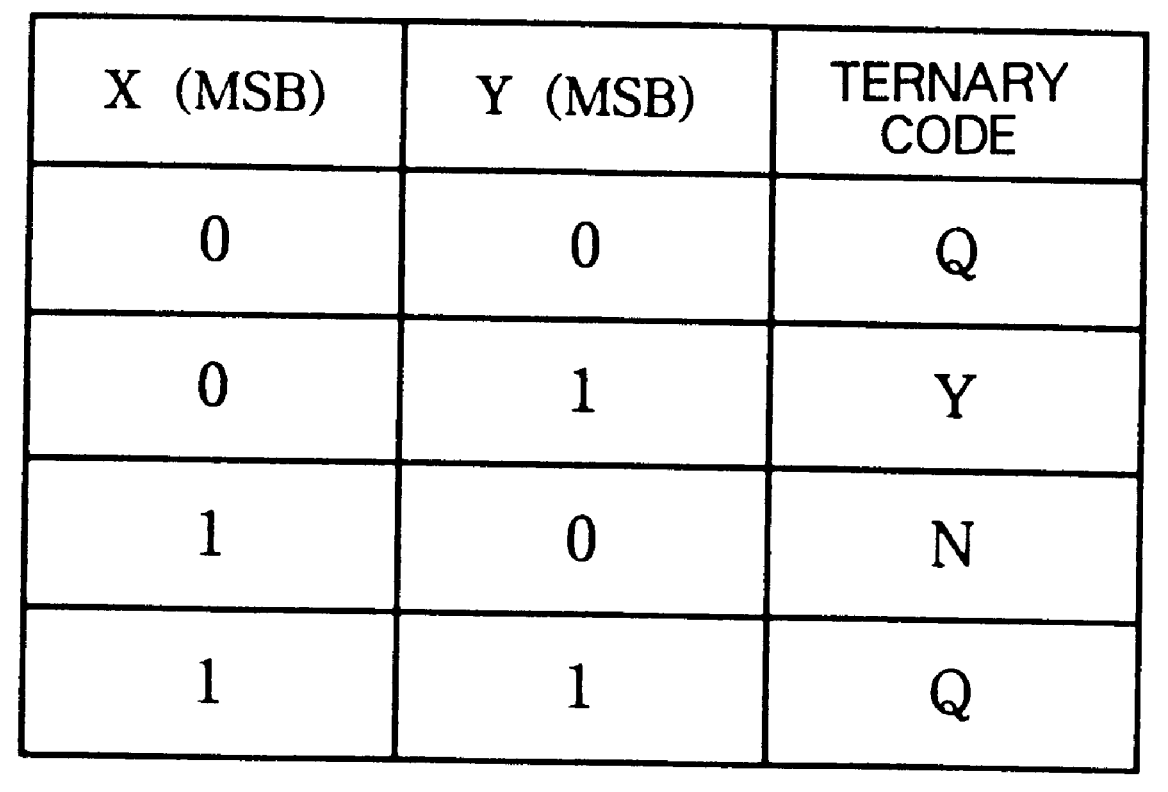

Why can a code-less binary comparator be converted to a code-bearing binary logical circuit by just this processing. This can be simply explained by the concept of the ternary code binary tree. The MSB of the code-bearing binary number expresses the sign of that number. When MSB is "0", it is positive, and when MSB is "1", it is negative. Now, we have defined the input stage of each bit so as to generate the ternary code "Y" if (X>Y), "N" if (X<Y), and "Q" if (X=Y). Forming the truth table of the ternary code generation by taking note of the fact that at the MSB, (0(positive) >1 (negative)), the result becomes as shown in FIG. 31.

This is none other than the case where X and Y are exchanged in the usual comparison ternary code generation. Where the MSB are the same, it is sufficient to regard the remaining input bits as code-less binary numbers and compare the same. This is clear from the property of the complement of 2.

Next, in the design of an actual logical circuit, considering the property of a CMOS logic circuit, a method such as sign optimization is used. Here, "sign optimization" is the method of converting a structure of logical circuits of positive logic inputs and positive logic outputs cascade-connected in multiple stages to a structure of stages of the positive logic input and negative logic output (PN stages) and the stages of the negative logic input and positive logic output (NP stages) alternately cascade-connected. By using the method of this sign optimization, the redundant transistors can be reduced, the number of transistors can be reduced, and the operation speed can be improved.

The sign optimization can be carried out also for the comparator of the present embodiment shown here. Namely, the sign optimization is carried out for the K logic circuit KL having a positive logic input and positive logic output so as to obtain a K logic circuit KLPN having a positive logic input and negative logic output shown in FIG. 32A and a K logic circuit KLNP having a negative logic input and positive logic output shown in FIG. 32B.

Figure 32A:
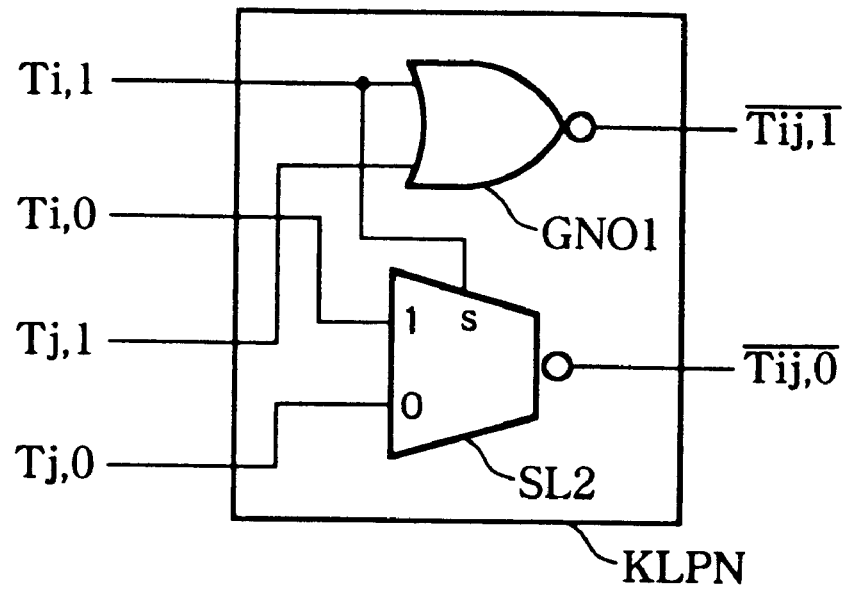
FIG. 32A and FIG. 32B, are circuit diagrams of a sign optimized K logic circuit.

In FIG. 32A, the K logic circuit KLPN having a positive logic input and negative logic output is configured provided with a NOR gate circuit GNO1 taking the NOR logic of the code Ti,1 and the code Tj,1 and outputting the result as the code ^Tij,1 and a selector (second selecting means) SL2 for taking the negative logic of the results obtained by respectively selecting the code Ti,0 when the code Ti,1 is "1" and selecting the code Tj,0 when the code Ti,1 is "0" and outputting the result as the code ^Tij,0.

Figure 32B:
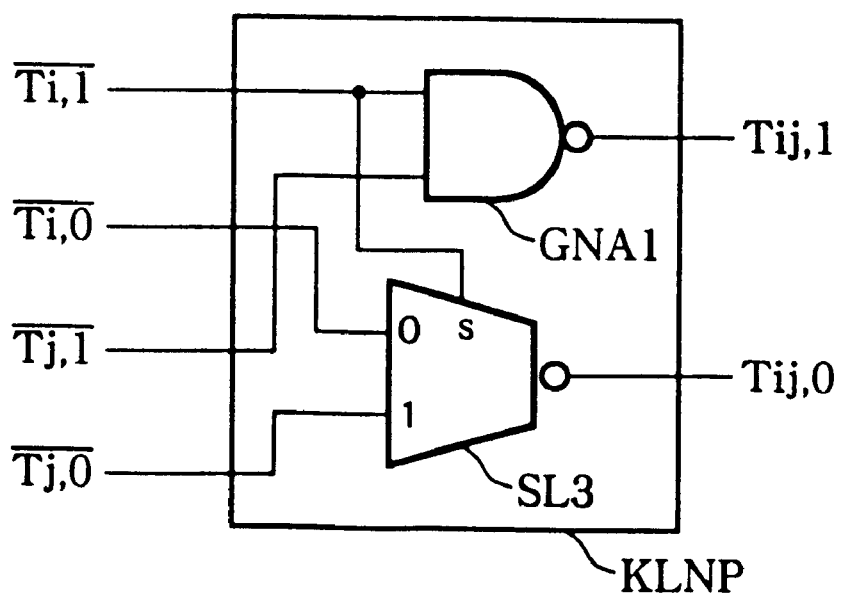

In FIG. 32B, the K logic circuit KLNP having a negative logic input and positive logic output is configured provided with a NAND gate circuit GNA1 taking the NAND logic of the code ^Ti,1 and the code ^Tj,1 and outputting the result as the code Tij,1 and a selector (third selecting means) SL3 for taking the negative logic of the results obtained by respectively selecting the code ^Ti,0 when the code ^Ti,1 is "0" and selecting the code ^Tj,0 when the code ^Ti,1 is "1" and outputting the result as the code Tij,0.

Figure 33:
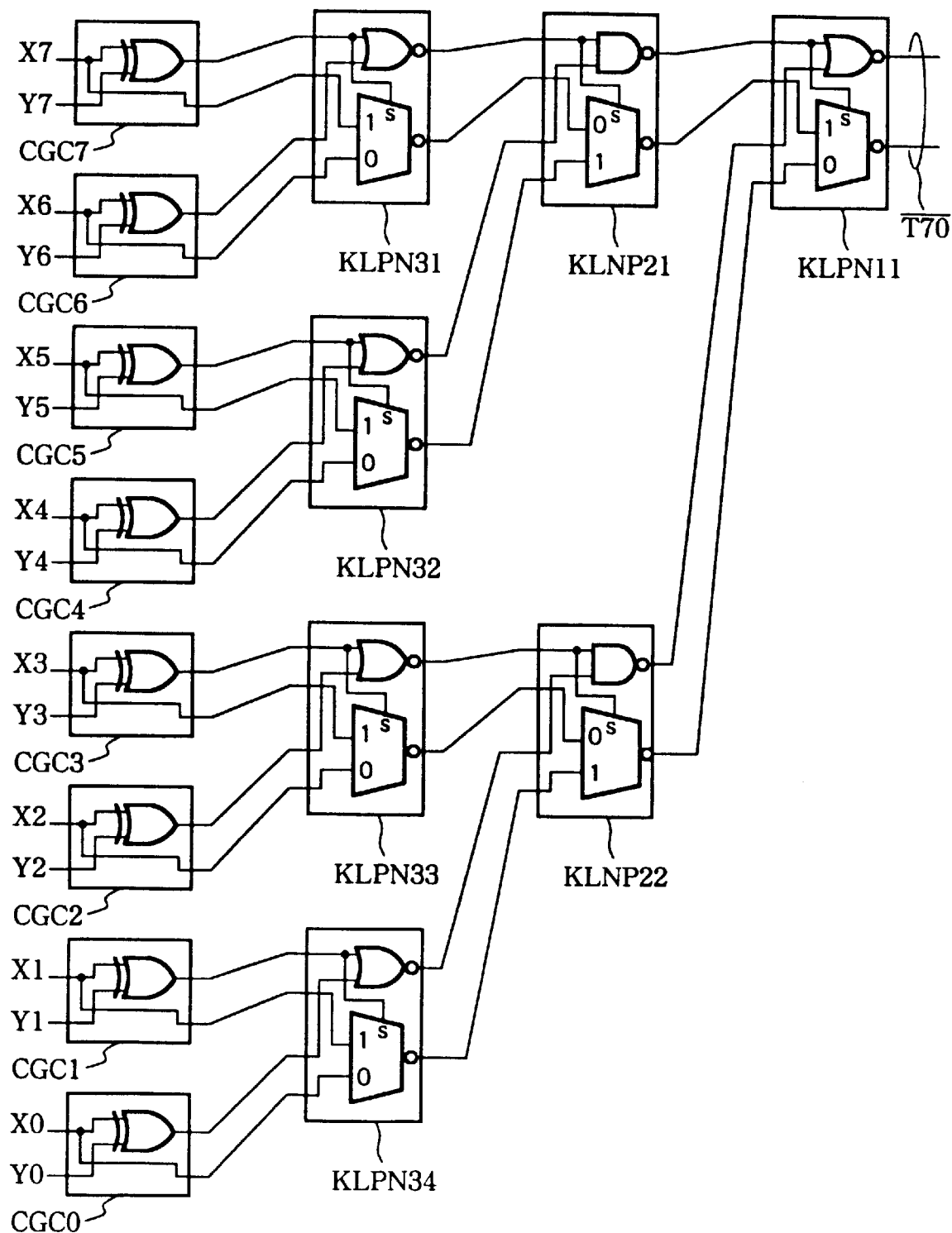
FIG. 33 is a view of the configuration of a sign optimized code-less 8-bit binary comparator.

The sign optimized comparator as shown in FIG. 33 is obtained by using these K logic circuit KLPN having a positive logic input and negative logic output and K logic circuit KLNP having a negative logic input and positive logic output. When applying this to an n-bit comparator, the result becomes as follows. Namely, when a sub binary tree of the height m (m is the smallest integer exceeding $\log_2 n$) not including the leaves of the binary tree (ternary code generation circuits) has Nm (Nm is the smallest integer exceeding n/2) number of K logic circuits serving as the nodes of the depth m and Ns (Ns is the smallest integer exceeding Ns+½) number serving as the nodes of the depth s (s is an integer represented by s=1 to m−1), a node of the depth m−p (p is an even number represented by p=0 to m−1) of the sub binary tree is configured by a K logic circuit KLNP and a node of the depth m−q (q is an odd number represented by q=1 to m−1) of the sub binary tree is configured by a K logic circuit KLPN. When m is an even number, it is interpreted that "the two numbers (Xa, Yb) are equal" if the output of the K logic circuit KLNP which serves as the root of the binary tree is Q={0*}, that "the two numbers (Xa, Yb) have the relationship of magnitude of Xa>Yb" if the output is represented by Y={11}, and that "two numbers (Xa, Yb) have the relationship of magnitude of Xa<Yb" if the output is represented by N={10}, respectively, and when m is an odd number, it is interpreted that "the two numbers (Xa, Yb) are equal" if the output of the K logic circuit KLPN which serves as the root of the binary tree is Q={1*}, that "the two numbers (Xa, Yb) have the relationship of magnitude of Xa>Yb" if the output is represented by Y={00}, and that "the two numbers (Xa, Yb) have the relationship of magnitude of Xa<Yb" if the output is represented by N={01}, respectively Note that, as an actual configuration, there also exists a case where a suitable decoder circuit is further added after the final output, and a 3-bit output terminal {GT (Greater Than), LT (Less Than), EQ (EQual)} is provided.

As described above, in the comparator of the present embodiment, in the comparison of 8-bit binary numbers (X, Y), by configuring the system so that the comparison ternary code generation circuit (decision node) CGC is realized by the exclusive OR logic gate circuit GXO1 and the connection line SGN1 and the ternary code in the comparison is generated by a ternary code generation circuit serving as a leaf of the binary tree, a binary comparator can be realized. Further, the K logic circuit KL in the {00, 01, 11, 10}={Q, Q, Y, N} assignment is realized by the OR logic gate circuit GO1 outputting the code Tij,1 and the selector SL1 outputting the code Tij,0. By this, the comparator for comparing the code-less binary numbers according to the present embodiment is simple and advantageous for increasing the speed with respect to a conventional binary tree form comparator. This is because the comparator of the present embodiment does not have a composite logical gate circuit (or logical function of a composite logical gate circuit) and does not have the disadvantageous aspects of a composite logical gate circuit. Further, the circuit structure of the ternary code generation circuit CGC of the input stage for generating the ternary code is simple and can be realized by a smaller number of gates (number of transistors).

Further, in the comparator of the present embodiment, in the comparison of code-bearing 8-bit binary numbers (X, Y), the comparison ternary code generation circuit CGC for performing the decision of comparison for the MSBs of the two numbers can convert a code-less binary comparator to a code-bearing binary comparator by the simple exchange of treating the digit value X7 as the digit value Y7 and treating the digit value Y7 as the digit value X7, respectively, and can realize a code-less binary comparator not requiring a code judgement circuit. Accordingly, the code-bearing binary comparator of the present embodiment has a smaller delay in comparison with the conventional code-bearing binary comparator by the amount of nonexistence of the code judgement circuit.

[Fourth Embodiment]

6.3 Embodiment of Adder 6.3.1 Ternary Code Generation of Sum

Next, in order to form a ternary code binary tree for judging whether or not a carry occurs, it is sufficient to define the sum ternary code generation question as follows based on the contents of the decision explained in "1.2.2 Case of Carry of Addition".

Sum Ternary Code Generation Question (Case of R-nary Numbers)

"Does the sum of two numbers of the same digit place (Xi+Yi) become R or more?

(If decimal, 10 or more. Namely, a carry absolutely occurs.) (Yes)?, does it become (R−2) or less (If decimal, 9. Namely, whether or not a carry occurs depends upon the result of one lower digit.) (Q)?"

When applying this sum ternary code generation question to binary numbers, the truth table of the logical function as shown in FIG. 34A is obtained, and the logical functions:

$$Ti, 1 = \hat{\ } (Xi (+) Yi) \tag{4}$$

$$Ti, 0 = Xi \text{ or } Ti, 0 = Yi$$

are obtained. Here, "^" is a logical operator meaning the inversion of the subsequent logical variable. Accordingly, the sum ternary code generation circuit which serves as the input stage of the adder becomes as shown in FIG. 34B from Equation (4).

Namely, in FIG. 34B, the decision node which serves as the input stage of the adder is realized by the sum ternary code generation circuit CGA provided with an exclusive NOR logic gate circuit GNX1 which takes the exclusive NOR logic of the digit value Xi and the digit value Yi and outputs the result as the code Ti,1 and the connection line SGA1 for outputting the digit value Xi as the code Ti,0 or the sum ternary code generation circuit CGA' provided with the exclusive NOR logic gate circuit GNX1 and the connection line SGA2 for outputting the digit value Yi as the code Ti,0.

6.3.2 Definitive Property of Bit 0

As explained in "1.2.2 Case of Carry of Addition", it is impossible to answer "do not know due to dependency" with respect to the question of whether or not a carry occurs. This is because the bit 0 has a definitive property and the answer becomes either "Yes" or "No". In the bit 0, there is no dependency with respect to a lower significant digit. Since there is no dependency, the answer can never not be known. There is never the answer "Q". The truth table of the ternary code generation of the bit 0 based on this is shown in FIG. 35A. Here, Cin is a carry input from an external portion.

It is clear from the truth table that the code T0,1 always becomes "1". Such an output always becoming a constant value irrespective of the input can be deleted. The sum ternary code generation circuit CGA0 of the bit 0 obtained as a result of this is shown in FIG. 35B.

In FIG. 35B, the sum ternary code generation circuit CGA0 of the bit 0 is configured by a NOR gate circuit GNO2 which takes the NOR logic of the digit value X0 and the digit value Y0, a NAND gate circuit GNA2 which takes the NAND logic of the digit value X0 and the digit value Y0, and a selector (selecting means) SL4 for taking the negative logic of the results obtained by respectively selecting the output of the NOR gate circuit GNO2 when the carry input Cin to the adder is "1" and selecting the output of the NAND gate circuit GNA2 when the carry input Cin is "0" and outputting the result as the code T0,0 and does not output the code T0,1.

Figure 36A:
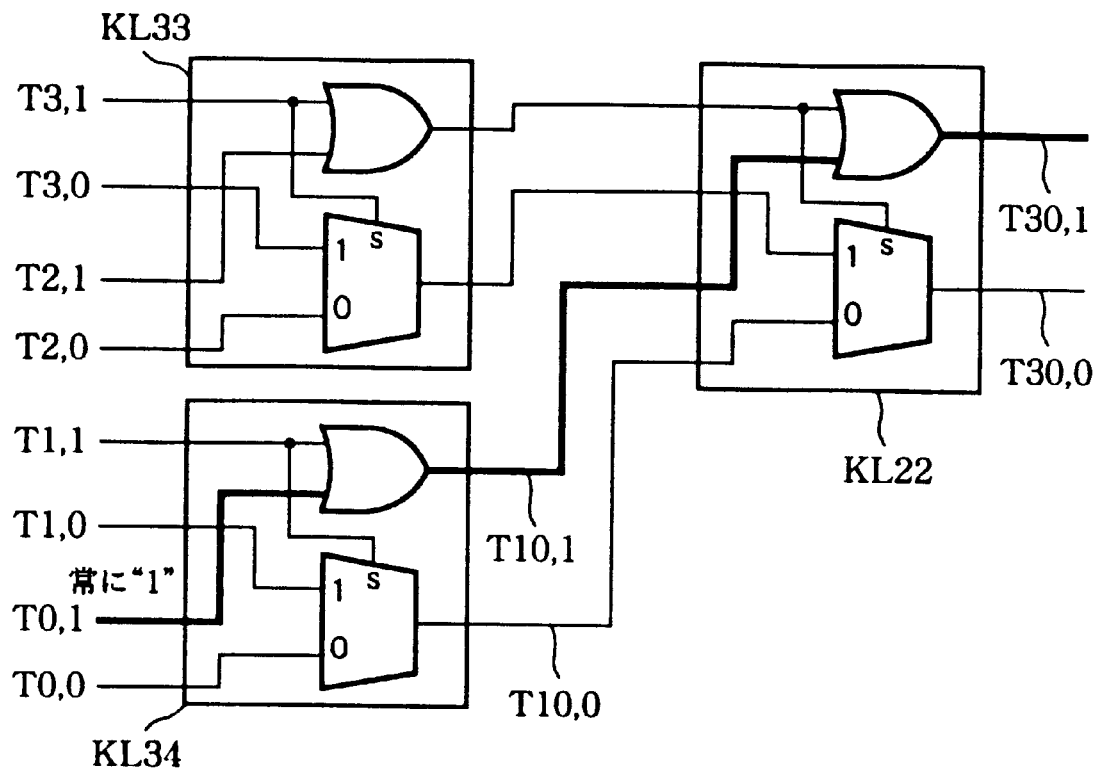
FIGS. 36A and 36 B are explanatory views of the K logic circuit simplified by the definitive property of the bit 0.

Further, by utilizing the fact that the code T0,1 is always "1", the redundant logic of the K logic circuit KL can be deleted. The binary tree of the K logic circuit in the adder before deletion is shown in FIG. 36A. It is seen that signals which always become "1" (bold line in the figure) are successively propagated. There is no problem even if the logic on a route always giving a constant value is deleted. Accordingly, as shown in FIG. 36B, a binary tree is obtained using the simplified K logic circuit KLR obtained by deleting the redundant logic.

Figure 36B:
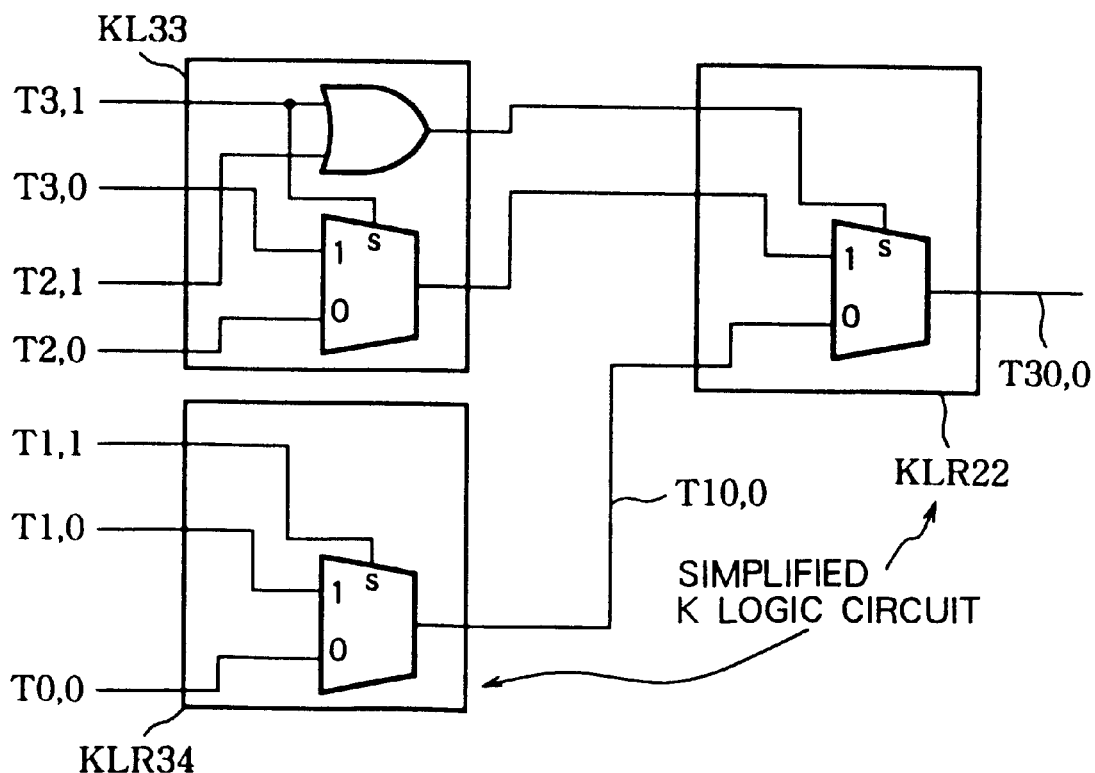

In FIG. 36B, among the K logic circuits, the K logic circuit due to the code T0,1 which originally should be output by the sum ternary code generation circuit CGA0 for performing the decision of existence of a carry for the LSB of two numbers is realized by the simplified K logic circuit KLR provided with a selector (selecting means) SL5 for selecting the code Ti,0 when the code Ti,1 is "1", selecting the code Tj,0 when the code Ti,1 is "0", respectively, and outputting the result as the code Tij,0 and does not output the code Tij,1. Note that if the output code of the K logic circuit KLR which serves as the root of the binary tree is "1", it is interpreted that "there is a carry output", and if the output code is "0", it is interpreted that "there is no carry output", respectively.

The fact that the action of deleting the logic as described above is proper will be intuitively understood by the following allegory. "There is a weather forecaster proud of a rate of accuracy of 90% or more who predicts only good weather. Will people listen to what this weather forecaster says? ... No one will listen since they know he will only tell them the weather will be good."

6.3.3 Configuration of Carry Generation Binary Tree (Case of Carry Generation Binary Tree)

Figure 37:
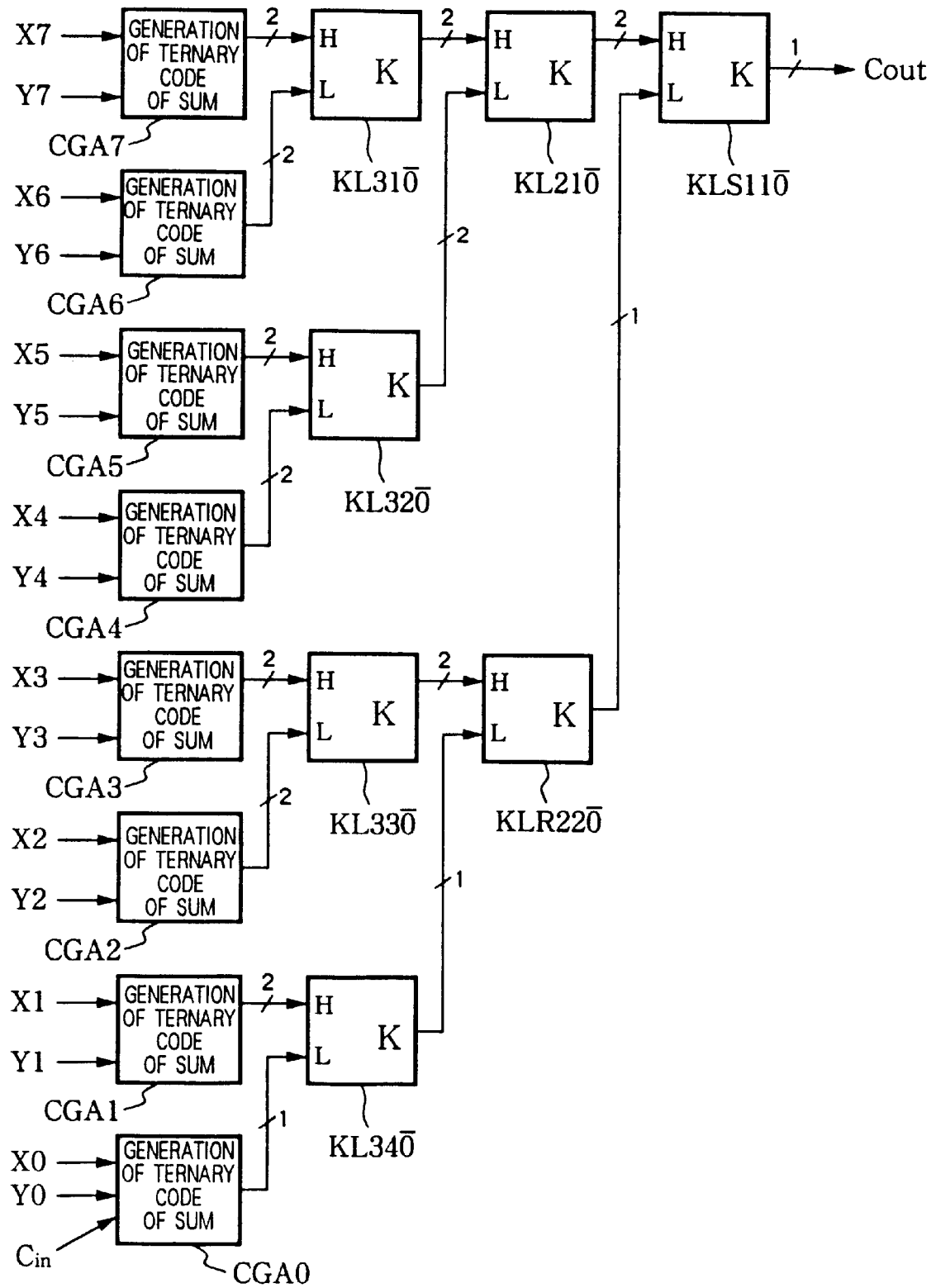
FIG. 37 is a view of the configuration of a carry generation binary tree of 8-bit binary numbers according to a fourth embodiment of the present invention.

A binary tree generating a carry can be realized by a binary tree using a sum ternary code generation circuit CGA as a leaf and using a K logic circuit KL or KLR as a constituent element. As a concrete example, a case of 8 bits is shown in FIG. 37. The K logic circuit through which the signal from the bit 0 is propagated is the simplified K logic circuit KLR. Further, the output of the simplified K logic circuit KLR is one bit.

In FIG. 37, the 8-bit binary (X, Y) adder is configured having the sum ternary code generation circuits CGA0 to CGA7 as the decision nodes and the K logic circuits KLR11o, KL21o, KLR22o, KL31o to KL33o, and KLR34o as the higher priority determination nodes and creates a model of the problem by a ternary code binary tree using the sum ternary code generation circuits CGA0 to CGA7 as leaves and the K logic circuits KLR11o, KL21o, KLR22o, KL31o to KL33o, and KLR34o as the nodes other than the leaves. Note that the sum ternary code generation circuits CGA0 to CGA7 which become the leaves and the K logic circuits KLR11o, KL21o, and KLR22o and the K logic circuits KL31o to KL33o and KLR34o located at the same depth in the binary tree simultaneously execute their operations.

In the concrete example of FIG. 37, the binary tree generating a carry signal Cout (external output) generated in the addition of two 8-bit numbers is shown. In general, in order to generate a carry signal to the bit n, a binary tree defining the bit (n−1) to the bit 0 as the range becomes necessary. Note that, in the configuration of FIG. 37 as well, as a modification thereof, a configuration in which sign optimization is achieved can be adopted.

(Generation of Sum)

Figure 38:
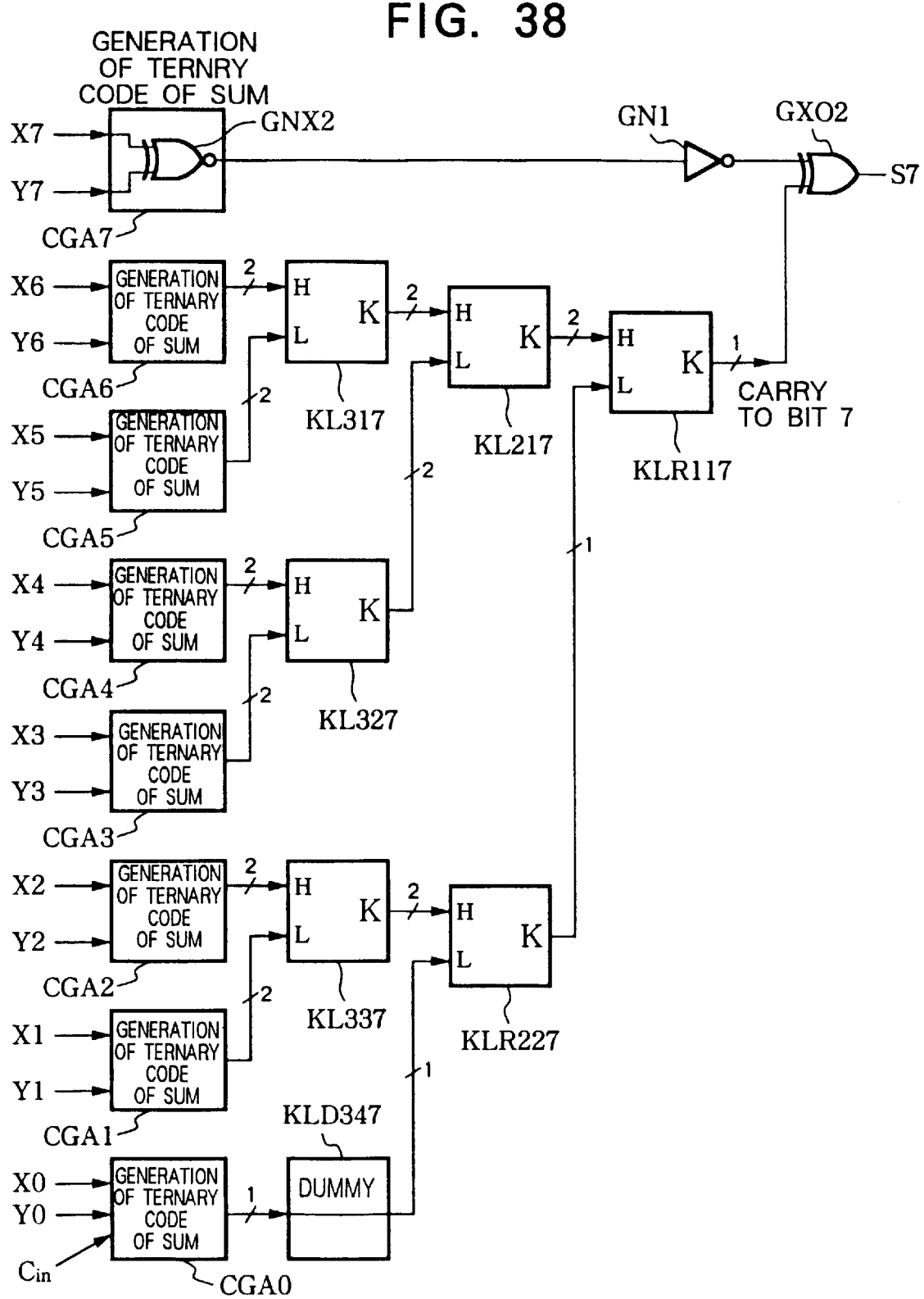
FIG. 38 is a circuit diagram of a circuit generating the sum of MSB's of the 8-bit binary numbers.

The generation of the final sum is obtained by adding the carry Ci from the bit (i−1) to the bit i to the sum of the same digit places ((Xi+Yi) mod 2) (i=0 to 7). The circuit for finding the bit 7 of the sum is shown in FIG. 38 as an example.

The sum output S7 of the bit 7 is obtained by adding the carry C7 from the bit 6 to the bit 7 to the sum of the same digit places (X7+Y7).

$$S7=(X7+Y7+C7)\bmod 2=X7(+)Y7(+)C7 \qquad (5)$$

The carry C7 from the bit 6 to the bit 7 is generated by a binary tree ranging from the bit 6 to the bit 0. By taking the exclusive OR logic (EXOR) of the output of this binary tree and X7(+)Y7, the final sum output S7 of the bit 7 is obtained.

In FIG. 38, the configuration for finding the sum output S7 of the bit 7 is achieved by providing the sum ternary code generation circuit CGA0 as the decision node performing the decision of existence of a carry for the LSB, the sum ternary code generation circuits CGA1 to CGA6 as the decision nodes performing the decision of existence of a carry for the digits Xk, Yk (k=1 to 6) of the two numbers, and the sum ternary code generation circuit CGA7 as the decision node of the MSB, configuring the binary tree by defining the sum ternary code generation circuits (decision nodes) CGA0 to CGA6 for the digits Xaj, Ybj (j=0 to 6) of the two numbers as the leaves, having, among the K logic circuits, the K logic circuits due to the code T0,1 which originally should be output by the sum ternary code generation circuit CGA0 as the K logic circuits KL (KL217, KL317, KL327, and KL337) and the K logic circuits not due to the code T0,1 as the simplified K logic circuits KLR (KLR117, KLR227), and having an exclusive OR gate circuit GXO2 which takes the exclusive OR logic between the negative logic by the negative logic gate circuit GN1 of the output code T7,1 of the sum ternary code generation circuit CGA7 and the output code T60,0 of the K logic circuit KLR117 which serves as the root of the binary tree and defines this as the result S7 of the sum for the MSB. Note that the number of leaves of the binary tree used here is not a power of 2, therefore the dummy node KLD347 is inserted. Further, the present configuration can be made a configuration achieving sign optimization as a modification. Further, the configuration of the negative logic gate circuit GN1 and the exclusive OR gate circuit GX02 can be replaced by one exclusive NOR gate circuit.

As an excellent characteristic feature of this ternary code binary tree, it can be mentioned that the exclusive OR operation of X7(+)Y7 is included in the ternary code generation. In the ternary code generation, the inverted form of X7(+)Y7 is output, but this can be easily changed to the non-inverted form. Note that this property is obtained in the case of the ternary code generation in the {00, 01, 11, 10}=}Q, Q, Y, N} assignment.

In general, when the method of assignment of the expression of the ternary code is changed, the configuration of the ternary code generation circuit also changes. Accordingly, as the logical circuit for performing the generation of a sum, it is necessary to se a suitable one in accordance with this. Note that the structure of the binary tree per se does not change.

As described above, in the adder of the present embodiment, in the addition of 8-bit binary numbers (X, Y), the sum ternary code generation circuit (decision node) CGA is realized by the exclusive NOR gate circuit GNX1 and connection line SGA1 or SGA2 and is configured so as to generate a ternary code in the addition by the sum ternary code generation circuit CGA which serves as a leaf of the binary tree, whereby the carry look-ahead circuit of the binary adder can be realized.

Further, in the adder performing the addition of two 8-bit numbers of the present embodiment, by utilizing the definitive property for the LSB (bit 0) and reflecting the carry input Cin for the sum ternary code generation circuit CGA0 performing the decision of existence of a carry of the LSB, the binary tree structure of the K value logical circuit following this can be simplified and a BLC array not having the −1-th row as in the conventional BLC adder and therefore having one less row than the conventional BLC adder can be configured. This is excellent in the point of the number of gates and surface area. Further, in the binary tree of the K value logical circuits for realizing the K logic function, by providing the K value logical circuit KLR of a configuration simplified by using only a selector, the logically redundant circuits can be eliminated and it is possible to form a binary tree having a smaller number of transistors. Further, the 8-bit binary adder according to the present embodiment does not have a composite logical gate circuit (or logical function of a composite logical gate circuit) and therefore does not have the disadvantageous aspects of a composite logical gate circuit, therefore is advantageous in being simpler and faster in speed in comparison with the conventional adder. Further, the sum ternary code generation circuit CGA for generating the ternary code is also simple and can be realized by a smaller number of gates (number of transistors).

Further, in the 8-bit binary adder of the present embodiment, when a binary tree of the K logic circuit in the {00, 01, 11, 10}={Q, Q, Y, N} assignment is used, the decision node for performing the decision of existence of a carry for the digits Xj, Yj (i=1 to n−2) includes an exclusive NOR gate circuit GNX1 for taking the exclusive NOR logic of the digit value Xj and the digit value Yj and outputting the result as the code Tj,1, therefore it is possible to obtain the exclusive OR logic for each digit (Xj, Yj) by just inverting the output code Tj,1 and to generate the sum by a simpler configuration. Further, the logical structure per se of the decision node for generating the ternary code is simple and can be realized by a smaller number of gates (number of transistors).

(Overall Configuration of Carry Generation Binary Tree: BLC Array)

Figure 39:
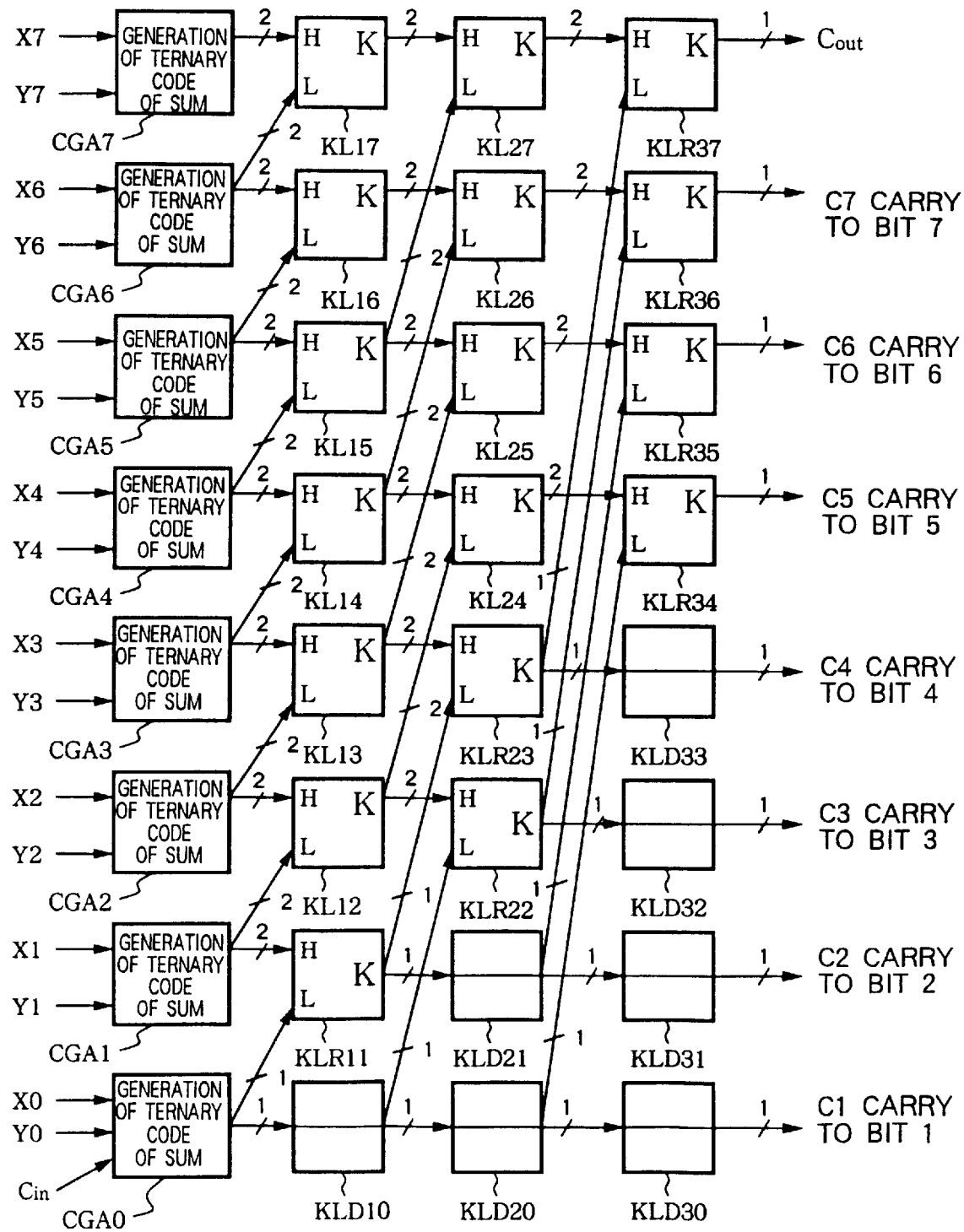
FIG. 39 is a view of the configuration of a BLC array according to the fourth embodiment of the present invention.

Next, in the same way as the formation of a binary tree generating a carry to the bit 7, when binary trees generating a carry to each bit are formed for every bit and superimposed, the result becomes as shown in FIG. 39.

Figure 40:
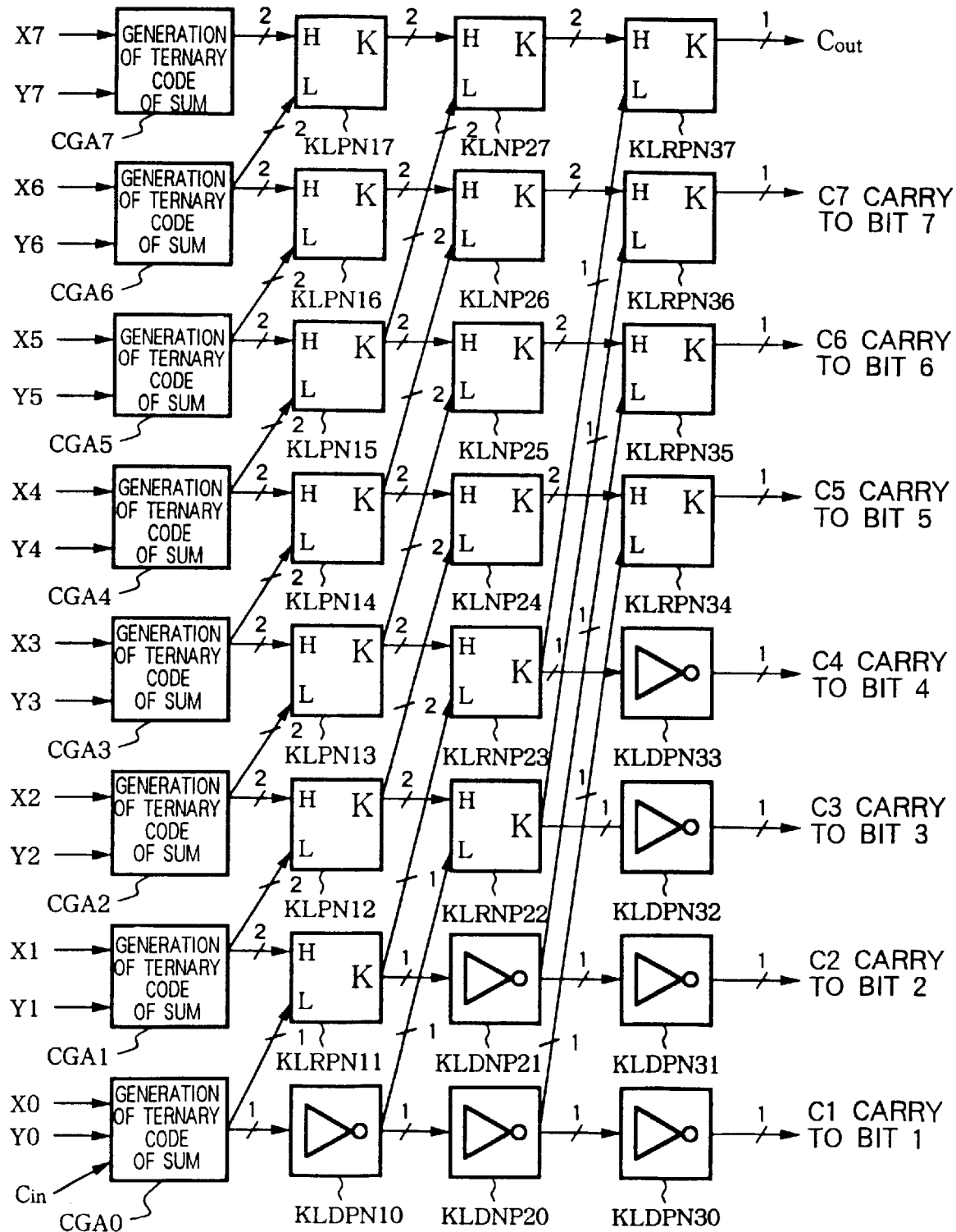
FIG. 40 is a view of the configuration of the sign optimized BLC array according to the fourth embodiment of the present invention.

In FIG. 39, the K logic circuits for realizing the sum ternary code generation circuits and K operators are arranged in the form of an array. This is a so-called BLC array. In actuality, the BLC array to which the sign optimization is applied as shown in FIG. 40 is used. Note that, where the sign optimization is applied, the dummy node is replaced by an inversion dummy node (inverter) performing logic inversion.

In FIG. 39, the BLC array is configured having n=8 number of sum ternary code generation circuits (decision nodes) CGA0 to CGA7 for outputting either of three values as the result of a decision based on the digit values Xi, Yi and a K logic circuit matrix of 8 rows and 3 columns (m=3 is obtained as $\log_2 8 = 3$) with rows corresponding to the digits. The K logic circuit matrix is configured with the group of K logic circuits of the first column provided with a K logic circuit KLD10 of the zero-th row as a dummy node for propagating the result of the decision of the sum ternary code generation circuit CGA0 of the zero-th digit as it is, a simplified K logic circuit KLR11 of the first row, and K logic circuits KL12 to KL17 of the second row to the seventh row; the group of K logic circuits of the second column provided with K logic circuits KLD20 and KLD21 of the zero-th row and first row as the dummy nodes, simplified K logic circuits KLR22 and KLR23 of the second row and the third row, and K logic circuits KL24 to KL27 of the fourth row to the seventh row; and the group of K logic circuits of the third column provided with K logic circuits KLD30 to KLD33 of the zero-th row to the third row as the dummy nodes and simplified K logic circuits KLR34 to KLR37 of the fourth row to the seventh row. Note that the eight decision nodes and groups of K logic circuits of the columns are respectively simultaneously executed. Further, the output codes of the K logic circuits from the zero-th row to the seventh row of the third column are respectively used as carries C1 to C7 of the first digit to the seventh digit and the carry output Cout to the external portion and it is interpreted that "there is a carry output" if the output code is "1", while that "there is no carry output" if the output code is "0".

With respect to the configuration of FIG. 39, if a sum generation circuit provided with an exclusive OR gate circuit of the zero-th digit taking the exclusive OR logic of the digit value X0 and the digit value Y0, an exclusive OR gate circuit of the zero-th row taking the exclusive OR logic of the output of the exclusive OR gate circuit of the zero-th digit and the carry input Cin and defining this as the result of sum of the zero-th digit, and exclusive OR gate circuits of the first row to the seventh row which take the exclusive OR logics between the negative logic of the output codes Ti,1 of the sum ternary code generation circuits CGA1 to CGA7 of the first digit to the seventh digit and the output codes of the K logic circuits KLD30 to KLD33 and KLR34 to KLR36 of the zero-th row to the sixth row of the third column and define them as the results of the sum of the first digit to the seventh digit is further added, the adder of a BLC addition system can be constituted.

Further, in FIG. 40, the sign optimized BLC array is configured having n=8 number of sum ternary code generation circuits (decision nodes) CGA0 to CGA7 for outputting either of three values as the result of a decision based on the digit values Xi, Yi and the K logic circuit matrix of 8 rows and 3 columns (m=3 is obtained as $\log_2 8 = 3$) with rows corresponding to the digits. The K logic circuit matrix is configured by the group of the K logic circuits of the first column provided with a K logic circuit KLDPN10 of the zero-th row as the dummy node for inverting the result of decision of the sum ternary code generation circuit CGA0 of the zero-th digit and propagating the same, a simplified K logic circuit KLRPN11 of the first row, and K logic circuits KLPN12 to KLPN17 of the second row to the seventh row; the group of K logic circuits of the second column provided with K logic circuits KLDNP20 and KLDNP21 of the zero-th row and first row as the inversion dummy nodes, simplified K logic circuits KLRNP22 and KLRNP23 of the second row and the third row, and K logic circuits KLNP24 to KLNP27 of the fourth row to the seventh row; and the group of K logic circuits of the third column provided with K logic circuits KLDPN30 to KLDPN33 of the zero-th row to the third row as the inversion dummy nodes and simplified K logic circuits KLRPN34 to KLRPN37 of the fourth row to the seventh row. Note that eight decision nodes and the groups of K logic circuits of the columns respectively simultaneously execute their operations. Further, the output codes of the K logic circuits from the zero-th row to the seventh row of the third column are respectively used as the carry output Cout to the first digit to the seventh digit and the external portion and it is interpreted that "there is a carry output" if the output code is "0" and that "there is no carry output" if the output code is "1" since m=3 (odd number).

With respect to the configuration of FIG. 40, if a sum generation circuit provided with an exclusive OR gate circuit of the zero-th digit taking the exclusive OR logic of the digit value X0 and the digit value Y0, an exclusive OR gate circuit of the zero-th row taking the exclusive OR logic of the output of the exclusive OR gate circuit of the zero-th digit and the carry input Cin and defining this as the result of the sum of the zero-th digit, and exclusive OR gate circuits of the first row to the seventh row which take the exclusive OR logics between the negative logic of the output codes Ti,1 of the sum ternary code generation circuits CGA1 to CGA7 of the first digit to the seventh digit and the negative logic of the output codes of the K logic circuits KLDPN30 to KLDPN33 and KLRPN34 to KLRPN36 of the zero-th row to the sixth row of the third column and define them as the results of sum of the first digit to the seventh digit is further added, an adder of the BLC addition system in which sign optimization is achieved can be configured.

As described above, the BLC adder of the BLC addition system of the present embodiment is configured so as to utilize the definitive property for the LSB (bit 0) to reflect the carry input Cin in the sum ternary code generation circuit CGA0 for performing the decision of existence of a carry of the LSB, whereby the binary tree structure of the K value logical circuits following this and a BLC array not having the −1-th row as in the conventional BLC adder and therefore having one less row than the conventional BLC adder can be configured. This is excellent in the point of the number of gates and surface area. Further, in the binary tree of the K value logical circuits for realizing the K logic functions, by providing the K value logical circuits KLR of a configuration simplified by using only a selector, the logically redundant circuits can be eliminated and it is possible to form a binary tree having a smaller number of transistors. Further, the adder of the BLC addition system according to the present embodiment does not have a composite logical gate circuit (or logical function of a composite logical gate circuit) and does not have the disadvantageous aspects of a composite logical gate circuit, therefore it is simpler and faster in speed in comparison with the conventional adder of a BLC system. Further, the sum ternary code generation circuit CGA for generating the ternary code is simpler and can be realized by a smaller number of gates (number of transistors).

(Reduced BLC Array)

However, the BLC Array shown in FIG. 39 and FIG. 40 has too many transistors. Therefore, in order to further reduce the number of gates of the BLC array, the number of even number rows of the BLC array is eliminated and the reduced BLC array is used to realize the adder as shown in FIG. 41.

The reduced BLC array only generates a carry signal to an even number bit. A carry signal to an odd number bit cannot be directly obtained. Namely, in the bit 6 and the bit 7 illustrated in FIG. 41, a carry signal to the bit 6 is obtained, but a carry signal to the bit 7 has not been obtained. The carry signal to the bit 7 is indirectly generated by the carry signal to the bit 6 and the ternary code generated at the input stage of the bit 6. Since the reduced BLC array is configured in this way with the stages generating a carry to an odd number stage cascade connected to the binary tree, the delay is slightly increased, but the number of gates is greatly decreased.

Figure 41:
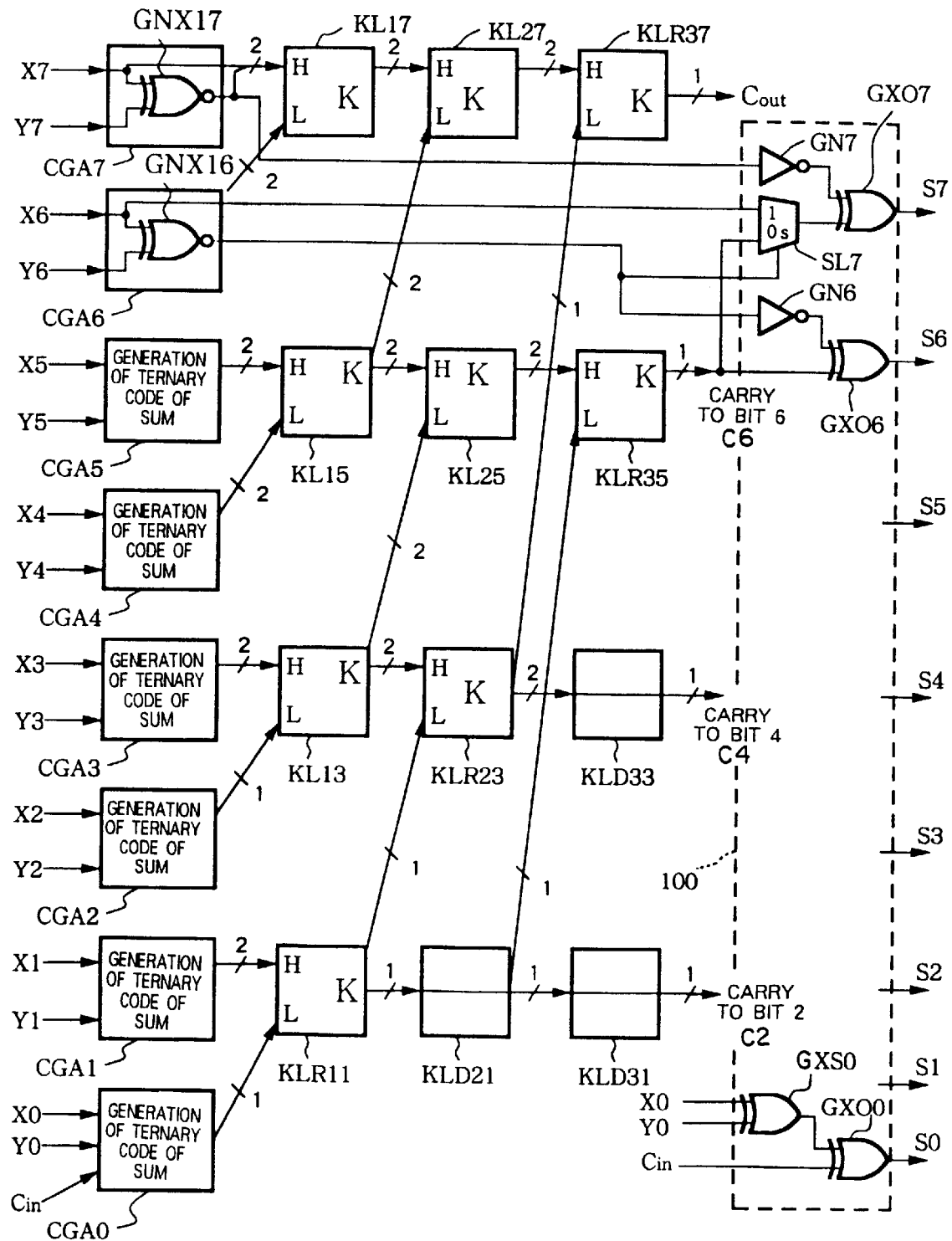
FIG. 41 is a view of the configuration of a reduced BLC array and an adder of a BLC addition system by the sum generation unit according to the fourth embodiment of the present invention.

In FIG. 41, the reduced BLC array is configured having n=8 number of sum ternary code generation circuits (decision nodes) CGA0 to CGA7 for outputting either of three values as the result of the decision based on the digit values Xi, Yi and a K logic circuit matrix of 4 rows and 3 columns (m=3 is obtained as $\log_2 8=3$) with rows corresponding to the odd number digits. The K logic circuit matrix is configured by the group of K logic circuits of the first column provided with the simplified K logic circuit KLR11 of the first row and K logic circuits KL13, KL15, and KL17 of the third row, fifth row, and seventh row; the group of K logic circuits of the second column provided with the K logic circuit KLD21 of the first row as the dummy node, the simplified K logic circuit KLR23 of the third row, and the K logic circuits KL25 and KL27 of the fifth row and the seventh row; and the group of K logic circuits of the third column provided with the K logic circuits KLD31 and KLD33 of the first row and the third row as the dummy nodes and the simplified K logic circuits KLR35 and KLR37 of the fifth row and the seventh row. Note that the eight decision nodes and the groups of K logic circuits of the columns are respectively simultaneously executed.

Further, in FIG. 41, the sum generation unit 100 is further added. Namely, the sum generation unit 100 is provided with an exclusive OR gate circuit GXS0 of the zero-th digit for taking the exclusive OR logic of the digit value X0 and the digit value Y0 and the sum generation circuit. Here, the sum generation circuit is configured provided with an exclusive OR gate circuit GXO0 of the zero-th row which takes the exclusive OR logic of the output of the exclusive OR gate circuit GXS0 of the zero-th digit and the carry input Cin and defines this as the result S0 of sum of the zero-th digit; an exclusive OR gate circuit of the first row (not illustrated) which takes the exclusive OR logic of the output code T0,0 of the sum ternary code generation circuit CGA0 of the zero-th digit and the negative logic of the output code T1,1 of the sum ternary code generation circuit CGA1 of the first digit and defines this as the result S1 of the sum of the first digit; a selector (carry generating means) SLf of the f-th row (only SL7 is displayed in the figure) for selecting the input digit value Xf or Yf to the row when the output code Tf,1 of the sum ternary code generation circuit CGAf (f=even number from 2 to 6) of the f-th digit is "1", selecting the output code of the K logic circuit of the f−1-th row when the output code Tf,1 is "0", respectively, and outputting this as a carry to the f+1-th row; an exclusive OR gate circuit GXOf of the f-th row which takes the exclusive OR logic of the negative logic of the output code Tf,1 of the sum ternary code generation circuit CGAf of the f-th digit and the output code of the K logic circuit of the f−1-th row and defines this as the result Sf of the sum of the f-th digit; and an exclusive OR gate circuit GXOf+1 of the f+1-th row which takes the exclusive OR logic of the negative logic of the output code Tf+1,1 of the sum ternary code generation circuit CGAf+1 of the f+1-th digit and the output of the selector SLf of the f-th row and defines this as the result Sf+1 of the sum of the f+1-th digit.

Further, the partial logical circuit of the sum generation circuit illustrated in FIG. 41 is configured by three parts, that is, the sum generation part of the bit 6, the part for ternary code interpretation of the bit 6 and carry generation of the bit 7, and the sum generation part of the bit 7. This logical circuit is one with the assignment of $\{00, 01, 11, 10\}=\{Q, Q, Y, N\}$. Accordingly, when another method of assignment is adopted, the sum generation circuit naturally becomes a different logical structure, but the basic framework is configured by the now mentioned three parts.

Figure 42:
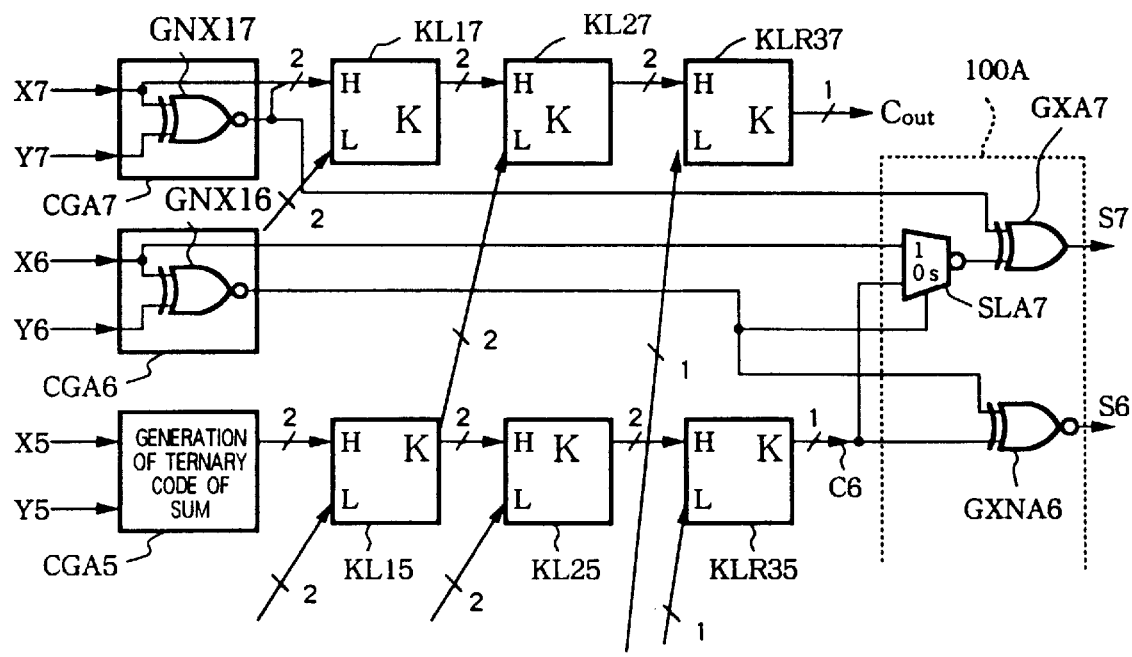
FIG. 42 is a view of the configuration of a modification having as another configuration the sum generation circuit in the adder of the BLC addition system of FIG. 41 (first)
Figure 43:
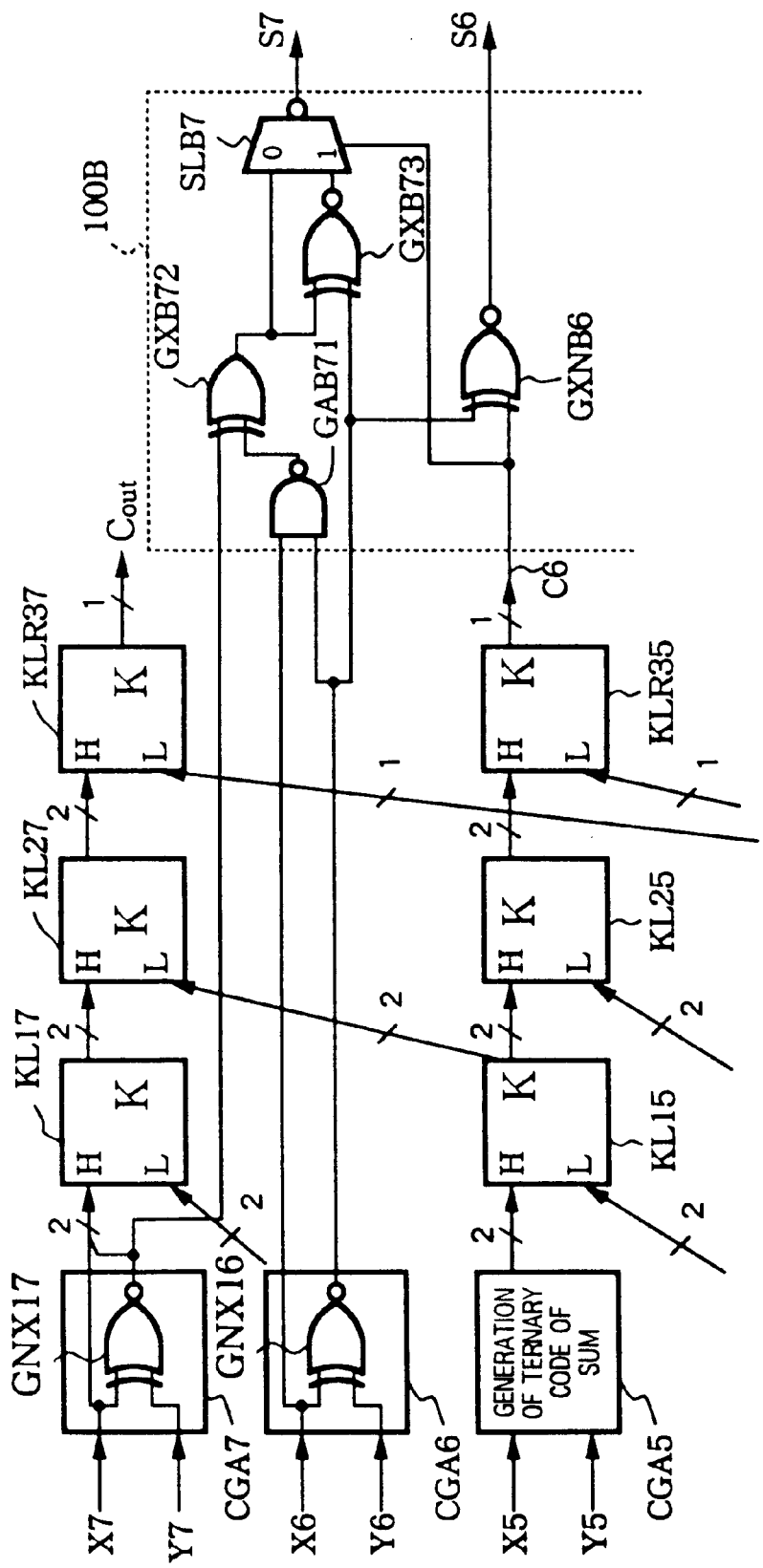
FIG. 43 is a view of the configuration of a modification having as another configuration the sum generation circuit in the adder of the BLC addition system of FIG. 41 (second)

Further, in FIG. 42 and FIG. 43, another example of the configuration of the sum generation circuit is shown. First, in FIG. 42, the sum generation part of the bit 6 and the sum generation part of the bit 7 are shown. Namely, the partial configuration of the sum generation circuit from the bit 2 to the bit 7 is configured provided with a selector (carry generating means) SLAf of the f-th row for taking the negative logic of the results obtained by respectively selecting the input digit value Xaf or Ybf to the row when the output code Tf,1 of the ternary code generation circuit CGAf (f=even number of 2 to 6) of the sum of the f-th digit is "1" and selecting the output code of the K logic circuit of the f−1-th row when the output code Tf,1 is "0" and outputting the result as a carry to the f+1-th digit; an exclusive NOR gate circuit GXNAf of the f-th row which takes the exclusive NOR logic of the output code Tf,1 of the decision node of the f-th digit and the output code of the K logic circuit of the f−1-th row and defines this as the result Sf of sum of the f-th digit; and an exclusive OR gate circuit GXAf of the f+1-th row which takes the exclusive OR logic of the output code Tf+1,1 of the sum ternary code generation circuit CGAf+1 of the f+1-th digit and the output of the selector SLAf of the f-th row and defines the same as the result Sf+1 of the sum of the f+1-th digit.

Next, FIG. 43 is a partial view of the configuration of the sum generation part of the bit 6 and the sum generation part of the bit 7 in another example of the configuration of the sum generation circuit. The partial configuration of the sum generation circuit from the bit 2 to the bit 7 is configured provided with a NAND gate circuit GABf1 which takes the NAND logic of the output code Tf,1 of the sum ternary code generation circuit CGAf (f=even number of 2 to 6) of the f-th digit and the input digit value Xaf or Ybf to the row; an exclusive OR gate circuit GXBf2 which takes the exclusive OR logic of the output code Tf+1,1 of the sum ternary code generation circuit CGAf+1 of the f+1-th digit and the output of the NAND gate circuit GABf1 and outputs the zero-th selected signal of the f+1-th row; an exclusive NOR gate circuit GXBf3 which takes the exclusive NOR logic of the output code Tf,1 of the sum ternary code generation circuit CGAf of the f-th digit and the zero-th selected signal of the f+1-th row and outputs the first selected signal of the f+1-th row; an exclusive NOR gate circuit GXNBf which takes the exclusive NOR logic of the output code Tf,1 of the sum ternary code generation circuit CGAf of the f-th digit and the output code of the K logic circuit of the f−1-th row and defines this as the result Sf of the sum of the f-th digit; and a selector (sum generation selecting means) SLBf of the f+1-th row for taking the negative logic obtained by selecting the first selected signal of the f+1-th row when the output code of the K logic circuit of the f−1-th row is "1" and selecting the zero-th selected signal of the f+1-th row when the output code is "0" and defining the same as the result Sf+1 of the sum of the f+1-th digit. In comparison with the configuration of FIG. 41, the amount of hardware is increased, but for the route including a carry signal in which the signal propagation delay time is critical, the delay of the selector and the exclusive OR gate circuit in FIG. 41 becomes the delay from the selection terminal of the selector to only the output terminal in FIG. 43, thus an adder capable of performing a sum generation at a higher speed can be realized.

As described above, the adder of the reduced BLD addition system of the present embodiment uses a reduced BLC array obtained by deleting the even number rows of the BLC array and reducing the number of gates so as to reduce the number of gates of the BLC array and the many long wirings existing in the BLC array to half. On the other hand, the number of operation steps is increased by one, but since the number of elements and the wirings of the BLC array were halved, the structure of the BLC array becomes simpler and an effect is produced of reducing the delay, thus an increase of the number of steps does not always mean an increase of the delay. As a result, the delays of the adders of the BLC array in which the even number rows are not deleted and the BLC array in which they are deleted become equivalent. Note that then the adder according to the reduced BLC array is excellent in terms of the number of transistors and the simplicity of the wiring.

6.3.4 Other Assignment of Ternary Code

There is a case where the logical circuit of the input stage becomes more refined by changing the binary expression of the ternary code. Namely, when assignment of other expressions is made, not only the input stage, but also the logical circuits of the constituent element of the binary tree can change.

Here, again, the above method of assignment is given as: $\{00, 01, 11, 10\}=\{Q, Q, Y, N\}$ Q is assigned two binary expressions. This means that $Q=\{0*\}$. "*" means "don't care".

Where four types of binary expressions $\{00, 01, 11, 10\}$ are assigned to the ternary code $\{Q, Y, N\}$, several systems result depending on what is done with the remaining one expression. FIG. 44 and FIG. 45 show four representative systems of the ternary code binary tree including the above assignment and the K logic function and the K logic circuit thereof.

First, in the $\{00, 01, 11, 10\}=\{Y, F, Q, Y\}$ assignment shown in FIG. 44A, the K logic function becomes as in the following equations. Note that "F" means "forbidden".

$$T1 = H1 \cdot (\hat{~}H0 + L1)$$

$$T0 = H0 \cdot L0$$

Further, when the code H is superior to the code L, the K logic circuit is configured provided with a composite logical gate circuit (ninth composite logical gate means) GC9 for taking the AND logic between the OR logic of the code ^H0 of the negative logic of the code H0 and the code L1 and the code H1 and outputting the result as the code T1 and an AND gate circuit GA1 for taking the AND logic of the code H0 and the code L0 and outputting the result as the code T0.

Next, in the $\{00, 01, 11, 10\}=\{F, Y, Q, Y\}$ assignment shown in FIG. 44B, the K logic function becomes as in the following equations:

$$T1 = \hat{~}H0 + H1 \cdot L1$$

$$T0 = \hat{~}H1 + H0 \cdot L0$$

Further, where the code H is superior to the code L, the K logic circuit is configured provided with a composite logical gate circuit (seventh composite logical gate means) GC7 for taking the OR logic between the AND logic of the code H1 and the code L1 and the code ^H0 which is the negative logic of the code H0 and outputting the result as the code T1 and a composite logical gate circuit (eighth composite logical gate means) GC8 for taking the OR logic between the AND logic of the code H0 and the code L0 and the code ^H1 which is the negative logic of the code H1 and outputting the result as the code T0.

Next, in the {00, 01, 11, 10}={Y, F, N, Q} assignment shown in FIG. 45A, the K logic function becomes as in the following equations:

T1=H0+H1·L1

T0=H0+H1·L0

Further, when the code H is superior to the code L, the K logic circuit is configured provided with a composite logical gate circuit (first composite logical gate means) GC1 for taking the OR logic between the AND logic of the code H1 and the code L1 and the code H0 and outputting the result as the code T1 and a composite logical gate circuit (second composite logical gate means) GC2 for taking the OR logic between the AND logic of the code H1 and the code L0 and the code H0 and outputting the result as the code T0.

6.3.5 Modification of Embodiment

Further, the {00, 01, 11, 10}={Q, Q, Y, N} assignment shown in FIG. 45B is the assignment used in the development of the above embodiment etc. and is illustrated for comparison. Namely, the embodiment of the comparator and the adder using the {Q, Q, Y, N} assignment is as explained above. Here, even considering a case where the comparator and the adder using the {Y, F, N, Q} assignment, the binary tree may be similarly formed by adopting the K logic circuit of FIG. 45A. The structure of the binary tree and the structure of the reduced BLC array per se are the same. Note it is necessary to use the input stages of the comparator and adder, the sum generation circuit of the adder, etc. which have logical circuit structures suited to them. Examples of these circuits are shown in FIG. 46.

FIG. 46A is a circuit diagram of the comparison ternary code generation circuit CGCa serving as the input stage when the comparator is configured by a {00, 01, 11, 10}={Y, F, N, Q} assignment. In the figure, the comparison ternary code generation circuit CGCa is configured provided with a NAND gate circuit GNA11 which takes the NAND logic of the digit value Xi and the negative logic of the digit value Yi by the negative logic gate circuit GN11 for the n bits of digits (Xi, Yi; i=0 to n−1) and outputs the same as the code Ti,1; and a NOR gate circuit GNO11 which takes the NOR logic of the digit value Xi and the negative logic of the digit value Yi by the negative logic gate circuit GN11 and outputs the same as the code Ti,0.

Further, FIG. 46B is a circuit diagram of the sum ternary code generation circuit CGAa serving as the input stage when the adder is configured by a {00, 01, 11, 10}={Y, F, N, Q} assignment. In the figure, the sum ternary code generation circuit CGAa is configured provided with a NAND gate circuit GNA12 which takes the NAND logic of the digit value Xi and the digit value Yi for n bits of digits (Xi, Yi; i=0 to n−1) and outputs the result as the code Ti,1; and a NOR gate circuit GNO12 which takes the NOR logic of the digit value Xi and the digit value Yi and outputs the result as the code Ti,0.

Further, FIGS. 46C and 46D are circuit diagrams of the case where the ternary code binary tree is comprised by a {00, 01, 11, 10}={Y, F, N, Q} assignment and of a K logic circuit KLaPN having a positive logic input and negative logic output and a K logic circuit KLaNP having a negative logic input and positive logic output which become the higher priority determination nodes when sign optimization is applied.

In FIG. 46C, the K logic circuit KLaPN having a positive logic input and negative logic output is configured provided with a composite logical gate circuit GC3 which takes the NOR logic between the AND logic of the code Ti,1 and the code Tj,1 and the code Ti,0 and outputs the result as the code ^Tij,1 when receiving the code Ti due to the result of the decision of the higher significant bit and the code Tj due to the result of the decision of the lower significant bit as its inputs and with a composite logical gate circuit GC4 which takes the NOR logic between the AND logic of the code Ti,1 and code Tj,0, and the code Ti,0 and outputs the result as the code ^Tij,0.

In FIG. 46D, the K logic circuit KLANP having a negative logic input and positive logic output is configured provided with a composite logical gate circuit GC5 which takes the NAND logic between the OR logic of the code ^Ti,1 and the code ^Tj,1 and the code ^Ti,0 and outputs the result as the code Tij,1 when receiving the code ^Ti due to the result of the decision of the higher significant bit and the code ^Tj due to the result of the decision of the lower significant bit as its inputs and with a composite logical gate circuit GC6 which takes the NAND logic between the OR logic of the code ^Ti,1 and code ^Tj,0 and the code ^Ti0 and outputs the same as the code Tij,0.

Figure 60:
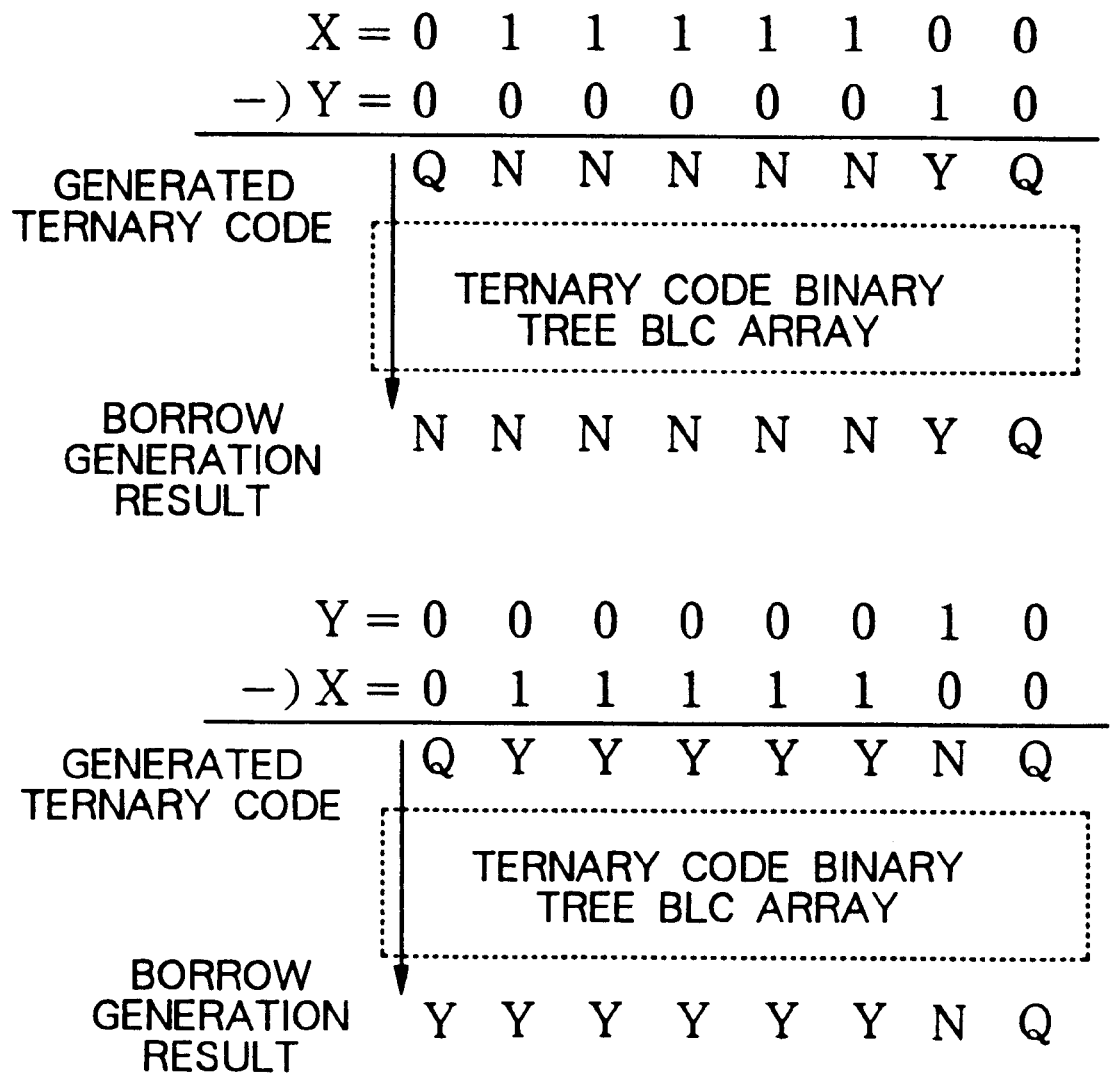
FIG. 60 is an explanatory view explaining the comparison of the ternary codes where the generations of the ternary codes of the bit 0 are made symmetrical.

Further, FIG. 46E is a partial circuit diagram of the sum generation when the adder is comprised by a {00, 01, 11, 10}={Y, F, N, Q} assignment and replaces the sum generation circuit in the circuit diagram of the configuration of FIG. 60. In the figure, the partial circuit generating the sum of the odd number bit and the even number bit is configured provided with a NAND gate circuit GA21 which takes the NAND logic of the output code Ti,1 from the sum ternary code generation circuit (input stage) of the odd number bit and the ^code Ti,0; a NOR gate circuit GNO21 which takes the NOR logic of the output code ^Tj,1 from the sum ternary code generation circuit (input stage) of the even number bit and the code Tj,0; a selector SL11 which takes the negative logic of the result obtained by respectively selecting the carry to the even number bit when the output of the NOR gate circuit GNO21 is "1" and selecting the output code ^Tj,1 from the sum ternary code generation circuit of the even number bit when the output is "0" and outputs the result as the carry signal to the odd number bit; an exclusive OR gate circuit GX11 which takes the exclusive OR logic of the output of the NAND gate circuit GA21 and the output of the selector SL11 (carry to the odd number bit) and outputs the result as the result of the sum of the odd number bits; and an exclusive OR gate circuit GX12 which takes the exclusive OR logic of the output of the NOR gate circuit GNO21 and the carry signal to the even number bit and outputs the result as the result of the sum of the even number bits.

As described above, in the arithmetic and logic unit of the present invention and the method of operation thereof, when a suitable ternary code generation question is defined by sufficiently considering the processing desired to be realized by the designer, it is sufficient if the most convenient system of the ternary code binary tree for later is selected. By selecting system matching the processing contents, it becomes possible to realize a suitable arithmetic and logic unit of a ternary code binary tree form and a method of operation thereof.

[Fifth Embodiment]

6.4 Embodiment of Subtractor

6.4.1 Difference Ternary Code Generation

Next, in order to form a ternary code binary tree for judging whether or not a borrow occurs, the difference ternary code generation question may be defined as follows based on the contents of the decision explained in "4.2.3 Case of Borrow of Subtraction".

Difference ternary code generation question: "Does the difference (Xi−Yi) of two numbers of the same digit place become negative (that is, borrow occurs. Xi<Yi) (Yes)?

become positive (that is, borrow does not occur. Xi>Yi) (No)?

become 0 (that is, do not know since it depends upon one lower position. Xi=Yi) (Q)?"

When this question is applied to the subtraction of n-bit binary numbers, the truth table of the logical function as shown in FIG. 47A is obtained, and further the logical functions:

$$Ti,1 = Xi(+)Yi$$

$$Ti,0 = Yi \tag{6}$$

are obtained. Accordingly, from equation (6), the difference ternary code generation circuit which serves as the input stage of the subtractor becomes as shown in FIG. 47B.

Namely, in FIG. 47B, the decision node which serves as the input stage of the subtractor is realized by a difference ternary code generation circuit CGSi (here, i is represented as i=0 to n−1) provided with an exclusive NOR gate circuit GX1 which takes the exclusive OR logic of the digit value Xi and the digit value Yi and outputs the result as the code Ti,1 and a connection line SGS for outputting the digit value Yi as the code Ti,0.

The difference ternary code generation circuit used in the input stage of the subtractor according to the present invention is not configured with an inverter added to the input stage of the adder as in the conventional subtractor, but includes part of the logical operation for finding the difference as the logic of the internal portion irrespective of the number of gates and the signal propagation delay being equivalent to those of the input stage of the adder (sum ternary code generation circuit) as will be explained later. Accordingly, it is possible to realize a subtractor with an ideal configuration without causing an increase of the number of gates and an increase of the signal propagation delay. Further, since it includes a logical operation to be carried out by the difference generation of the output stage, the logical circuit of the output stage becomes simpler and can be realized by a smaller number of gates.

Note that the difference ternary code generation question is not limited to binary numbers and can be adapted to any R-nary numbers. This is because if it is possible to use a circuit system capable of R-nary expression such as a multiple value logical circuit or analog circuit to realize a difference ternary code generation circuit in line with this ternary code generation question, the borrow Bi to each digit can be generated by the BLB array of the ternary code binary tree corresponding to the BLC array in the adder later. For the difference generation, if a circuit (one R-nary digit's worth of subtractor) for realizing (Xi−Yi−Bi) is separately prepared and combined with this, an R-nary subtractor is obtained.

6.4.2 Definitive Property of Bit 0

As explained in "4.2.3 Case of Borrow of Subtraction", it is impossible to answer "do not know due to dependency" in the final conclusion with respect to the question of whether or not a borrow occurs. This is because the bit 0 has a definitive property and the answer becomes either "Yes" or "No". In the bit 0, there is no dependency with respect to a lower significant digit. Since there is no dependency, the answer can never not be known. There is never the answer "Q". The truth table of the ternary code generation of the bit 0 based on this is shown in FIG. 48A. Here, Bin is a borrow input from an external portion.

It is clear from the truth table that the code T0,1 always becomes "1". An output which always becomes a constant value irrespective of the input can be deleted. The difference ternary code generation circuit CGS0 of the bit 0 which is obtained as a result of this is shown in FIG. 48B.

In FIG. 48B, the difference ternary code generation circuit CGS0 of the bit 0 is configured having a NOR gate circuit GNO21 which takes the NOR logic of the negative logic of the digit value X0 by the negative logic gate circuit GN21 and the digit value Y0; a NAND gate circuit GNA21 which takes the NAND logic of the negative logic of the digit value X0 by the negative logic gate circuit GN21 and the digit value Y0; and a selector (selecting means) SL21 for taking the negative logic of the results obtained by respectively selecting the output of the NOR gate circuit GNO21 when the borrow input Bin to the subtractor is "1" and selecting the output of the NAND gate circuit GNA21 when the borrow input Bin is "0" and outputting the result as the code T0,0 and does not output the code T0,1.

Figure 49A:
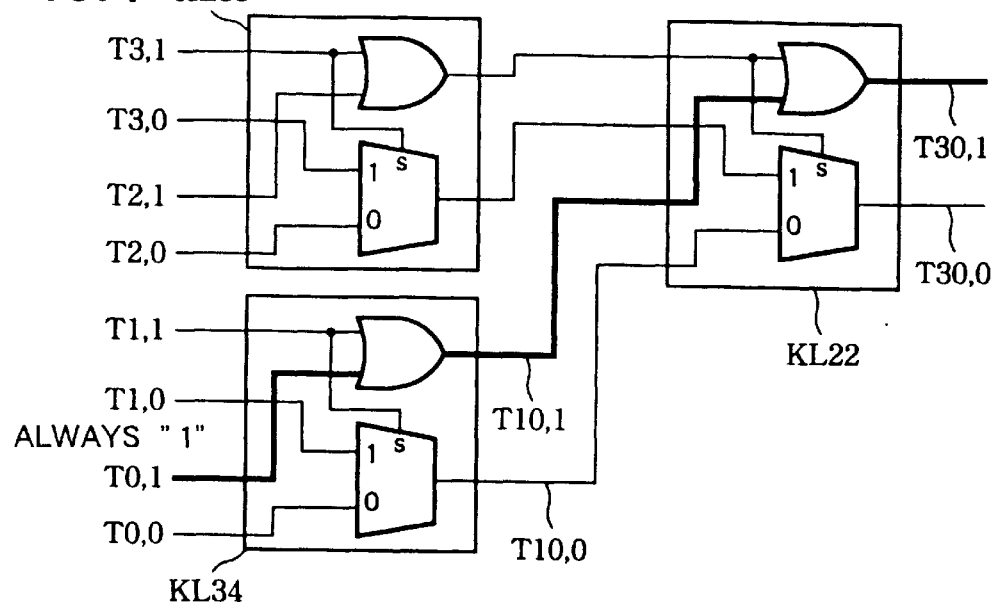
FIGS. 49A and 49B are explanatory views of the K logic circuit simplified by the definitive property of the bit 0.

Further, by utilizing the fact that the code T0,1 is always "1", the redundant logic of the K logic circuit KL can be deleted. The binary tree of the K logic circuits in the subtractor before deletion is shown in FIG. 49A. It will be understood that the signals which always become "1"(bold line in the figure) are successively propagated. There is no problem even if the logic on a route always becoming a constant value is deleted. Accordingly, as shown in FIG. 49B, a binary tree using the K logic circuits KLR simplified by deleting the redundant logic is obtained.

Figure 49B:
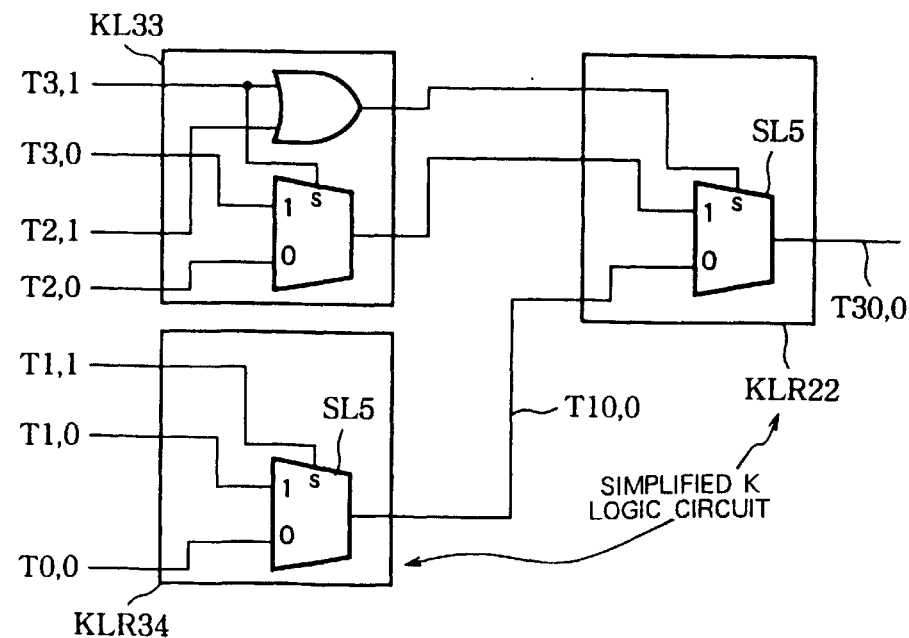

In FIG. 49B, among the K logic circuits, the K logic circuit due to the code T0,1 which should be output by the difference ternary code generation circuit CGS0 performing a decision of existence of a borrow for the LSB of the two numbers is realized by a simplified K logic circuit KLR provided with a selector (selecting means) for respectively selecting the code Ti,0 when the code Ti,1 is "1", selecting the code Tj,0 when the code Ti,1 is "0", and outputting the result as the code Tij,0 and does not output the code Tij,1. Note that it is interpreted that "there is a borrow output" if the output code of the K logic circuit KLR which serves as the root of the binary tree is "1" and that "there is no borrow output" if the output code is "0", respectively.

6.4.3 Configuration of Borrow Generation Binary Tree (Case of Borrow Generation Binary Tree)

Figure 50:
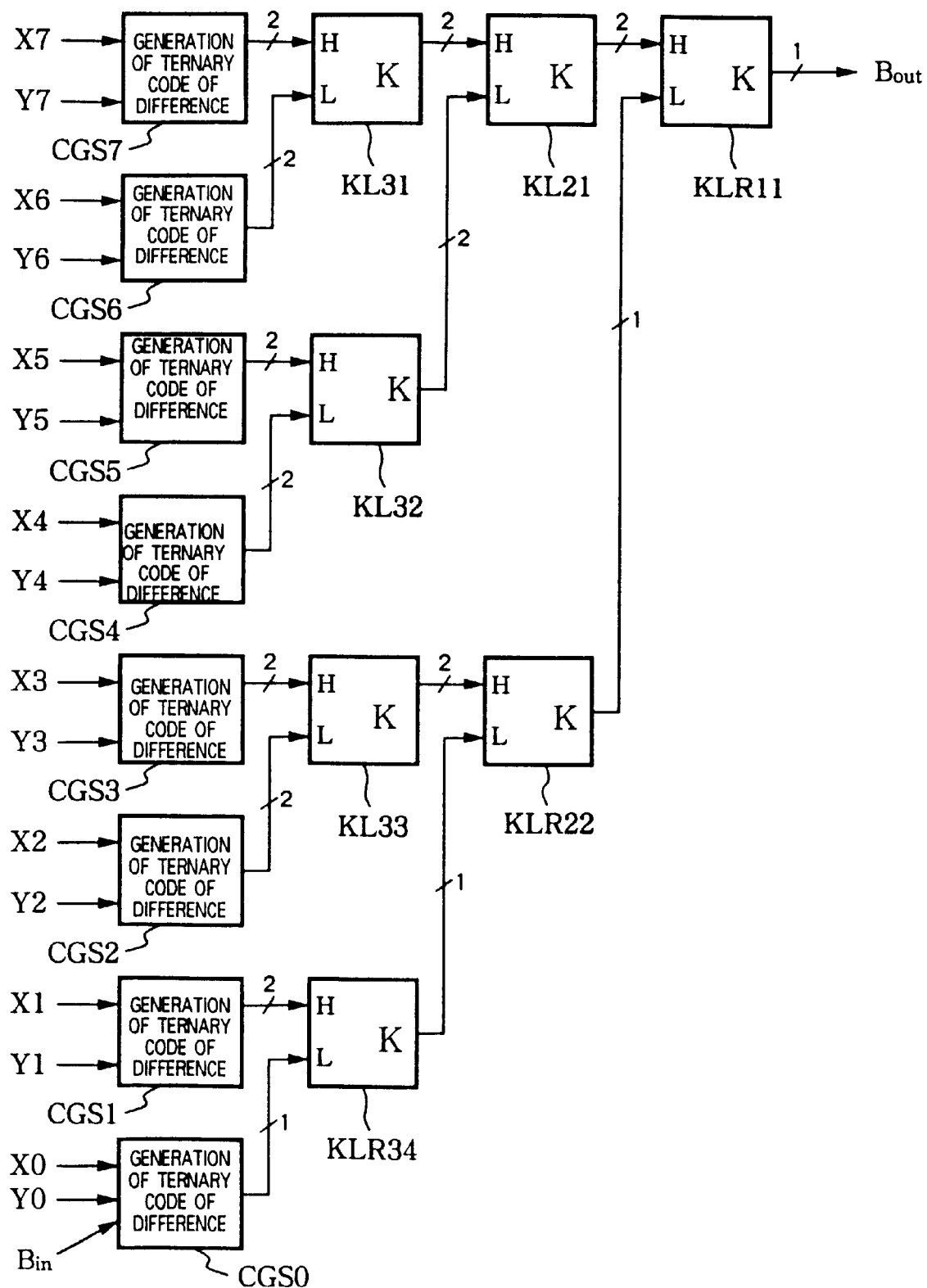
FIG. 50 is a view of the configuration of a borrow generation binary tree of 8-bit binary numbers according to a fifth embodiment of the present invention.

A binary tree generating a borrow can be realized by a binary tree formed by using difference ternary code generation circuits CGSi (i=0 to n−1) as leaves and using K logic circuits KL or KLR as the constituent elements. As a concrete example, the case of 8 bits is shown in FIG. 50. A K logic circuit through which the signal from the bit 0 is propagated is a simplified K logic circuit KLR. Further, the output of the simplified K logic circuit KLR is 1 bit.

In FIG. 50, the borrow generation binary tree of 8-bit binary numbers (X, Y) is configured having the difference ternary code generation circuits CGS0 to CGS7 as the decision nodes and the K logic circuits KLR11, KL21, KLR22, KL31 to KL33 and KLR34 as the higher priority determination nodes and creates a model of the problem by a ternary code binary tree using the difference ternary code generation circuits CGS0 to CGS7 as the leaves and K the logic circuits KLR11, KL21, KLR22, KL31 to KL33, and KLR34 as the nodes other than the leaves. Note that the difference ternary code generation circuits CGS0 to CGS7 which serve as the leaves and the K logic circuits KLR11, KL21, KLR22 and the K logic circuits KL31 to KL33 and KLR34 located at the same depth in the binary tree simultaneously execute their operations.

In the concrete example of FIG. 50, a binary tree generating a borrow signal Bout (external output) generated in the subtraction of two 8-bit numbers is shown. In general, in order to generate a borrow signal to the bit n, a binary tree ranging the bit (n–1) to the bit 0 becomes necessary.

As described above, with the subtractor of the present embodiment, in the subtraction of 8-bit binary numbers (X, Y), a difference ternary code generation circuit (decision node) CGSi is realized by the exclusive OR gate circuit GX21 and the connection line SGS, and the ternary code in the subtraction is generated by the difference ternary code generation circuit CGSi which serves as a leaf of the binary tree, whereby the borrow look-ahead circuit of the binary subtractor can be realized. Further, also the logic per se of the difference ternary code generation circuit is simple and the circuit can be realized by a smaller number of gates (number of transistors).

(Overall Configuration of Borrow Generation Binary Tree: BLB Array)

Figure 51:
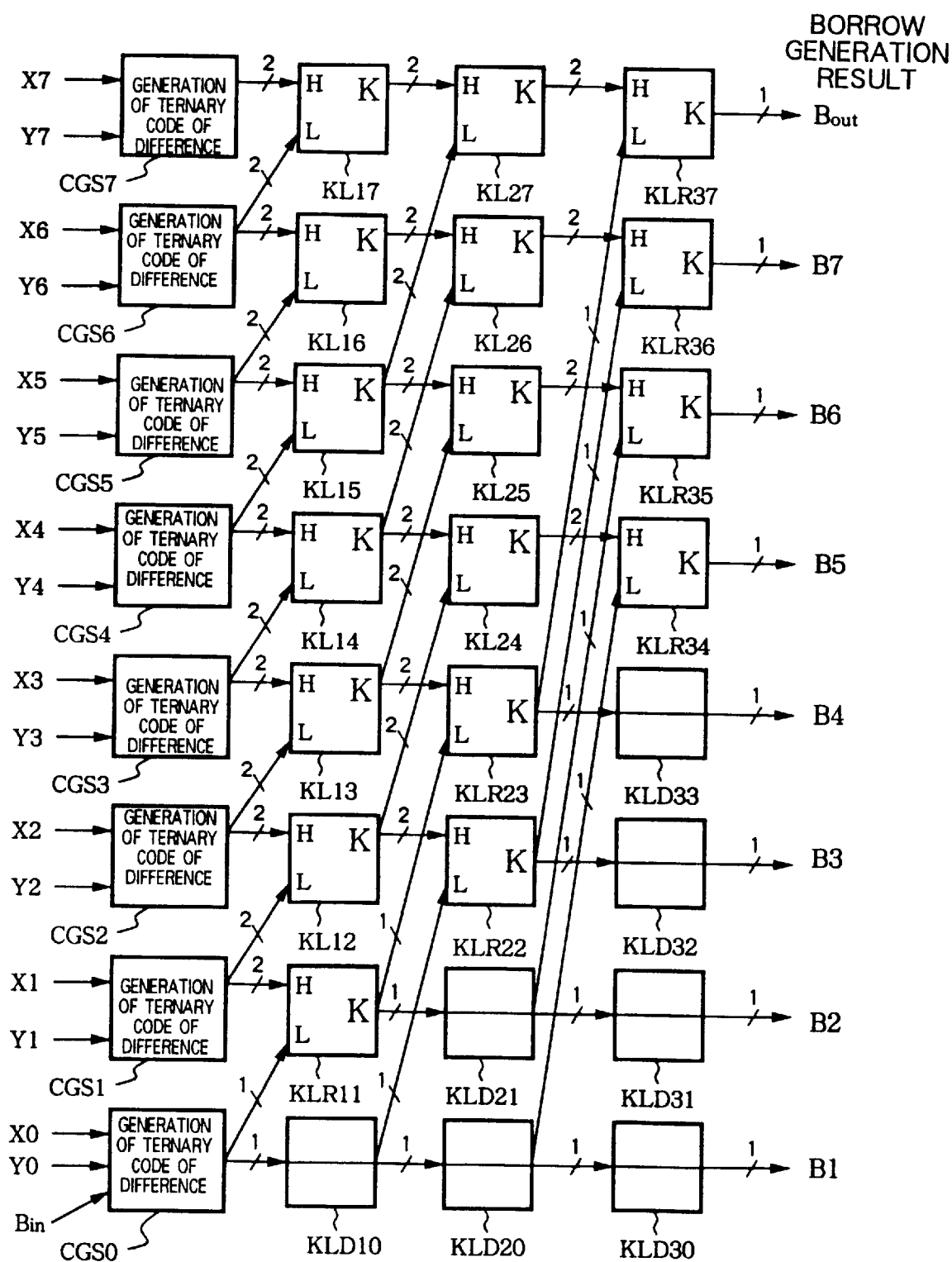
FIG. 51 is a view of the configuration of a BLB array generating a borrow of 8-bit binary numbers according to the fifth embodiment of the present invention.

Next, in the same way as the formation of a binary tree generating a borrow to the bit 7, when binary trees generating digit borrows to each bit are formed for every bit and superimposed, the result becomes as shown in FIG. 51.

In FIG. 51, the K logic circuits for realizing the difference ternary code generation circuits and the K operators are arranged in the form of array. This is a so-called BLB array of a ternary code binary tree corresponding to the BLC array in the adder.

In FIG. 51, the BLB array is configured having n=8 number of difference ternary code generation circuits (decision nodes) CGS0 to CGS7 for outputting either of three values as the result of a decision based on the digit values Xi, Yi and the K logic circuit matrix of 8 rows and 3 columns (m=3 is obtained as $\log_2 8=3$) with rows corresponding to the digits. The K logic circuit matrix is configured with the group of K logic circuits of the first column provided with a K logic circuit KLD10 of the zero-th row as the dummy node for propagating the result of the decision of the difference ternary code generation circuit CGS0 of the zero-th digit as it is, the simplified K logic circuit KLR11 of the first row, and the K logic circuits KL12 to KL17 of the second row to the seventh row; the group of K logic circuits of the second column provided with K logic circuits KLD20 and KLD21 of the zero-th row and first row as the dummy nodes, simplified K logic circuits KLR22 and KLR23 of the second row and the third row, and K logic circuits KL24 to KL27 of the fourth row to the seventh row; and the group of K logic circuits of the third column provided with the K logic circuits KLD30 to KLD33 of the zero-th row to the third row as the dummy nodes and simplified K logic circuits KLR34 to KLR37 of the fourth row to the seventh row. Note that the eight decision nodes and groups of K logic circuits of the columns are respectively simultaneously executed. Further, the output codes of the K logic circuits from the zero-th row to the seventh row of the third column are respectively used as the borrows B1 to B7 of the first digit to the seventh digit and the borrow output Bout to the external portion and it is interpreted that "there is a borrow output" if the output code is "1", while that "there is no borrow output" if the output code is "0".

In the design of an actual logical circuit, the technique called sign optimization is used in consideration of the property of the CMOS logical circuit. Here, "sign optimization" is a technique of converting a structure comprised of logical circuits having positive logic inputs and positive logic outputs cascade-connected in multiple stages to a structure comprising the stages of the positive logic input and negative logic output (PN stages) and the stages of the negative logic input and positive logic output (NP stages) alternately cascade-connected. By using this technique of sign optimization, the redundant transistors are reduced, and thus the number of transistors can be reduced and the operation speed can be improved.

Sign optimization can be carried out also for the subtractor of the present embodiment shown here. Namely, sign optimization is carried out for the K logic circuits KL having positive logic inputs and positive logic outputs to obtain the K logic circuits KLPN having positive logic inputs and negative logic outputs shown in FIG. 52A and the K logic circuits KLNP having negative logic inputs and positive logic outputs shown in FIG. 52B.

Figure 52A:
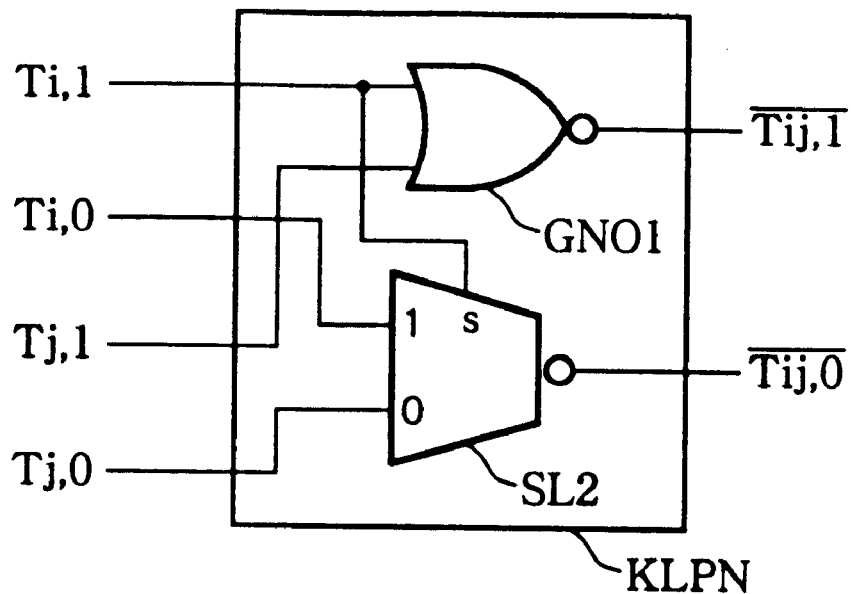
FIG. 52A and FIG. 52B are circuit diagrams of a sign optimized K logic circuit.

In FIG. 52A, a K logic circuit KLPN having a positive logic input and negative logic output is configured provided with a NOR gate circuit GNO1 which takes the NOR logic of the code Ti,1 and the code Tj,1 and outputs the result as the code ~Tij,1 and with a selector (second selecting means) SL2 for taking the negative logic of the results obtained by respectively selecting the code Ti,0 when the code Ti,1 is "1" and selecting the code Tj,0 when the code Ti,1 is non and outputting the result as the code ~Tij,0.

Figure 52B:
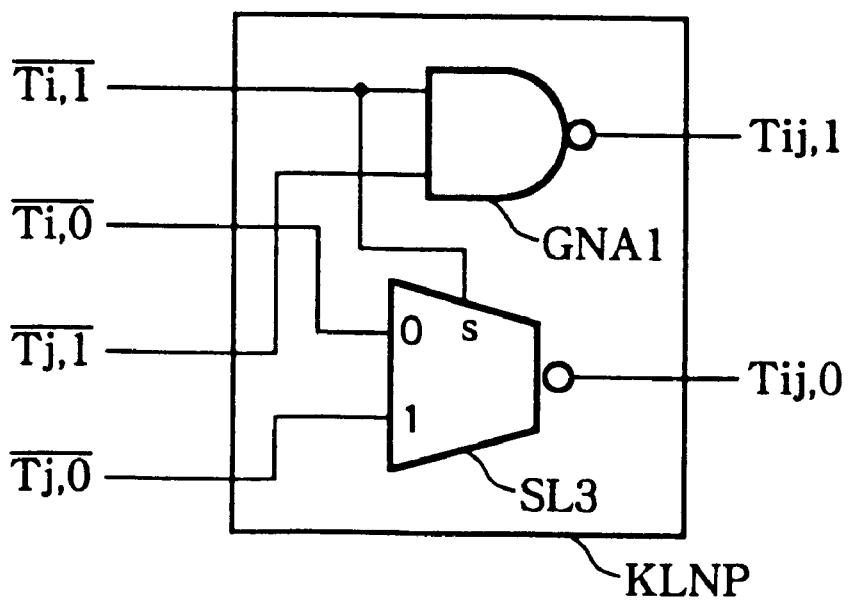

In FIG. 52B, a K logic circuit KLNP having a negative logic input and positive logic output is configured provided with the NAND gate circuit GNA1 which takes the NAND logic of the code ~Ti,1 and the code ~Tj,1 and outputs the result as the code Tij,1 and with a selector (third selecting means) SL3 for taking the negative logic of the results obtained by respectively selecting the code ~Ti,0 when the code ~Ti,1 is "0" and selecting the code ~Tj,0 when the code ~Ti,1 is "1" and outputting the result as the code Tij,0.

Figure 53:
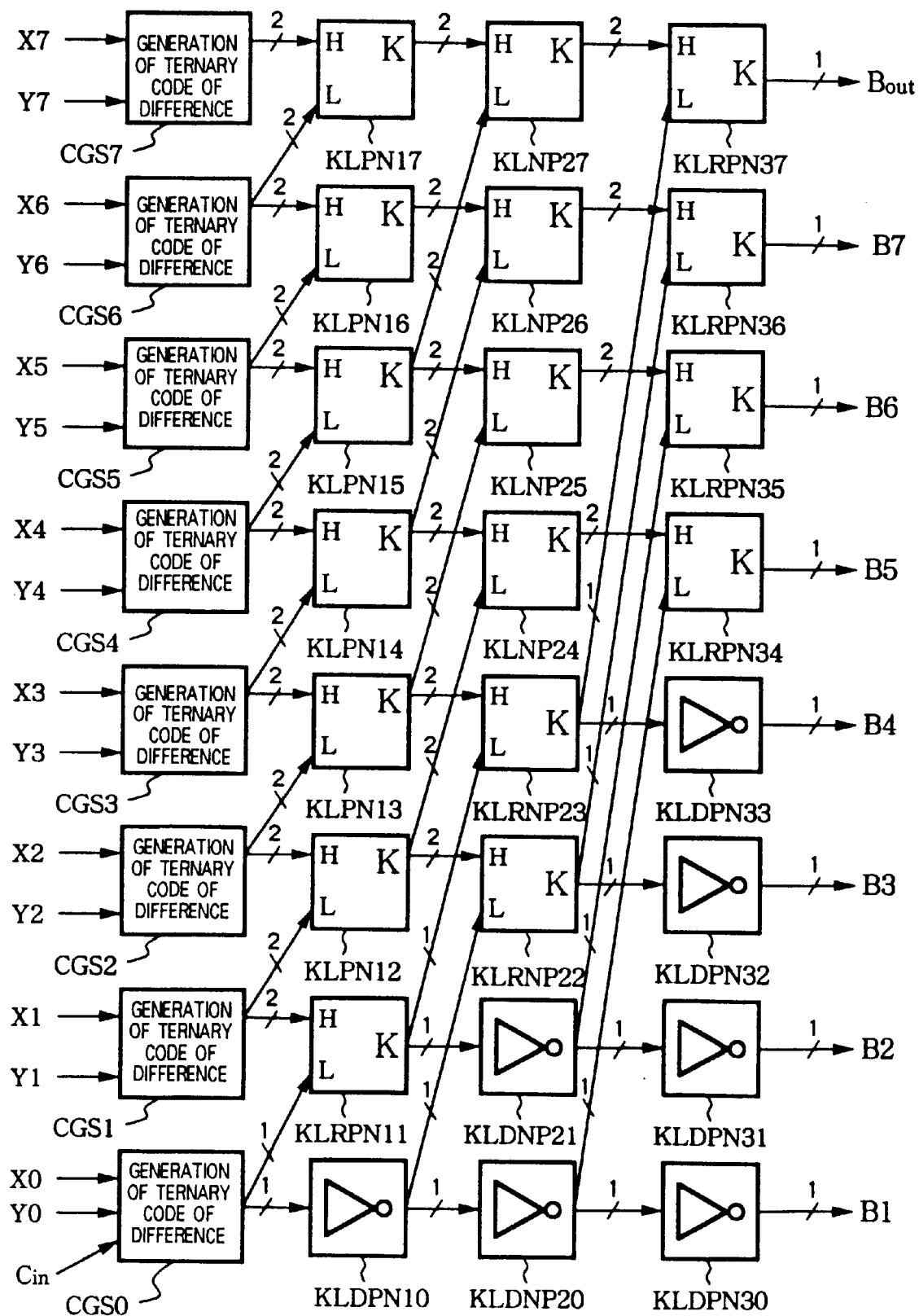
FIG. 53 is a view of the configuration of a BLB array generating a borrow of sign optimized 8-bit binary numbers.

If these K logic circuit KLPN of the positive logic input and negative logic output and K logic circuit KLNP of the negative logic input and positive logic output are used with respect to the BLB array of FIG. 51, the BLB array to which the sign optimization is applied as shown in FIG. 53 is obtained. Note that, where the sign optimization is applied, the dummy node is replaced by the inversion dummy node (inverter) performing the logic inversion.

In FIG. 54, the sign optimized BLB array is configured having n=8 number of difference ternary code generation circuits (decision nodes) CGS0 to CGS7 for outputting either of three values as the result of a decision based on the digit values Xi, Yi and the K logic circuit matrix of 8 rows and 3 columns (m=3 is obtained as $\log_2 8=3$) with rows corresponding to the digits. The K logic circuit matrix is configured by the group of K logic circuits of the first column provided with a K logic circuit KLDPN10 of the zero-th row as the dummy node for propagating the result of decision of the difference ternary code generation circuit CGS0 of the zero-th digit after inversion, a simplified K logic circuit KLRPN11 of the first row, and K logic circuits KLPN12 to KLPN17 of the second row to the seventh row; the group of K logic circuits of the second column provided with K logic circuits KLDNP20 and KLDNP21 of the zero-th row and first row as the inversion dummy nodes, simplified K logic circuits KLRNP22 and KLRNP23 of the second row and the third row, and K logic circuits KLNP24 to KLNP27 of the fourth row to the seventh row; and the

119 group of K logic circuits of the third column provided with K logic circuits KLDPN30 to KLDPN33 of the zero-th row to the third row as the inversion dummy nodes and simplified K logic circuits KLRPN34 to KLRPN37 of the fourth row to the seventh row. Note that the eight decision nodes and groups of K logic circuits of the columns respectively simultaneously execute their operations. Further, since m=3 (odd number), the output codes of the K logic circuits from the zero-th row to the seventh row of the third column are respectively used as borrows B1 to B7 of the first digit to the seventh digit and the borrow output Bout to the external portion and it is interpreted that "there is a borrow output" if the output code is "0", while that "there is no borrow output" if the output code is "1".

As described above, the BLB subtractor of the BLB subtraction system of the present embodiment utilizes the definitive property for the LSB (bit 0) to reflect the borrow input Bin in the difference ternary code generation circuit CGS0 for performing the decision on the existence of a borrow of the LSB, whereby the binary tree structure of the K value logical circuit following this can be simplified. This is excellent in the points of the number of gates and the surface area. Further, in a binary tree of K value logical circuits realizing K logic functions, by providing K value logical circuits KLR of configurations simplified by only a selector, the logically redundant circuits can be deleted, and a binary tree having the smaller number of transistors can be formed. Further, the subtractor of the BLB subtraction system according to the present embodiment is advantageous in the increase of speed since it does not have a composite logic gate circuit (or the logical function of a composite logic gate circuit) and does not have the disadvantageous aspects of the composite logic gate circuit. Further, the difference ternary code generation circuit CGS for generating the ternary code is simple and can be realized by a smaller number of gates (number of transistors).

[Generation of Difference]

The generation of the difference which is the final operation result is obtained by further subtracting the borrow Bi from the bit (i−1) to the bit i from the difference of the same digit places (Xi−Yi) (i=0 to 7). For example, a circuit finding the difference output D7 of the bit 7 is shown in FIG. 54. Note that, FIG. 54 is for explaining the difference generation stage to be added to the BLB array of FIG. 51, (a) of the figure is a partial circuit diagram generating the difference output D7 of the bit 7; and (b) of the figure is a partial circuit diagram generating the difference output D0 of the bit 0, respectively.

The sum output S7 of the bit 7 is obtained by further subtracting the borrow B7 from the bit 6 to the bit 7 from the difference (X7−Y7) of the same digit places.

$$D7 = X7 - Y7 - B7 \quad (8)$$
$$= X7(+)Y7(+)B7 (\text{mod } 2)$$

Namely, a borrow B7 from the bit 6 to the bit 7 is generated by a binary tree ranging from the bit 6 to the bit 0. By taking the exclusive OR logic (EXOR) of the output of this binary tree and X7(+)Y7, the final difference output D7 of bit 7 is obtained.

As an excellent characteristic feature of the ternary code binary tree, it can be mentioned that the exclusive OR operation of X7(+)Y7 is contained in the difference ternary code generation circuit CGSi. Note that this property is obtained in the case of the ternary code generation in a {00, 01, 11, 10}={Q, Q, Y, N} assignment. In general, if the

120 method of assignment of the expression of the ternary code is changed, the configuration of the difference ternary code generation circuit changes. Accordingly, as the logical circuit performing the generation of the difference, it is necessary to use one in accordance with this. Note, there is no change in the structure per se of the binary tree.

In order to generate the difference, the configuration which should be added to the BLB array of FIG. 51 becomes as follows. Namely, if a difference generation circuit provided with an exclusive OR gate circuit GXK0 of the zero-th digit taking the exclusive OR logic of the digit value X0 and the digit value Y0; an exclusive OR gate circuit GXD0 of the zero-th row taking the exclusive OR logic of the output of the exclusive OR gate circuit GXK0 of the zero-th digit and the borrow input Bin and defining the same as the result D0 of difference of the zero-th digit; and exclusive OR gate circuits GXD1 to GXD7 of the first row to the seventh row for taking exclusive OR logics between the output codes Ti,1 of the difference ternary code generation circuits CGS1 to CGS7 of the first digit to the seventh digit and the output codes of the K logic circuits KLD30 to KLD33 and KLR34 to KLR36 of the zero-th row to the sixth row of the third column of the K logic circuit matrix and defining the same as the results D1 to D7 of differences of the first digit to the seventh digit is added to FIG. 51, a subtractor of the BLB subtraction system can be configured.

With respect to a configuration in which the sign optimization of FIG. 53 is applied as well, similarly, if a difference generation circuit provided with the exclusive OR gate circuit GXK0 of the zero-th digit taking the exclusive OR logic of the digit value X0 and the digit value Y0; the exclusive OR gate circuit GXD0 of the zero-th row taking the exclusive OR logic of the output of the exclusive OR gate circuit GXK0 of the zero-th digit and the borrow input Bin and defining the same as the result D0 of difference of the zero-th digit; and exclusive OR gate circuits of the first row to the seventh row for taking exclusive OR logics between the output codes Ti,1 of the difference ternary code generation circuits CGA1 to CGA7 of the first digit to the seventh digit and negative logics of the output codes of the K logic circuits KLDPN30 to KLDPN33 and KLRPN34 to KLRPN36 of the zero-th row to the sixth row of the third column and defining the same as the results D1 to D7 of differences of the first digit to the seventh digit is added, a subtractor of the BLB subtraction system in which sign optimization is achieved can be configured.

As described above, in the subtractor of the present embodiment, when using a binary tree of K logic circuits in a {00, 01, 11, 10}={Q, Q, Y, N} assignment, the decision nodes for performing a decision of existence of a borrow for the digits Xj, Yj (j=1 to n−2) includes the exclusive OR gate circuit GX21 for taking the exclusive OR logic of the digit value Xj and the digit value Yj and outputting the result as the code Tj,1, therefore it is possible to obtain the exclusive OR logic for each digit (Xj, Yj) by the output code Tj,1 and generate the difference by a simpler structure.

(Reduced BLB Array)

However, the BLB array shown in FIG. 51 and FIG. 53 has too many transistors. Therefore, in order to further decrease the number of gates of the BLB array, the even number rows of the BLB array are reduced and the reduced BLB array is used to realize a subtractor as shown in FIG. 55.

The reduced BLB array generates only the borrow signals B2, B4, B6, and Bout to the even number bits and cannot directly obtain the borrow signals B1, B3, B5, and B7 to the odd number bits.

Figure 55:
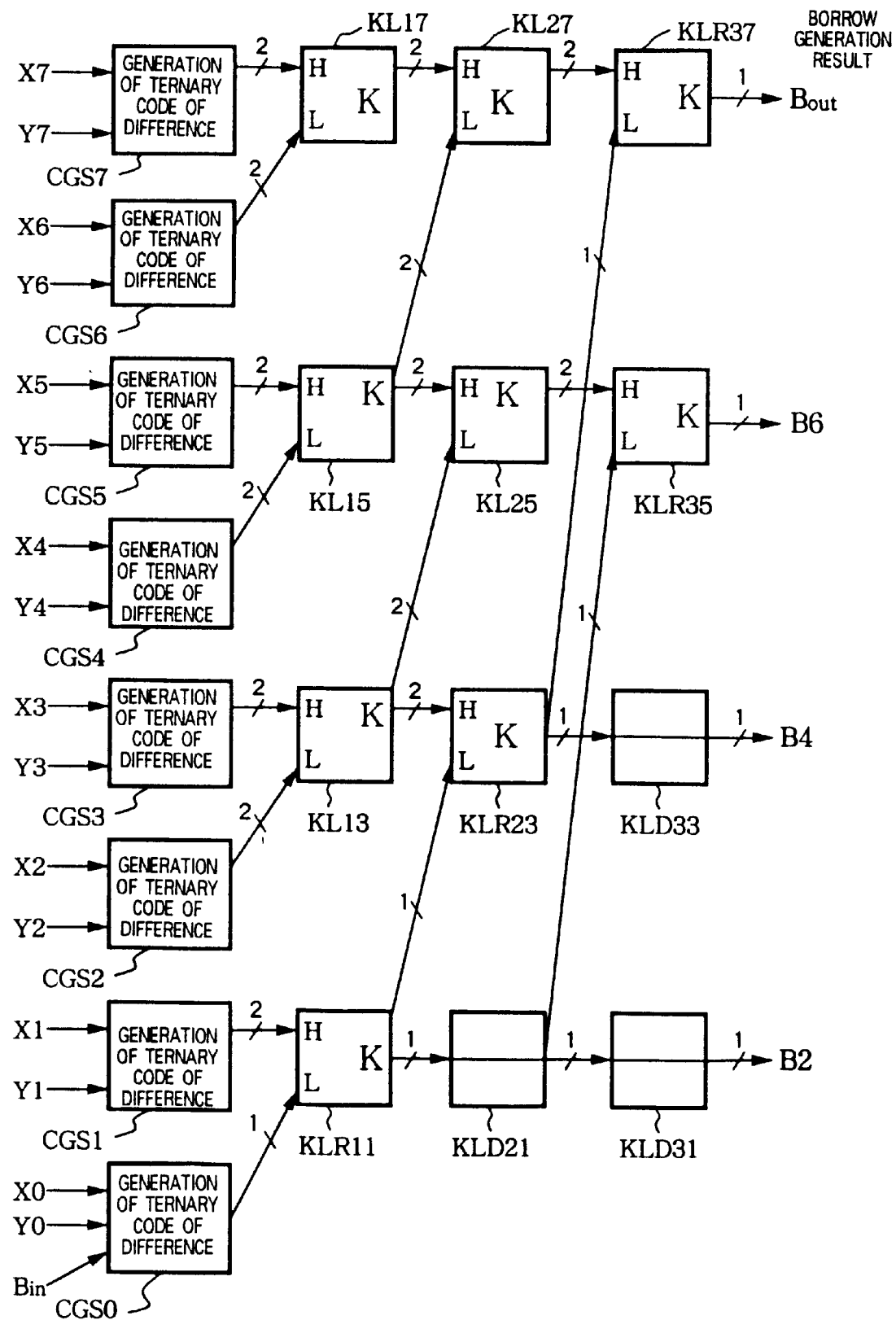
FIG. 55 is a view of the configuration of a reduced BLB array configuring the input stage to the borrow generation of a subtractor according to the fifth embodiment of the present invention.

In FIG. 55, the reduced BLB array is configured having n=8 number of difference ternary code generation circuits (decision nodes) CGS0 to CGS7 for outputting either of three values as the result of a decision based on the digit values Xi, Yi and the K logic circuit matrix of 4 rows and 3 columns (m=3 is obtained as $\log_2 8=3$) with rows corresponding to the odd number digits. The K logic circuit matrix is configured by the group of K logic circuits of the first column provided with the simplified K logic circuit KLR11 of the first row and the K logic circuits KL13, KL15, and KL17 of the third row, fifth row, and seventh row; the group of K logic circuits of the second column provided with the K logic circuit KLD21 of the first row as the dummy node, the simplified K logic circuit KLR23 of the third row, and the K logic circuits KL25 and KL27 of the fifth row and the seventh row; and the group of K logic circuits of the third column provided with the K logic circuits KLD31 and KLD33 of the first row and the third row as the dummy nodes and simplified K logic circuits KLR35 and KLR37 of the fifth row and the seventh row. Note that the eight decision nodes and the groups of K logic circuits of the columns are respectively simultaneously executed.

Figure 56A:
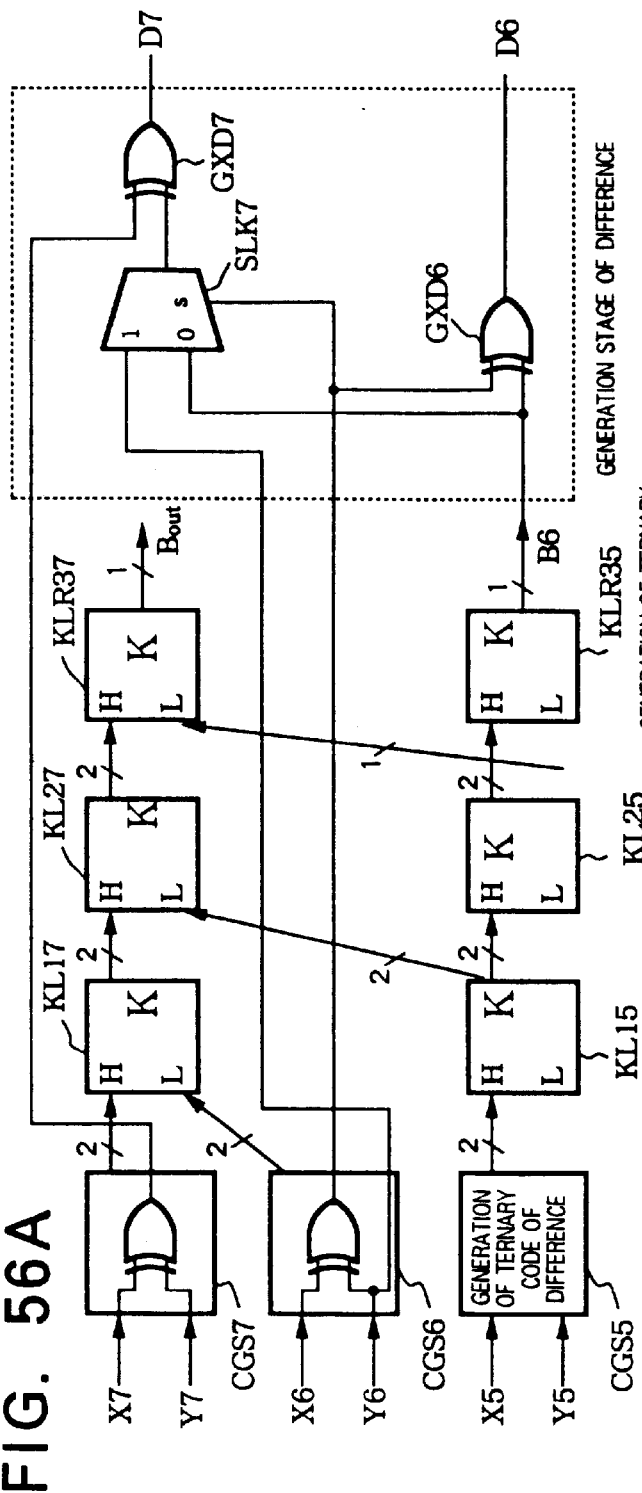
FIG. 56A and FIG. 56B are-partial views of the configuration of explaining the structure from the borrow generation to the generation of difference of the subtractor using the reduced BLB array.
Figure 56B:
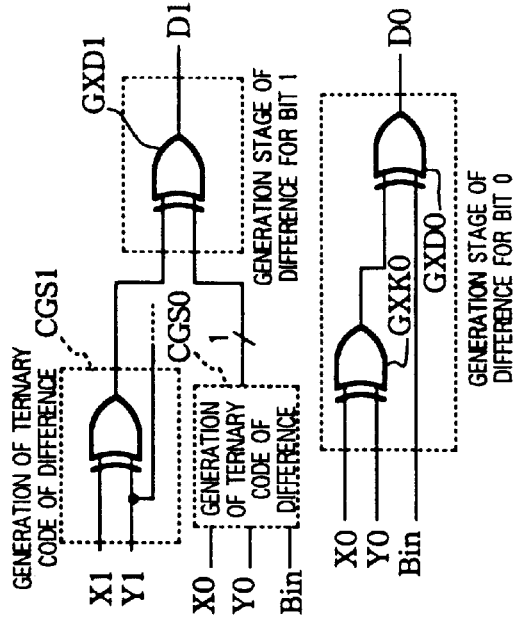

Further, FIG. 56 explains the difference generation stage to be added to the reduced BLB array of FIG. 55. (a) of the figure shows the partial circuit diagrams for generating the difference outputs D7 and D6 of the bit 7 and the bit 6, and (b) of the figure shows partial circuit diagrams for generating the difference outputs D0 and D1 of the bit 0 and bit 1 are shown.

In order to generate the difference, the configuration which should be added to the reduced BLB array of FIG. 55 becomes as follows. Namely, it is provided with an exclusive OR gate circuit GXK0 of the zero-th digit taking the exclusive OR logic of the digit value X0 and the digit value Y0 and the difference generation stage. Here, the difference generation stage is configured provided with an exclusive OR gate circuit GXD0 of the zero-th row which takes the exclusive OR logic of the output of the exclusive OR gate circuit GXK0 of the zero-th digit and the borrow input Bin and defines the result as the result D0 of difference of the zero-th digit; an exclusive OR gate circuit GXD1 of the first row which takes the exclusive OR logic of the output code T0,0 of the difference ternary code generation circuit CGS0 of the zero-th digit and the output code T1,1 of the difference ternary code generation circuit CGS1 of the first digit and defines the same as the result D1 of the difference of the first digit; a selector (borrow generating means) SLKf (only SLK7 is shown in the figure) of the f-th row for respectively selecting the input digit value Xf or Yf to the row when the output code Tf,1 of the difference ternary code generation circuit CGSf (f=even number of 2 to 7) of the f-th digit is "1", selecting the output code of the K value logical circuit of the f−1-th row when the output code Tf,1 is "0", and outputting the result as a borrow to the f+1-th digit; an exclusive OR gate circuit GXDf of the f-th row which takes the exclusive OR logic of the output code Tf,1 of the difference ternary code generation circuit CGSf of the f-th digit and the output code of the K value logical circuit of the f−1-th row and defines the same as the result Df of the difference of the f-th digit; and an exclusive OR gate circuit GXDf+1 of the f+1-th row which takes the exclusive OR logic of the output code Tf+1,1 of the difference ternary code generation circuit CGSf+1 of the f+1-th digit and the output of the selector SLKf of the f-th row and defines the same as the result Df+1 of the difference of the f+1-th digit.

As described above, the subtractor of the reduced BLB subtraction system of the present embodiment uses the reduced BLB array in which the even number rows of the BLB array are deleted and the number of gates is reduced so as to enable the number of gates of the BLB array and the many long wirings in the BLB array to be halved. On the other hand, while the number of operation steps is increased by one, since the number of elements and the wirings of the BLB array are halved, the structure of the BLB array becomes simpler and an effect of reducing the delay is produced, thus an increase of the number of steps does not always mean an increase of the delay. As a result, the delays of the subtractors of the BLB array in which the even number rows are not deleted and the BLB array in which they are deleted become equivalent. Note that, then, the subtractor according to the reduced BLB array is excellent in the number of transistors and the simplicity of the wiring.

6.4.4 Effect of Application of Ternary Code Binary Tree to Subtractor

The conventional subtractor is configured with an inverter added to the input stage of an adder and had a drawback that the number of gates and delay were increased by that amount. A subtractor using the ternary code binary tree according to the present invention does not have such a defect. Here, the differences from the adder are clarified for a comparison with the conventional subtractor.

First, for the ternary code generation circuit of the input stage, as clear by a comparison of the difference ternary code generation circuit CGS in the subtractor shown in FIG. 47B and the sum ternary code generation circuit CGA of the adder shown in FIG. 13B, the difference of the two resides in only the point of whether the logic gate circuit in the ternary code generation circuit is an exclusive NOR EXNOR (adder) or an exclusive OR EXOR (subtractor). In the present method of designing integrated circuits, as shown in FIG. 57, the exclusive NOR EXNOR (refer to A of the figure) and the exclusive NOR EXOR (refer to B of the figure) are exactly the same in circuit structure except that the connection lines with respect to the gates of the transfer gates are slightly different. Namely, there is no difference between the adder and the subtractor in the number of gates and signal propagation delay of the ternary code generation circuit of the input stage. Accordingly, the subtractor using the ternary code binary tree of the present embodiment is realized without adding an inverter in comparison with the conventional subtractor of the configuration adding an inverter to the input stage of the adder and can be realized without the defect of an increase of the number of gates and increase of the signal propagation delay.

[Sixth Embodiment]

6.5 Embodiment of Operation Unit for Obtaining Absolute Value of Difference 6.5.1 Ideal Configuration of Operation Unit for Obtaining Absolute Value of Difference In the "Problem to be Solved by the Invention", a description was made of the defects of the operation unit for obtaining the absolute value of a difference of the related art, but the ideal configuration of an operation unit for obtaining the absolute value of a difference can be considered to be the method of easily deriving the operation process of (Y−X) from the operation process of (X−Y). Concretely speaking, this is given by the following processing steps:

Step SAA1. X>Y is assumed and the operation of (X−Y) is carried out.

Step SAA2. If the result of (X−Y) becomes negative, the assumption was wrong, so the operation of (Y−X) must be carried out.

Here, the process of operation process of (X−Y) is converted to the operation process of (Y−X).

Note that, the operation conversion required at step SAA2 is a high speed one which does not depend upon the number n of data bits (constant C<$\log_2$n) and must be realized by a number of gates which is smaller than one subtractor.

6.5.2 Difference of X–Y and Y–X

The process of subtraction (X–Y) of the following two binary numbers

X=01111101, Y=00000010 is shown in FIG. 58. The ternary code generated at the input stage is:

$$(Q, N, N, N, N, N, Y, N) \qquad (9)$$

What about the case of (Y–X)? The ternary code generated at the input stage is:

$$(Q, Y, Y, Y, Y, Y, N, Y) \qquad (10)$$

This example teaches the symmetry of the generated ternary codes of the cases of (X–Y) and (Y–X). It is understood that (10) is obtained if the codes of (9) are respectively substituted, i.e., "Q" with "Q", "Y" with "N", and "N" with "Y". Accordingly, this example holds forth the promise that the ideal operation unit of the for obtaining the absolute value of the difference can be surprisingly simply realized if a ternary code is used. This is because the ternary code generated at the input stage becomes a borrow of each digit through the BLB array of the ternary code binary tree. If the ternary codes of the input stage have symmetry, the results of the borrow generation thereof naturally have symmetry. In this example, the result of the borrow generation obtained from (9) becomes:

$$(N, N, N, N, N, N, Y, N) \qquad (11)$$

and the result of borrow generation obtained from (10) becomes:

$$(Y, Y, Y, Y, Y, Y, N, Y) \qquad (12)$$

The symmetry is clear.

Accordingly, as the method of obtaining the operation for obtaining the absolute value of the difference, the next method can be considered:

Step SAB1. The operation of (X–Y) is carried out up to the borrow generation.

Step SAB2. When it is found that (X<Y), there is a necessity of changing this to (Y–X), the result of the borrow generation is substituted by using the symmetry.

When (X–Y) can be left as it is, the result of the borrow generation is also left as it is.

The decision of whether or not (X<Y) is can be made by looking at the code at the left end of the result of the borrow generation. When the code of the most significant digit (left end) is Y, (X<Y), and when it is N, (X>Y). The results of the borrow generation obtained at step SAB3 and step SAB2 are input to the difference generation logical circuit used in the subtractor so as to generate the difference.

This value is the absolute value of the difference.

However, a correct result cannot always be obtained by this method. Therefore, another example shown in FIG. 59 will be considered. Namely, in the case of subtraction (X–Y) of:

X=01111100, Y=00000010, the ternary code generated at the input stage is:

$$(Q, N, N, N, N, N, Y, N) \qquad (13)$$

What about the case of (Y–X)? The ternary code generated at the input stage is:

$$(Q, Y, Y, Y, Y, Y, N, N) \qquad (14)$$

When comparing (13) and (14), the previous symmetry appears at first glance to stand. The left end to the seventh bit are indeed symmetrical. However, the code (rightmost) of the bit 0 is an exception. In both of (13) and (14), the code of the bit 0 is "N". This asymmetry reaches up to the result of the borrow generation, therefore the absolute value of the difference cannot be obtained by the previous method.

6.5.3 Method of the absolute value operation of difference by the ternary code

In the above two examples, there was symmetry in the former example including the bits 0. On the other hand, the symmetry did not stand for the bits 0 in the latter example. The bits 0 of X and Y of the former case are "1" and "0", while both of the bits 0 of X and Y of the latter case are "0". However, in both examples, the generated ternary codes were the same "N". Here lies the essence of the problem.

In the case of the former example, that is, where the numbers of the bits 0 of X and Y are different, if the X and Y of (X–Y) are replaced, the relationship of magnitude at the bits 0 are reversed. Accordingly, naturally the code "N" is substituted with the code "Y". However, in the case of the latter example, that is, where the numbers of the bits 0 of X and Y are the same, even if the X and Y of (X–Y) are replaced, the relationship of magnitude at the bits 0 does not change. Accordingly, it is unnatural to substitute the code "N" with the code "Y". Irrespective of the same code "N", there are two types of methods of dealing with the case where X and Y are replaced, therefore the symmetry has been lost. Such a situation indicates that it is necessary to differentiate between the case where "a borrow does not occur ("N") in the operation of (X0–Y0) and a borrow occurs in the operation of (Y0–X0) ("Y")" and the case where "a borrow does not occur ("N") in the operation of (X0–Y0) and a borrow occurs also in the operation of (Y0–X0) ("N")".

In fact, it is possible to solve this problem by a simple method. It is sufficient so far as the ternary code generation of the bit 0 is carried out in the same way as the ternary code generation of the other bits. At bits other than the bit 0, the code "Q" is generated in the sense of "do not know if a borrow will occur" when the bits of (X, Y) are (0,0) /(1,1); the code "N" is generated in the sense of "a borrow will not occur" at the time of (1,0); and the code "Y" is generated in the sense of "a borrow will occur" at the time of (0,1). In the case of the bit 0, it is convenient if the code "Q" is generated in the sense of "a borrow will not occur in the operation of (X0–Y0) ("N") and a borrow will not occur also in the operation of (Y0–X0) ("N")" at the time of (0,0) /(1,1); the code "N" is generated in the sense of "a borrow will not occur in the operation of (X0–Y0) ("N") and a borrow will occur in the operation of (Y0–X0) ("Y")" at the time of (1,0); and the code "Y" is generated at the time of (0,1).

This generation of codes is applied to the previously indicated latter example (X=01111100, Y=00000010) as shown in FIG. 60.

In the case of (X–Y), the ternary code generated at the input stage is:

$$(Q, N, N, N, N, N, Y, Q) \qquad (15)$$

In the case of (Y–X), it becomes:

$$(Q, Y, Y, Y, Y, Y, N, Q) \qquad (16)$$

Clearly, the symmetry of the ternary codes stands. Namely, if the codes of (15) are respectively substituted, i.e., "Q" with "Q", "Y" with "N", and "N" with "Y", (16) is obtained. The symmetry similarly stands in also the results of borrow generation.

Note, where it is intended to input (15) to the BLB array of a ternary code binary tree and to obtain the result of borrow generation, care must be taken. The BLB array used in the subtractor was the BLB array simplified based on the definitive property of the bit 0. Namely, in the ternary code generation of the bit 0, by utilizing the fact that the code "Q" is not used, the logical circuit of the internal portion is simplified. As is apparent when viewing (15) and (16), in the operation for obtaining the absolute value of a difference, the code "Q" is used for the bit 0. Accordingly, unlike the subtractor, the BLB array of the binary tree configured by only not simplified K logic circuits KL becomes necessary.

Even in a case where the result of borrow generation obtained from this BLB array for the absolute value operation is interpreted, care must be taken. When the code "Q" is included in the result of borrow generation, this is definitely the "Q" generated at the bit 0. This is because the code "Q" generated at bits other than the bit 0 is definitely cancelled at "Y"/"N" at the lower significant digit. The code "Q" generated at the bit 0 does not express the meaning "do not know since it depends upon the lower significant digit". As mentioned above, this means "a borrow will not occur in the operation of (X0–Y0) ("N") and a borrow will not occur also in the operation of (Y0–X0) ("N")". Accordingly, the generation of a final borrow must be carried out by replacing the code "Q" by the code "N".

Consideration was given to the method of obtaining the result of borrow generation of (Y–X) from the result of borrow generation of (X–Y) heretofore. How then can the absolute value of the difference be obtained? In the case of 1 bit, the following relationship stands:

$$(Xi - Yi) - Bi = (Yi - Xi) - Bi (\mathrm{mod}\ 2)$$
$$= Xi(+)Yi(+)Bi (\mathrm{mod}\ 2)$$

This Indicates the same relationship as the generation of the difference at the output stage of the subtractor (equation (6)). Namely, if the generation of a final borrow of the operation for obtaining the absolute value of a difference is obtained, it can be realized by using the logical circuit finding the difference in the subtraction in subsequent steps.

The method of obtaining the correct absolute value of difference using the ternary code obtained based on the above consideration is shown below.

Step SAC1. (X–Y) is assumed and the circuit of the input stage of the subtractor (difference ternary code generation logical circuit) is used to generate the ternary code for each digit.

Codes are generated using "0" for the bit 0 in the same way as the other bits.

Step SAC2. The generated ternary code of each digit is input to the ternary code binary tree BLC array for the absolute value operation and borrow generation is carried out.

Step SAC3. Attention is paid to the code of the left end of the obtained result of borrow generation.

If the code of the left end is "Y", (X<Y) and the code of the result of the borrow generation is replaced.

If it is "Q", (X=Y) and the code of the result of borrow generation is replaced or it is left as it is.

If it is "N", (X>Y) and the result of borrow generation is left as it is.

The code replacement referred to here is the replacement of "Q" with "Q", "Y" with "N", and "N" with "Y", respectively.

Step SAC4. After step SAC3, if the code "Q" is included in the result of borrow generation, it is replaced by "N".

Step SAC5. The code of the result of the final borrow generation obtained from step SAC3 becomes only "Y"/"N".

If it is "Y", Bi=1, if it is "N", Bi is brought to equal to 0, and this is input to the difference generation circuit (output stage of subtractor).

Further, the value of (Xi(+)Yi) obtained at the input stage of ternary code generation is input to the difference generation circuit.

Step SAC6. In the difference generation circuit, (Xi(+)Yi(+)Bi) is operated and output.

This is the absolute value of the difference.

6.5.4 Code Replacement Circuit

It is necessary to newly form a logical circuit for realizing the code replacement at step SAC3 and step SAC4 of the method explained at end of the previous section. The rest of the logical circuits which becomes necessary have been obtained in the subtractor according to the fifth embodiment.

Namely, the arithmetic and logic unit for finding the absolute value operation of a difference of two n-bit binary numbers (X, Y) is configured provided with a group of decision nodes (difference ternary code generation circuits) for generating ternary codes of differences for all bits including the bit 0; a ternary code binary tree BLB array comprised of a higher priority determination node matrix (not simplified K logic circuit matrix); a borrow generation unit generating a borrow of each digit in the operation for obtaining an absolute value of difference; and a difference generation unit.

Here, the borrow generation unit is configured provided with a code judgement circuit which judges the code for the result of difference of two numbers (X–Y) based on the result of borrow generation of the n–1-th digit generated from the K logic circuit of the n–1-th row and the m-th column and outputs the code judgement signal SGN and with code replacement circuits of the zero-th row to the n–2-th row which respectively substitute the value code "Q" with the value code "Q", substitutes the value code "Y" with the value code "N", and substitutes the value code "N" with the value code "Y" for the output codes of the K logic circuit from the zero-th row to the n–2-th row except the K logic circuit of the n–1-th row in the group of K logic circuits of the m-th column where the result of code judgement of the code judgement circuit is negative or negative or zero (code judgement signal SGN=1), do not perform the code replacement and leave them as they are where the result of the code judgement is positive or zero or positive (code judgement signal SGN=0), and then substitute the value code "Q" with the value code "N" for the result outputs which are subjected to the code replacement or left as they are, thereby to obtain the borrows of the digits.

Figure 61A:
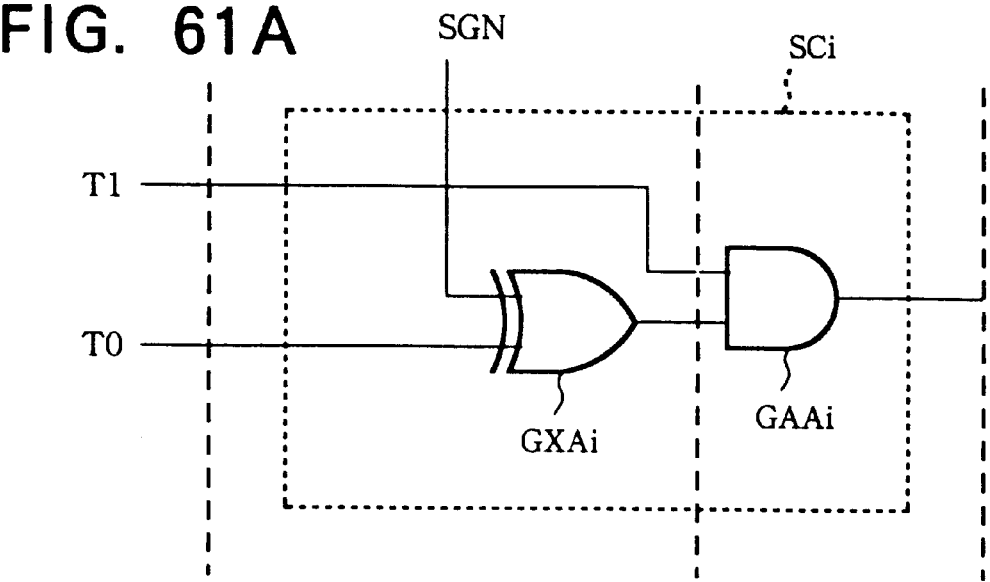

FIGS. 61 is a circuit diagram (FIG. 61A) of the code replacement circuit SCi of the i-th row (i=0 to n–2) in a {00, 01, 11, 10}=(Q, Q, Y, N} assignment and tables (FIGS. 61B and 61C) explaining the code conversion (final borrow generation) based on the code judgement result of the code judgement.

The code replacement circuits SCi from the zero-th row to the n–2-th row are configured in two stages. Symmetry code replacement is applied in the first stage. Namely, by the exclusive OR gate circuit GXAi, the exclusive OR logics of the code judgement signal SGN and the output codes Tij,0 of the K logic circuits from the zero-th row to the n–2-th row are taken by the exclusive OR gate circuit GXAi. At the time of the code judgement signal SGN=1, for the output code Tij,0 of the K logic circuit, the value code "Q" is substituted with the value code "Q" the value code "Y" is substituted with the value code "N", and the value code "N" is substituted with the value code "Y", respectively. At the time of the code judgement signal SGN=0, the code replacement is not carried out and the codes are left as they are. Further, in the second stage, the AND logics of the output of the exclusive OR gate circuit GXAi and the output codes Tij,1 of the K logic circuits of the zero-th row to the n–2-th row are respectively taken by the AND gate circuit GAAi, the value code "Q" is substituted with the value code "N", and the final borrow of each digit is obtained. At this time, the final borrow code becomes the two values of Y/N, therefore the output becomes one bit.

As apparent from this figure, the code replacement circuit SCi is simple in logic and in addition operates at a high speed. Note that, then, the time required for this code replacement does not depend upon the number n of data bits and is an order of a constant. Accordingly, it may be excellent in both of the operation time and amount of hardware compared with the incrementer used in the conventional generation of the complement of 2.

Figure 54A:
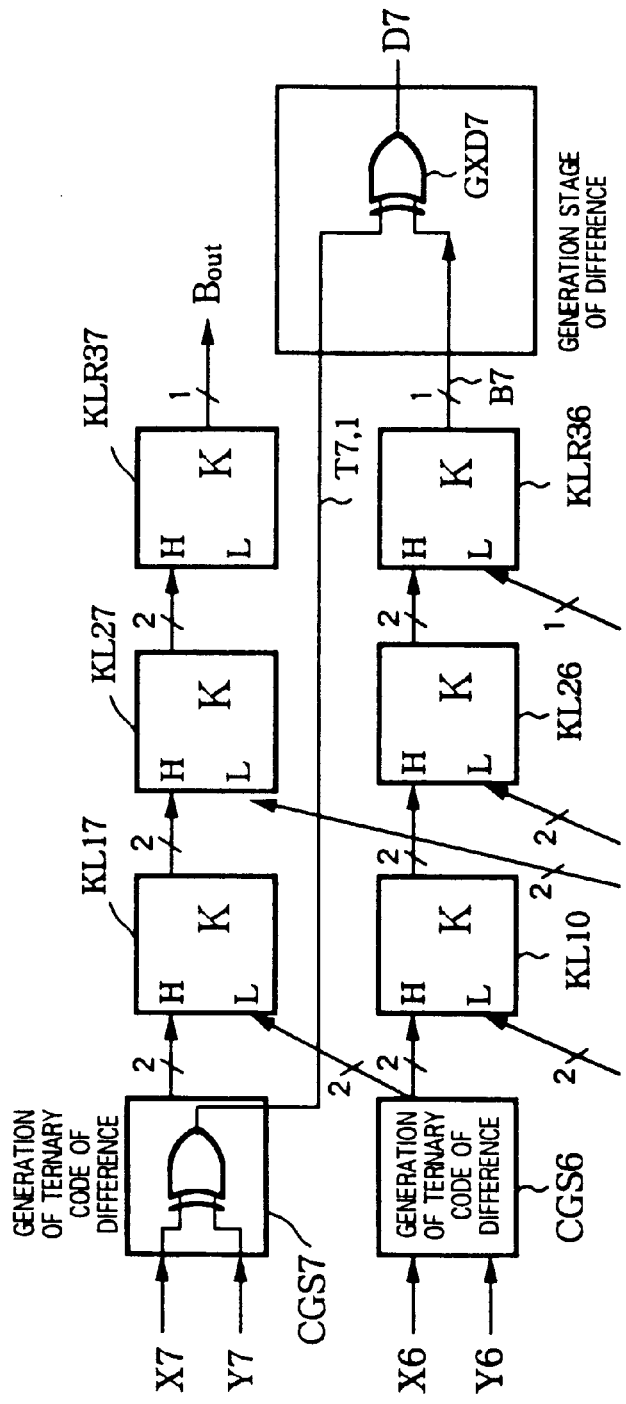
FIG. 54A and FIG. 54B are partial views of a configuration explaining the configuration from the borrow generation to the generation of difference of the subtractor using the BLB array.
Figure 62:
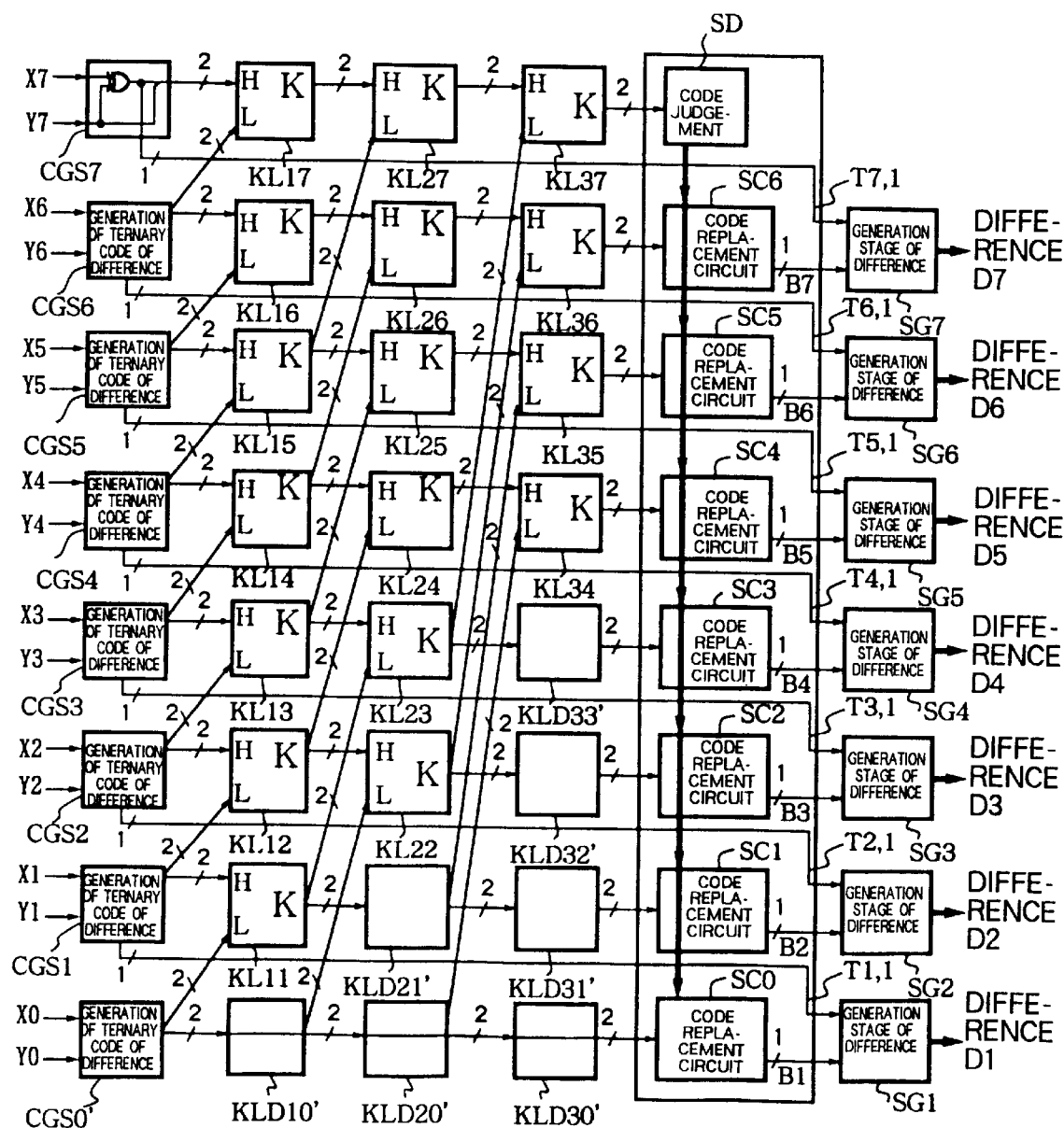
FIG. 62 is a view of the overall configuration of an operation unit for obtaining the absolute value of a code-less difference according to a sixth embodiment of the present invention.

6.5.5 Configuration of Operation Unit for Obtaining Absolute Value of Code-less Difference The configuration of the operation circuit for obtaining an absolute value of a difference expressed abstractly by using a ternary code is shown in FIG. 62. The code judgement circuit in the figure can be realized by just one AND gate circuit in a {00, 01, 11, 10}=(Q, Q, Y, N} assignment. Further, for the circuit configuration of the constituent elements in the figure, elements other than the code replacement circuits SC0 to SC6 shown in FIG. 61A have been already shown in the subtractor of the fifth embodiment, and the difference ternary code generation circuits CGS0' and CGS1 to CGS7 existing at the input stage are shown in FIG. 47B; the K logic circuits KL11 to KL117, KL22 to KL27, and KL34 to KL37 constituting the K logic circuit matrix are shown in FIG. 5D, and the difference generation stages SG1 to SG7 of the output stages are shown in FIG. 54A, respectively.

Figure 54B:
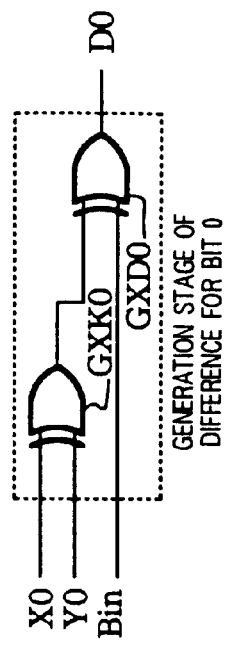

Note that, unlike the configuration of the BLB array in the subtractor (fifth embodiment), in the BLB array of FIG. 62, as the difference ternary code generation circuit CGS0' of the bit 0, a circuit the same as the difference ternary code generation circuits CGS1 to CGS7 of other bits is used. The simplified K logic circuit KLR is not used as the K logic circuit matrix. Along with this, the dummy nodes KLD10', KLD20', KLD21', and KLD30' to KLD33' are expanded from the 1-bit width to the 2-bit width. Further, in FIG. 62, the difference generation stage SG0 of the bit 0 is omitted. This is as shown in FIG. 54B.

6.5.6 Configuration of Operation Unit for Obtaining Absolute Value of Code-bearing Difference The operation unit for obtaining the absolute value of a difference explained heretofore assumes code-less binary numbers.

For example, in the case of X=0000B (=0D), and Y=1111B (=15D), the value ABS(X–Y)=1111B (=15D) is output. Here, the added "B" indicates a binary number, and "D" indicates a decimal number, respectively.

On the other hand, when the two input binary numbers are regarded as the code-bearing binary numbers using the complement of 2, in the case of X=0000B (=0D), and Y=1111B (=1D), the value becomes:

ABS(X–Y)=0001B (=1D)

In this way, the meanings are different even in the case where the inputs are exactly the same (X=0000, Y=1111), therefore the outputs become different. Accordingly, the operation unit for obtaining an absolute value of a code-less difference of FIG. 62 cannot be used as the operation unit of an absolute value of a code-bearing difference if left as it is.

Figure 63:
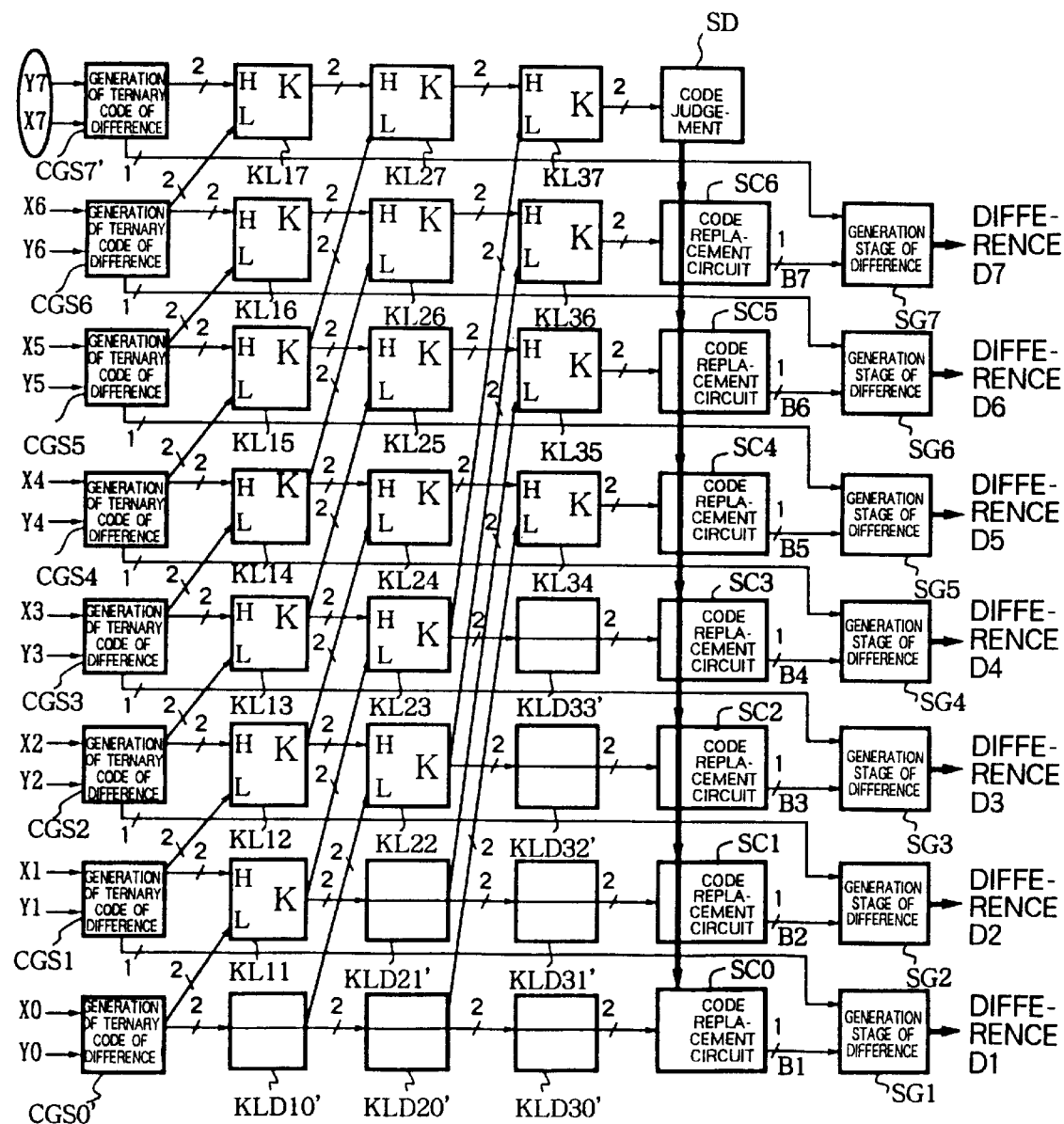
FIG. 63 is a view of the overall configuration of the operation unit for obtaining the absolute value of a code-bearing difference according to the sixth embodiment of the present invention.
Figure 65:
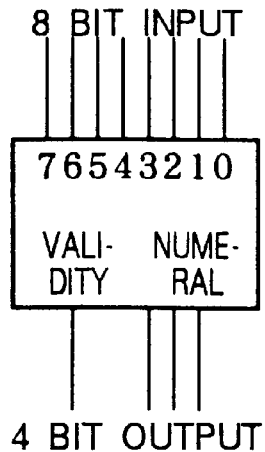
FIG. 65 is a truth table of an 8-bit input and 4-bit output priority encoder.
Figure 66:
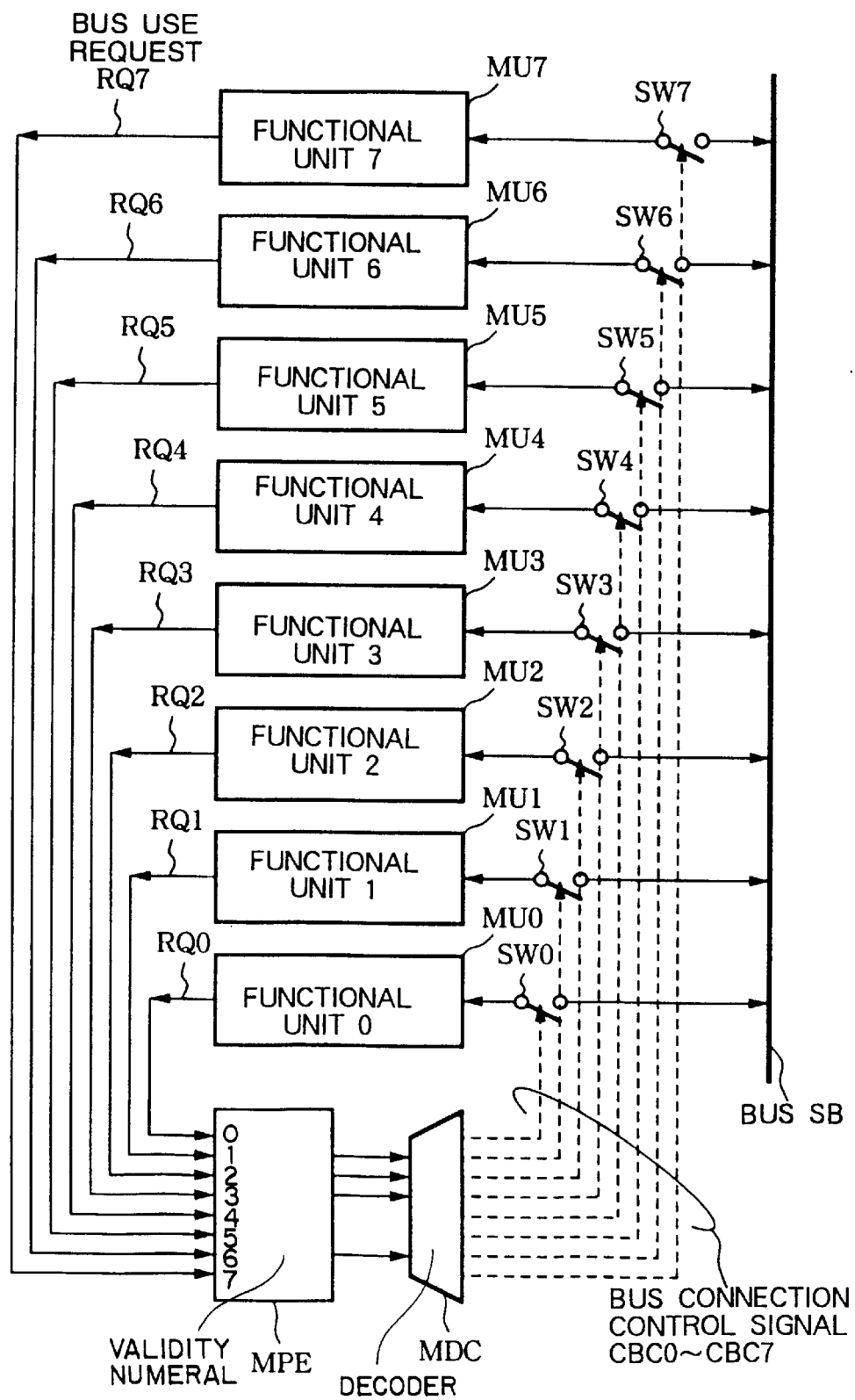
FIG. 66, is an explanatory view explaining bus arbitration as an example of application of the priority encoder.
Figure 67:
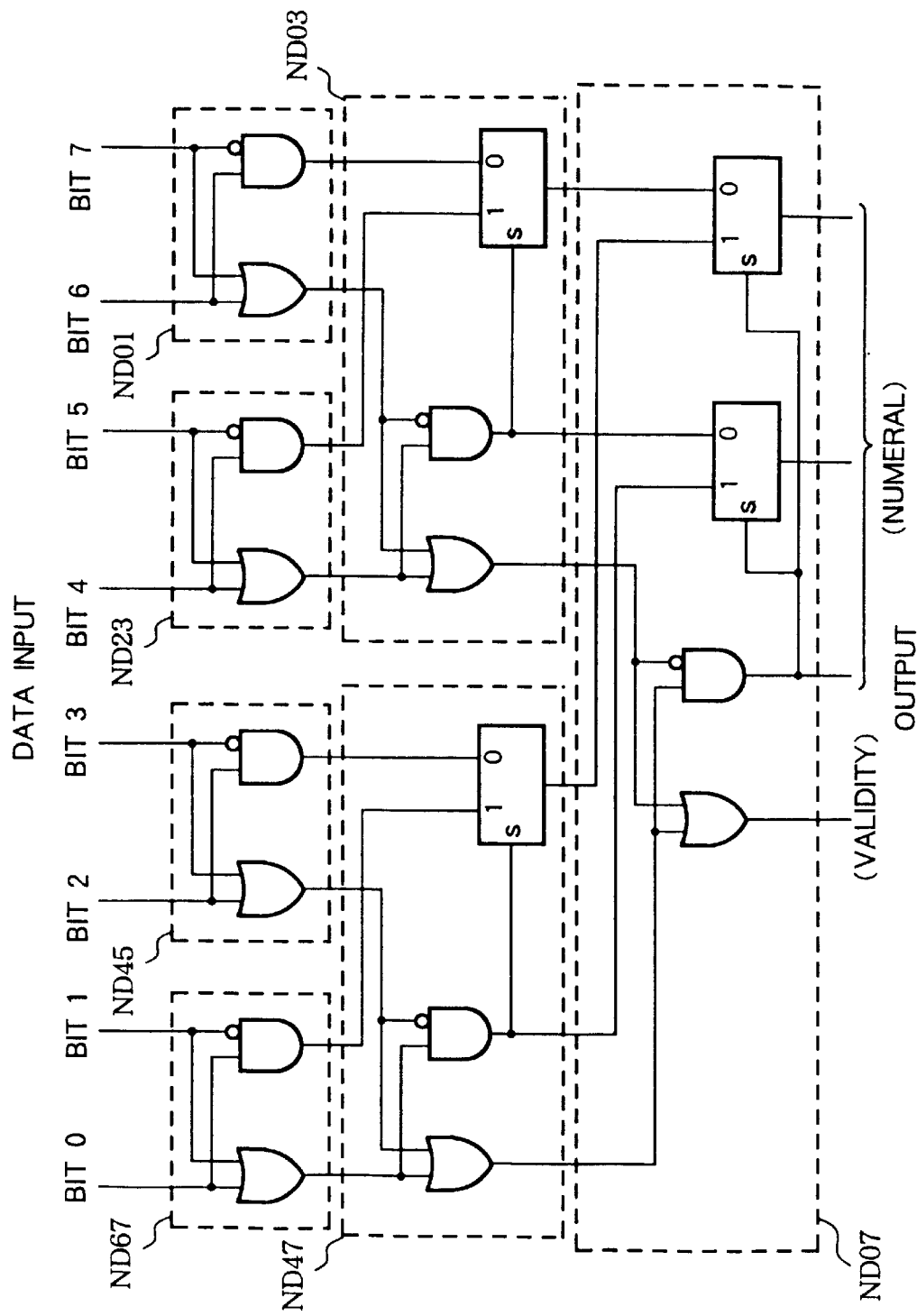
FIG. 67 is a logical circuit diagram of a conventional 8-bit input and 4-bit output priority encoder.
Figure 68:
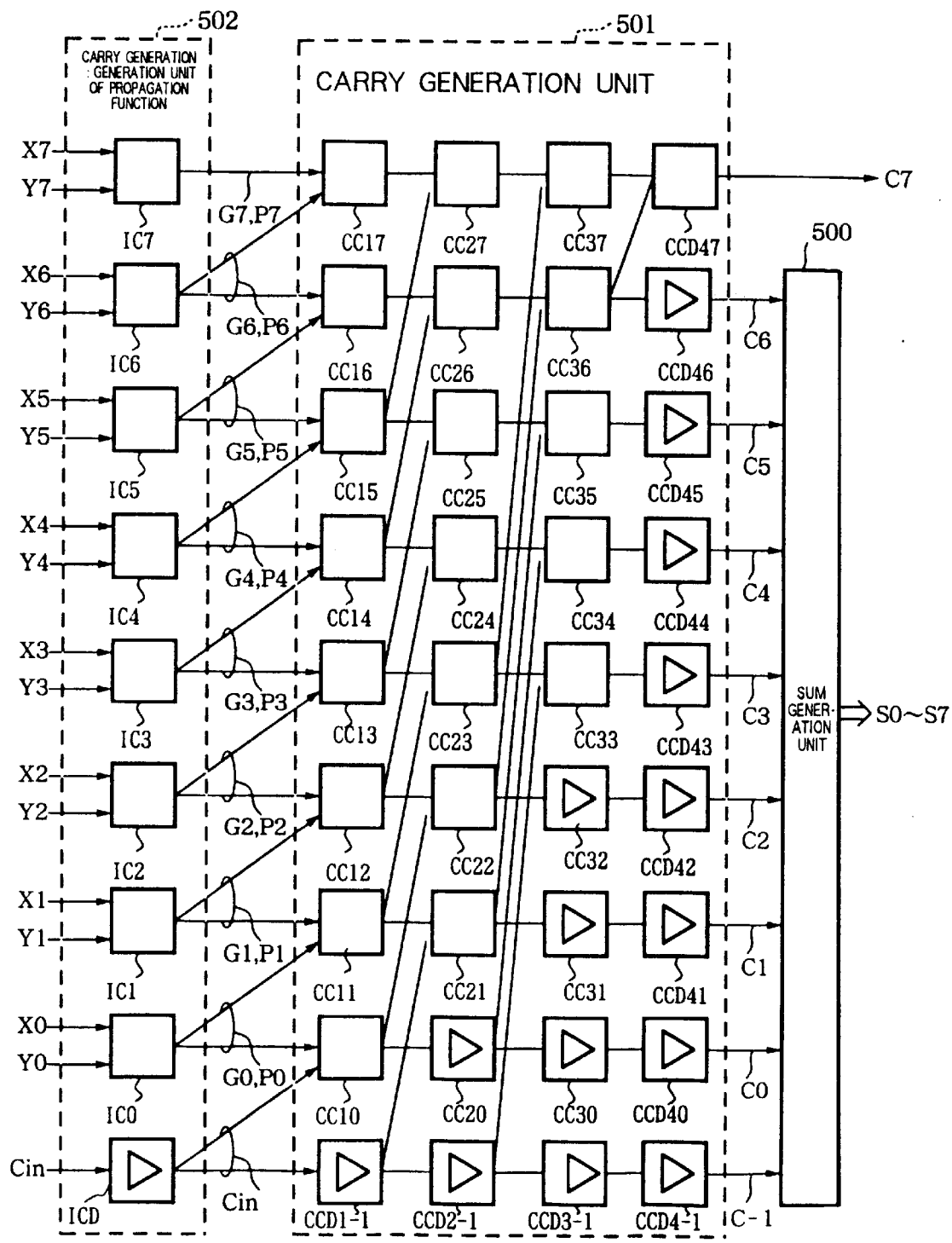
FIG. 68 is a view of the configuration of a BLC array in a BLC adder according to the conventional 8-bit BLC addition system.
Figure 69A:
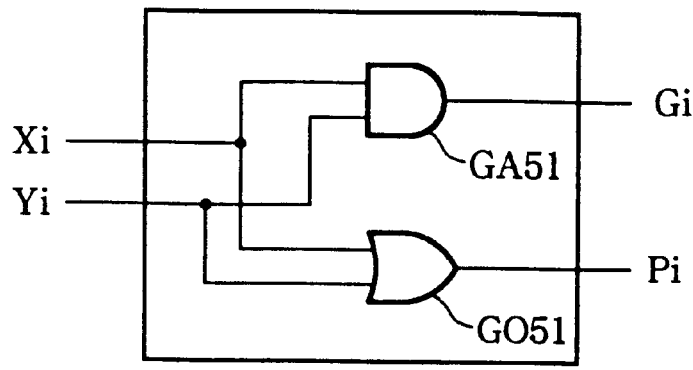
FIG. 69A, FIG. 69B and FIG. 69C are circuit diagrams of the input stage in the BLC adder according to the conventional 8-bit BLC addition system.
Figure 69B:
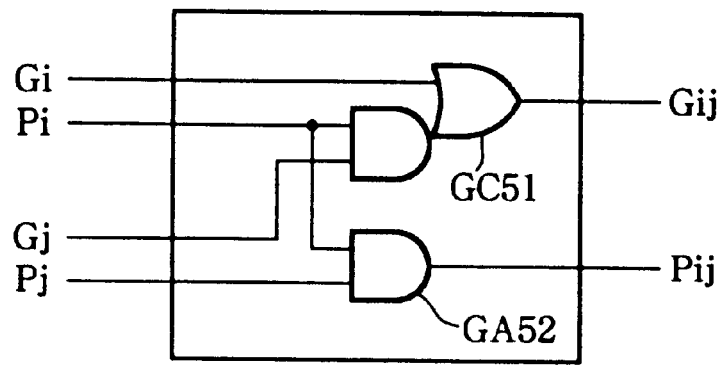
Figure 69C:
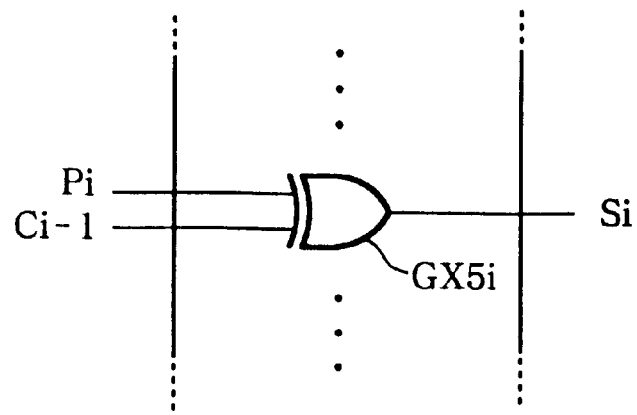
Figure 72:
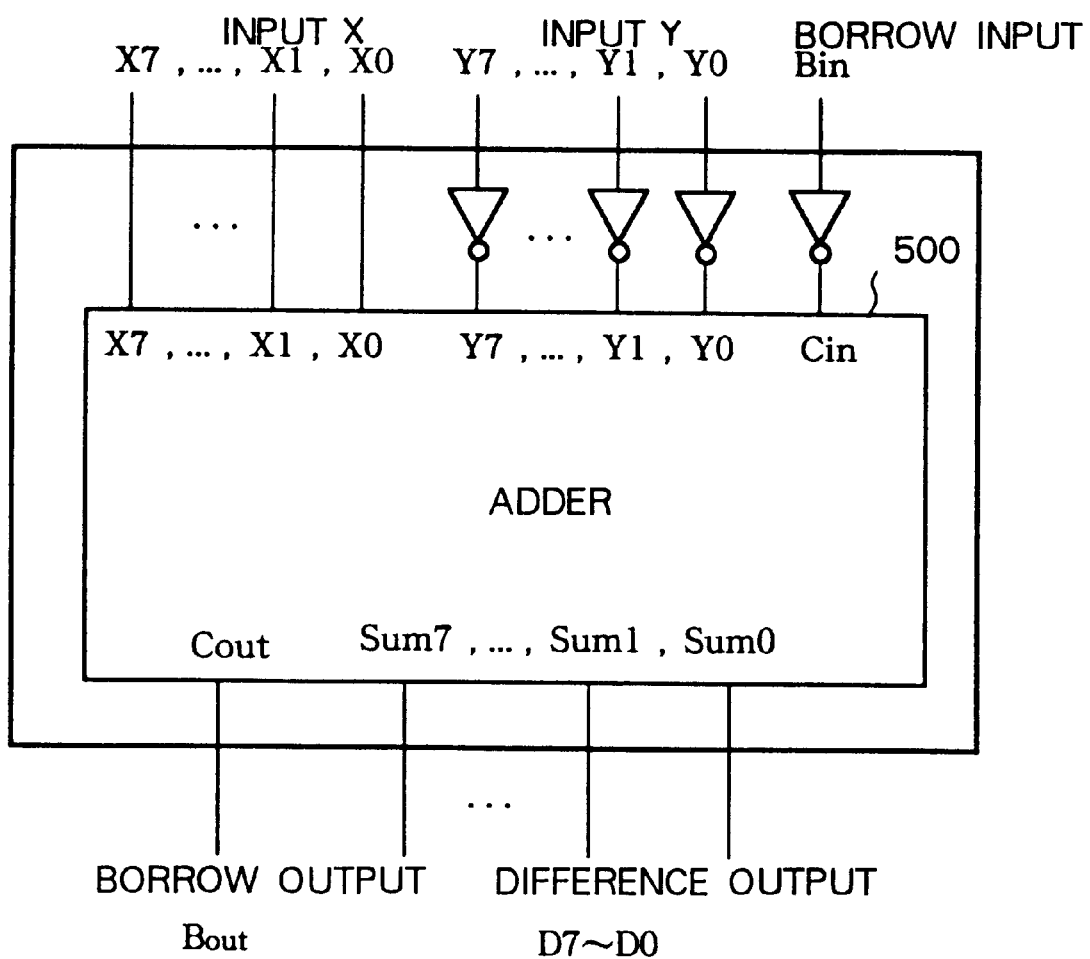
FIG. 72 is a view of the configuration of a subtractor using a conventional adder.
Figure 73:
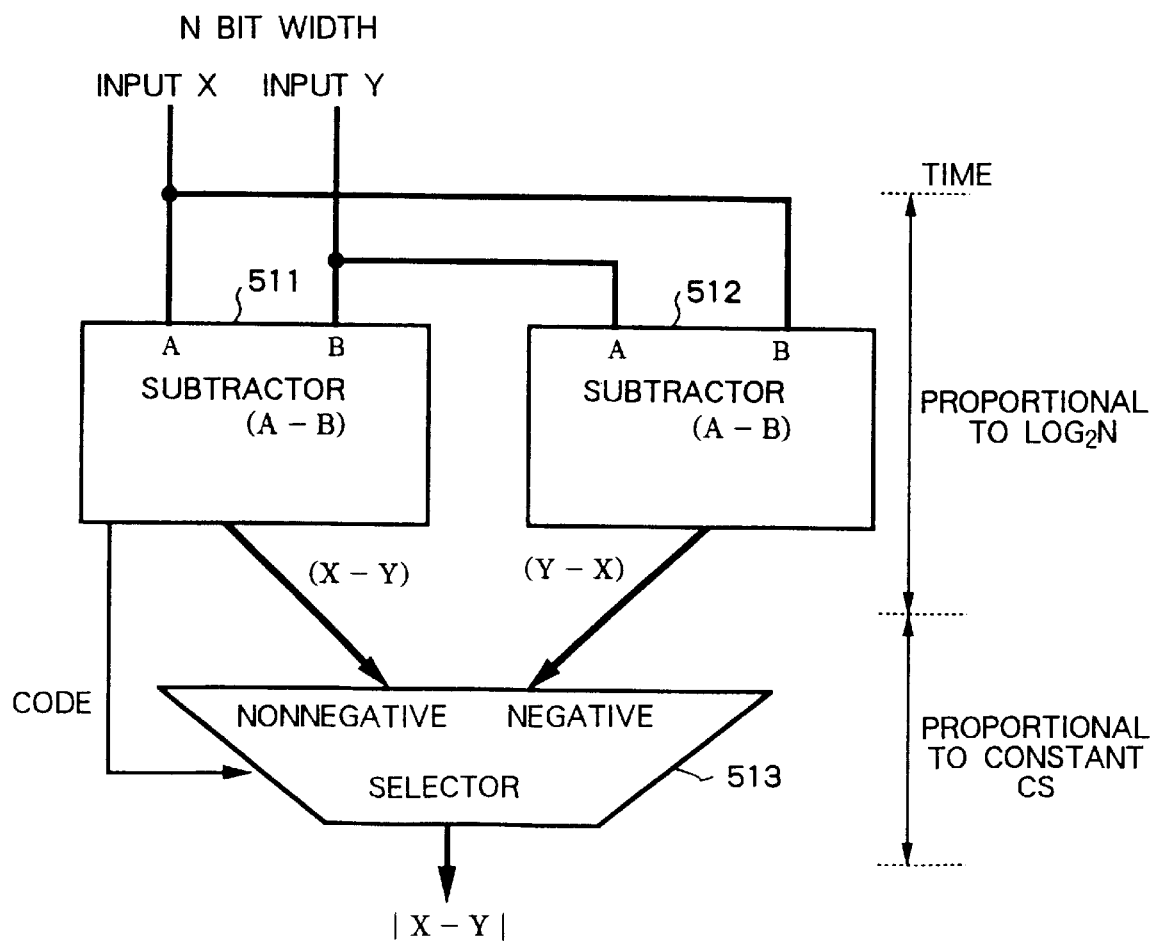
FIG. 73 is a view of the configuration of an operation unit for obtaining the absolute value of a difference according to the conventional second method.
Figure 74:
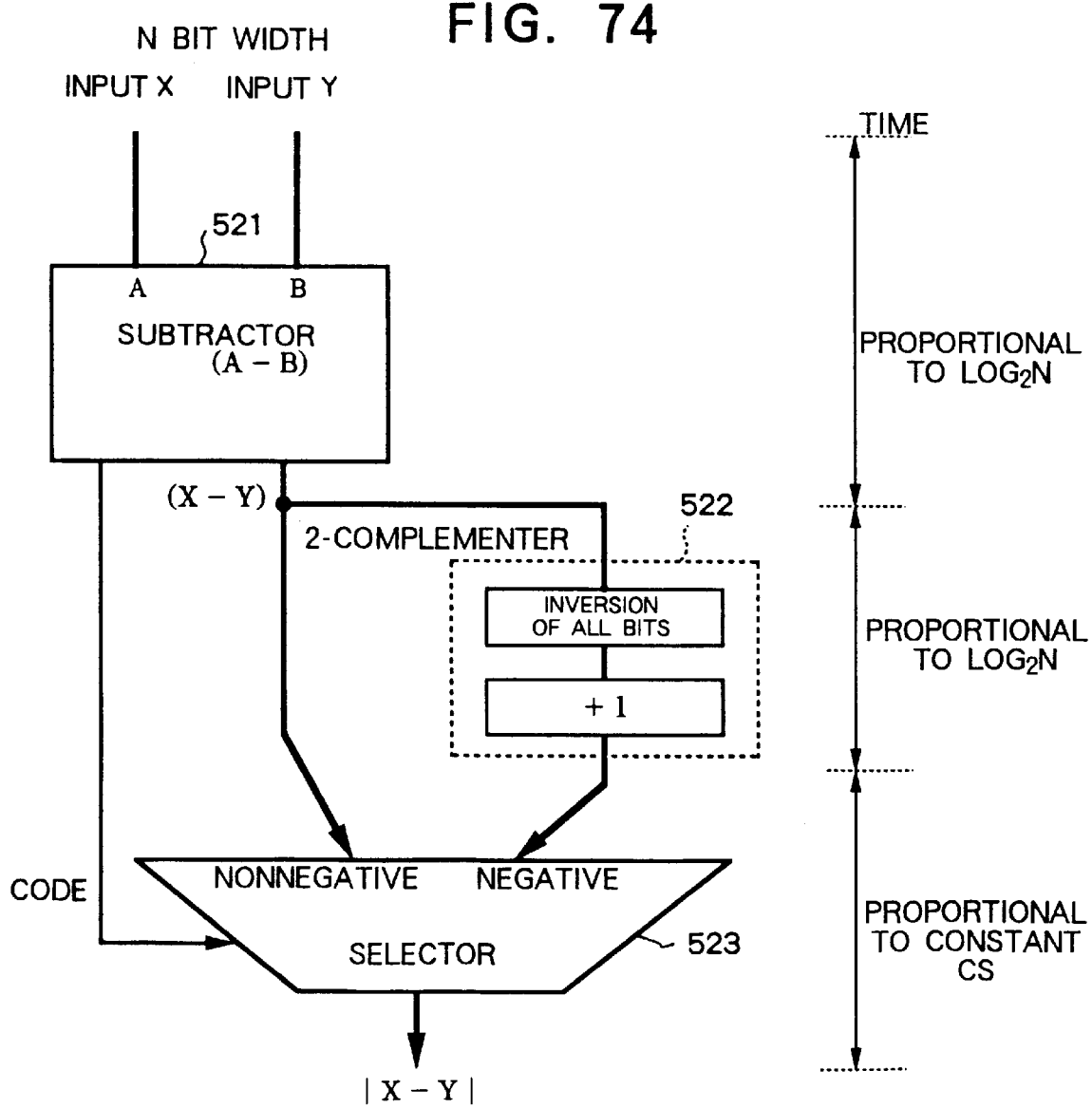
FIG. 74 is a view of the configuration of an operation unit for obtaining the absolute value of a difference according to the conventional third method.

However, surprisingly, an operation unit for obtaining an absolute value of a code-bearing difference can be obtained by just making a slight change to the operation unit for obtaining an absolute value of a code-less difference of FIG. 62. Namely, it is sufficient so far as the MSB's of the inputs X and Y are exchanged and added to the input. FIG. 63 is a view of the configuration of the operation unit for obtaining an absolute value of a code-bearing difference. In the figure, the ternary code generation circuit CGS7' performing the ternary code generation for MSB (bits 7) of two numbers handles the digit value X7 as the digit value Y7, and handles the digit value Y7 as the digit value X7, respectively, and the handling has become inverse to the handling of Xi and Yi in the ternary code generation circuits CGS0' and CGS1 to CGS6 of other bits.

6.5.7 Effect of Application of Ternary Code Binary Tree to Operation Unit for Obtaining Absolute Value of Difference As explained above, in the operation unit for obtaining the absolute value of a difference of the present embodiment, when seeking the absolute value operation of the difference of two numbers (X, Y), by using the ternary code binary tree BLB array by the ternary code generation circuit group and the not simplified K logic circuit matrix, first, the ternary codes of the difference for all bits including the bit 0 are generated by the group of difference ternary code generation circuits. By this, the generation of the ternary code at the time of (X–Y) and the generation of the ternary code at the time of (Y–X) become symmetric and accordingly, also, the results of the borrow generation become symmetric between the time of (X–Y) and the time of (Y–X). For this reason, after performing the borrow generation assuming (X–Y), the result of the borrow generation at the time of (Y–X) can be obtained by an extremely simple method based on the result of the borrow generation.

Next, the results of the generation of the ternary codes of the difference for all bits including the bit 0 generated by the difference ternary code generation circuit are given to the K logic circuit matrix where the borrow generation of the digits is carried out. Also the results of borrow generation are output in the form of ternary codes, but in the outputs, the symmetry prescribed in the ternary code generation at the input stage is maintained. Accordingly, the result of borrow generation at the time of (Y–X) can be easily obtained from the result of borrow generation at the time of (X–Y).

Further, the results of generation of the ternary codes of the difference for all bits including the bit 0 generated by the difference ternary code generation circuit are given to the not simplified K logic circuit matrix, where the borrows of the digits are generated. Then, based on the results of the borrow generation of the MSB, the code is judged for the result of the difference of two numbers. When the code of the result of the borrow generation of the MSB is "Y", X<Y and the code replacement of the result of the borrow generation is carried out; when the code of the result is "Q", X=Y and the code replacement of the result of the borrow generation is carried out or left as it is; and when the code of the result is "N", X>Y and the result of the borrow generation is left as it is. Note that, in the symmetrical code replacement, the value code "Q" is replaced by the value code the value code "Y" is replaced by the value code "N", and the value code "N" is replaced by the value code "Y". By this, the result of the borrow generation of (Y–X) can be easily obtained from the result of the borrow generation of (X−Y) and an ideal operation conversion can be realized.

Also, after the code replacement, further, the value code "Q" is substituted with the value code "N" and the borrow of each digit is obtained for the result of replacement or the output code of the K logic circuit. That is, attention is paid to the fact that the value code "Q" after the code replacement means "a borrow will occur", and the value code "Q" is replaced by the value code "N". The results of borrow generation after replacing the value code "Q" by the value code "N" become only the value code "Y" and the value code "N". The value code "Y" means "a borrow will occur", that is, the carry Bi=1, and the value code "N" means "a borrow will not occur", that is, the carry Bi=0, respectively. These are the same as the results of borrow generation in the subtractor. Accordingly, an operation unit for obtaining the absolute value of a difference can be realized by using the logical circuit in the same way as the subtractor from here.

Further, as explained in the "Prior Art", conventionally, there are two methods of realization of the operation unit for obtaining the absolute value of a difference which have been frequently used. One is the method of performing (X−Y) and (Y−X) in parallel by using two subtractors (second method) and had a characteristic feature that the speed was high, but the number of gates was large. Another one is the method of generating the complement of 2 according to need by performing (X−Y) by using one subtractor and one incrementer (third method) and had a characteristic feature that the number of gates was small, but the speed was low. A qualitative comparison of the number of gates and delay between the operation units for obtaining the absolute value of a difference according to these second and third methods and the operation unit for obtaining the absolute value of a difference according to the present invention is given in FIG. 64.

In general, within the practical range of about N≧8, the following relationships stand.

(a) For the number of gates, kTN+kA $\log_2$N (operation unit for obtaining the absolute value of a difference of the present invention)

≦1.4 kA N $\log_2$N (operation unit for obtaining the absolute value of a difference according to the third method)

≦kS N+kA 2 $\log_2$N (absolute value operation unit of difference according to the second method)

(b) For the delay,

CT+CA $\log_2$N (operation unit for obtaining the absolute value of a difference of the present invention)

≈CS+CA $\log_2$N (operation unit for obtaining the absolute value of a difference according to the second method)

≦CS+CA 2$\log_2$N (absolute value operation unit of difference according to the third method)

Accordingly, it can be said that the operation unit for obtaining the absolute value of a difference according to the present invention is superior in both points of the number of gates and the signal propagation delay in comparison with the conventional operation unit for obtaining the absolute value of a difference.

As explained above, according to the arithmetic and logic unit of the present invention, the method of operation of the same, and the storage medium for storing the method of operation as a program, when a serial structure of decisions having an order dependency is converted to an indeterminate code binary tree structure, the processing time becomes the sum of the smallest integers exceeding $\log_2$N at most, it becomes possible to process this at a high speed, and it is also possible to realize a high speed arithmetic and logic unit capable of efficiently performing parallel processing.

Further, according to the arithmetic and logic unit of the present invention, the method of operation of the same, and the storage medium for storing the method of operation as a program, when the serial structure of decisions having an order dependency is converted to a structure of a complete binary tree form, the processing time becomes the sum of the smallest integers exceeding the $\log_2$N at the most, it becomes possible to process this at a high speed, and it is also possible to realize a high speed arithmetic and logic unit capable of efficiently performing parallel processing.

Further, according to the arithmetic and logic unit of the present invention, the method of operation of the same, and the storage medium for storing the method of operation as a program, when a serial structure of decisions having an order dependency in various operations such as comparison, addition, and subtraction of any two R-nary numbers and the operation for obtaining the absolute value of a difference is converted to a structure of a complete binary tree form, the processing time becomes the sum of the smallest integers exceeding $\log_2$N at most, it becomes possible to process this at a high speed, and it is also possible to realize a high speed arithmetic and logic unit capable of efficiently performing parallel processing.

Note that the present invention is not limited to the above embodiments and includes modifications within the scope of the claims.

What is claimed is:

1. A method of operation of an arithmetic and logic unit for solving a problem including a series of decisions having an order dependency by creating a model by a binary tree using processings for decisions not having dependency input/outputs as leaves and using processings for determination of a higher priority as nodes other than the leaves, in said method of operation of an arithmetic and logic unit, processings for decisions not having dependency input/outputs, corresponding to the decisions, each executing a predetermined decision based on a single or a plurality of data inputs comprising an R-nary number or quantity of logical value information at a point of time when said data input becomes valid and outputting a code of a format combining into one an indeterminate code "Q" of the meaning "cannot be defined" and the quantity as a working conclusion;

said processings for determination of higher priorities, corresponding to the series of decisions, each receiving as its input the working conclusions of two processings for decisions not having dependency input/outputs or the working conclusions of two processings for determination of higher priorities before the same, outputting the working conclusion of the processing for a decision of a higher significant bit not having a dependency input/output or the working conclusion of the processing for determination of a higher priority of a higher significant bit as a working conclusion when the working conclusion of the processing for a decision not having a dependency input/output of a higher significant bit or the working conclusion of the processing for determination of a higher priority of a higher significant bit is not the indeterminate code "Q", and outputting the working conclusion of the processing for a decision not having a dependency input/output of a lower significant bit or the working conclusion of the processing for determination of a higher priority of a lower significant bit as the working conclusion when the working conclusion of the processing for a decision not having a dependency input/output of a higher significant bit or the working conclusion of the processing for determination of a higher priority of a higher significant bit is the indeterminate code "Q"; and all processings for decisions serving as leaves of the binary tree and all processings for determination of higher priorities located at the same depth in the binary tree being respectively processed in parallel and the working conclusion of the processing for determination of a higher priority serving as a root of the binary tree being defined as the conclusion of the problem.

2. A storage medium which can be read by a computer, wherein the method of operation of the arithmetic and logic unit disclosed in claim 1 is stored as a program for execution by the computer.

3. A method of operation of an arithmetic and logic unit for transforming all problems for which a model can be created by a serial structure of decisions having an order dependency configured by having N (N is any positive integer) number of decision nodes having dependency input/outputs each executing a predetermined decision based on a single or a plurality of data inputs comprising an R-nary number or quantity of logical value information and a dependency input comprising binary information indicating "valid" or "invalid" at a point of time when both of the data input and the dependency input become valid and each outputting a conclusion output comprising an R-nary number or quantity of logical value information and a dependency output comprising binary information indicating "valid" or "invalid" and having a relationship of relative order between the decision nodes having dependency input/outputs, having the dependency input of the decision node having a dependency input/output of the most significant bit always being "valid", and having the dependency output of a decision node having a dependency input/output located at a higher significant bit connected as the dependency input of a decision node having a dependency input/output located at one lower significant bit from that decision node having a dependency input/output to a binary tree structure having N number of decision nodes not having dependency input/outputs for each executing a predetermined decision based on a single or a plurality of data inputs comprising an R-nary number or a quantity of logical value information at a point of time when the data input becomes valid and outputting a code of a format combining into one an indeterminate code "Q" of the meaning "cannot be defined" and a quantity as a working conclusion and defining the N number of decision nodes not having dependency input/outputs as leaves, said method of operation of an arithmetic and logic unit replacing a decision node having a dependency input/output by a decision node not having a dependency input/output having a connotation decision node for executing a predetermined decision based on a single or a plurality of data inputs comprising an R-nary number or quantity of logical value information and a dependency input always comprising "valid" at a point of time when the data input becomes valid and outputting a conclusion output comprising an R-nary number or quantity of logical value information and a dependency output comprising binary information indicating "valid" or "invalid" and an indeterminate code generation node for outputting an indeterminate code "Q" when the dependency output of the connotation decision node becomes "valid" and outputting a code of a format combining in one the indeterminate code "Q" and the quantity as the working conclusion of the decision node not having a dependency input/output.

4. A storage medium which can be read by a computer, wherein the method of operation of the arithmetic and logic unit disclosed in claim 3 is stored as a program for execution by the computer.

5. A method of operation of an arithmetic and logic unit for transforming all problems for which a model can be created by a serial structure of decisions having an order dependency configured by having N (N is any positive integer) number of decision nodes having dependency input/outputs for each executing a predetermined decision based on a single or a plurality of data inputs comprising an R-nary number or quantity of logical value information and a dependency input comprising binary information indicating "valid" or "invalid" at a point of time when both of the data input and the dependency input become valid and each outputting a conclusion output comprising an R-nary number or quantity of logical value information and a dependency output comprising binary information indicating "valid" or "invalid" and having a relationship of relative order between the decision nodes having dependency input/outputs, having the dependency input of the decision node having a dependency input/output of the most significant bit always being "valid", and having the dependency output of a decision node having a dependency input/output located at a higher significant bit connected as the dependency input of a decision node having a dependency input/output located at one lower significant bit from that decision node having a dependency input/output to a binary tree structure having N number of decision nodes not having dependency input/outputs for each executing a predetermined decision based on a single or a plurality of data inputs comprising an R-nary number or quantity of logical value information at a point of time when the data input becomes valid and outputting a code of a format combining into one an indeterminate code "Q" of the meaning "cannot be defined" and the quantity as a working conclusion and higher priority determination nodes, corresponding to the series of decisions, which each receives as its input the working conclusions of two decision nodes not having dependency input/outputs or the working conclusions of two higher priority determination nodes in front of this higher priority determination node and outputs the working conclusion of the decision node not having a dependency input/output of a higher significant bit or the working conclusion of the higher priority determination node of a higher significant bit as the working conclusion of that higher priority determination node when the working conclusion of the decision node not having a dependency input/output of a higher significant bit or the working conclusion of the higher priority determination node of a higher significant bit is not the indeterminate code "Q", while outputs the working conclusion of the decision node not having a dependency input/output of a lower significant bit or the working conclusion of the higher priority determination node of a lower significant bit as the working conclusion of that higher priority determination node when the working conclusion of the decision node not having a dependency input/output of a higher significant bit or the working conclusion of the higher priority determination node of a higher significant bit is the indeterminate code "Q" and defining the decision nodes not having dependency input/outputs as leaves and defining the higher priority determination nodes as other nodes other than leaves, said method of operation of an arithmetic and logic unit replacing a decision node having a dependency input/output by a decision node not having a dependency input/output having a connotation decision node for executing a predetermined decision based on a single or a plurality of data inputs comprising an R-nary number or quantity of logical value information and a dependency input always comprising "valid" at a point of time when the data input becomes valid and outputting a conclusion output comprising an R-nary number or quantity of logical value information and a dependency output comprising binary information indicating "valid" or "invalid" and an indeterminate code generation node for outputting an indeterminate code "Q" when the dependency output of the connotation decision node becomes "valid" and outputting a code of a format combining in one the indeterminate code "Q" and the quantity as the working conclusion of the decision node not having a dependency input/output.

6. A storage medium which can be read by a computer, wherein the method of operation of the arithmetic and logic unit disclosed in claim 5 is stored as a program for execution by the computer.

7. A method of operation of an arithmetic and logic unit for realizing a priority encoding function for outputting as a binary number, with respect to data input of n-bit binary numbers, a bit position which is first "1" or "0" in a direction from the most significant bit to the least significant bit or the number of continuous "1's" or "0's" in the direction from the most significant bit to the least significant bit by creating a model by a binary tree defining a processing for a decision not having a dependency input/output as a leaf and defining processing for determination of a higher priority as another node other than a leaf, in said method of operation of an arithmetic and logic unit, the processings for decisions not having dependency input/outputs, corresponding to each bit of the data input, each executing a predetermined decision based on one bit of the data input at the point of time when the data input becomes valid and outputting a code of a format combining into one an indeterminate code "Q" indicating "cannot be defined" and a quantity as a working conclusion;

the processings for determination of higher priorities, corresponding to each bit of the data input, each receiving as its input the working conclusions of two processings for decisions not having dependency input/outputs or the working conclusions of two processings for determination of higher priorities in front of the same, outputting the working conclusion of the processing for a decision not having a dependency input/output of a higher significant bit or the working conclusion of the processing for determination of a higher priority of a higher significant bit as the working conclusion when the working conclusion of the processing for a decision not having significant dependency input/output of a higher significant bit or the working conclusion of the processing for determination of a higher priority of a higher significant bit is not the indeterminate code "Q", and outputting the working conclusion of the processing for a decision not having a dependency input/output of a lower significant bit or the working conclusion of the processing for determination of a higher priority of a lower significant bit as the working conclusion when the working conclusion of the processing for a decision not having a dependency input/output of a higher significant bit or the working conclusion of the processing for determination of a higher priority of a higher significant bit is the indeterminate code "Q"; and all processings for decisions serving as leaves of the binary tree and all processings for determination of higher priorities located at the same depth in the binary tree being respectively processed in parallel and the working conclusion of the higher priority determination node serving as a root of the binary tree being defined as the conclusion of the priority encoding.

8. A method of operation of an arithmetic and logic unit for solving a problem including a series of decisions having an order dependency by creating a model by a binary tree defining processings for decisions, corresponding to the decisions, as leaves and defining processings for determination of higher priorities as other nodes other than leaves, in said method of operation of an arithmetic and logic unit, the processings for decisions outputting any one of "true", "false", and "neither true nor false or do not know" as a result of decision based on one or a plurality of input information;

the processings for determination of higher priorities, corresponding to the series of decisions, each receiving as its input the results of decisions of two processings for decisions or the results of decisions of two processings for determination of higher priorities in front of the same, outputting the result of decision of the processing for a decision of the higher significant bit or the processing for determination of a higher priority of the higher significant bit when the result of decision of the processing for a decision of the higher significant bit or the processing for determination of a higher priority of the higher significant bit is "true" or "false", and outputting the result of decision of the processing for a decision of the lower significant bit or the processing for determination of a higher priority of the lower significant bit when the result of decision of the processing for a decision of the higher significant bit or the processing for determination of a higher priority of the higher significant bit is "neither true nor false or do not know"; and all processings for decisions serving as leaves of the binary tree and all processings for determination of higher priorities located at the same depth in the binary tree being respectively processed in parallel.

9. A method of operation of an arithmetic and logic unit as set forth in claim 8, wherein:

when the result of decision "true" is defined as the value code "Y", "false" is defined as the value code "N", and "neither true nor false or do not know" is defined as the value code "Q", respectively, the processing for determination of a higher priority is given as a K operator for deriving one code $Tij \in \{Y, N, Q\}$ from two codes, that is, a code $Ti \in \{Y, N, Q\}$ derived from the result of decision of the processing for a decision of a higher significant bit and a code $Tj \in \{Y, N, Q\}$ derived from the result of decision of a processing for a decision of a lower significant bit; and when the code Ti is in a relationship superior to the code Tj, the K operator defines the value code "Y" or the value code "N" as the value code taken by the code Tij when the code Ti is the value code "Y" or the value code "N" and defines the value code taken by the code Tj as the value code taken by the code Tij when the code Ti is the value code "Q".

10. A method of operation of an arithmetic and logic unit as set forth in claim 8, wherein:

when the result of decision "true" is defined as the value code "Y", "false" is defined as the value code "N", and "neither true nor false or do not know" is defined as the value code "Q", respectively, the processing for determination of a higher priority is given as a K operator for deriving one code $Tij \in \{Y, N, Q\}$ from two codes, that is, a code $Ti \in \{Y, N, Q\}$ derived from the result of decision of the processing for a decision of a higher significant bit and a code $Tj \in \{Y, N, Q\}$ derived from the result of decision of a processing for a decision of a lower significant bit; and when the code Ti is in a relationship superior to the code Tj, when any code X is given by a 2-bit binary number (X, 1, X, 0) defining the value code "Y" as {11}, the value code "N" as {10}, and the value code "Q" as {0*} (where, "*" is "don't care"), an OR logic is denoted by a "+" operator, an AND logic is denoted by a "·" operator, and a negative logic is denoted by a "^" operator, respectively, the K operator is given as:

$$TiKTj = Tij$$
$$(Ti, 1, Ti, 0)K(Tj, 1, Tj, 0) = (Tij, 1, Tij, 0)$$
$$= (Ti, 1 + Tj, 1, Ti, 1 \cdot Ti, 0 +^{\wedge} Ti, 1 \cdot Tj, 0).$$

11. A storage medium which can be read by a computer, wherein the method of operation of the arithmetic and logic unit disclosed in claim 8 is stored as a program for execution by the computer.

12. A method of operation of an arithmetic and logic unit for finding the absolute value of the difference of two numbers (X, Y) of n number of digits of any R-nary number by creating a model by one column of n number of processings for decisions, all filled by n number of binary trees defining the processings for decisions from the first digit to a g-th digit (g=1 to n) as the leaves and defining other nodes other than the leaves as the processings for determination of higher priorities, and a matrix comprising n number of rows and m number of columns (m is the smallest integer exceeding $\log_2 n$) of processings for determination of higher priorities in said method of operation of an arithmetic and logic unit, the processings for decisions each outputting as the result of decision a value code "Y" meaning "true" when the result of the difference (X−Y) of two numbers of the same digit place becomes negative, outputting a value code "N" meaning "false" when the result becomes positive, and outputting a value code "Q" meaning "neither true nor false or do not know" when the result becomes zero;

the processings for determination of higher priorities, corresponding to the series of decisions, each receiving as its input the results of decisions of two processings for decisions or the results of decisions of two processings for determination of higher priorities in front of the same, outputting the result of decision of the processing for a decision of the higher significant bit or the processing for determination of a higher priority of the higher significant bit when the result of decision of the processing for a decision of the higher significant bit or the processing for determination of a higher priority of the higher significant bit is "true" or "false", and outputting the result of decision of the processing for a decision of a lower significant bit or the processing for determination of a higher priority of the lower significant bit when the result of decision of the processing for a decision of the higher significant bit or processing for determination of a higher priority of the higher significant bit is "neither true nor false or do not know"; and the one column of n number of processings for decisions and the constituent elements of the columns comprising the matrix comprising the n number of rows and m number of columns of processings for determination of higher priorities being respectively simultaneously processed and a borrow operation of each digit being generated from each processing for determination of a higher priority of the m-th column.

13. A method of operation of an arithmetic and logic unit as set forth in claim 12, comprising:

a code judgement step for judging the code for the result of the difference (Xa−Yb) of two numbers based on the result of the generation of the borrow operation of the most significant digit generated from the processing for determination of a higher priority of the n-th row and m-th column;

a code replacement step of respectively replacing the value code "Q" with the value code "Q", the value code "Y" with the value code "N", and the value code "N" with the value code "Y" for the output codes of the processings for determination of higher priorities not including the processing for determination of a higher priority of the n-th row among the group of processings for determination of higher priorities of the m-th column when the result of the code judgement of the code judgement step is negative or when it is negative or zero and leaving them as they are without performing the replacement where the result is positive or zero or when it is positive; and a second code replacement step for replacing the value code "Q" with the value code "N" to obtain a borrow operation of each digit for the result of replacement or the output code of the processing for determination of a higher priority after the code replacement step.

14. A storage medium which can be read by a computer, wherein the method of operation of the arithmetic and logic unit disclosed in claim 13 is stored as a program for execution by the computer.

15. A storage medium which can be read by a computer, wherein the method of operation of the arithmetic and logic unit disclosed in claim 12 is stored as a program for execution by the computer.

16. An arithmetic and logic unit for solving a problem including a series of decisions having an order dependency, said arithmetic and logic unit having decision nodes not having dependency input/outputs, corresponding to the decisions, for each executing a predetermined decision based on a single or a plurality of data inputs comprising an R-nary number or quantity of logical value information at a point of time when the data input becomes valid and outputting a code of a format combining in one an indeterminate code "Q" indicating "cannot be defined" and the quantity as a working conclusion and higher priority determination nodes, corresponding to the series of decisions, for each receiving as its input the working conclusions of two decision nodes not having dependency input/outputs or the working conclusions of two higher priority determination nodes in front of the same, outputting the working conclusion of the decision node not having a dependency input/output of the higher significant bit or the working conclusion of the higher priority determination node of the higher significant bit as the working conclusion when the working conclusion of the decision node not having the dependency input/output of the higher significant bit or the working conclusion of the higher priority determination node of the higher significant bit is not the indeterminate code "Q", and outputting the working conclusion of the decision node not having a dependency input/output of the lower significant bit or the working conclusion of the higher priority determination node of the lower significant bit as the working conclusion when the working conclusion of the decision node not having a dependency input/output of the higher significant bit or the working conclusion of the higher priority determination node of the higher significant bit is the indeterminate code "Q" and creating a model for the problem by a binary tree defining a decision node not having a dependency input/output as a leaf and defining a higher priority determination node as another node other than a leaf, simultaneously processing all decision nodes serving as the leaves and all higher priority determination nodes located at the same depth in the binary tree, and defining the working conclusion of the higher priority determination node serving as a root of the binary tree as the conclusion of the problem.

17. An arithmetic and logic unit configured to transform a serial structure of decisions having an order dependency configured by having N (N is any positive integer) number of decision nodes having dependency input/outputs for each executing a predetermined decision based on a single or a plurality of data inputs comprising an R-nary number or quantity of logical value information and a dependency input comprising binary information indicating "valid" or "invalid" at a point of time when both of the data input and the dependency input become valid and outputting a conclusion output comprising an R-nary number or quantity of logical value information and a dependency output comprising the binary information indicating "valid" or "invalid", and having a relationship of relative order between the decision nodes having dependency input/outputs, having the dependency input of the decision node having a dependency input/output of the most significant bit always being "valid", and having the dependency output of a decision node having a dependency input/output located at a higher significant bit connected as the dependency input of a decision node having a dependency input/output located at one lower significant bit from that decision node having a dependency input/output to a binary tree structure having N number of decision nodes not having dependency input/outputs for each executing a predetermined decision based on a single or a plurality of data inputs comprising an R-nary number or quantity of logical value information at a point of time when the data input becomes valid and outputting a code of a format combining in one an indeterminate code "Q" indicating "cannot be defined" and the quantity as the working conclusion and defining the N number of decision nodes not having dependency input/outputs as leaves, said arithmetic and logic unit replacing a decision node having a dependency input/output by a decision node not having a dependency input/output having a connotation decision node for executing a predetermined decision based on a single or a plurality of data inputs comprising an R-nary number or quantity of logical value information and a dependency input always comprising "valid" at a point of time when the data input becomes valid and outputting a conclusion output comprising an R-nary number or quantity of logical value information and a dependency output comprising binary information indicating "valid" or "invalid" and an indeterminate code generation node for outputting an indeterminate code "Q" when the dependency output of the connotation decision node becomes "valid" and outputting a code of a format combining in one the indeterminate code "Q" and the quantity as the working conclusion.

18. An arithmetic and logic unit configured to transform a serial structure of decisions having an order dependency configured by having N (N is any positive integer) number of decision nodes having dependency input/outputs for each executing a predetermined decision based on a single or a plurality of data inputs comprising an R-nary number or quantity of logical value information and a dependency input comprising binary information indicating "valid" or "invalid" at a point of time when both of the data input and the dependency input become valid and outputting a conclusion output comprising an R-nary number or quantity of logical value information and a dependency output comprising the binary information indicating "valid" or "invalid", and having a relationship of relative order between the decision nodes having dependency input/outputs, having the dependency input of the decision node having a dependency input/output of the most significant bit always being "valid", and having the dependency output of a decision node having a dependency input/output located at a higher significant bit connected as the dependency input of a decision node having a dependency input/output located at one lower significant bit from that decision node having a dependency input/output to a binary tree structure having N number of decision nodes not having dependency input/outputs for each executing a predetermined decision based on a single or a plurality of data inputs comprising an R-nary number or quantity of logical value information at a point of time when the data input becomes valid and outputting a code of a format combining into one an indeterminate code "Q" of the meaning "cannot be defined" and the quantity as a working conclusion and higher priority determination nodes, corresponding to the series of decisions, which each receives as its input the working conclusions of two decision nodes not having dependency input/outputs or the working conclusions of two higher priority determination nodes in front of this higher priority determination node and outputs the working conclusion of the decision node not having a dependency input/output of a higher significant bit or the working conclusion of the higher priority determination node of a higher significant bit as the working conclusion of that higher priority determination node when the working conclusion of the decision node not having a dependency input/output of a higher significant bit or the working conclusion of the higher priority determination node of a higher significant bit is not the indeterminate code "Q", while outputs the working conclusion of the decision node not having a dependency input/output of a lower significant bit or the working conclusion of the higher priority determination node of a lower significant bit as the working conclusion of that higher priority determination node when the working conclusion of the decision node not having a dependency input/output of a higher significant bit or the working conclusion of the higher priority determination node of a higher significant bit is the indeterminate code "Q" and defining the decision nodes not having dependency input/outputs as leaves and defining the higher priority determination nodes as other nodes other than leaves, said arithmetic and logic unit replacing a decision node having a dependency input/output by a decision node not having a dependency input/output having a connotation decision node for executing a predetermined decision based on a single or a plurality of data inputs comprising an R-nary number or quantity of logical value information and a dependency input always comprising "valid" at a point of time when the data input becomes valid and outputting a conclusion output comprising an R-nary number or quantity of logical value information and a dependency output comprising binary information indicating "valid" or "invalid" and an indeterminate code generation node for outputting an indeterminate code "Q" when the dependency output of the connotation decision node becomes "valid" and outputting a code of a format combining in one the indeterminate code "Q" and the quantity as the working conclusion.

19. An arithmetic and logic unit provided with a priority encoding function for outputting as a binary number, with respect to data input of n-bit binary numbers, a bit position which is first "1" or "0" in a direction from the most significant bit to the least significant bit, said arithmetic and logic unit having decision nodes not having dependency input/outputs, corresponding to each bit of the data input, each executing a predetermined decision based on one bit of the data input at the point of time when the data input becomes valid and outputting a code of a format combining into one an indeterminate code "Q" indicating "cannot be defined" and a quantity as a working conclusion and higher priority determination nodes, corresponding to each bit of the data input, each receiving as its input the working conclusions of two decision nodes not having dependency input/outputs or the working conclusions of two higher priority determination nodes in front of the same, outputting the working conclusion of the decision node not having a dependency input/output of a higher significant bit or the working conclusion of the higher priority determination node of a higher significant bit as the working conclusion when the working conclusion of the decision node not having significant dependency input/output of a higher significant bit or the working conclusion of the higher priority determination node of a higher significant bit is not the indeterminate code "Q", and outputting the working conclusion of the decision node not having a dependency input/output of a lower significant bit or the working conclusion of the higher priority determination node of a lower significant bit as the working conclusion when the working conclusion of the decision node not having a dependency input/output of a higher significant bit or the working conclusion of the higher priority determination node of a higher significant bit is the indeterminate code "Q" and creating a model of the priority encoding function by a binary tree defining a decision node not having a dependency input/output as a leaf and defining a higher priority determination node as another node other than a leaf, simultaneously processing all decision nodes serving as leaves and all higher priority determination nodes located at the same depth in the binary tree, and defining the working conclusion of the higher priority determination node serving as a root of the binary tree as the conclusion of the priority encoding function.

20. An arithmetic and logic unit as set forth in claim 19, wherein:

the binary tree has n number of decision nodes serving as the leaves;

a sub binary tree of a height m (m is the smallest integer exceeding $\log_2 n$) not including the leaves of the binary tree has Nm (Nm is the smallest integer exceeding n/2) number of higher priority determination nodes serving as the nodes of a depth m, and Ns (Ns is the smallest integer exceeding Ns+½) number of higher priority determination nodes serving as the nodes of a depth s (s is an integer represented as s=1 to m−1);

a decision node is a bit signal line of the corresponding data input;

the pm-th (pm=1 to Nm) higher priority determination nodes from the least significant bit serving as the nodes of the depth m of the sub binary tree each defines a (2×pm−2)-th bit signal line and a (2×pm−1)-th bit signal line of the data input as the zero-th bit input and the first bit input and has an OR logic means for taking an OR logic of the zero-th bit input and the first bit input and outputting the result as a first bit output and a connection line for outputting the first bit input as the zero-th bit output;

the ps-th (ps=1 to Ns) higher priority determination nodes from the least significant bit serving as the nodes of the depth s of the sub binary tree each defines a zero-th bit output to an (m−s)-th bit output of a (2×ps−1)-th higher priority determination node serving as a node of the depth (s+1) of the sub binary tree as the zero-th bit input to the (m−s)-th bit input of a lower significant bit and defines the zero-th bit output

141 to the (m−s)-th bit output of a (2×ps)-th higher priority determination node serving as a node of the depth (s+1) of the sub binary tree as the zero-th bit input to the (m−s)-th bit input of a higher significant bit and has an OR logic means for taking the OR logic of the (m−s)-th bit input of the lower significant bit and the (m−s)-th bit input of the higher significant bit and outputting the result as an (m−s+1)-th bit output, a connection line for outputting the (m−s)-th bit input of the higher significant bit as the (m−s)-th bit output, and (m−s+1) number of selecting means; and a q-th (q=1 to m−s+1)-th selecting means from the least significant bit receives as its input the (m−s)-th bit of the higher significant bit as the selection input, selects the (q−1)-th bit input of the higher significant bit when the selection input is "true", selects the (q−1)-th bit input of the lower significant bit when the selection input is "false", and outputs the same as the (q−1)-th bit output.

21. An arithmetic and logic unit provided with a priority encoding function for outputting as a binary number, with respect to a data input of n-bit binary numbers, a bit position which is first "1" or "0" in a direction from the most significant bit to the least significant bit, in said arithmetic and logic unit, a model is created for said arithmetic and logic unit by a binary tree of a height m (m is the smallest integer exceeding log₂n), the binary tree has Nm (Nm is the smallest integer exceeding n/2) number of nodes of a depth m and Ns (Ns is the smallest integer exceeding Ns+½) number of nodes of a depth s (s is an integer represented as s=1 to m−1);

the pm-th (pm=1 to Nm) nodes from the least significant bit of the depth m of the binary tree each uses a (2×pm−2)-th bit signal line and a (2×pm−1)-th bit signal line of the data input as the zero-th bit input and the first bit input and has an OR logic means for taking the OR logic of the zero-th bit input and the first bit input and outputting the result as the first bit output and a connection line for outputting the first bit input as the zero-th bit output;

the ps-th (ps=1 to Ns) nodes from the least significant bit of the depth s of the binary tree each uses the zero-th bit output to the (m−s)-th bit output of a (2×ps−1)-th node of the depth (s+1) of the binary tree as the zero-th bit input to the (m−s)-th bit input of a lower significant bit and uses the zero-th bit output to the (m−s)-th bit output of a (2×ps)-th node of the depth (s+1) of the binary tree as the zero-th bit input to the (m−s)-th bit input of a higher significant bit and has an OR logic means for taking the OR logic of the (m−s)-th bit input of the lower significant bit and the (m−s)-th bit input of the higher significant bit and outputting the result as an (m−s+1)-th bit output, a connection line for outputting the (m−s)-th bit input of the higher significant bit as the (m−s)-th bit output, and (m−s+1) number of selecting means; and a q-th (q=1 to m−s+1)-th selecting means from the least significant bit receives as its input the (m−s)-th bit of the higher significant bit as the selection input, selects the (q−1)-th bit input of the higher significant bit when the selection input is "true", selects the (q−1)-th bit input of the lower significant bit when the selection input is "false", and outputs the result as the (q−1)-th bit output.

142

22. An arithmetic and logic unit provided with a priority encoding function for outputting as a binary number, with respect to data input of n-bit binary numbers, the number of continuous "1's" or "0's" in the direction from the most significant bit to the least significant bit, said arithmetic and logic unit having decision nodes not having dependency input/outputs, corresponding to the individual bits of the data input, for each executing a predetermined decision based on one bit of the data input at a point of time when the data input becomes valid and outputting a code of a format combining in one an indeterminate code "Q" of the meaning "cannot be defined" and a quantity as a working conclusion and higher priority determination nodes, corresponding to the individual bits of the data input, which each receives as its input the working conclusions of two decision nodes not having dependency input/outputs or working conclusions of two higher priority determination nodes in front of the same, outputs the working conclusion of the decision node not having a dependency input/output of the higher significant bit or the working conclusion of the higher priority determination node of the higher significant bit as the working conclusion when the working conclusion of the decision node not having a dependency input/output of the higher significant bit or the working conclusion of the higher priority determination node of the higher significant bit is not the indeterminate code "Q", and outputs the working conclusion of the decision node not having a dependency input/output of the lower significant bit or the working conclusion of the higher priority determination node of the lower significant bit as the working conclusion when the working conclusion of the decision node not having a dependency input/output of the higher significant bit or the working conclusion of the higher priority determination node of the higher significant bit is the indeterminate code "Q"; and the priority encoding function is realized by creating a model by a binary tree using decision nodes not having dependency input/outputs as leaves and using higher priority determination nodes as nodes other than the leaves, simultaneously processing all decision nodes serving as leaves and all higher priority determination nodes located at the same depth in the binary tree, and using the working conclusion of the higher priority determination node serving as the root of the binary tree as the conclusion of the priority encoding function.

23. An arithmetic and logic unit as set forth in claim 22, wherein:

the binary tree has n number of decision nodes serving as the leaves;

a sub binary tree of a part of a height m (m is the smallest integer exceeding log₂n) not including the leaves of the binary tree has Nm (Nm is the smallest integer exceeding n/2) number of higher priority determination nodes which serve as the nodes of a depth m and Ns (Ns is the smallest integer exceeding Ns+½) number of higher priority determination nodes which serve as the nodes of a depth s (s is an integer represented as S=1 to m−1);

a decision node is a bit signal line of the corresponding data input;

the pm-th (pm=1 to Nm) higher priority determination nodes from the least significant bit serving as the nodes of the depth m of the sub binary tree each defines a (2×pm−2)-th bit signal line and a (2×pm−1)-th bit signal line of the data input as the zero-th bit input and the first bit input and has an OR logic means for taking an OR logic of the zero-th bit input and the first bit input and outputting the result as a first bit output and a negative logic means for taking the negative logic of the first bit input and outputting the result as the zero-th bit output;

the ps-th (ps=1 to Ns) higher priority determination nodes from the least significant bit which serve as the nodes of the depth s of the sub binary tree each uses the zero-th bit output to the (m−s)-th bit output of the (2×ps−1)-th higher priority determination node which serves as a node of the depth (s+1) of the sub binary tree as the zero-th bit input to the (m−s)-th bit input of the lower significant bit and uses the zero-th bit output to the (m−s)-th bit output of the (2×ps)-th higher priority determination node which serves as a node of the depth (s+1) of the sub binary tree as the zero-th bit input to the (m−s)-th bit input of the higher significant bit, and has an OR logic means for taking the OR logic of the (m−s)-th bit input of the lower significant bit and the (m−s)-th bit input of the higher significant bit and outputting the result as an (m−s+1)-th bit output, a negative logic means for taking the negative logic of the (m−s)-th bit input of the higher significant bit and outputting the result as the (m−s)-th bit output, and (m−s+1) number of selecting means; and a q-th (q=1 to m−s+1)-th selecting means from the least significant bit receives as its input the (m−s)-th bit of the higher significant bit as the selection input, selects the (q−1)-th bit input of the higher significant bit when the selection input is "true", selects the (q−1)-th bit input of the lower significant bit when the selection input is "false", and outputs the same as the (q−1)-th bit output.

24. An arithmetic and logic unit provided with a priority encoding function for outputting as a binary number, with respect to data input of n-bit binary numbers, the number of continuous "1's" or "0's" in the direction from the most significant bit to the least significant bit, wherein the arithmetic and logic unit is realized by creating of model by a binary tree of the height m (m is the smallest integer exceeding $\log_2 n$);

the binary tree has Nm (Nm is the smallest integer exceeding n/2) number of nodes of the depth m and Ns (Ns is the smallest integer exceeding Ns+½) number of nodes of the depth s (s is an integer represented as s=1 to m−1);

the pm-th (pm=1 to Nm) nodes from the least significant bit of the depth m of the binary tree each uses a (2×pm−2)-th bit signal line and a (2×pm−1)-th bit signal line of the data input as the zero-th bit input and the first bit input and has an OR logic means for taking the OR logic of the zero-th bit input and the first bit input and outputting the result as the first bit output and a negative logic means for taking the negative logic of the first bit input and outputting this as the zero-th bit output;

the ps-th (ps=1 to Ns) nodes from the least significant bit of the depth s of the binary tree each uses the zero-th bit output to the (m−s)-th bit output of the (2×ps−1)-th node of the depth (s+1) of the binary tree as the zero-th bit input to the (m−s)-th bit input of the lower significant bit and uses the zero-th bit output to the (m−s)-th bit output of the (2×ps)-th node of the depth (s+1) of the binary tree as the zero-th bit input to the (m−s)-th bit input of the higher significant bit and has an OR logic means for taking the OR logic of the (m−s)-th bit input of the lower significant bit and the (m−s)-th bit input of the higher significant bit and outputting the result as an (m−s+1)-th bit output, a negative logic means for taking the negative logic of the (m−s)-th bit input of the higher significant bit and outputting this as the (m−s)-th bit output, and (m−s+1) number of selecting means; and a q-th (q=1 to m−s+1)-th selecting means from the least significant bit receives as its input the (m−s)-th bit of the higher significant bit as the selection input, selects the (q−1)-th bit input of the higher significant bit when the selection input is "true", selects the (q−1)-th bit input of the lower significant bit when the selection input is "false", and outputs the same as the (q−1)-th bit output.

25. An arithmetic and logic unit for solving a problem including a series of decisions having an order dependency, having decision nodes, corresponding to the decisions, for each outputting either of "true", "false", and "neither true nor false or do not know" as the result of the decision based on one or a plurality of input information and higher priority determination nodes, corresponding to series of the decisions, for each receiving as its input the results of the decisions of two decision nodes or the results of the decisions of two higher priority determination nodes, outputs the result of the decision of the decision node of the higher significant bit or the higher priority determination node of the higher significant bit when the result of the decision of the decision node of the higher significant bit or the higher priority determination node of the higher significant bit is "true" or "false", and outputs the result of the decision of the decision node of the lower significant bit or the higher priority determination node of the lower significant bit when the result of the decision of the decision node of the higher significant bit or the higher priority determination node of the higher significant bit is "neither true nor false or do not know"; and creating a model of the problem by a binary tree using decision nodes as leaves and higher priority determination nodes as nodes other than the leaves and simultaneously processing all decision nodes which serve as leaves and all higher priority determination nodes located at the same depth in the binary tree.

26. An arithmetic and logic unit as set forth in claim 25, wherein:

when the arithmetic and logic unit is for performing a comparison of two numbers of any R-nary system and the comparison decisions for the digits of the two numbers form a series of decisions having an order dependency, the decision nodes each output "true or false" when the result of difference of the two numbers of the same digit places becomes positive, "false or true" when the result becomes negative, and "neither true nor false or do not know" when the result becomes zero.

27. An arithmetic and logic unit as set forth in claim 25, wherein:

when the arithmetic and logic unit performs an addition of two numbers of any R-nary system and the decisions of existence of a carry at each digit form a series of decisions having an order dependency, the decision nodes each outputs "true or false" when the result of the sum of the two numbers of the same digit places becomes R or more, "false or true" when the result becomes (R−2), and "neither true nor false or do not know" when the result becomes (R−1).

28. An arithmetic and logic unit as set forth in claim 25, wherein:

when the arithmetic and logic unit performs the subtraction of two numbers of any R-nary system and the decisions of existence of a borrow at each digit forms a series of decisions having an order dependency, the decision nodes each outputs "true or false" when the result of difference of two numbers of the same digit places becomes negative, "false or true" when the result becomes positive, and "neither true nor false or do not know" when the result becomes zero.

29. An arithmetic and logic unit as set forth in claim 25, wherein:

when the number of decisions in the series of decisions having an order dependency is n, the binary tree has n number of decision nodes serving as the leaves; and a sub binary tree of a part of a height m (m is the smallest integer exceeding $\log_2 n$) not including the leaves of the binary tree has Nm (Nm is the smallest integer exceeding n/2) number of higher priority determination nodes which serve as nodes of a depth m and Ns (Ns is the smallest integer exceeding Ns+½) number of higher priority determination nodes which serve as nodes of a depth s (s is an integer represented as s=1 to m−1).

30. An arithmetic and logic unit as set forth in claim 25, wherein:

when the result of decision "true" is defined as the value code "Y", "false" is defined as the value code "N", and "neither true nor false or do not know" is defined as the value code "Q", respectively, a higher priority determination node is given as a K operator for deriving one code Tij∈{Y, N, Q} from two codes, that is, a code Ti∈{Y, N, Q} derived from the result of decision of the decision node of the higher significant bit and a code Tj∈{Y, N, Q} derived from the result of decision of the decision node of the lower significant bit; and where the code Ti is superior to the code Tj, the K operator uses the value code "Y" or the value code "N" as the value code taken by the code Tij when the code Ti is the value code "Y" or the value code "N" and uses the value code taken by the code Tj as the value code taken by the code Tij where the code Ti is the value code "Q".

31. An arithmetic and logic unit as set forth in claim 25, wherein:

when the result of decision "true" is defined as the value code "Y", "false" is defined as the value code "N", and "neither true nor false or do not know" is defined as the value code "Q", respectively, a higher priority determination node is given as a K operator for deriving one code Tij∈{Y, N, Q} from two codes, that is, a code Ti∈{Y, N, Q} derived from the result of decision of the decision node of the higher significant bit and a code Tj∈{Y, N, Q} derived from the result of decision of the decision node of the lower significant bit; and where the code Ti is superior to the code Tj, when any code X is assigned by a 2-bit binary number (X, 1, X, 0) defining the value code "Y" as {11}, the value code "N" as {10}, and the value code "Q" as {0*} (where, "*" is "don't care"), an OR logic is denoted by a "+" operator, an AND logic is denoted by a "·" operator, and a negative logic is denoted by a "^" operator, respectively, the K operator is given as:

$$TiKTj = Tij$$
$$(Ti, 1, Ti, 0) K(Tj, 1, Tj, 0) = (Tij, 1, Tij, 0)$$
$$= (Ti, 1 + Tj, 1, Ti, 1 \cdot Ti, 0 +^{\wedge} Ti, 1 \cdot Tj, 0).$$

32. An arithmetic and logic unit as set forth in claim 31, wherein each higher priority determination node has:

an OR logic means for taking the OR logic of the code Ti,1 and the code Tj,1 and outputting the result as the code Tij,1 and a selecting means for selecting and outputting the code Ti,0 when the code Ti,1 is "1" and the code Tj,0 when the code Ti,1 is "0" as the code Tij,0, respectively.

33. An arithmetic and logic unit as set forth in claim 31, wherein:

when the number of decisions in the series of decision having an order dependency is n and a sub binary tree of the height m (m is the smallest integer exceeding $\log_2 n$) not including the leaves of the binary tree has Nm (Nm is the smallest integer exceeding n/2) number of higher priority determination nodes which serve as the nodes of a depth m and Ns (Ns is the smallest integer exceeding Ns+½) number of higher priority determination nodes which serve as the nodes of a depth s (s is an integer represented as s=1 to m−1), a higher priority determination node which serves as a node at the depth m−p (p is an even number indicated as p=0 to m−1) of the sub binary tree has a NOR logic means for taking the NOR logic of the code Ti,1 and the code Tj,1 and outputting the result as a code ^Tij,1 and a second selecting means for taking the negative logic of the results obtained by respectively selecting the code Ti,0 when the code Ti,1 is "1" and the code Tj,0 when the code Ti,1 is "0" and outputting the result as the ^code Tij,0; and a higher priority determination node which serves as a node at the depth m−q (q is an odd number indicated as q=0 to m−1) of the sub binary tree has a NAND logic means for taking the NAND logic of the code ^Ti,1 and the code ^Tj,1 and outputting the result as a code Tij,1 and a third selecting means for taking the negative logic of the results obtained by respectively selecting the code ^Ti,0 when the code ^Ti,1 is "0" and the code ^Tj,0 when the code ^Ti,1 is "1" and outputting the result as the code Tij,0.

34. An arithmetic and logic unit as set forth in claim 31, wherein:

when the arithmetic and logic unit performs a comparison of two n-bit binary numbers (Xa, Yb) and the comparison decisions for the digits of the two numbers (Xai, Ybi; i=0 to n−1) form a series of decisions having an order dependency, a decision node has an exclusive OR logic means for taking the exclusive OR logic of the digit value Xai and the digit value Ybi and outputting the result as the code Ti,1 and a connecting means for outputting the digit value Xai as the code Ti,0.

35. An arithmetic and logic unit as set forth in claim 34, wherein:

each higher priority determination node has an OR logic means for taking the OR logic of the code Ti,1 and the code Tj,1 and outputting the result as the code Tij,1 and a selecting means for respectively selecting the code Ti,0 when the code Ti,1 is "1" and the code Tj,0 when the code Ti,1 is "0" and outputting the result as the code Tij,0; and it is respectively interpreted that "the two numbers (Xa, Yb) are equal" when the output of the higher priority determination node serving as the root of the binary tree is indicated as Q=(0*), that "the two numbers (Xa, Yb) have a relationship of magnitude Xa>Yb" when the output is indicated as Y={11}, and that "the two numbers (Xa, Yb) have a relationship of magnitude Xa<Yb" when the output is indicated as N={10}.

36. An arithmetic and logic unit as set forth in claim 34, wherein:

when the sub binary tree of the height m (m is the smallest integer exceeding $\log_2 n$) not including the leaves of the binary tree has Nm (Nm is the smallest integer exceeding n/2) number of higher priority determination nodes which serve as the nodes of a depth m and Ns (Ns is the smallest integer exceeding Ns+½) number of higher priority determination nodes which serve as the nodes of a depth s (s is an integer represented as s=1 to m−1), a higher priority determination node which serves as a node at the depth m−p (p is an even number indicated as p=0 to m−1) of the sub binary tree has a NOR logic means for taking the NOR logic of the code Ti,1 and the code Tj,1 and outputting the result as a code ^Tij,1 and a second selecting means for taking the negative logic of the results obtained by respectively selecting the code Ti,0 when the code Ti,1 is "1" and the code Tj,0 when the code Ti,1 is "0" and outputting the result as the code ^Tij,0;

a higher priority determination node which serves as a node at the depth m−q (q is an odd number indicated as q=0 to m−1) of the sub binary tree has a NAND logic means for taking the NAND logic of the code Ti,1 and the code ^Tj,1 and outputting the result as a code Tij,1, and a third selecting means for taking the negative logic of the results obtained by respectively selecting the code ^Ti,0 when the code ^Ti,1 is "0" and the code ^Tj,0 when the code ^Ti,1 is "1" and outputting the result as the code Tij,0;

when m is an even number, it is respectively interpreted that "the two numbers (Xa, Yb) are equal" when the output of the higher priority determination node serving as the root of the binary tree is indicated as Q=(0*), that "the two numbers (Xa, Yb) have a relationship of magnitude Xa>Yb" when the output is indicated as Y={11}, and that "the two numbers (Xa, Yb) have a relationship of magnitude Xa<Yb" when the output is indicated as N={10}; and when m is an odd number, it is respectively interpreted that "the two numbers (Xa, Yb) are equal" when the output of the higher priority determination node serving as the root of the binary tree is indicated as Q=(1*), that "the two numbers (Xa, Yb) have a relationship of magnitude Xa>Yb" when the output is indicated as Y={00}, and that "the two numbers (Xa, Yb) have a relationship of magnitude Xa<Yb" when the output is indicated as N={01}.

37. An arithmetic and logic unit as set forth in claim 34, wherein:

when the arithmetic and logic unit performs a comparison of two code-bearing n-bit binary numbers (Xa, Yb), the decision node performing the comparison decision for the MSBs (most significant bits) of the two numbers treats the digit value Xan−1 as the digit value Ybn−1 and treats the digit value Ybn−1 as the digit value Xan−1, respectively.

38. An arithmetic and logic unit as set forth in claim 31, wherein:

when the decisions of existence of a carry for the digits (Xai, Ybi; i=0 to n−1) of two digits in the addition of two n-bit binary numbers (Xa, Yb) form a series of decisions having an order dependency, each decision node has an exclusive NOR logic means for taking the exclusive NOR logic of the digit value Xai and the digit value Ybi and outputting the result as the code Ti,1 and a connecting means for outputting the digit value Xai as the code Ti,0 or a connecting means for outputting the digit value Ybi as the code Ti,0.

39. An arithmetic and logic unit as set forth in claim 38, wherein:

the decision node performing a decision of existence of the carry for the LSBs (least significant bits) of the two numbers has a NOR logic means for taking the NOR logic of the digit value Xa0 and the digit value Yb0, a NAND logic means for taking the NAND logic of the digit value Xa0 and the digit value Yb0, and a selecting means for taking the negative logic of the results obtained by respectively selecting the output of the NOR logic means when the carry input to the arithmetic and logic unit is "1" and selecting the output of the NAND logic means when the carry input is "0" and outputting the result as the code T0,0; and does not output the code T0,1.

40. An arithmetic and logic unit as set forth in claim 39, wherein:

each higher priority determination node not due to the code T0,1 which originally should be output by the decision node performing the decision of existence of a carry for the LSBs of the two numbers among the higher priority determination nodes has an OR logic means for taking the OR logic of the code Ti,1 and the code Tj,1 and outputting the result as the code Tij,1 and a selecting means for selecting the code Ti,0 when the code Ti,1 is "1", selecting the code Tj,0 when the code Ti,1 is "0", respectively, and outputting the result as the code Tij,0;

the higher priority determination node due to the code T0,1 which originally should be output by the decision node performing the decision of existence of a carry for the LSBs of the two numbers among the higher priority determination nodes has a selecting means for selecting the code Ti,0 when the code Ti,1 is "1", selecting the code Tj,0 when the code Ti,1 is "0", respectively, and outputting the result as the code Tij,0 and does not output the code Tij,1; and it is respectively interpreted that "there is a carry output" when the output code Tij,0 of the higher priority determination node which serves as the root of the binary tree is "1" and that "there is no carry output" when the output code Tij,0 is "0".

41. An arithmetic and logic unit as set forth in claim 39, wherein:

when the sub binary tree of the height m (m is the smallest integer exceeding $\log_2 n$) not including the leaves of the binary tree has Nm (Nm is the smallest integer exceeding n/2) number of higher priority determination nodes which serve as the nodes of a depth m and Ns (Ns is the smallest integer exceeding Ns+½) number of higher priority determination nodes which serve as the nodes of a depth s (s is an integer represented as s=1 to m−1), each higher priority determination node not derived from the code T0,1 which originally should be output by the decision node performing the decision of existence of a carry for the LSBs of the two numbers among the higher priority determination nodes which serve as the nodes at the depth m−p (p is an even number indicated as p=0 to m−1) of the sub binary tree has a NOR logic means for taking the NOR logic of the code Ti,1 and the code Tj,1 and outputting the result as a code ^Tij,1 and a second selecting means for taking the negative logic of the results obtained by respectively selecting the code Ti,0 when the code Ti,1 is "1" and the code Tj,0 when the code Ti,1 is "0" and outputting the result as the code ^Tij,0;

each higher priority determination node not derived from the code T0,1 which originally should be output by the decision node performing the decision of existence of a carry for the LSBs of the two numbers among the higher priority determination nodes which serve as the nodes at the depth m−q (q is an odd number indicated as q=0 to m−1) of the sub binary tree has a NAND logic means for taking the NAND logic of the code ^Ti,1 and the code ^Tj,1 and outputting the result as a code Tij,1 and a third selecting means for taking the negative logic of the results obtained by respectively selecting the code ^Ti,0 when the code ^Ti,1 is "0" and the code ^Tj,0 when the code ^Ti,1 is "1" and outputting the result as the code Tij,0;

the higher priority determination node derived from the code T0,1 which originally should be output by the decision node performing the decision of existence of a carry for the LSBs of the two numbers among the higher priority determination nodes which serve as the nodes at the depth m−p (p is an even number indicated as p=0 to m−1) of the sub binary tree has a second selecting means for taking the negative logic of the results obtained by respectively selecting the code Ti,0 when the code Ti,1 is "1" and the code Tj,0 when the code Ti,1 is "0" and outputting the result as the code ^Tij,0 and does not output the code Tij,1;

the higher priority determination node derived from the code T0,1 which originally should be output by the decision node performing the decision of existence of a carry for the LSBs of the two numbers among the higher priority determination nodes which serve as the nodes at the depth m−q (q is an odd number indicated as q=0 to m−1) of the sub binary tree has a third selecting means for taking the negative logic of the results obtained by respectively selecting the code ^Ti,0 when the code ^Ti,1 is "0" and the code ^Tj,0 when the code ^Ti,1 is "1" and outputting the result as the code Tij,0 and does not output the code Tij,1;

when m is an even number, it is respectively interpreted that "there is a carry output" when the output code Tij,0 of the higher priority determination node which serves as the root of the binary tree is "1" and that "there is no carry output" when the output code Tij,0 is "0"; and when m is an odd number, it is respectively interpreted that "there is a carry output" when the output code ^Tij,0 of the higher priority determination node which serves as the root of the binary tree is "0" and that "there is no carry output" when the output code ^Tij,0 is "1".

42. An arithmetic and logic unit as set forth in claim 31, wherein:

when the decisions of existence of a carry for the digits (Xai, Ybi; i=0 to n−1) of two numbers in the addition of two n-bit binary numbers (Xa, Yb) forms a series of decisions having an order dependency and when the binary tree is comprised using the decision nodes for performing the decision of existence of a carry for the binary digits Xaj, Ybj (j=0 to n−2) as leaves and the sub binary tree of the height m (m is the smallest integer exceeding $\log_2 n$) not including the leaves of the binary tree has Nm (Nm is the smallest integer exceeding n/2) number of higher priority determination nodes which serve as the nodes of a depth m and Ns (Ns is the smallest integer exceeding Ns+½) number of higher priority determination nodes which serve as the nodes of a depth s (s is an integer represented as s=1 to m−1), the decision node for performing the decision of existence of a carry for the LSBs of the two numbers has a NOR logic means for taking the NOR logic of the digit value Xa0 and the digit value Yb0, a NAND logic means for taking the NAND logic of the digit value Xa0 and the digit value Yb0, and a selecting means for taking the negative logic of the results obtained by respectively selecting the output of the NOR logic means when the carry input to the arithmetic and logic unit is "1" and selecting the output of the NAND logic means when the carry input is "0" and outputting the result as the code T0,0 and does not output the code T0,1;

a decision node performing a decision of existence of a carry for the digits Xak, Ybk (k=1 to n−1) of the two numbers has an exclusive NOR logic means for taking the exclusive NOR logic of the digit value Xaj and the digit value Ybj and outputting the result as the code Tj,1 and a connecting means for outputting the digit value Xaj as the code Tj,0 or a connecting means for outputting the digit value Ybj as the code Tj,0;

the higher priority determination node derived from the code T0,1 which originally should be output by the decision node performing the decision of existence of a carry for the LSBs of the two numbers among the higher priority determination nodes has a selecting means for respectively selecting the code Ti,0 when the code Ti,1 is "1", selecting the code Tj,0 when the code Ti,1 is "0", and outputting the result as the code Tij,0 and does not output the code Tij,1;

each higher priority determination node not derived from the code T0,1 which originally should be output by the decision node performing the decision of existence of a carry for the LSBs of the two numbers among the higher priority determination nodes has an OR logic means for taking the OR logic of the code Ti,1 and the code Tj,1 and outputting the result as the code Tij,1 and a selecting means for respectively selecting the code Ti,0 when the code Ti,1 is "1", selecting the code Tj,0 when the code Ti,1 is "0", and outputting the result as the code Tij,0;

when the number of leaves of the binary tree is not a power of 2, uses the higher priority determination node corresponding to the decision node performing the decision of existence of a carry for the LSBs of the two numbers as the dummy node for propagating the code T0,0 output by the decision node as it is; and has an exclusive OR logic means for taking the exclusive OR logic between the negative logic of the output code Tn−1,1 of the decision node performing the decision of existence of a carry for the MSBs of the two numbers and the code output Tij,0 of the higher priority determination node which serves as the root of the binary tree and defining this as the result of the sum for the MSBs of the two numbers.

43. An arithmetic and logic unit as set forth in claim 31, wherein:

when the decisions of existence of a carry for the digits (Xai, Ybi; i=0 to n−1) of two numbers in the addition of two n-bit binary numbers (Xa, Yb) form a series of decisions having an order dependency and when the binary tree is comprised using decision nodes for performing the decisions of existence of a carry for the digits Xaj, Ybj (j=0 to n−2) of the two numbers as leaves and the sub binary tree of the height m (m is the smallest integer exceeding $\log_2 n$) not including the leaves of the binary tree has Nm (Nm is the smallest integer exceeding n/2) number of higher priority determination nodes which serve as the nodes of a depth m and Ns (Ns is the smallest integer exceeding Ns+½) number of higher priority determination nodes which serve as the nodes of a depth s (s is an integer represented as s=1 to m−1), the decision node for performing the decision of existence of a carry for the LSBs of the two numbers has a NOR logic means for taking the NOR logic of the digit value Xa0 and the digit value Yb0, a NAND logic means for taking the NAND logic of the digit value Xa0 and the digit value Yb0, and a selecting means for taking the negative logic of the results obtained by respectively selecting the output of the NOR logic means when the carry input to the arithmetic and logic unit is "1" and selecting the output of the NAND logic means when the carry input is "0" and outputting the result as the code T0,0 and does not output the code T0,1;

each decision node performing the decision of existence of a carry for the digits Xak, Ybk (k=1 to n−1) of the two numbers has an exclusive NOR logic means for taking the exclusive NOR logic of the digit value Xaj and the digit value Ybj and outputting the result as the code Tj,1 and a connecting means for outputting the digit value Xaj as the code Tj,0 or a connecting means for outputting the digit value Ybj as the code Tj,0;

each higher priority determination node not derived from the code T0,1 which originally should be output by the decision node performing the decision of existence of a carry for the LSBs of the two numbers among the higher priority determination nodes which serve as the nodes at the depth m−p (p is an even number indicated as p=0 to m−1) of the sub binary tree has a NOR logic means for taking the NOR logic of the code Ti,1 and the code Tj,1 and outputting the result as a code ~Tij,1 and a second selecting means for taking the negative logic of the results obtained by respectively selecting the code Ti,0 when the code Ti,1 is "1" and the code Tj,0 when the code Ti,1 is "0" and outputting the result as the code ~Tij,0;

each higher priority determination node not derived from the code T0,1 which originally should be output by the decision node performing the decision of existence of a carry for the LSBs of the two numbers among the higher priority determination nodes which serve as the nodes at the depth m−q (q is an odd number indicated as q=0 to m−1) of the sub binary tree has a NAND logic means for taking the NAND logic of the code ~Ti,1 and the code ~Tj,1 and outputting the result as a code Tij,1, and a third selecting means for taking the negative logic of the results obtained by respectively selecting the code ~Ti,0 when the code ~Ti 1 is "0" and the code ~Tj,0 when the code ~Ti,1 is "1" and outputting the result as the code Tij,0;

the higher priority determination node derived from the code T0,1 which originally should be output by the decision node performing the decision of existence of a carry for the LSBs of the two numbers among the higher priority determination nodes which serve as the nodes at the depth m−p (p is an even number indicated as p=0 to m−1) of the sub binary tree has a second selecting means for taking the negative logic of the results obtained by respectively selecting the code Ti,0 when the code Ti,1 is "1" and the code Tj,0 when the code Ti,1 is "0" and outputting the result as the code ~Tij,0 and does not output the code Tij,1;

the higher priority determination node derived from the code T0,1 which should be output by the decision node performing the decision of existence of a carry for the LSBs of the two numbers among the higher priority determination nodes which serve as the nodes at the depth m−q (q is an odd number indicated as q=0 to m−1) of the sub binary tree has a third selecting means for taking the negative logic of the results obtained by respectively selecting the code ~Ti,0 when the code ~Ti,1 is "0" and the code ~Tj,0 when the code ~Ti,1 is "1" and outputting the result as the code Tij,0 and does not output the code Tij,1;

when the number of leaves of the binary tree is not a power of 2, defines the higher priority determination node corresponding to the decision node performing the decision of existence of a carry for the LSBs of the two numbers as a dummy node for propagating the code T0,0 output by the decision node as it is;

has an exclusive OR logic means for taking the exclusive OR logic between the negative logic of the output code Tn−1,1 of the decision node performing the decision of existence of a carry for the MSBs of the two numbers and the code output Tij,0 of the higher priority determination node which serves as the root of the binary tree and defining this as the result of the sum for the MSBs of the two numbers when m is an even number; and has an exclusive OR logic means for taking the exclusive OR logic between the negative logic of the output code Tn−1,1 of the decision node performing the decision of existence of a carry for the MSBs of the two numbers and the negative logic of the code output ^Tij,0 of the higher priority determination node which serves as the root of the binary tree and defining this as the result of the sum for the MSBs of the two numbers when m is an odd number.

44. An arithmetic and logic unit as set forth in claim 25, wherein:

when the result of decision "true" is defined as the value code "Y", "false" is defined as the value code "N", and "neither true nor false or do not know" is defined as the value code "Q", respectively, a higher priority determination node is given as a K operator for deriving one code Tij∈{Y, N, Q} from two codes, that is, a code Ti∈{Y, N, Q} derived from the result of decision of the decision node of the higher significant bit and a code Tj∈{Y, N, Q} derived from the result of decision of the decision node of the lower significant bit; and where the code Ti is superior to the code Tj, when any code X is assigned by a 2-bit binary number (X, 1, X, 0) defining the value code "Y" as {00}, value code "N"as {11}, and value code "Q" as {10} and defining {01} as "usage forbidden" (value code "F"), an OR logic is denoted by a "+" operator, an AND logic is denoted by a "·" operator, and a negative logic is denoted by a "^" operator, respectively, the K operator is given as:

$$TiKTj = Tij$$

$$(Ti, 1, Ti, 0)K(Tj, 1, Tj, 0) = (Tij, 1, Tij, 0)$$

$$= (Ti, 0 + Ti, 1, Tj, 1 \cdot Ti, 0 + Ti, 1 \cdot Tj, 0).$$

45. An arithmetic and logic unit as set forth in claim 44, wherein each higher priority determination node has:

a first composite logical gate means for taking the OR logic between the AND logic of the code Ti,1 and the code Tj,1 and the code Ti,0 and outputting the result as the code Tij,1; and a second composite logical gate means for taking the OR logic between the AND logic of the code Ti,1 and the code Tj,0 and the code Ti,0 and outputting the result as the code Tij,0.

46. An arithmetic and logic unit as set forth in claim 44, wherein:

when the number of decisions in the series of decision having an order dependency is n and a sub binary tree of the height m (m is the smallest integer exceeding log$_2$n) not including the leaves of the binary tree has Nm (Nm is the smallest integer exceeding n/2) number of higher priority determination nodes which serve as the nodes of a depth m and Ns (Ns is the smallest integer exceeding Ns+½) number of higher priority determination nodes which serve as the nodes of a depth s (s is an integer represented as s=1 to m−1), a higher priority determination node which serves as a node at the depth m−p (p is an even number indicated as p=0 to m−1) of the sub binary tree has a third composite logical gate means for taking the NOR logic between the AND logic of the code Ti,1 and the code Tj,1 and the code Ti,0 and outputting the result as the code ^Tij,1, and a fourth composite logical gate means for taking the NOR logic between the AND logic of the code Ti,1 and the code Tj,0 and the code Ti,0 and outputting the result as the code ^Tij,0; and a higher priority determination node which serves as a node at the depth m−q (q is an odd number indicated as q=0 to m−1) of the sub binary tree has a fifth composite logical gate means for taking the NAND logic between the OR logic of the code ^Ti,1 and the code ^Tj,1 and the code ^Ti,0 and outputting the result as the code Tij,1, and a sixth composite logical gate means for taking the NAND logic between the OR logic of the code ^Ti,1 and the code ^Tj,0 and the code ^Ti,0 and outputting the result as the code Tij,0.

47. An arithmetic and logic unit as set forth in claim 44, wherein:

when the arithmetic and logic unit performs a comparison of two n-bit binary numbers (Xa, Yb) and the comparison decisions for digits of the two numbers (Xai, Ybi; i=0 to n−1) form a series of decisions having an order dependency, each decision node has a NAND logic means for taking the NAND logic of negative logic of the digit value Xai and the digit value Ybi and outputting the result as the code Ti,1 and a NOR logic means for taking the NOR logic of the negative logic of the digit value Xai and the digit value Ybi and outputting the result as the code Ti,0.

48. An arithmetic and logic unit as set forth in claim 44, wherein:

when the decisions of existence of a carry for the digits (Xai, Ybi; i=0 to n−1) of two numbers in the addition of two n-bit binary numbers (Xa, Yb) forms a series of decisions having an order dependency, each decision node has a NAND logic means for taking the NAND logic of the digit value Xai and the digit value Ybi and outputting the result as the code Ti,1 and a NOR logic means for taking the NOR logic of the digit value Xai and the digit value Ybi and outputting the result as the code Ti,0.

49. An arithmetic and logic unit as set forth in claim 25, wherein:

when the result of decision "true" is defined as the value code "Y", "false" is defined as the value code "N", and "neither true nor false or do not know" is defined as the value code "Q", respectively, a higher priority determination node is given as a K operator for deriving one code Tij∈{Y, N, Q} from two codes, that is, a code Ti∈{Y, N, Q} derived from the result of decision of the decision node of the higher significant bit and a code Tj∈{Y, N, Q} derived from the result of decision of the decision node of the lower significant bit; and where the code Ti is superior to the code Tj, when any code X is assigned by a 2-bit binary number (X, 1, X, 0) defining the value code "Y" as {01}, the value code "N" as {10}, and the value code "Q" as {11} and defining {00} as "usage forbidden" (value code "F"), an OR logic is denoted by a "+" operator, an AND logic is denoted by a "^" operator, and a negative logic is denoted by a "^" operator, respectively, a K operator is given as:

$$TiKTj = Tij$$
$$(Ti, 1, Ti, 0)K(Tj, 1, Tj, 0) = (Tij, 1, Tij, 0)$$
$$= (^\!Ti, 0 + Ti, 1, Tj, 1 \cdot {}^\!Ti, 1 + Ti, 0 \cdot Tj, 0);$$

and a higher priority determination node has a seventh composite logical gate means for taking the OR logic between the AND logic of the code Ti,1 and the code Tj,1 and the code ^Ti,0 and outputting the result as the code Tij,1 and an eighth composite logical gate means for taking the OR logic between the AND logic of the code Ti,0 and the code Tj,0 and the code ^Ti1 and outputting the result as the code Tij,0.

50. An arithmetic and logic unit as set forth in claim 25, wherein:

when the result of decision "true" is defined as the value code "Y", "false" is defined as the value code "N", and "neither true nor false or do not know" is defined as the value code "Q", respectively, a higher priority determination node is given as a K operator for deriving one code Tij∈{Y, N, Q} from two codes, that is, a code Ti∈{Y, N, Q} derived from the result of decision of the decision node of the higher significant bit and a code Tj∈{Y, N, Q} derived from the result of decision of the decision node of the lower significant bit; and where the code Ti is superior to the code Tj, when any code X is assigned by a 2-bit binary number (X, 1, X, 0) defining the value code "Y" as {00}, the value code "N" as {10}, and the value code "Q" as {11} and defining {01} as "usage forbidden" (value code "F"), an OR logic is denoted by a "+" operator, an AND logic is denoted by a "·" operator, and a negative logic is denoted by a "^" operator, respectively, the K operator is given as:

$$TiKTj = Tij$$
$$(Ti, 1, Ti, 0)K(Tj, 1, Tj, 0) = (Tij, 1, Tij, 0)$$
$$= (Ti, 1 \cdot (^\!Ti, 0 + Tj, 1), Ti, 0 \cdot Tj, 0);$$

and a higher priority determination node has a ninth composite logical gate means for taking the AND logic between the OR logic of the code ^Ti,0 and the code Tj,1 and the code Ti,1 and outputting the result as the code Tij,1 and an AND logic means for taking the AND logic of the code Ti,0 and the code Tj,0 and outputting the result as the code Tij,0.

51. An arithmetic and logic unit wherein, when decisions of existence of a carry for the digits (Xai, Ybi; i=0 to n−1) of two numbers in the addition of two n-bit binary numbers (Xa, Yb) form a series of decisions having an order dependency, has n number of decision nodes which respectively output "true or false" when the result of the sum of the same digit places becomes 2 or more, "false or true" when the result becomes zero, and "neither true nor false or do not know" when the result becomes 1 as the results of the decisions based on the digit values Xai, Ybi of the two numbers and a higher priority determination node matrix comprising n number of rows and m number of columns (m is the smallest integer exceeding $\log_2 n$) with rows corresponding to the digits of the two numbers;

the group of the higher priority determination nodes of the first column has a higher priority determination node of the zero-th row as a dummy node for propagating the result of decision of the decision node of the zero-th digit as it is and a higher priority determination node of an h1-th row which receives as its input the result of decision of an h1−1-th digit and the decision node of the h1−-th digit (h1=1 to n−1), outputs the result of decision of the decision node of the h1-th digit when the result of decision of the decision node of the h1-th digit is "true" or "false", and outputs the result of decision of the decision node of the h1−1-th digit when the result of decision of the decision node of h1-th digit is "neither true nor false or do not know";

the group of higher priority determination nodes of a k-th column (k=2 to m) has higher priority determination nodes from the zero-th row to a $2^{k-1}$-th row as the dummy nodes for respectively propagating the result of decisions of the higher priority determination nodes from the zero-th row to the $2^{k-1}$-th row as they are and a higher priority determination node of an hk-th row which receives as its input the results of decisions of the higher priority determination node of an hk−$2^{k-1}$-th row and the higher priority determination node of the hk-th row (hk=$2^{k-1}$ to n−1), outputs the result of decision of the higher priority determination node of the hk-th row when the result of decision of the higher priority determination node of the hk-th row is "true" or "false", and outputs the result of decision of the higher priority determination node of the hk−$2^{k-1}$-th row when the result of decision of the higher priority determination node of the hk-th row is "neither true nor false or do not know"; and the n number of decision nodes and the groups of higher priority determination nodes of the columns are respectively simultaneously processed.

52. An arithmetic and logic unit as set forth in claim 51, wherein:

when the result of decision "true" is defined as the value code "Y", "false" is defined as the value code "N", and "neither true nor false or do not know" is defined as the value code "Q", respectively, each higher priority determination node is given as a K operator for deriving one code Tij∈{Y, N, Q} from two codes, that is, the code Ti∈{Y, N, Q} derived from the result of decision of the decision node of the higher significant bit and the code Tj∈{Y, N, Q} derived from the result of decision of the decision node of the lower significant bit; and where the code Ti is superior to the code Tj, a K operator defines the value code "Y" or the value code "N" as the value code taken by the code Tij when the code Ti is the value code "Y" or the value code "N" and defines the value code taken by the code Tj as the value code taken by the code Tij when the code Ti is the value code "Q".

53. An arithmetic and logic unit as set forth in claim 51, wherein:

when the result of decision "true" is defined as the value code "Y", "false" is defined as the value code "N", and "neither true nor false or do not know" is defined as the value code "Q", respectively, each higher priority determination node is given as a K operator for deriving one code $Tij \in \{Y, N, Q\}$ from two codes, that is, the code $Ti \in \{Y, N, Q\}$ derived from the result of decision of the decision node of the higher significant bit and the code $Tj \in \{Y, N, Q\}$ derived from the result of decision of the decision node of the lower significant bit; and where the code Ti is superior to the code Tj, when any code X is assigned by a 2-bit binary number (X, 1, X, 0) defining the value code "Y" as $\{11\}$, the value code "N" as $\{10\}$, and the value code as $\{0*\}$ (here, "*" is "don't care"), an OR logic is denoted by a "+" operator, an AND logic is denoted by a "·" operator, and a negative logic is denoted by a "^" operator, respectively, the K operator is given as:

$$TiKTj = Tij$$

$$(Ti, 1, Ti, 0)K(Tj, 1, Tj, 0) = (Tij, 1, Tij, 0)$$

$$= (Ti, 1 + Tj, 1, Ti, 1 \cdot Ti, 0 +{}^\wedge Ti, 1 \cdot Tj, 0).$$

54. An arithmetic and logic unit as set forth in claim 53, wherein:

the decision nodes from the first digit to the n–1-th digit each has an exclusive NOR logic means for taking the exclusive NOR logic of the digit value Xai and the digit value Ybi and outputting the result as the code Ti,1 and a connecting means for outputting the digit value Xai as the code Ti,0 or a connecting means for outputting the digit value Ybi as the code Ti,0;

the decision node of the zero-th digit has a NOR logic means for taking the NOR logic of the digit value Xa0 and the digit value Yb0, a NAND logic means for taking the NAND logic of the digit value Xa0 and the digit value Yb0, and a selecting means for taking the negative logic of the results obtained by respectively selecting the output of the NOR logic means when the carry input to the arithmetic and logic unit is "1" and selecting the output of the NAND logic means when the carry input is "0" and outputting the result as the code T0,0 and does not output the code T0,1;

among the higher priority determination nodes not including the dummy nodes, each higher priority determination node not derived from the code T0,1 which originally should be output by the decision node of the zero-th digit has a OR logic means for taking the OR logic of the code Ti,1 and the code Tj,1 and outputting the result as the code Tij,1 and a selecting means for respectively selecting the code Ti,0 when the code Ti,1 is "1", selecting the code Tj,0 when the code Ti,1 is "0", and outputting the result as the code Tij,0;

among the higher priority determination nodes not including the dummy nodes, the higher priority determination node derived from the code T0,1 which originally should be output by the decision node of the zero-th digit has a selecting means for respectively selecting the code Ti,0 when the code Ti,1 is "1", selecting the code Tj,0 when the code Ti,1 is "0", and outputting the result as the code Tij,0 and does not output the code Tij,1; and the output code Tij,0 of the higher priority determination nodes from the zero-th row to the n–1-th row of the m-th column is used as the first digit to the n–1-th digit and the carry output of the arithmetic and logic unit and it is interpreted that "there is a carry output" when the output code Tij,0 is "1" and that "there is no carry output" when the output code Tij,0 is "0", respectively.

55. An arithmetic and logic unit as set forth in claim 54, having:

an exclusive OR logic means of the zero-th digit for taking the exclusive OR logic of the digit value Xa0 and the digit value Yb0 and a sum generating means provided with an exclusive OR logic means of the zero-th row for taking the exclusive OR logic of the output of the exclusive OR logic means of the zero-th digit and the carry input to the arithmetic and logic unit and defining this as the result of the sum of the zero-th digits and exclusive OR logic means from the first row to the n–1-th row for taking the exclusive OR logic between each of the negative logics of the output codes Ti,1 of the decision nodes from the first digit to the n–1-th digit and each of the output codes Tij,0 of the higher priority determination nodes from the zero-th row to the n–2-th row of the m-th column and defining this as the result of the sum of the first digit to the n–1-th digit.

56. An arithmetic and logic unit as set forth in claim 53, wherein:

the decision nodes from the first digit to the n–1-th digit each has an exclusive NOR logic means for taking the exclusive NOR logic of the digit value Xai and the digit value Ybi and outputting the result as the code Ti,1 and a connecting means for outputting the digit value Xai as the code Ti,0 or a connecting means for outputting the digit value Ybi as the code Ti,0;

the decision node of the zero-th digit has a NOR logic means for taking the NOR logic of the digit value Xa0 and the digit value Yb0, a NAND logic means for taking the NAND logic of the digit value Xa0 and the digit value Yb0, and a selecting means for taking the negative logic of the results obtained by respectively selecting the output of the NOR logic means when the carry input to the arithmetic and logic unit is "1" and selecting the output of the NAND logic means when the carry input is "0" and outputting the result as the code T0,0 and does not output the code T0,1;

the higher priority determination node of the zero-th row of the first column and the higher priority determination nodes from the zero-th row to the $2^{k-1}$-th row (k=2 to m) of the k-th column are defined as dummy nodes which invert the result of decision of the decision node of the zero-th digit and the results of decisions of the higher priority determination nodes from the zero-th row to the $2^{k-1}$-th row and propagate the same;

among the higher priority determination nodes of the m−p-th column (p is an even number indicated by p=0 to m−1) not including the dummy nodes, each higher priority determination node not derived from the code T0,1 which originally should be output by the decision node of the zero-th digit has a NOR logic means for taking the NOR logic of the code Ti,1 and the code Tj,1 and outputting the result as the code ^Tij,1 and a second selecting means for taking the negative logic of the results obtained by respectively selecting the code Ti,0 when the code Ti,1 is "1" and the code Tj,0 when the code Ti,1 is "0" and outputting the result as the code ^Tij,0;

among the higher priority determination nodes of the m−q-th column (q is an odd number indicated by q=1 to m−1) not including the dummy nodes, each higher priority determination node not derived from the code T0,1 which originally should be output by the decision node of the zero-th digit has a NAND logic means for taking the NAND logic of the code ^Ti,1 and the code ^Tj,1 and outputting the result as the code Tij,1 and a third selecting means for taking the negative logic of the results obtained by respectively selecting the code ^Ti,0 when the code ^Ti,1 is "0" and the code ^Tj,0 when the code ^Ti,1 is "1" and outputting the result as the code Tij,0;

among the higher priority determination nodes of the m−p-th column (p is an even number indicated by p=0 to m−1) not including the dummy nodes, the higher priority determination node derived from the code T0,1 which originally should be output by the decision node of the zero-th digit has a second selecting means for taking the negative logic of the results obtained by respectively selecting the code Ti,0 when the code Ti,1 is "1" and the code Tj,0 when the code Ti,1 is "0" and outputting the result as the code ^Tij,0 and does not output the code Tij,1;

among the higher priority determination nodes of the m−q-th column (q is an odd number indicated by g=1 to m−1) not including the dummy nodes, the higher priority determination node derived from the code T0,1 which originally should be output by the decision node of the zero-th digit has a third selecting means for taking the negative logic of the results obtained by respectively selecting the code ^Ti,0 when the code ^Ti,1 is "0" and the code ^Tj,0 when the code ^Ti,1 is "1" and outputting the result as the code Tij,0 and does not output the code Tij,1;

when m is an even number, the output codes Tij,0 of the higher priority determination nodes from the zero-th row to the n−1-throw of the m-th column are used as the first digit to the n−1-th digit and the carry output of the arithmetic and logic unit and it is respectively interpreted that "there is a carry output" when the output code Tij,0 is "1" and that "there is no carry output" when the output code Tij,0 is "0"; and when m is an odd number, the output codes ^Tij,0 of the higher priority determination nodes from the zero-th row to the n−1-th row of the m-th column are used as the first digit to the n−1-th digit and the carry output of the arithmetic and logic unit and it is respectively interpreted that "there is a carry output" when the output code ^Tij,0 is "0" and that "there is no carry output" when the output code ^Tij,0 is "1".

57. An arithmetic and logic unit as set forth in claim 56, having an exclusive OR logic means of the zero-th digit for taking the exclusive OR logic of the digit value Xa0 and the digit value Yb0 and, when m is an even number, a sum generating means provided with an exclusive OR logic means of the zero-th row for taking the exclusive OR logic of the output of the exclusive OR logic means of the zero-th digit and the carry input to the arithmetic and logic unit and defining this as the result of the sum of the zero-th digits and exclusive OR logic means from the first row to the n−1-th row for taking the exclusive OR logic between each of the negative logics of the output codes Ti,1 of the decision nodes from the first digit to the n−1-th digit and each of the output codes Tij,0 of the higher priority determination nodes from the zero-th row to the n−2-th row of the m-th column and defining this as the result of the sum of the first digit to the n−1-th digit, and, when m is an odd number, a sum generating means provided with an exclusive OR logic means of the zero-th row for taking the exclusive OR logic of the output of the exclusive OR logic means of zero-th digit and the carry input to the arithmetic and logic unit and defining this as the result of sum of the zero-th digits and exclusive OR logic means from the first row to the n−1-th row for taking the exclusive OR logic between each of the negative logics of the output codes Ti,1 of the decision nodes from the first digit to the n−1-th digit and each of negative logics of the output codes ^Tij,0 of the higher priority determination nodes from the zero-th row to the n−2-th row of the m-th column and defining this as the result of the sum of the first digit to the n−1-th digit.

58. An arithmetic and logic unit wherein, when the decisions of existence of a carry for the digits (Xai, Ybi; i=0 to n−1) of two numbers in the addition of two n-bit binary numbers (Xa, Yb) form a series of decisions having an order dependency, it has n number of decision nodes which respectively output "true or false" when the result of the sum of the same digit places becomes 2 or more, "false or true" when the result becomes zero, and "neither true nor false or do not know" when the result becomes 1 as the result of a decision based on the digit values Xai, Ybi of the two numbers and a higher priority determination node matrix consisting of n/2 number of rows and m number of columns (m is the smallest integer exceeding $\log_2 n$) with rows corresponding to the odd number digits of the two numbers;

the group of higher priority determination nodes of the first column has a higher priority determination node of the h1-th row which receives as its input the results of the decisions of the h1−1-th digit and the decision node of h1-th digit (h1=odd number from 1 to n−1), outputs the result of decision of the decision node h1-th digit when the result of the decision of the decision node of the h1-th digit is "true" or "false", and outputs the result of the decision of the decision node of h1–1-th digit when the result of decision of the decision node of the h1-th digit is "neither true nor false or do not know";

the group of higher priority determination nodes of the k-th column (k=2 to m) has higher priority determination nodes from the first to $2^{k-1}$-th odd number rows as the dummy nodes for respectively propagating the results of decisions of the higher priority determination nodes from the first to $2^{k-1}-1$-th odd number rows as they are and a higher priority determination node of the hk-th row which receives as its input the result of decision of the higher priority determination node of the hk–$2^{k-1}$-th row and the higher priority determination node of the hk-th row (hk=odd number from $2^{k-1}$ to n–1), outputs the result of decision of the higher priority determination node of the hk-th row when the result of decision of the higher priority determination node of the hk-th row is "true" or "false", and outputs the result of decision of the higher priority determination node of the hk–$2^{k-1}$-th row when the result of decision of the higher priority determination node of the hk-th row is "neither true nor false or do not know"; and the n number of decision nodes and the groups of the higher priority determination nodes of the columns are respectively simultaneously processed.

59. An arithmetic and logic unit as set forth in claim 58, wherein:

when the result of decision "true" is defined as the value code "Y", "false" is defined as the value code "N", and "neither true nor false or do not know" is defined as the value code "Q", respectively, each higher priority determination node is given as a K operator for deriving one code Tij∈{Y, N, Q} from two codes, that is, the code Ti∈{Y, N, Q} derived from the result of decision of the decision node of the higher significant bit and the code Tj∈{Y, N, Q} derived from the result of decision of the decision node of the lower significant bit; and where the code Ti is superior to the code Tj, the K operator defines the value code "Y" or the value code "N" as the value code taken by the code Tij when the code Ti is the value code "Y" or the value code "N" and defines the value code taken by the code Tj as the value code taken by the code Tij when the code Ti is the value code "Q".

60. An arithmetic and logic unit as set forth in claim 58, wherein:

when the result of decision "true" is defined as the value code "Y", "false" is defined as the value code "N", and "neither true nor false or do not know" is defined as the value code "Q", respectively, each higher priority determination node is given as a K operator for deriving one code Tij∈{Y, N, Q} from two codes, that is, the code Ti∈{Y, N, Q} derived from the result of decision of the decision node of the higher significant bit and the code Tj∈{Y, N, Q} derived from the result of decision of the decision node of the lower significant bit; and where the code Ti is superior to the code Tj, when any code X is assigned by a 2-bit binary number (X,1, X,0) defining the value code "Y" as {11}, the value code "N" as {10}, and the value code "Q" as {0*} (here, "*" is "don't care"), an OR logic is denoted by a "+" operator, an AND logic is denoted by a "·" operator, and a negative logic is denoted by "^" operator, respectively, the K operator is given as:

$$TiKTj = Tij$$

$$(Ti, 1, Ti, 0)K(Tj, 1, Tj, 0) = (Tij, 1, Tij, 0)$$

$$= (Ti, 1 + Tj, 1, Ti, 1 \cdot Ti, 0 +^{\wedge} Ti, 1 \cdot Tj, 0).$$

61. An arithmetic and logic unit as set forth in claim 60, wherein:

the decision nodes from the first digit to the n–1-th digit each has an exclusive NOR logic means for taking the exclusive NOR logic of the digit value Xai and the digit value Ybi and outputting the result as the code Ti,1 and a connecting means for outputting the digit value Xai as the code Ti,0 or a connecting means for outputting the digit value Ybi as the code Ti,0;

the decision node of the zero-th digit has a NOR logic means for taking the NOR logic of the digit value Xa0 and the digit value Yb0, a NAND logic means for taking the NAND logic of the digit value Xa0 and the digit value Yb0, and a selecting means for taking the negative logic of the results obtained by respectively selecting the output of the NOR logic means when the carry input to the arithmetic and logic unit is "1" and selecting the output of the NAND logic means when the carry input is "0" and outputting the result as the code T0,0 and does not output the code T0,1;

among the higher priority determination nodes not including the dummy nodes, each higher priority determination node not derived from the code T0,1 which originally should be output by the decision node of the zero-th digit has an OR logic means for taking the OR logic of the code Ti,1 and the code Tj,1 and outputting the result as the code Tij,1 and a selecting means for respectively selecting the code Ti,0 when the code Ti,1 is "1", selecting the code Tj,0 when the code Ti,1 is "0", and outputting the result as the code Tij,0;

among the higher priority determination nodes not including the dummy node, the higher priority determination node derived from the code T0,1 which originally should be output by the decision node of the zero-th digit has a selecting means for respectively selecting the code Ti,0 when the code Ti,1 is "1", selecting the code Tj,0 when the code Ti,1 is "0", and outputting the result as the code Tij,0 and does not output the code Tij,1;

the output code Tij,0 of the higher priority determination node of the n–1-th row of the m-th column is used as the carry output of the arithmetic and logic unit and it is interpreted that "there is a carry output" when the output code Tij,0 is "1" and that "there is no carry output" when the output code Tij,0 is "0", respectively;

the arithmetic and logic unit has an exclusive OR logic means of the zero-th digit for taking the exclusive OR logic of the digit value Xa0 and the digit value Yb0 and the sum generating means; and the sum generating means has an exclusive OR logic means of the zero-th row for taking the exclusive OR logic of the output of the exclusive OR logic means of zero-th digit and the carry input to the arithmetic and logic unit and defining this as the result of the sum of the zero-th digits, an exclusive OR logic means of the first row or taking the exclusive OR logic between the output code T0,0 of the decision node of the zero-th digit and the negative logic of the output code T1,1 of the decision node of the first digit and defining this as the result of the sum of the first digits, a carry generating means of the f-th row for respectively selecting the input digit value Xaf or Ybf to the row when the output code Tf,1 of the decision node of the f-th digit (f=even number from 2 to n−1) is "1", selecting the output code of the higher priority determination node of the f−1-th row when the output code Tf,1 is "0", and outputting the result as the carry to the f+1-th digit, an exclusive OR logic means of the f-th row for taking the exclusive OR logic between the negative logic of the output code Tf,1 of the decision node of the f-th digit and the output code of the higher priority determination node of the f−1-th row and defining this as the result of the sum of the f-th digits, and an exclusive OR logic means of the f+1-th row for taking the exclusive OR logic between the negative logic of the output code Tf+1,1 of the decision node of the f+1-th digit and the output of the carry generating means of the f-th row and defining this as the result of the sum of the f+1-th digits.

62. An arithmetic and logic unit as set forth in claim 60, wherein:

the decision nodes from the first digit to the n−1-th digit each has an exclusive NOR logic means for taking the exclusive NOR logic of the digit value Xai and the digit value Ybi and outputting the result as the code Ti,1, and a connecting means for outputting the digit value Xai as the code Ti,0 or a connecting means for outputting the digit value Ybi as the code Ti,0;

the decision node of the zero-th digit has a NOR logic means for taking the NOR logic of the digit value Xa0 and the digit value Yb0, a NAND logic means for taking the NAND logic of the digit value Xa0 and the digit value Yb0, and a selecting means for taking the negative logic of the results obtained by respectively selecting the output of the NOR logic means when the carry input to the arithmetic and logic unit is "1" and selecting the output of the NAND logic means when the carry input is "0" and outputting the result as the code T0,0 and does not output the code T0,1;

the higher priority determination nodes of the first to $2^{k-1}-1$-th (k=2 to m) odd number rows of the k-th column are defined as dummy nodes which respectively invert the results of decisions of the higher priority determination nodes of the first to $2^{k-1}-1$-th odd number rows and propagate the same;

among the higher priority determination nodes of the m−p-th column (p is an even number indicated by p=0 to m−1) not including the dummy nodes, each higher priority determination node not derived from the code T0,1 which originally should be output by the decision node of the zero-th digit has a NOR logic means for taking the NOR logic of the code Ti,1 and the code Tj,1 and outputting the result as the code ~Tij,1 and a selecting means for taking the negative logic of the result obtained by respectively selecting the code Ti,0 when the code Ti,1 is "1" and the code Tj,0 when the code Ti,1 is "0" and outputting the result as the code ~Tij,0;

among the higher priority determination nodes of the m−q-th column (q is an odd number indicated by q=1 to m−1) not including the dummy nodes, each higher priority determination node not derived from the code T0,1 which originally should be output by the decision node of the zero-th digit has a NAND logic means for taking the NAND logic of the code ~Ti,1 and the code ~Tj,1 and outputting the result as the code Tij,1 and a third selecting means for taking the negative logic of the results obtained by respectively selecting the code ~Ti,0 when the code ~Ti,1 is "0" and the code ~Tj,0 when the code ~Ti,1 is "1" and outputting the result as the code Tij,0;

among the higher priority determination nodes of the m−p-th column (p is an even number indicated by p=0 to m−1) not including the dummy nodes, the higher priority determination node derived from the code T0,1 which originally should be output by the decision node of the zero-th digit has a second selecting means for taking the negative logic of the results obtained by respectively selecting the code Ti,0 when the code Ti,1 is "1" and the code Tj,0 when the code Ti,1 is "0" and outputting the result as the code ~Tij,0 and does not output the code Tij,1;

among the higher priority determination nodes of the m−q-th column (q is an odd number indicated by q=1 to m−1) not including the dummy nodes, the higher priority determination node derived from the code T0,1 which originally should be output by the decision node of the zero-th digit has a third selecting means for taking the negative logic of the results obtained by respectively selecting the code ~Ti,0 when the code ~Ti,1 is "0" and the code ~Tj,0 when the code ~Ti,1 is "1" and outputting the result as the code Tij,0 and does not output the code Tij,1;

when m is an even number, the output code Tij,0 of the higher priority determination node of the n−1-th row of the m-th column is used as the carry output of the arithmetic and logic unit and it is respectively interpreted that "there is a carry output" when the output code Tij,0 is "1" and that "there is no carry output" when the output code Tij,0 is "0"; and when m is an odd number, the output code Tij,0 obtained by taking the negative logic of the output code ~Tij,0 of the higher priority determination node of the n−1-th row of the m-th column is used as the carry output of the arithmetic and logic unit and it is respectively interpreted that "there is a carry output" when the output code Tij,0 is "1" and that "there is no carry output" when the output code Tij,0 is "0";

the arithmetic and logic unit has an exclusive OR logic means of the zero-th digit for taking the exclusive OR logic of the digit value Xa0 and the digit value Yb0 and the sum generating means;

the sum generating means has, when m is an even number, the exclusive OR logic means of the zero-th row for taking the exclusive OR logic of the output of the exclusive OR logic means of the zero-th digit and the carry input to the arithmetic and logic unit and defining this as the result of the sum of the zero-th digits, the exclusive OR logic means of the first row for taking the exclusive OR logic between the output code T0,0 of the decision node of the zero-th digit and the negative logic of the output code T1,1 of the decision node of the first digit and defining this as the result of the sum of the first digits, the carry generating means of the f-th row for respectively selecting the input digit value Xaf or Ybf to the row when the output code Tf, 1 of the decision node of the f-th digit (f=even number from 2 to n−1) is "1", selecting the output code of the higher priority determination node of the f−1-th row when the output code Tf,1 is "0", and outputting the result as a carry to the f+1-th digit, the exclusive OR logic means of the f-th row for taking the exclusive OR logic between the negative logic of the output code Tf,1 of the decision node of the f-th digit and the output code of the higher priority determination node of the f−1-th row and defining this as the result of the sum of the f-th digits, and the exclusive OR logic means of the f+1-th row for taking the exclusive OR logic between the negative logic of the output code Tf+1,1 of the decision node of the f+1-th digit and the output of the carry generating means of the f-th row and defining this as the result of the sum of the f+1-th digits, while, when m is an odd number, an exclusive OR logic means of the zero-th row for taking the exclusive OR logic of the output of the exclusive OR logic means of zero-th digit and the carry input to the arithmetic and logic unit and defining this as the result of the sum of the zero-th digits, an exclusive OR logic means of the first row for taking the exclusive OR logic between the output code T0,0 of the decision node of the zero-th digit and the negative logic of the output code T1,1 of the decision node of the first digit and defining this as the result of the sum of the first digits, a carry generating means of the f-th row for respectively selecting the input digit value Xaf or Ybf to the row when the output code Tf,1 of the decision node of the f-th digit (f=even number from 2 to n−1) is "1" selecting the negative logic of the output code of the higher priority determination node of the f−1-th row when the output code Tf,1 is "0", and outputting the result as the carry to the f+1-th digit, an exclusive OR logic means of the f-th row for taking the exclusive OR logic between the negative logic of the output code Tf,1 of the decision node of the f-th digit and the negative logic of the output code of the higher priority determination node of the f−1-th row and defining this as the result of the sum of the f-th digits, and an exclusive OR logic means of the f+1-th row for taking the exclusive OR logic between the negative logic of the output code Tf+1,1 of the decision node of the f+1-th digit and the output of the carry generating means of the f-th row and defining this as the result of the sum of the f+1-th digits.

63. An arithmetic and logic unit as set forth in claim 60, wherein:

the decision nodes from the first digit to the n−1-th digit each has an exclusive NOR logic means for taking the exclusive NOR logic of the digit value Xai and the digit value Ybi and outputting the result as the code Ti,1 and a connecting means for outputting the digit value Xai as the code Ti,0 or a connecting means for outputting the digit value Ybi as the code Ti,0;

the decision node of the zero-th digit has a NOR logic means for taking the NOR logic of the digit value Xa0 and the digit value Yb0, a NAND logic means for taking the NAND logic of the digit value Xa0 and the digit value Yb0, and a selecting means for taking the negative logic of the results obtained by respectively selecting the output of the NOR logic means when the carry input to the arithmetic and logic unit is "1" and selecting the output of the NAND logic means when the carry input is "0" and outputting the result as the code T0,0 and does not output the code T0,1;

among the higher priority determination nodes not including the dummy node, each higher priority determination node not derived from the code T0,1 which originally should be output by the decision node of the zero-th digit has an OR logic means for taking the OR logic of the code Ti,1 and the code Tj,1 and outputting the result as the code Tij,1 and a selecting means for respectively selecting the code Ti,0 when the code Ti,1 is "1" and the code Tj,0 when the code Ti,1 is "0" and outputting the result as the code Tij,0;

among the higher priority determination nodes not including the dummy node, the higher priority determination node derived from the code T0,1 which originally should be output by the decision node of the zero-th digit has a selecting means for respectively selecting the code Ti,0 when the code Ti,1 is "1" and the code Tj,0 when the code Ti,1 is "0" and outputting the result as the code Tij,0 and does not output the code Tij,1;

an output code Tij,0 of the higher priority determination node of the n−1-th row of the m-th column is used as the carry output of the arithmetic and logic unit and it is respectively interpreted that "there is a carry output" when the output code Tij,0 is "1" and that "there is no carry output" when the output code Tij,0 is "0";

the arithmetic and logic unit has an exclusive OR logic means of the zero-th digit for taking the exclusive OR logic of the digit value Xa0 and the digit value Yb0 and a sum generating means; and the sum generating means has an exclusive OR logic means of the zero-th row for taking the exclusive OR logic of the output of the exclusive OR logic means of zero-th digit and the carry input to the arithmetic and logic unit and defining this as the result of sum of the zero-th digits, an exclusive OR logic means of the first row for taking the exclusive OR logic between the output code T0,0 of the decision node of the zero-th digit and the negative logic of the output code T1,1 of the decision node of the first digit and defining this as the result of the sum of the first digits, a carry generating means of the f-th row for taking the negative logic of the results obtained by respectively selecting the input digit value Xaf or Ybf to the row when the output code Tf,1 of the decision node of the f-th digit (f=even number from 2 to n−1) is "1" and selecting the output code of the higher priority determination node of the f−1-th row when the output code Tf,1 is "0" and outputting the result as a carry to the f+1-th digit, an exclusive NOR logic means of the f-th row for taking the exclusive NOR logic between the output code Tf,1 of the decision node of the f-th digit and the output code of the higher priority determination node of the f−1-th row and defining this as the result of sum of f-th digits, and an exclusive OR logic means of the f+1-th row for taking the exclusive OR logic between the output code Tf+1,1 of the decision node of the f+1-th digit and the output of the carry generating means of the f-th row and defining this as the result of the sum of the f+1-th digits.

64. An arithmetic and logic unit as set forth in claim 60, wherein:

the decision nodes from the first digit to the n−1- digit each has an exclusive NOR logic means for taking the exclusive NOR logic of the digit value Xai and the digit value Ybi and outputting the result as the code Ti,1 and a connecting means for outputting the digit value Xai as the code Ti,0 or a connecting means for outputting the digit value Ybi as the code Ti,0;

the decision node of the zero-th digit has a NOR logic means for taking the NOR logic of the digit value Xa0 and the digit value Yb0, a NAND logic means for taking the NAND logic of the digit value Xa0 and the digit value Yb0, and a selecting means for taking the negative logic of the results obtained by respectively selecting the output of the NOR logic means when the carry input to the arithmetic and logic unit is "1" and selecting the output of the NAND logic means when the carry input is "0" and outputting the result as the code T0,0 and does not output the code T0,1;

among the higher priority determination nodes not including the dummy node, each higher priority determination node not derived from the code T0,1 which originally should be output by the decision node of the zero-th digit has an OR logic means for taking the OR logic of the code Ti,1 and the code Tj,1 and outputting the result as the code Tij,1 and a selecting means for respectively selecting the code Ti,0 when the code Ti,1 is "1" and the code Tj,0 when the code Ti,1 is "0" and outputting the result as the code Tij,0;

among the higher priority determination nodes not including the dummy node, the higher priority determination node derived from the code T0,1 which originally should be output by the decision node of the zero-th digit has a selecting means for respectively selecting the code Ti,0 when the code Ti,1 is "1" and the code Tj,0 when the code Ti,1 is "0" and outputting the result as the code Tij,0 and does not output the code Tij,1;

the output code Tij,0 of the higher priority determination node of the n−1-th row of the m-th column is used as the carry output of the arithmetic and logic unit and it is respectively interpreted that "there is a carry output" when the output code Tij,0 is "1" and that "there is no carry output" when the output code Tij,0 is "0";

the arithmetic and logic unit has an exclusive OR logic means of the zero-th digit for taking the exclusive OR logic of the digit value Xa0 and the digit value Yb0 and a sum generating means; and the sum generating means has an exclusive OR logic means of the zero-th row for taking the exclusive OR logic of the output of the exclusive OR logic means of zero-th digit and the carry input to the arithmetic and logic unit and defining this as the result of sum of the zero-th digits, an exclusive OR logic means of the first row for taking the exclusive OR logic between the output code T0,0 of the decision node of the zero-th digit and the negative logic of the output code T1,1 of the decision node of the first digit and defining this as the result of the sum of the first digits, a NAND logic means for taking the NAND logic between the output code Tf,1 of the decision node of the f-th digit (f=even number from 2 to n−1) and the input digit value Xaf or Ybf to the row, an exclusive OR logic means for taking the exclusive OR logic of the output code Tf+1,1 of the decision node of the f+1-th digit and the output of the NAND logic means and outputting the zero-th selected signal of the f+1-th row, an exclusive NOR logic means of the f-th row for taking the exclusive NOR logic between the output code Tf,1 of the decision node of the f-th digit and the zero-th selected signal of the f+1-th row and outputting the first selected signal of the f+1-th row, an exclusive NOR logic means for taking the exclusive NOR logic between the output code Tf,1 of the decision node of the f-th digit and the output code of the higher priority determination node of the f−1-th row and defining this as the result of the sum of the f-th digits, and a sum generation selecting means of the f+1-th row for taking the negative logic of the results obtained by respectively selecting the first selected signal of the f+1-th row when the output code of the higher priority determination node of the f−1-th row is "1" and selecting the zero-th selected signal of the f+1-th row when the output code is "0" and defining the result as the result of the sum of the f+1-th digits.

65. An arithmetic and logic unit as set forth in claim 66, wherein:

when the decisions of existence of a borrow for digits (Xai, Ybi; i=0 to n−1) of two numbers in the subtraction (Xa−Yb) of two n-bit binary numbers form a series of decisions having an order dependency, each decision node has an exclusive OR logic means for taking the exclusive OR logic of the digit value Xai and the digit value Ybi and outputting the result as the code Ti,1 and a connecting means for outputting the digit value Ybi as the code Ti,0.

66. An arithmetic and logic unit as set forth in claim 65, wherein:

the decision node performing a decision of the existence of a borrow for the LSBs (least significant bits) of the two numbers has a NOR logic means for taking the NOR logic of ^Xa0 of the negative logic of the digit value Xa0 and the digit value Yb0, a NAND logic means for taking the NAND logic of ^Xa0 of the negative logic of the digit value Xa0 and the digit value Yb0, and a selecting means for taking the negative logic of the results obtained by respectively selecting the output of the NOR logic means when the borrow input to the arithmetic and logic unit is "1" and selecting the output of the NAND logic means when the borrow input is "0" and outputting the result as the code T0,0; and does not output the code T0,1.

67. An arithmetic and logic unit as set forth in claim 66, wherein:

each higher priority determination node not derived from the code T0,1 which originally should be output by the decision node performing the decision of existence of a borrow for the LSBs of the two numbers among the higher priority determination nodes has an OR logic means for taking the OR logic of the code Ti,1 and the code Tj,1 and outputting the result as the code Tij,1 and a selecting means for selecting the code Ti,0 when the code Ti,1 is "1", selecting the code Tj,0 when the code Ti,1 is "0", respectively, and outputting the result as the code Tij,0;

the higher priority determination node derived from the code T0,1 which originally should be output by the decision node performing the decision of existence of the borrow for the LSBs of the two numbers among the higher priority determination nodes has a selecting means for selecting the code Ti,0 when the code Ti,1 is "1", selecting the code Tj,0 when the code Ti,1 is "0", respectively, and outputting the result as the code Tij,0 and does not output the code Tij,1; and it is respectively interpreted that "there is a borrow output" when the output code Tij,0 of the higher priority determination node which serves as the root of the binary tree is "1" and that "there is no borrow output" when the output code Tij,0 is "0".

68. An arithmetic and logic unit as set forth in claim 66, wherein:

when the sub binary tree of the height m (m is the smallest integer exceeding $\log_2 n$) not including the leaves of the binary tree has Nm (Nm is the smallest integer exceeding n/2) number of higher priority determination nodes which serve as the nodes of a depth m and Ns (Ns is the smallest integer exceeding Ns+½) number of higher priority determination nodes which serve as the nodes of a depth s (s is an integer represented as s=1 to m−1), each higher priority determination node not derived from the code T0,1 which originally should be output by the decision node performing the decision of existence of the borrow for the LSBs of the two numbers among the higher priority determination nodes which serve as the nodes at the depth m−p (p is an even number indicated as p=0 to m−1) of the sub binary tree has a NOR logic means for taking the NOR logic of the code Ti,1 and the code Tj,1 and outputting the result as a code ^Tij,1 and a second selecting means for taking the negative logic of the results obtained by respectively selecting the code Ti,0 when the code Ti,1 is "1" and the code Tj,0 when the code Ti,1 is "0" and outputting the result as the code ^Tij,0;

each higher priority determination node not derived from the code T0,1 which originally should be output by the decision node performing the decision of existence of a borrow for the LSBs of the two numbers among the higher priority determination nodes which serve as the nodes at the depth m−q (q is an odd number indicated as q=0 to m−1) of the sub binary tree has a NAND logic means for taking the NAND logic of the code ^Ti,1 and the code ^Tj,1 and outputting the result as a code Tij,1 and a third selecting means for taking the negative logic of the results obtained by respectively selecting the code ^Ti,0 when the code ^Ti,1 is "0" and the code ^Tj,0 when the code ^Ti,1 is "1" and outputting the result as the code Tij,0;

the higher priority determination node derived from the code T0,1 which originally should be output by the decision node performing the decision of existence of a borrow for the LSBs of the two numbers among the higher priority determination nodes which serve as the nodes at the depth m−p (p is an even number indicated as p=0 to m−1) of the sub binary tree has a second selecting means for taking the negative logic of the results obtained by respectively selecting the code Ti,0 when the code Ti,1 is "1" and the code Tj,0 when the code Ti,1 is "0" and outputting the result as the code ^Tij,0 and does not output the code Tij,1;

the higher priority determination node derived from the code T0,1 which originally should be output by the decision node performing the decision of existence of a borrow for the LSBs of the two numbers among the higher priority determination nodes which serve as the nodes at the depth m−q (q is an odd number indicated as q=0 to m−1) of the sub binary tree has a third selecting means for taking the negative logic of the results obtained by respectively selecting the code ^Ti,0 when the code ^Ti,1 is "0" and the code ^Tj,0 when the code ^Ti,1 is "1" and outputting the result as the code Tij,0 and does not output the code Tij,1;

when m is an even number, it is respectively interpreted that "there is a borrow output" when the output code Tij,0 of the higher priority determination node which serves as the root of the binary tree is "1" and that "there is no borrow output" when the output code Tij,0 is "0"; and when m is an odd number, it is respectively interpreted that "there is a borrow output" when the output code ^Tij,0 of the higher priority determination node which serves as the root of the binary tree is "0" and that "there is no borrow output" when the output code ^Tij,0 is "1".

69. An arithmetic and logic unit, wherein, when the decisions of existence of a borrow for the digits (Xai, Ybi; i=0 to n−1) in the subtraction (Xa−Yb) of two n-bit binary numbers form a series of decisions having an order dependency, it has n number of decision nodes which respectively output "true or false" when the result of the difference of two numbers of the same digit places becomes negative, "false or true" when the result becomes positive, and "neither true nor false or do not know" when the result becomes zero as a result of the decision based on the digit values Xai, Ybi of the two numbers and a higher priority determination node matrix consisting of n number of rows and m number of columns (m is the smallest integer exceeding $\log_2 n$) with rows corresponding to the digits of the two numbers;

the group of higher priority determination nodes of the first column has a higher priority determination node of the zero-th row as a dummy node for propagating the result of decision of the decision node of the zero-th digit as it is and a higher priority determination node of the h1-th row which receives as its input the results of decisions of the h1−1-th digit and the decision node of h1-th digit (h1=1 to n−1), outputs the result of decision of the decision node of the h1-th digit as the result when the result of decision of the decision node of the h1-th digit is "true" or "false", and outputs the result of decision of the decision node of h1−1-th digit as the result when the result of decision of the decision node of h1-th digit is "neither true nor false or do not know";

the group of higher priority determination nodes of the k-th column (k=2 to m) has higher priority determination nodes from the zero-th row to the $2^{k-1}$-th row as the dummy nodes for respectively propagating the result of decisions of the higher priority determination nodes from the zero-th row to the $2^{k-1}$-th row as they are and a higher priority determination node of the hk-th row which receives as its input the results of decisions of the higher priority determination node of the hk−$2^{k-1}$-th row and the higher priority determination node of the hk-th row (hk=$2^{k-1}$ to n−1), outputs the result of the decision of the higher priority determination node of the hk-th row as the result when the result of the decision of the higher priority determination node of the hk-th row is "true" or "false", and outputs the result of the decision of the higher priority determination node of the hk−$2^{k-1}$-th row as the result when the result of the decision of the higher priority determination node of the hk-th row is "neither true nor false or do not know"; and the n number of decision nodes and the groups of the higher significant priority determination nodes of the columns are respectively simultaneously processed.

70. A method of operation of an arithmetic and logic unit as set forth in claim 69, wherein:

when the result of decision "true" is defined as the value code "Y", "false" is defined as the value code "N", and "neither true nor false or do not know" is defined as the value code "Q", respectively, each higher priority determination node is given as a K operator for deriving one code $Tij\epsilon\{Y, N, Q\}$ from two codes, that is, the code $Ti\epsilon\{Y, N, Q\}$ derived from the result of decision of the decision node of the higher significant bit and the code $Tj\epsilon\{Y, N, Q\}$ derived from the result of decision of the decision node of the lower significant bit; and where the code Ti is superior to the code Tj, a K operator defines the value code "Y" or the value code "N" as the value code taken by the code Tij when the code Ti is the value code "Y" or the value code "N" and defines the value code taken by the code Tj as the value code taken by the code Tij when the code Ti is the value code "Q".

71. A method of operation of an arithmetic and logic unit as set forth in claim 69, wherein:

when the result of decision "true" is defined as the value code "Y", "false" is defined as the value code "N", and "neither true nor false or do not know" is defined as the value code "Q", respectively, each higher priority determination node is given as a K operator for deriving one code $Tij\epsilon\{Y, N, Q\}$ from two codes, that is, the code $Ti\epsilon\{Y, N, Q\}$ derived from the result of decision of the decision node of the higher significant bit and the code $Tj\epsilon\{Y, N, Q\}$ derived from the result of decision of the decision node of the lower significant bit; and where the code Ti is superior to the code Tj, when any code X is assigned by a 2-bit binary number (X, 1, X, 0) defining the value code "Y" as $\{11\}$, the value code "N" as $\{10\}$, and the value code as $\{0^*\}$ (here, "*" is "don't care"), an OR logic is denoted by a "+" operator, an AND logic is denoted by a "·" operator, and a negative logic is denoted by a "^" operator, respectively, the K operator is given as:

$$TiKTj = Tij$$
$$(Ti, 1, Ti, 0)K(Tj, 1, Tj, 0) = (Tij, 1, Tij, 0)$$
$$= (Ti, 1 + Tj, 1, Ti, 1 \cdot Ti, 0 +{}^{\wedge} Ti, 1 \cdot Tj, 0).$$

72. An arithmetic and logic unit as set forth in claim 71, wherein:

the decision nodes from the first digit to the n−1-th digit each has an exclusive OR logic means for taking the exclusive OR logic of the digit value Xai and the digit value Ybi and outputting the result as the code Ti,1 and a connecting means for outputting the digit value Ybi as the code Ti,0;

the decision node of the zero-th digit has a NOR logic means for taking the NOR logic of ^Xa0 of the negative logic of the digit value Xa0 and the digit value Yb0, a NAND logic means for taking the NAND logic of ^Xa0 of the negative logic of the digit value Xa0 and the digit value Yb0, and a selecting means for taking the negative logic of the results obtained by respectively selecting the output of the NOR logic means when the borrow input to the arithmetic and logic unit is "1" and selecting the output of the NAND logic means when the borrow input is "0" and outputting the result as the code T0,0 and does not output the code T0,1, among the higher priority determination nodes not including the dummy node, each higher priority determination node not derived from the code T0,1 which originally should be output by the decision node of the zero-th digit has an OR logic means for taking the OR logic of the code Ti,1 and the code Tj,1 and outputting the result as the code Tij,1 and a selecting means for respectively selecting the code Ti,0 when the code Ti,1 is "1", selecting the code Tj,0 when the code Ti,1 is "0", and outputting the result as the code Tij,0;

among the higher priority determination nodes not including the dummy nodes, the higher priority determination node derived from the code T0,1 which originally should be output by the decision node of the zero-th digit has a selecting means for respectively selecting the code Ti,0 when the code Ti,1 is "1", selecting the code Tj,0 when the code Ti,1 is "0", and outputting the result as the code Tij,0 and does not output the code Tij,1; and an output code Tij,0 of the higher priority determination nodes from the zero-th row to the n−1-th row of the m-th column is used as the first digit to the n−1-th digit and the borrow output of the arithmetic and logic unit and it is interpreted that "there is a borrow output" when the output code Tij,0 is "1" and that "there is no borrow output" when the output code Tij,0 is "0", respectively.

73. An arithmetic and logic unit as set forth in claim 72, having an exclusive OR logic means of the zero-th digit for taking the exclusive OR logic of the digit value Xa0 and the digit value Yb0 and a sum generating means provided with an exclusive OR logic means of the zero-th row for taking the exclusive OR logic of the output of the exclusive OR logic means of zero-th digit and the borrow input to the arithmetic and logic unit and defining this as the result of difference of the zero-th digits and exclusive OR logic means from the first row to the n−1-th row for taking the exclusive OR logic between each of the output codes Ti,1 of the decision nodes from the first digit to the n−1-th digit and each of the output codes Tij,0 of the higher priority determination nodes from the zero-th row to the n−2-th row of the m-th column and defining this as the result of difference of the first digit to the n−1-th digit.

74. An arithmetic and logic unit as set forth in claim 71, wherein:

the decision nodes from the first digit to the n−1-th digit each has an exclusive OR logic means for taking the exclusive OR logic of the digit value Xai and the digit value Ybi and outputting the result as the code Ti,1 and a connecting means for outputting the digit value Ybi as the code Ti,0;

the decision node of the zero-th digit has a NOR logic means for taking the NOR logic of ^Xa0 as the negative logic of the digit value Xa0 and the digit value Yb0, a NAND logic means for taking the NAND logic of ^Xa0 as the negative logic of the digit value Xa0 and the digit value Yb0, and a selecting means for taking the negative logic of the results obtained by respectively selecting the output of the NOR logic means when the borrow input to the arithmetic and logic unit is "1" and selecting the output of the NAND logic means when the borrow input is "0" and outputting the result as the code T0,0 and does not output the code T0,1;

the higher priority determination node of the zero-th row of the first column and the higher priority determination nodes from the zero-th row to the $2^{k-1}$-th row (k=2 to m) of the k-th column are defined as dummy nodes which invert the result of decision of the decision node of the zero-th digit and the results of decisions of the higher priority determination nodes from the zero-th row to the $2^{k-1}$-th row and propagate the same;

among the higher priority determination nodes of the m−p-th column (p is an even number indicated by p=0 to m−1) not including the dummy nodes, each higher priority determination node not derived from the code T0,1 which originally should be output by the decision node of the zero-th digit has a NOR logic means for taking the NOR logic of the code Ti,1 and the code Tj,1 and outputting the result as the code ^Tij,1, and a second selecting means for taking the negative logic of the results obtained by respectively selecting the code Ti,0 when the code Ti,1 is "1" and the code Tj,0 when the code Ti,1 is "0" and outputting the result as the code ^Tij,0;

among the higher priority determination nodes of the m−q-th column (q is an odd number indicated by q=1 to m−1) not including the dummy nodes, each higher priority determination node not derived from the code T0,1 which originally should be output by the decision node of the zero-th digit has a NAND logic means for taking the NAND logic of the code ^Ti,1 and the code ^Tj,1 and outputting the result as the code Tij,1 and a third selecting means for taking the negative logic of the results obtained by respectively selecting the code ^Ti,0 when the code ^Ti,1 is "0" and the code ^Tj,0 when the code ^Ti,1 is "1" and outputting the result as the code Tij,0;

among the higher priority determination nodes of the m−p-th column (p is an even number indicated by p=0 to m−1) not including the dummy nodes, the higher priority determination node derived from the code T0,1 which originally should be output by the decision node of the zero-th digit has a second selecting means for taking the negative logic of the results obtained by respectively selecting the code Ti,0 when the code Ti,1 is "1" and the code Tj,0 when the code Ti,1 is "0" and outputting the result as the code ^Tij,0 and does not output the code Tij,1;

among the higher priority determination nodes of the m−q-th column (q is an odd number indicated by q=1 to m−1) not including the dummy node, the higher priority determination node derived from the code T0,1 which originally should be output by the decision node of the zero-th digit has a third selecting means for taking the negative logic of the results obtained by respectively selecting the code ^Ti,0 when the code ^Ti,1 is "0" and the code ^Tj,0 when the code ^Ti,1 is "1" and outputting the result as the code Tij,0 and does not output the code Tij,1;

when m is an even number, the output codes Tij,0 of the higher priority determination nodes from the zero-th row to the n−1-th row of the m-th column are used as the first digit to the n−1-th digit and the borrow output of the arithmetic and logic unit and it is respectively interpreted that "there is a borrow output" when the output code Tij,0 is "1" and that "there is no borrow output" when the output code Tij,0 is "0"; and when m is an odd number, the output codes ^Tij,0 of the higher priority determination nodes from the zero-th row to the n−1-th row of the m-th column are used as the first digit to the n−1-th digit and the borrow output of the arithmetic and logic unit and it is respectively interpreted that "there is a borrow output" when the output code ^Tij,0 is "0" and that "there is no borrow output" when the output code ^Tij,0 is "1".

75. An arithmetic and logic unit as set forth in claim 74, having an exclusive OR logic means of the zero-th digit for taking the exclusive OR logic of the digit value Xa0 and the digit value Yb0 and, when m is an even number, a difference generating means provided with an exclusive OR logic means of the zero-th row for taking the exclusive OR logic of the output of the exclusive OR logic means of zero-th digit and the carry input to the arithmetic and logic unit and defining this as the result of difference of the zero-th digits and exclusive OR logic means from the first row to the n−1-th row for taking the exclusive OR logic between each the output codes Ti,1 of the decision nodes from the first digit to the n−1-th digit and each of the output codes Tij,0 of the higher priority determination nodes from the zero-th row to the n−2-th row of the m-th column and defining this as the result of difference of the first digit to the n−1-th digit, and, when m is an odd number, a difference generating means provided with an exclusive OR logic means of the zero-th row for taking the exclusive OR logic of the output of the exclusive OR logic means of zero-th digit and the borrow input to the arithmetic and logic unit and defining this as the result of difference of the zero-th digits and exclusive OR logic means from the first row to the n−1-th row for taking the exclusive OR logic between each of the output codes Ti,1 of the decision nodes from the first digit to the n−1-th digit and each of negative logics of the output codes ^Tij,0 of the higher priority determination nodes from the zero-th row to the n−2-th row of the m-th column and defining this as the result of sum of the first digit to the n−1-th digit.

76. An arithmetic and logic unit, wherein, when decisions of existence of a borrow for the digits (Xai Ybi; i=0 to n−1) in the subtraction of two n-bit binary numbers (Xa−Yb) forms a series of decisions having an order dependency, it has n number of decision nodes which respectively output "true or false" when the result of difference of two numbers of the same digit places becomes negative, "false or true" when the result becomes positive, and "neither true nor false or do not know" when the result becomes zero as the result of the decision based on the digit values Xai, Ybi of the two numbers and a higher priority determination node matrix comprising n/2 number of rows and m number of columns (m is the smallest integer exceeding $\log_2 n$) with rows corresponding to the odd number digits of the two numbers;

the group of higher priority determination node of the first column has a higher priority determination node of the h1-th row which receives as its input the result of decision of the h1−1-th digit and the decision node of h1-th digit (h1=odd number from 1 to n−1), outputs the result of the decision of the decision node h1-th digit as the result when the result of decision of the decision node of the h1-th digit is "true" or "false", and outputs the result of the decision of the decision node of h1−1-th digit as the result when the result of decision of the decision node of h1-th digit is "neither true nor false or do not know";

the group of higher priority determination nodes of the k-th column (k=2 to m) has higher priority determination nodes from the first to $2^{k-1}$-th odd number rows as dummy nodes for respectively propagating the results of decisions of the higher priority determination nodes of the first to $2^{k-1}-1$-th odd number rows as they are and a higher priority determination node of the hk-th row which receives as its input the result of decision of the higher priority determination node of the hk−$2^{k-1}$-th row and the higher priority determination node of the hk-th row (hk=odd number from $2^{k-1}$ to n−1), outputs the result of decision of the higher priority determination node of the hk-th row as the result when the result of decision of the higher priority determination node of the hk-th row is "true" or "false", and outputs the result of decision of the higher priority determination node of the hk−$2^{k-1}$-th row as the result when the result of decision of the higher priority determination node of the hk-th row is "neither true nor false or do not know"; and the n number of decision nodes and the groups of the higher priority determination nodes of the columns are respectively simultaneously processed.

77. An arithmetic and logic unit as set forth in claim 76, wherein:

when the result of decision "true" is defined as the value code "Y", "false" is defined as the value code "N", and "neither true nor false or do not know" is defined as the value code "Q", respectively, each higher priority determination node is given as a K operator for deriving one code Tij∈{Y, N, Q} from two codes, that is, the code Ti∈{Y, N, Q} derived from the result of decision of the decision node of the higher significant bit and the code Tj∈{Y, N, Q} derived from the result of decision of the decision node of the lower significant bit; and where the code Ti is superior to the code Tj, a K operator defines the value code "Y" or the value code "N" as the value code taken by the code Tij wherein the code Ti is the value code "Y" or the value code "N" and defines the value code taken by the code Tj as the value code taken by the code Tij when the code Ti is the value code "Q".

78. An arithmetic and logic unit as set forth in claim 76, wherein:

when the result of decision "true" is defined as the value code "Y", "false" is defined as the value code "N", and "neither true nor false or do not know" is defined as the value code "Q", respectively, each higher priority determination node is given as a K operator for deriving one code Tij∈{Y, N, Q} from two codes, that is, the code Ti∈{Y, N, Q} derived from the result of decision of the decision node of the higher significant bit and the code Tj∈{Y, N, Q} derived from the result of decision of the decision node of the lower significant bit; and where the code Ti is superior to the code Tj, when any code X is assigned by a 2-bit binary number (X, 1, X, 0) defining the value code "Y" as {11}, the value code "N" as {10}, and the value code as {0*} (here, "*" is "don't care"), an OR logic is denoted by a "+" operator, an AND logic is denoted by a "·" operator, and a negative logic is denoted by a "^" operator, respectively, the K operator is given as:

$TiKTj = Tij$ $(Ti, 1, Ti, 0)K(Tj, 1, Tj, 0) = (Tij, 1, Tij, 0)$ $= (Ti, 1 + Tj, 1, Ti, 1 \cdot Ti, 0 +^\wedge Ti, 1 \cdot Tj, 0).$ 79. An arithmetic and logic unit as set forth in claim 78, wherein:
the decision nodes from the first digit to the n–1-th digit each has
an exclusive OR logic means for taking the exclusive OR logic of the digit value Xai and the digit value Ybi and outputting the result as the code Ti,1 and
a connecting means for outputting the digit value Ybi as the code Ti,0;
the decision node of the zero-th digit has
a NOR logic means for taking the NOR logic of ^Xa0 as the negative logic of the digit value Xa0 and the digit value Yb0,
a NAND logic means for taking the NAND logic of ^Xa0 of the negative logic of the digit value Xa0 and the digit value Yb0, and
a selecting means for taking the negative logic of the results obtained by respectively selecting the output of the NOR logic means when the borrow input to the arithmetic and logic unit is "1" and selecting the output of the NAND logic means when the borrow input is "0" and outputting the result as the code T0,0 and does not output the code T0,1;
among the higher priority determination nodes not including the dummy nodes, each higher priority determination node not derived from the code T0,1 which originally should be output by the decision node of the zero-th digit has
an OR logic means for taking the OR logic of the code Ti,1 and the code Tj,1 and outputting the result as the code Tij,1 and
a selecting means for respectively selecting the code Ti,0 when the code Ti,1 is "1", selecting the code Tj,0 when the code Ti,1 is "0", and outputting the result as the code Tij,0;
among the higher priority determination nodes not including the dummy nodes, the higher priority determination node derived from the code T0,1 which originally should be output by the decision node of the zero-th digit has
a selecting means for respectively selecting the code Ti,0 when the code Ti,1 is "1", selecting the code Tj,0 when the code Ti,1 is "0", and outputting the result as the code Tij,0 and does not output the code Tij,1;
the output code Tij,0 of the higher priority determination node of the n–1-th row of the m-th column is used as the borrow output of the arithmetic and logic unit and it is interpreted that "there is a borrow output" when the output code Tij,0 is "1" and that "there is no borrow output" when the output code Tij,0 is "0", respectively;
the arithmetic and logic unit has
an exclusive OR logic means of the zero-th digit for taking the exclusive OR logic of the digit value Xa0 and the digit value Yb0 and
a difference generating means; and
the difference generating means has an exclusive OR logic means of the zero-th row for taking the exclusive OR logic of the output of the exclusive OR logic means of zero-th digit and the borrow input to the arithmetic and logic unit and defining this as the result of difference of the zero-th digits,
an exclusive OR logic means of the first row for taking the exclusive OR logic between the output code T0,0 of the decision node of the zero-th digit and the negative logic of the output code T1,1 of the decision node of the first digit and defining this as the result of the difference of the first digits,
a borrow generating means of the f-th row for respectively selecting the input digit value Ybf to the row when the output code Tf,1 of the decision node of the f-th digit (f=even number from 2 to n–1) is "1" and selecting the output code of the higher priority determination node of the f–1-th row when the output code Tf,1 is "0" and outputting the result as the borrow to the f+1-th digit,
an exclusive OR logic means of the f-th row for taking the exclusive OR logic between the output code Tf,1 of the decision node of the f-th digit and the output code of the higher priority determination node of the f–1-th row and defining this as the result of difference of the f-th digits, and
an exclusive OR logic means of the f+1-th row for taking the exclusive OR logic between the output code Tf+1,1 of the decision node of the f+1-th digit and the output of the borrow generating means of the f-th row and defining this as the result of difference of the f+1-th digits.

80. An arithmetic and logic unit as set forth in claim 78, wherein:
each decision nodes from the first digit to the n–1-th digit has
an exclusive OR logic means for taking the exclusive OR logic of the digit value Xai and the digit value Ybi and outputting the result as the code Ti,1 and
a connecting means for outputting the digit value Ybi as the code Ti,0;
the decision node of the zero-th digit has
a NOR logic means for taking the NOR logic of ^Xa0 as the negative logic of the digit value Xa0 and the digit value Yb0,
a NAND logic means for taking the NAND logic of ^Xa0 as the negative logic of the digit value Xa0 and the digit value Yb0, and
a selecting means for taking the negative logic of the results obtained by respectively selecting the output of the NOR logic means when the borrow input to the arithmetic and logic unit is "1" and selecting the output of the NAND logic means when the borrow input is "0" and outputting the result as the code T0,0 and does not output the code T0,1;
the higher priority determination nodes from the first to $2^{k-1}-1$-th (k=2 to m) odd number rows of the k-th column are defined as dummy nodes which respectively invert the results of decisions of the higher significant priority determination nodes from the first to $2^{k-1}-1$-th odd number rows and propagate the same;
among the higher priority determination nodes of the m–p-th column (p is an even number indicated by p=0 to m–1) not including the dummy nodes, each higher priority determination node not derived from the code T0,1 which originally should be output by the decision node of the zero-th digit has a NOR logic means for taking the NOR logic of the code Ti,1 and the code Tj,1 and outputting the result as the code ^Tij,1 and a selecting means for taking the negative logic of the results obtained by respectively selecting the code Ti,0 when the code Ti,1 is "1" and the code Tj,0 when the code Ti,1 is "0" and outputting the result as the code ^Tij,0;

among the higher priority determination nodes of the m−q-th column (q is an odd number indicated by q=1 to m−1) not including the dummy nodes, each higher priority determination node not derived from the code T0,1 which originally should be output by the decision node of the zero-th digit has a NAND logic means for taking the NAND logic of the code ^Ti,1 and the code ^Tj,1 and outputting the result as the code Tij,1 and a third selecting means for taking the negative logic of the results obtained by respectively selecting the code ^Ti,0 when the code ^Ti1 is "0" and the code ^Tj,0 when the code ^Ti,1 is "1" and outputting the result as the code Tij,0;

among the higher priority determination nodes of the m−p-th column (p is an even number indicated by p=0 to m−1) not including the dummy nodes, the higher priority determination node derived from the code T0,1 which originally should be output by the decision node of the zero-th digit has a second selecting means for taking the negative logic of the results obtained by respectively selecting the code Ti,0 when the code Ti,1 is "1" and the code Tj,0 when the code Ti,1 is "0" and outputting the result as the code ^Tij,0 and does not output the code Tij,1;

among the higher priority determination nodes of the m−q-th column (q is an odd number indicated by q=1 to m−1) not including the dummy node, the higher priority determination node derived from the code T0,1 which originally should be output by the decision node of the zero-th digit has a third selecting means for taking the negative logic of the results obtained by respectively selecting the code ^Ti,0 when the code ^Ti,1 is "0" and the code ^Tj,0 when the code ^Ti,1 is "1" and outputting the result as the code Tij,0 and does not output the code Tij,1;

when m is an even number, the output code Tij,0 of the higher priority determination node of the n−1-th row of the m-th column is used as the borrow output of the arithmetic and logic unit and it is respectively interpreted that "there is a borrow output" when the output code Tij,0 is "1" and that "there is no borrow output" when the output code Tij,0 is "0"; and when m is an odd number, the output code ^Tij,0 of the higher priority determination node of the n−1-th row of the m-th column is used as the borrow output of the arithmetic and logic unit and it is respectively interpreted that "there is a borrow output" when the output code ^Tij,0 is "0" and that "there is no borrow output" when the output code ^Tij,0 is "1";

the arithmetic and logic unit has an exclusive OR logic means of the zero-th digit for taking the exclusive OR logic of the digit value Xa0 and the digit value Yb0 and a difference generating means;

the difference generating means has, when m is an even number, an exclusive OR logic means of the zero-th row for taking the exclusive OR logic of the output of the exclusive OR logic means of the zero-th digit and the borrow input to the arithmetic and logic unit and defining this as the result of difference of the zero-th digits, an exclusive OR logic means of the first row for taking the exclusive OR logic between the output code T0,0 of the decision node of the zero-th digit and the output code T1,1 of the decision node of the first digit and defining this as the result of the difference of the first digits, a borrow generating means of the f-th row for respectively selecting the input digit value Ybf to the row when the output code Tf,1 of the decision node of the f-th digit (f=even number from 2 to n−1) is "1" and selecting the output code of the higher priority determination node of the f−1-th row when the output code Tf,1 is "0" and outputting the result as a borrow to the f+1-th digit, an exclusive OR logic means of the f-th row for taking the exclusive OR logic between the output code Tf,1 of the decision node of the f-th digit and the output code of the higher priority determination node of the f−1-th row and defining this as the result of difference of the f-th digits, and an exclusive OR logic means of the f+1-th row for taking the exclusive OR logic between the output code Tf+1,1 of the decision node of the f+1-th digit and the output of the borrow generating means of the f-th row and defining this as the result of difference of the f+1-th digits, and, when m is an odd number, an exclusive OR logic means of the zero-th row for taking the exclusive OR logic of the output of the exclusive OR logic means of zero-th digit and the borrow input to the arithmetic and logic unit, and defining this as the result of difference of the zero-th digits, an exclusive OR logic means of the first row for taking the exclusive OR logic between the output code T0,0 of the decision node of the zero-th digit and the output code T1,1 of the decision node of the first digit and defining this as the result of the difference of the first digits, a borrow generating means of the f-th row for respectively selecting the input digit value Ybf to the row when the output code Tf,1 of the decision node of the f-th digit (f=even number from 2 to n−1) is "1" and selecting the negative logic of the output code of the higher priority determination node of the f−1-th row when the output code Tf,1 is "0" and outputting the result as a borrow to the f+1-th digit, an exclusive OR logic means of the f-th row for taking the exclusive OR logic between the output code Tf,1 of the decision node of the f-th digit and the negative logic of the output code of the higher priority determination node of the f−1-th row and defining this as the result of difference of the f-th digits, and an exclusive OR logic means of the f+1-th row for taking the exclusive OR logic between the output code Tf+1,1 of the decision node of the f+1-th digit, and the output of the borrow generating means of the f-th row, and defining this as the result of difference of the f+1-th digits.

81. An arithmetic and logic unit for finding the absolute value of the difference of two n-bit binary numbers (Xa, Yb), having a decision node which outputs the value code "Y" meaning "true" when the result of difference (Xai−Ybi) of two numbers of the same digit places becomes negative, the value code "N" meaning "false" when the result becomes positive, and the value code "Q" meaning "neither true nor false or do not know" when the result becomes zero as the result of the decision based on the digit values Xai and Ybi (i=0 to n−1) of the two numbers and has a matrix of the higher priority determination nodes consisting of n number of rows and m number of columns (m is the smallest integer exceeding $\log_2 n$) with rows corresponding to the digits of the two numbers and a borrow generating unit for generating a borrow of the digits in the absolute value operation of the difference;

the group of higher priority determination nodes of the first column has a higher priority determination node of the zero-th row as a dummy node for propagating the result of decision of the decision node of the zero-th digit as it is and a higher priority determination node of the h1-th row which receives as its input the result of decision of the h1−1-th digit and the decision node of h1-th digit (h1=1 to n−1), outputs the result of decision of the decision node of the h1-th digit as the result when the result of decision of the decision node of the h1-th digit is "true" or "false", and outputs the result of decision of the decision node of h1−1-th digit as the result when the result of decision of the decision node of h1-th digit is "neither true nor false or do not know";

the group of higher priority determination nodes of the k-th column (k=2 to m) has higher priority determination nodes from the zero-th row to the $2^{k-1}$-th row as the dummy nodes for respectively propagating the results of decisions of the higher priority determination nodes from the zero-th row to the $2^{k-1}-1$-th row as they are and a higher priority determination node of the hk-th row which receives as its input the result of decision of the higher priority determination node of the hk-$2^{k-1}$-th row and the higher priority determination node of the hk-th row (hk=$2^{k-1}$ to n−1), outputs the result of decision of the higher priority determination node of the hk-th row as the result when the result of decision of the higher priority determination node of the hk-th row is "true" or "false", and outputs the result of decision of the higher priority determination node of the hk-$2^{k-1}$-th row as the result when the result of decision of the higher priority determination node of the hk-th row is "neither true nor false or do not know";

the borrow generation unit has a code judging means for judging the code for the result of difference (Xa−Yb) of the two numbers based on the result of the borrow generation of the n−1-th digit generated from the higher priority determination node of the n−1-th row and the m-th column, code replacing means from the zero-th row to the n−2-th row for replacing the value code "Q" with the value code "Q", the value code "Y" with the value code "N", and the value code "N" with the value code "Y", respectively for the output codes of the higher priority determination nodes from the zero-th row to the n−2-th row not including the higher priority determination node of the n−1-th row in the higher priority determination node group of the m-th column where the code is negative or negative or zero as the result of code judgement of the code judging means, respectively, and not performing the replacement, and leaving them as they are where the result is positive or zero or positive, and a second code replacing means of the zero-th row to the n−2-th row for replacing the value code "Q" with the value code "N" to obtain a borrow of each digit for the output of the code replacing means of the zero-th row to the n−2-th row; and the n number of decision nodes, the groups of higher priority determination nodes of the columns, and the code replacing means of the zero-th row to the n−2-th row and the second code replacing means are respectively simultaneously processed.

82. An arithmetic and logic unit as set forth in claim 81, wherein:

each higher priority determination node is given as a K operator for deriving one code Tij∈{Y, N, Q} from two codes, that is, the code Ti∈{Y, N, Q} derived from the result of decision of the decision node of the higher significant bit and the code Tj∈{Y, N, Q} derived from the result of decision of the decision node of the lower significant bit; and a K operator defines the value code "Y" or the value code "N" as the value code taken by the code Tij where the code Ti is the value code "Y" or the value code "N" and defines the value code taken by the code Tj as the value code taken by the code Tij where the code Ti is the value code "Q".

83. An arithmetic and logic unit as set forth in claim 81, wherein:

each higher priority determination node is given as a K operator for deriving one code Tij∈{Y, N, Q} from two codes, that is, the code Ti∈{Y, N, Q} derived from the result of decision of the decision node of the higher significant bit and the code Tj∈{Y, N, Q} derived from the result of decision of the decision node of the lower significant bit; and where the code Ti is superior to the code Tj, when any code X is assigned by a 2-bit binary number (X, 1, X, 0) defining the value code "Y" as {11}, the value code "N" as {10}, and the value code as {0*} (here, "*" is "don't care"), an OR logic is denoted by a "+" operator, an AND logic is denoted by a "^" operator, and a negative logic is denoted by "ˆ" operator, respectively, a K operator is given as:

$$TiKTj = Tij$$

$$(Ti, 1, Ti, 0)K(Tj, 1, Tj, 0) = (Tij, 1, Tij, 0)$$

$$= (Ti, 1 + Tj, 1, Ti, 1 \cdot Ti, 0 +{}^{\wedge} Ti, 1 \cdot Tj, 0).$$

84. An arithmetic and logic unit as set forth in claim 83, wherein:

each decision node has an exclusive OR logic means for taking the exclusive OR logic of the digit value Xai and the digit value Ybi and outputting the result as the code Ti,1 and a connecting means for outputting the digit value Ybi as the code Ti,0;

each higher priority determination node not including the dummy nodes has an OR logic means for taking the OR logic of the code Ti,1 and the code Tj,1 and outputting the result as the code Tij,1 and a selecting means for respectively selecting the code $T_{i,0}$ when the code $T_{i,1}$ is "1" and code $T_{j,0}$ when the code $T_{i,1}$ is "0" and outputting the result as the code $T_{ij,0}$;

a code judging means outputs a code judgement signal which becomes "true" when the output code Tij from the higher priority determination node of the n–1-th row and the m-th column is the value code "Y", "false" when it is the value code "Q" or "N", or "true" when the output code Tij is the value code "Y" or "Q", and "false" when it is the value code "N";

the code replacing means of the zero-th row to the n–2-th row have exclusive logical means for respectively taking the exclusive OR logic between the code judgement signal from the code judging means and the output code $T_{ij,0}$ of the higher priority determination nodes from the zero-th row to the n–2-th row;

the second code replacing means of the zero-th row to the n–2-th row have AND logic means for respectively taking the AND logic between the outputs of the code replacing means from the zero-th row to the n–2-th row and the output codes $T_{ij,1}$ of the higher priority determination nodes from the zero-th row to the n–2-th row; and the arithmetic and logic unit has a difference generating means provided with a connecting means for defining the output code $T_{i,1}$ of the decision node of the zero-th digit as the result of the absolute value of the difference and the exclusive OR logic means for taking the exclusive OR logic between each of the output codes $T_{i,1}$ of the decision nodes from the first digit to the n–1-th digit and each of outputs of the second node replacing means from the zero-th row to the n–2-th row and defining the same as the result of the absolute value of differences from the first digit to the n–1-th digit.

85. An arithmetic and logic unit as set forth in claim 81, wherein:

when the arithmetic and logic unit finds the operation for obtaining the absolute value of a difference of the two code-bearing n-bit binary numbers (Xa, Yb), the decision node performing the comparison decision for the MSB (most significant bit) of the two numbers treats the digit value Xan–1 as the digit value Ybn–1 and treats the digit value Ybn–1 as the digit value Xan–1, respectively.

* * * * *